US012280512B2

(12) United States Patent
Dryfhout

(10) Patent No.: US 12,280,512 B2
(45) Date of Patent: Apr. 22, 2025

(54) SAFETY RAZOR WITH COMB AND BLADE

(71) Applicant: BAKBLADE LIMITED, London (GB)

(72) Inventor: Matthew James Dryfhout, Homer Glen, IL (US)

(73) Assignee: Bakblade Limited, London (GB)

( * ) Notice: Subject to any disclaimer, the term of this patent is extended or adjusted under 35 U.S.C. 154(b) by 428 days.

(21) Appl. No.: 17/444,281

(22) Filed: Aug. 2, 2021

(65) Prior Publication Data

US 2021/0362364 A1 Nov. 25, 2021

Related U.S. Application Data

(60) Division of application No. 16/248,760, filed on Jan. 15, 2019, now Pat. No. 11,077,570, which is a division of application No. 15/162,606, filed on May 23, 2016, now abandoned, which is a continuation of application No. 15/156,816, filed on May 17, 2016, now Pat. No. 10,315,322, said application No. 16/248,760 is a division of application No. 15/156,868, filed on May 17, 2016, now Pat. No. 10,500,744, said application No. 15/162,606 is a (Continued)

(51) Int. Cl.

| | |
|---|---|
| ***B26B 21/12*** | (2006.01) |
| ***B26B 21/40*** | (2006.01) |
| ***B26B 21/52*** | (2006.01) |

(52) U.S. Cl.

CPC ............ *B26B 21/12* (2013.01); *B26B 21/125* (2013.01); *B26B 21/4031* (2013.01); *B26B 21/4081* (2013.01); *B26B 21/523* (2013.01)

(58) Field of Classification Search

CPC ....... B26B 21/12; B26B 21/125; B26B 21/16; B26B 21/4018; B26B 21/4025; B26B 21/4031; B26B 21/52; B26B 21/523; B26B 21/22; B26B 21/227

USPC ................. 30/30, 31, 47–84, 526, 532, 534; D28/52; 132/213.1

See application file for complete search history.

(56) References Cited

U.S. PATENT DOCUMENTS 65,130 A 5/1867 Spblman
775,134 A 11/1904 Gillette (Continued)

FOREIGN PATENT DOCUMENTS

CA 2936645 A1 8/2015
CN 2329495 Y 7/1999

(Continued)

OTHER PUBLICATIONS

Shave from www.ishave.com downloaded Jun. 24, 2008.

(Continued)

*Primary Examiner* — Jason Daniel Prone

(74) *Attorney, Agent, or Firm* — Tarter Krinsky & Drogin LLP

(57) ABSTRACT

A safety razor removes hair from skin using the cutting blade comprising a sharp edge along an elongated side of a planar surface. An outer comb has a row of outer teeth running along the planar surface on an outside of the cutting blade, each outer tooth is substantially perpendicular to the sharp edge and spaced with a gap between the row of the outer teeth and the planar surface of the cutting blade. Ends of the row of outer teeth comprise outer teeth tips. An inner guard runs along the planar surface on an inside of the cutting blade.

18 Claims, 61 Drawing Sheets

Related U.S. Application Data continuation-in-part of application No. 14/170,269, filed on Jan. 31, 2014, now Pat. No. 9,718,200, said application No. 15/156,868 is a continuation-in-part of application No. 14/170,269, filed on Jan. 31, 2014, now Pat. No. 9,718,200.

(56) References Cited

U.S. PATENT DOCUMENTS 913,005 A 2/1909 Lancellotte
974,083 A 10/1910 Likewise
991,147 A 5/1911 Gillette
1,047,617 A 12/1912 Cress
1,060,245 A 4/1913 Gaisman
1,111,721 A 9/1914 Gillette
1,158,480 A 11/1915 Gillette
1,158,481 A 11/1915 Gillette
1,288,522 A 12/1918 Cowan
1,383,516 A 7/1921 Benton
1,386,353 A 8/1921 Norton
D59,243 S 10/1921 MacLagan
1,419,187 A 6/1922 Wilson
1,477,689 A 12/1923 Burns
1,496,295 A 6/1924 Chance
1,572,154 A 2/1926 McConoughey
1,749,051 A 3/1930 Watt
1,789,234 A 1/1931 John
1,876,570 A 9/1932 Cesario
1,899,414 A 2/1933 Gray
1,976,987 A 10/1934 Gardner
2,108,267 A 2/1938 O'Neil
2,151,265 A 3/1939 Clausen
2,165,391 A 7/1939 Lewis
2,168,447 A 8/1939 Patterson
2,171,880 A 9/1939 Lewis
2,198,531 A 4/1940 Fulenwider
D123,180 S 10/1940 Pileggi
D124,684 S 1/1941 Werner
2,229,971 A 1/1941 Hammerling
2,234,440 A 3/1941 Lewis
2,237,676 A 4/1941 Lewis
2,325,868 A 5/1941 Morrow
2,252,628 A 8/1941 Grachan
2,256,326 A 9/1941 Quinio
2,270,388 A 1/1942 Stampleman
2,288,299 A 6/1942 Pileggi
2,363,894 A 11/1944 Muros
2,370,815 A 3/1945 Ross
D150,189 S 7/1948 Zurlinden
D154,784 S 8/1949 Lazar
2,488,436 A 11/1949 Santoro, Sr.
D157,063 S 1/1950 Mansfield
D157,064 S 1/1950 Mansfield
2,502,062 A 3/1950 Rieger
D159,994 S 9/1950 Lee
D161,784 S 1/1951 Palmer
2,536,485 A 1/1951 Behr
2,568,368 A 9/1951 Sayer et al.
2,580,058 A 12/1951 Willhelm
2,587,964 A 3/1952 Burns
RE23,505 E 5/1952 Davis
2,615,243 A 10/1952 Brown
2,615,244 A 10/1952 Mansfield
D169,147 S 3/1953 Lamb
2,633,635 A 4/1953 North
2,641,055 A 6/1953 Mansfield
2,661,529 A 12/1953 Infantino
2,663,930 A 12/1953 Zazzo
2,670,533 A 3/1954 Kearney
2,703,449 A 3/1955 Haynes
2,725,886 A 12/1955 Gagliano
2,746,144 A 5/1956 Spanel
2,766,521 A 10/1956 Benvenuti
2,810,953 A 10/1957 Brody
2,814,865 A 12/1957 Sunich
2,834,357 A 5/1958 Gould
2,840,901 A 7/1958 Narizzano
2,858,835 A 11/1958 Parziale
2,866,984 A 1/1959 Plough
2,869,229 A 1/1959 Hightower
2,896,320 A 7/1959 Caplan
2,900,718 A 8/1959 Bailey
2,952,907 A 9/1960 Miller
2,959,853 A 11/1960 Mercer
2,967,354 A 1/1961 Ahlborn
2,972,187 A 2/1961 Gore
D190,580 S 6/1961 Christensen
3,041,721 A 7/1962 Quinio, Sr.
3,054,180 A 9/1962 Gore
3,084,430 A 4/1963 Pacitti
D195,954 S 8/1963 Chrislcnscn
3,106,020 A 10/1963 Tape
D197,588 S 2/1964 Macon
3,138,865 A 6/1964 Meyer
3,238,616 A 3/1966 Eweson
3,259,978 A 7/1966 Weichselbaum
D205,453 S 8/1966 Christensen
D208,619 S 9/1967 Baker
3,358,367 A 12/1967 Bartley
3,384,960 A 5/1968 Solomon
D211,443 S 6/1968 Tin
3,402,467 A 9/1968 Manahan
3,413,720 A 12/1968 Mullen
3,421,213 A 1/1969 Pawlikowski
D219,501 S 1/1970 Trevor
3,500,539 A 3/1970 Muros
3,536,080 A 10/1970 Player
3,570,121 A 3/1971 Graceffo
3,571,927 A 3/1971 Stone
3,599,327 A 8/1971 Calandra
3,644,992 A 2/1972 Bennett et al.
3,646,672 A 3/1972 Braginetz
3,675,323 A 7/1972 Braginetz
3,768,161 A 10/1973 Miller
3,805,381 A 4/1974 Broussard
3,816,912 A 6/1974 Glaberson
3,816,913 A 6/1974 Ferraro
D232,874 S 9/1974 Koblick
3,834,017 A 9/1974 Tolmie
D235,696 S 7/1975 Krupski
3,895,437 A 7/1975 DiBuono
3,969,817 A 7/1976 DiBuono
3,986,258 A 10/1976 Liedtke
4,009,517 A 3/1977 Horn
4,011,656 A 3/1977 Liedtke
4,020,549 A 5/1977 Edwards
4,026,016 A 5/1977 Nissen
4,069,580 A 1/1978 Cartwright et al.
4,074,429 A 2/1978 Roberts
4,094,066 A 6/1978 Daniel, Jr.
4,163,316 A 8/1979 Hagmann et al.
4,198,746 A 4/1980 Trotta
D259,743 S 6/1981 Hollinger
4,281,456 A 8/1981 Douglass et al.
RE30,913 E 4/1982 Cartwright et al.
4,335,509 A 6/1982 Smith
4,344,226 A 8/1982 Blake, III
4,346,721 A 8/1982 Molaro
4,378,633 A 4/1983 Jacobson
4,401,129 A 8/1983 Luque
4,409,735 A 10/1983 Cartwright et al.
4,441,252 A 4/1984 Caves
4,446,619 A 5/1984 Jacobson
4,461,078 A 7/1984 Carreker
4,501,066 A 2/1985 Sceberras
4,512,077 A 4/1985 Tanabe et al.
4,550,718 A 11/1985 Kaeser
4,562,644 A 1/1986 Hitchens
4,599,793 A 7/1986 Iten
4,663,841 A 5/1987 Custer
4,692,986 A 9/1987 Motta
4,709,475 A 12/1987 Phung
4,712,300 A 12/1987 Hemmeter
4,741,103 A 5/1988 Hultman

(56) References Cited

U.S. PATENT DOCUMENTS 4,768,528 A 9/1988 Steele
4,831,731 A 5/1989 Elits
4,850,107 A 7/1989 Valliades
4,893,641 A 1/1990 Strickland
4,905,372 A 3/1990 Willis
4,912,846 A 4/1990 Yu
4,926,553 A 5/1990 Miskin
4,928,716 A 5/1990 Greene
4,955,136 A 9/1990 Diaz-Rivera
D312,144 S 11/1990 Buba
D314,247 S 1/1991 Amit
5,009,003 A 4/1991 Grange
5,010,645 A 4/1991 Furukawa
5,031,316 A 7/1991 Oldroyd
5,031,319 A 7/1991 Althaus
5,129,157 A 7/1992 Wood
5,167,069 A 12/1992 Quinn
5,220,728 A 6/1993 Masayuki et al.
5,236,439 A 8/1993 Kozikowski
5,333,383 A 8/1994 Ferraro
5,343,622 A 9/1994 Andrews
5,351,356 A 10/1994 Townsend
D352,568 S 11/1994 Meisner
D353,941 S 1/1995 O'Hearn
D354,626 S 1/1995 Hurwitz
D355,049 S 1/1995 Yasui
5,386,750 A 2/1995 Morrison
5,388,332 A 2/1995 Oldroyd
5,410,810 A 5/1995 Gillibrand
5,426,853 A 6/1995 McNinch
D364,939 S 12/1995 Scott
5,522,137 A 6/1996 Andrews
5,524,346 A 6/1996 Backhaus
5,526,568 A 6/1996 Copelan
5,560,106 A 10/1996 Armbruster
5,560,746 A 10/1996 Willow
5,643,403 A 7/1997 Poole
5,673,711 A 10/1997 Andrews
5,704,127 A 1/1998 Cordio
D391,021 S 2/1998 van Oene
5,771,589 A 6/1998 Kim
5,771,591 A 6/1998 Armbruster
5,778,535 A 7/1998 Ledesma
5,787,594 A 8/1998 Estrada
5,802,720 A 9/1998 Pribe
5,802,721 A 9/1998 Wain
5,911,480 A 6/1999 Morgan
5,933,960 A 8/1999 Avidor
5,944,032 A 8/1999 Masterson
6,018,877 A 2/2000 Greene
6,032,372 A 3/2000 Dischler
6,041,503 A 3/2000 Calwell
6,058,608 A 5/2000 Wruck
D428,667 S 7/2000 Christian
6,082,007 A 7/2000 Andrews
6,094,820 A 8/2000 Adachi
6,112,421 A 9/2000 Greene
6,125,857 A 10/2000 Silber
6,141,875 A 11/2000 Andrews
D435,316 S 12/2000 Chenvainu
6,161,288 A 12/2000 Andrews
6,164,290 A 12/2000 Andrews
6,189,222 B1 2/2001 Doyle
6,249,973 B1 6/2001 Hirano
6,266,888 B1 7/2001 Zowaski
6,301,785 B1 10/2001 Kwiecien et al.
6,308,416 B1 10/2001 Bosy
D452,046 S 12/2001 Borcherds
6,418,623 B1 7/2002 Marcarelli
6,434,828 B1 8/2002 Andrews
D463,622 S 9/2002 Harrington
6,449,849 B1 9/2002 Hackerman
6,476,984 B1 11/2002 Ringdahl
6,493,950 B1 12/2002 Kludjian et al.
6,519,856 B1 2/2003 Dischler
D472,673 S 4/2003 Carvotta
6,550,148 B2 4/2003 Cecil
6,581,290 B1 6/2003 Fishel
D476,772 S 7/2003 Wonderley
6,598,303 B2 7/2003 Bosy
6,681,665 B2 1/2004 Calwell
6,694,626 B2 2/2004 Kludjian et al.
6,722,039 B2 4/2004 Kitano
D495,827 S 9/2004 Branden
D495,844 S 9/2004 Berti
D496,129 S 9/2004 Ogi
6,823,594 B2 11/2004 Kludjian et al.
D499,511 S 12/2004 Wakayama
D500,172 S 12/2004 Fields
6,871,403 B2 3/2005 Clark
6,886,262 B2 5/2005 Ohtsubo
D506,035 S 6/2005 Dombrowski
D507,379 S 7/2005 Alphonso
6,915,580 B2 7/2005 Dassel
6,973,730 B2 12/2005 Tomassetti
7,028,407 B2 4/2006 Ehrlich et al.
7,093,363 B1 8/2006 Kuo
7,103,980 B2 9/2006 Leventhal
7,140,115 B2 11/2006 Greene
7,140,116 B2 11/2006 Coffin
D542,972 S 5/2007 Pryor
7,251,849 B2 8/2007 Moskovich
D550,400 S 9/2007 Orloff
D560,032 S 1/2008 Lopez
7,316,045 B2 1/2008 Koke
D563,044 S 2/2008 Ramm
D585,157 S 1/2009 Park
7,475,481 B1 1/2009 Napoli
D587,846 S 3/2009 Wonderley
D593,711 S 6/2009 Yamamoto
7,540,088 B2 6/2009 Takeshita
D603,096 S 10/2009 Greene
D605,362 S 12/2009 Andersen
D611,653 S 3/2010 Marut
D611,654 S 3/2010 Nakasuka
D611,655 S 3/2010 Askew
7,681,314 B2 3/2010 Folio
7,698,823 B1 4/2010 Iadarola
D616,147 S 5/2010 Adams
7,685,720 B2 5/2010 Efthimiadis
7,726,032 B1 6/2010 Hernandez
D621,544 S 8/2010 Bommarito
D623,800 S 9/2010 Clemons
7,856,725 B2 12/2010 Marut
D630,378 S 1/2011 Jung
D631,198 S 1/2011 Adams
7,926,183 B2 4/2011 Groh
D638,580 S 5/2011 Adams
7,934,320 B2 5/2011 Gratsias et al.
D640,415 S 6/2011 Wonderley
D641,928 S 7/2011 Psimadas
8,006,393 B2 8/2011 Collins
8,033,027 B2 10/2011 Leventhal
D653,395 S 1/2012 Adams
8,091,241 B2 1/2012 Ouchi et al.
D654,222 S 2/2012 Coresh
D656,675 S 3/2012 Payne
8,141,258 B1 3/2012 Frisch et al.
D659,904 S 5/2012 Gilbert
8,166,658 B2 5/2012 Nakasuka
8,166,661 B2 5/2012 King
D664,297 S 7/2012 Prat-Pfister
8,209,869 B2 7/2012 Royle
8,302,239 B2 11/2012 Lantsberg
8,307,552 B1 11/2012 Drouillard
D669,220 S 12/2012 Otsuka
D669,221 S 12/2012 Otsuka
D674,546 S 1/2013 Barrow
D676,197 S 2/2013 Boulanger
D678,610 S 3/2013 Prat-Pfister
8,413,334 B2 4/2013 Walker, Jr et al.
8,479,398 B2 7/2013 Coresh
8,484,852 B2 7/2013 King
8,524,207 B2 9/2013 Ellis

(56) References Cited

U.S. PATENT DOCUMENTS

| | | | |
|---|---|---|---|
| 8,539,961 B2 | 9/2013 | Gaugler | |
| 8,601,695 B2 | 12/2013 | Hamburg | |
| D698,999 S | 2/2014 | Otsuka | |
| D699,396 S | 2/2014 | Hasegawa | |
| D699,893 S | 2/2014 | Marut | |
| D700,997 S | 3/2014 | Marut | |
| 8,671,576 B1 | 3/2014 | Hotella | |
| 8,683,641 B2 | 4/2014 | Weinberger | |
| 8,701,291 B2 | 4/2014 | Hirano | |
| 8,707,561 B1 | 4/2014 | Kneier | |
| 8,720,072 B2 | 5/2014 | Bucco | |
| 8,726,517 B2 | 5/2014 | Lau | |
| 8,739,411 B2 | 6/2014 | Kinghorn | |
| 8,782,903 B2 | 7/2014 | Clarke et al. | |
| 8,782,911 B1 | 7/2014 | Greene | |
| 8,839,521 B2 | 9/2014 | Hazard | |
| 8,973,272 B2 | 3/2015 | Moon | |
| D741,015 S | 5/2015 | Sacks | |
| 9,032,628 B2 | 5/2015 | Hobson | |
| 9,049,976 B2 | 6/2015 | Blocker | |
| 9,108,328 B2 | 8/2015 | Kneier | |
| 9,149,944 B2 | 10/2015 | Hobson | |
| 9,193,080 B2 | 11/2015 | Whelan et al. | |
| 9,308,658 B2 | 4/2016 | Coviello | |
| 9,327,415 B1 | 5/2016 | Hovsepian | |
| D766,505 S | 9/2016 | Coviello | |
| D772,484 S | 11/2016 | Otsuka | |
| D773,734 S | 12/2016 | Li | |
| D776,384 S | 1/2017 | Eldridge | |
| D776,876 S | 1/2017 | Coviello | |
| D777,392 S | 1/2017 | Reaux | |
| 9,604,376 B2 | 3/2017 | Sacks | |
| D783,900 S | 4/2017 | Coviello | |
| 9,630,332 B2 | 4/2017 | Coresh | |
| 9,676,112 B2 | 6/2017 | Bolcar | |
| 9,718,200 B2 | 8/2017 | Dryfhout | |
| D798,065 S | 9/2017 | Brilla | |
| D802,213 S | 11/2017 | Contaldi | |
| D808,589 S | 1/2018 | Dryfhout | |
| 9,937,629 B1 | 4/2018 | Dryfhout | |
| 10,131,062 B1 | 11/2018 | Dryfhout | |
| 10,315,322 B1 | 6/2019 | Dryfhout | |
| 10,493,643 B1 | 12/2019 | Dryfhout | |
| 10,500,744 B1 | 12/2019 | Dryfhout | |
| 10,543,609 B2 | 1/2020 | Dryfhout | |
| 11,345,056 B1 * | 5/2022 | Wang | B26B 21/225 |
| D971,501 S * | 11/2022 | Wang | D28/46 |
| 11,511,449 B1 * | 11/2022 | Zeng | B26B 21/521 |
| 11,529,747 B1 * | 12/2022 | Zeng | B26B 21/4062 |
| D1,004,289 S * | 11/2023 | Dryfhout | D28/48 |
| 2002/0023352 A1 | 2/2002 | Mil'shtein | |
| 2002/0056197 A1 | 5/2002 | Johnson | |
| 2003/0000039 A1 | 1/2003 | Borcherds | |
| 2003/0014871 A1 | 1/2003 | Coffin | |
| 2003/0177648 A1 | 9/2003 | Zeiter | |
| 2003/0204958 A1 | 11/2003 | Jewell | |
| 2003/0208914 A1 | 11/2003 | Ehrlich | |
| 2004/0016126 A1 | 1/2004 | deBlois | |
| 2004/0035003 A1 | 2/2004 | Stiles | |
| 2004/0107585 A1 | 6/2004 | Helmrich | |
| 2004/0128835 A1 | 7/2004 | Coffin | |
| 2004/0177518 A1 | 9/2004 | Leventhal | |
| 2004/0181949 A1 | 9/2004 | Coffin | |
| 2005/0066532 A1 | 3/2005 | Kludjian | |
| 2005/0188554 A1 | 9/2005 | Kjemhus | |
| 2005/0198826 A1 | 9/2005 | Segrea | |
| 2005/0241162 A1 | 11/2005 | Nicolosi | |
| 2006/0101655 A1 | 5/2006 | Givant | |
| 2006/0130334 A1 | 6/2006 | Park | |
| 2006/0143926 A1 | 7/2006 | Khubani et al. | |
| 2006/0162165 A1 | 7/2006 | Villalobos | |
| 2007/0180700 A9 | 8/2007 | Sandor | |
| 2007/0283567 A1 | 12/2007 | Magli | |
| 2008/0034525 A1 | 2/2008 | Panfili | |
| 2009/0019700 A1 | 1/2009 | Shushan | |
| 2009/0032043 A1 | 2/2009 | Gaugler | |
| 2009/0255124 A1 | 10/2009 | Hasbani | |
| 2010/0071214 A1 | 3/2010 | Kinghorn | |
| 2010/0071215 A1 | 3/2010 | Wonderley | |
| 2010/0139097 A1 | 6/2010 | Perez-Lopez | |
| 2011/0094108 A1 | 4/2011 | Wain | |
| 2011/0094114 A1 | 4/2011 | Payne-Baggetta | |
| 2011/0146079 A1 | 6/2011 | Clarke | |
| 2011/0167639 A1 | 7/2011 | Lau | |
| 2011/0271534 A1 | 11/2011 | Briganti | |
| 2012/0090181 A1 | 4/2012 | Broekhuizen | |
| 2012/0110855 A1 | 5/2012 | Allen, Sr. | |
| 2012/0151772 A1 | 6/2012 | Moon | |
| 2012/0192427 A1 | 8/2012 | Hazard | |
| 2012/0192431 A9 | 8/2012 | Wain | |
| 2012/0210586 A1 | 8/2012 | Lelieveld | |
| 2012/0297625 A1 | 11/2012 | Madden | |
| 2013/0000127 A1 | 1/2013 | Coresh | |
| 2013/0019484 A1 | 1/2013 | Allen | |
| 2013/0023807 A1 | 1/2013 | Hennessey | |
| 2013/0152400 A1 | 6/2013 | Nunez | |
| 2013/0239413 A1 | 9/2013 | Fischer | |
| 2013/0298412 A1 | 11/2013 | Harski | |
| 2014/0033537 A1 | 2/2014 | Ramakrishnan | |
| 2014/0068948 A1 | 3/2014 | Marder | |
| 2014/0096402 A1 | 4/2014 | Nakasuka | |
| 2014/0109735 A1 | 4/2014 | Shepperson | |
| 2014/0123506 A1 | 5/2014 | Gaines | |
| 2014/0150264 A1 | 6/2014 | Micinilio | |
| 2015/0217468 A1 | 8/2015 | Dryfhout | |
| 2015/0290822 A1 | 10/2015 | Haba | |
| 2015/0320172 A1 | 11/2015 | Spencer | |
| 2016/0107324 A1 | 4/2016 | Robertson | |
| 2016/0121496 A1 | 5/2016 | Johnson | |
| 2016/0151925 A1 | 6/2016 | Gers-Barlag | |
| 2016/0158948 A1 | 6/2016 | Eagleton | |
| 2016/0158949 A1 | 6/2016 | Eagleton | |
| 2016/0318198 A1 | 11/2016 | Brazley | |
| 2017/0217035 A1 | 8/2017 | Treu | |
| 2017/0334080 A1 | 11/2017 | Dryfhout | |
| 2017/0334081 A1 | 11/2017 | Dryfhout | |
| 2018/0035849 A1 | 2/2018 | Vergara | |
| 2018/0065261 A1 | 3/2018 | Fingold | |
| 2019/0008416 A1 | 3/2019 | Dryfhout | |

FOREIGN PATENT DOCUMENTS

| | | |
|---|---|---|
| CN | 2363853 Y | 2/2000 |
| CN | 201693578 U | 1/2011 |
| CN | 102196886 A | 9/2011 |
| CN | 202862240 U | 4/2013 |
| DE | 102006044316 A1 | 3/2008 |
| EP | 0615820 A1 | 9/1994 |
| EP | 1173311 B1 | 1/2002 |
| EP | 1356900 A1 | 10/2003 |
| EP | 0885698 B1 | 4/2004 |
| EP | 1537964 B1 | 7/2010 |
| EP | 2918383 A1 | 9/2015 |
| FR | 2909025 A1 | 5/2008 |
| GB | 120109 A | 10/1918 |
| GB | 2306373 A | 5/1997 |
| JP | H07265562 A | 10/1995 |
| JP | 9-135973 A | 5/1997 |
| JP | 2004236766 A | 8/2004 |
| WO | 1996004110 A1 | 2/1996 |
| WO | WO0245921 A1 | 6/2002 |
| WO | WO2012161449 A2 | 11/2012 |
| WO | WO2015116561 A1 | 8/2015 |
| WO | WO2017201075 A1 | 11/2017 |
| WO | WO2017201080 A1 | 11/2017 |

OTHER PUBLICATIONS

Shave from www.inventorspot.com downloaded Jun. 24, 2008.
Mangroomer from www.amazon.com/MANGROOMER downloaded Jun. 25, 2008.
Razorba from www.razorba.com downloaded Jun. 24, 2008.

(56) References Cited

OTHER PUBLICATIONS

Patent Abstracts of Japan, English Language Abstract for JP-A-2004-236766 Aug. 26, 2004 NISHIDA.
International Search Report mailed May 13, 2015 in corresponding PCT/US2015/013009.
Written Opinion of the International Searching Authority mailed May 13, 2015 in corresponding PCT/US2015/013009.
Agnieszka Kozłowska, Studying Tactile Sensitivity—Population Approach, Anthropological Review, vol. 61, pp. 3-10, figs 18, tables 11, ISBN 83-86969-35-0, ISSN 0033-2003, Poznan 1998.
Sidney Weinstein, Tactile Sensitivity of the Phalanges, Perceptual and Motor Skills, 14, pp. 351-354, Southern Universities Press, @ 1962.
Gemperle, F.; Hirsch, T.; Goode, A.; Pearce, J.; Siewiorek, D.; Smailigic, A. Wearable Vibro-Tactile Display. Carnegie Mellon Wearable Group, Carnegie Mellon University, 2003.
Sherrick, C. E.; Cholewiak, R. W.; Collins, A. A. The Localization of Low- and High-Frequency Vibrotactile Stimuli. Journal of the Acoustical Society of America, 88 (1), 169-179, 1990.
Verrillo, R. T. Vibrotactile Thresholds for Hairy Skin. Journal of Experimental Psychology, 72 (1), 47-50, 1966.
Zhu, B; Skin-Inspired Haptic Memory Arrays with an Electrically Reconfigurable Architecture, 2015.
Shih; Dubrowski; Carnahan; Evidence for Haptic Memory, 2009.
Van Erp, J.B.F. Tactile displays for navigation and orientation: perception and behavior (pp. 26-27), Soesterberg, The Netherlands: TNO Human Factors, 2007.
Myles; Binseel; The Tactile Modality: A Review of Tactile Sensitivity and Human Tactile Interfaces; ARL-TR-4115 report, 2007.
English Language Abstract for DE102006044316A1 Espacenet Bibliographic data Mar. 27, 2008.
International Search Report mailed Sep. 12, 2017 in PCT/ US2017/032949.
Written Opinion of the International Searching Authority mailed Sep. 12, 2017 in PCT/ US2017/032949.
International Search Report mailed Sep. 11, 2017 in PCT/ US2017/032956.
Written Opinion of the International Searching Authority mailed Sep. 11, 2017 in PCT/ US2017/032956.
Search Report and Office Action from Chinese Patent Office dated Aug. 2, 2018 in corresponding Chinese patent application 201710352681.1.
English translation of WO0245921A1 published Jun. 13, 2002.
English translation of JPH07265562A published Sep. 21, 2011.
English translation of CN201693578U published Jan. 5, 2011.
English translation of CN2329495Y published Jul. 21, 1999.
English translation of CN202862240U published Apr. 10, 2013.
Search Report by the Chinese Patent Office dated Aug. 18, 2017 in Chinese patent application No. 2015800064966.
Patent Abstracts of Japan for JP9-135973A with English abstract.
Espacenet—Bibliographic data for CN2329495Y with English abstract.
Espacenet—Bibliographic data for CN2363853Y with English abstract.
FR2909025 Carlos English Abstract May 30, 2008.
EP0615820 Schwarz English Abstract Sep. 21, 1994.

* cited by examiner

265

265

Two-point discrimination thresholds for males for different areas of the body

SAFETY RAZOR WITH COMB AND BLADE

PRIORITY CLAIMS

The instant patent application is a Divisional (DIV) from U.S. Pat. No. 11,077,570 granted Aug. 8, 2021 from U.S. patent application Ser. No. 16/248,760 filed on Jan. 15, 2019 by the same inventor which was a Divisional (DIV) from U.S. Pat. No. 10,500,744 granted Dec. 16, 2019 from U.S. patent application Ser. No. 15/156,868 filed on May 17, 2016 by the same inventor which was a Continuation-in-part (CIP) of U.S. Pat. No. 9,718,200 granted Aug. 1, 2017 from U.S. patent application Ser. No. 14/170,269 filed on Jan. 31, 2014 by the same inventor.

U.S. Pat. No. 11,077,570 granted Aug. 8, 2021 from U.S. patent application Ser. No. 16/248,760 was also a Divisional (DIV) from U.S. patent application Ser. No. 15/162,606 filed on May 23, 2016 by the same inventor, and Ser. No. 15/162,606 was a Continuation-in-part (CIP) of U.S. Pat. No. 9,718,200 granted Aug. 1, 2017 from U.S. patent application Ser. No. 14/170,269 filed on Jan. 31, 2014 by the same inventor, and Ser. No. 15/162,606 was also a Continuation (CON) from U.S. Pat. No. 10,315,322 granted Jun. 11, 2019 from U.S. patent application Ser. No. 15/156,816 filed on May 17, 2016 by the same inventor.

BACKGROUND OF THE INVENTIONS

1. Technical Field

The present inventions relate to body shavers and, more particularly, relate to handle couplings for body shavers.

2. Description of the Related Art

Safety razor blades have had assemblies where a cutting blade is surrounded by flexible portions or guards within a construction assembly used to house the cutting blade and are generally flexible for the purposes of temporarily allowing a greater cutting blade exposure when force is manually applied and when force is withdrawn the cutting blade exhibits less exposure. The cutting blades within these prior safety razor blades are typically fastened rigidly in order to disallow the cutting blade to move in relation to the housing cartridge of the safety razor blade. We often see the housing or cartridge of the prior safety razors adjusting in order to contour to challenging surfaces while the blade is anchored in place for the purpose of remaining rigid. These characteristics prove beneficial in creating and allowing for a clean close shave cutting hairs as close as possible. Therefore, getting the cleanest and closest shave is often a primary competitive factor between shaving companies. In fact, in today's market we even see multiple rows of cutting blades rigidly in place in order to continue this trend. Because of the closeness these safety razors offer and because of the level of cutting blade exposure to one's skin we find that shaving cream is a necessary promoted lubricant in the shaving method in order to prevent cutting or bleeding. These safety razors were typically created for men who seek to shave their face as well as women who seek to shave their legs. Most prior art configurations illustrate flexible guards or a safety razor cartridge housing in order to safely contour a straight edge razor along the many curves that typically exist on a face of a man or legs of a woman while cutting hair as close as possible in order to promote the smoothest shave attainable.

Examples of safety blade prior art are exhibited herein. One example is illustrated in U.S. Pat. No. 3,500,539 by Muros.

Another example of a prior art is U.S. Pat. No. 4,409,735 by Cartwright, wherein we see a shaving geometry that promotes a flexible cutting blade cartridge that offers more controlled flexibility when protruding a skin surface along the elongated side.

Yet another prior art is EP Patent 1,537,964 by Pennella et al., wherein we see a wet shaving geometry that incorporates guard elements. The guard elements are staggered alongside the sharp edge of the razor while perpendicular and bisecting each razor row.

Yet another prior art is U.S. Pat. No. 5,031,316 by Oldroyd wherein we see another illustration wherein a supporting member or guard surrounds the flexible cutting blade allowing a level of protection while the sharp edge of the cutting blade protrudes the skin surface.

Yet another prior art is U.S. Pat. No. 2,670,533 by Kearney, wherein we see another illustration that similar to the U.S. Pat. No. 3,500,539 by Muros wherein the cutting blade protrudes into a skin surface which in turn allows an overexposure of a rigid cutting blade.

Yet another prior art is U.S. Pat. No. 2,725,886 by Gagliano, wherein there is illustrated a comb or like structure used for cutting or trimming hair on one's head but the prior art does not have a supporting inner guard, predetermined base, nor a void used to assist in creating the shaving geometry illustrated in embodiments of the present inventions.

Yet another prior art is U.S. Pat. No. 6,094,820 by Adachi, wherein there is illustrated a razor comb blade unit intended for cutting or trimming hair on one'. However, the cutting blade in this example is slidably held in the blade holder leaving no base, void or gap to allow a desired cutting blade flexibility as described in the embodiments of the present inventions.

Yet another prior art is U.S. Pat. No. 8,413,334 by Walker, wherein there is illustrated a more recent art form where we are presented again a purposely rigid cutting blade that is rigidly anchored into place in order to allow the safety blade housing or cartridge to alone provide a level of safety through the depth margin of slots or grooves between each tooth in the comb guard.

When shaving the body skin it is also difficult to understand whether or not the safety razor is positioned at a correct shaving angle. It is commonly known that there are many hills and valleys that can be found over one's body or backside. Muscular and skeletal obstacles that protrude often are protruding at alternate shapes and sizes provide an even greater challenge when attempting to shave the backside. Those who are muscularly fit commonly have deeper cracks and crevices between muscles that can be even more of a challenge. For these reasons many men decide to settle for more expensive and painful alternatives such as waxing or laser treatments. Not only has displaying unshaven back hair been deemed as "gross" or disgusting by society but it's also seen as non-hygienic.

SUMMARY OF THE INVENTIONS

Thus, it is an object of the present inventions to provide a safety shaving razor blade that allows wet and dry shaving capabilities and the like.

It is still another object of the present inventions to minimize accidental cutting, nicking or razor burn from the sharp edge of the cutting blade which can often be negative results of shaving without applying shaving cream.

It is another object of the present inventions to provide such a razor blade that will eliminate the need to use a hair trimmer prior to shaving with a straight edge razor blade.

It is yet another object of the present inventions to provide such a razor blade that will cut hair at or slightly below a skin surface but not to the depth at which other safety razors provide. Thus, the shaving geometry eliminates the need of shaving cream in order to protect the skin surface from cutting or nicking.

It is still another object of the present inventions to provide such a razor blade that will allow an individual the choice to choose whether to dry shave without the application of water and/or shaving cream or to choose to apply shaving cream or shaving lubricant and/or water to one's back side during the shaving process such as in the shower.

It is still another object of the present inventions to allow certain individuals who may have extremely sensitive skin or even viruses such as MERSA the ability to shave certain areas without irritation the infected skin surface which when using an overly exposure cutting blade tends to irritate, flare up and spread a virus.

It is still another object of the present inventions to offer a quick and easy shave during situations where a medical emergency may occur. An example of this could be using embodiments of the present inventions in the effect that a medical team may need to shave an individual chest in order to apply defibrillator in order to control heart fibrillation when applying an electric current to the chest wall.

It is still another object of the present inventions to eliminate the user of batteries and moving parts which are all too often found when using electronic devices.

It is still another object of the present inventions to eliminate the use of a device that possess moving parts which tends to break down and cause returns when selling through distributors, wholesalers and retailers.

It is still another object of the present inventions to offer a device that maintains a handle of which can accept its replacement shaving blades as well as accepts a device used to lubricate one's back with a shaving cream or gel type of lubricant prior to shaving.

It is still another object of the present inventions to offer a device that can be folded into a smaller more compact size that would be easily stored in a convenient space such as on the wall of one's shower and such. Folding the device would also prove efficient when selling in retail stores in that it would save space which is very important to retailers.

It is still another object of the present inventions to offer a shaving device that would allow handicapped individuals access easily and effectively shave "hard-to-reach" areas such as their legs without the effort that is normally required when using a traditional straight edge shaver handle and razor blade.

It is still another object of the present inventions to create a razor blade that could act as a handle itself or adhere to a handle that could be used for any part of the body.

It is still another object of the present inventions to create a razor that could prove beneficial for prepping during medical surgery or in an emergency matter time is crucial and shaving must be performed rapidly.

It is still another object of the present inventions to create a razor that could prove beneficial for use in rehabilitation centers such as prisons or detention centers where safety is important.

There is a need for a safety razor blade with outer teeth, outer teeth edge, deep void, inner guard, inner guard edge and an integrated cutting blade whereby deep void is intermediate of cutting blade and outer teeth.

The present inventions are illustrated by way of example and are not limited by the accompanying figures, in which like references indicate similar elements. Elements in the figures are illustrated for simplicity and clarity and have not necessarily been drawn to scale.

The details of the preferred embodiments and these and other objects and features of the inventions will be more readily understood from the following detailed description when read in conjunction with the accompanying drawings wherein:

DETAILED DESCRIPTION OF THE PREFERRED EMBODIMENTS

Figure 1:
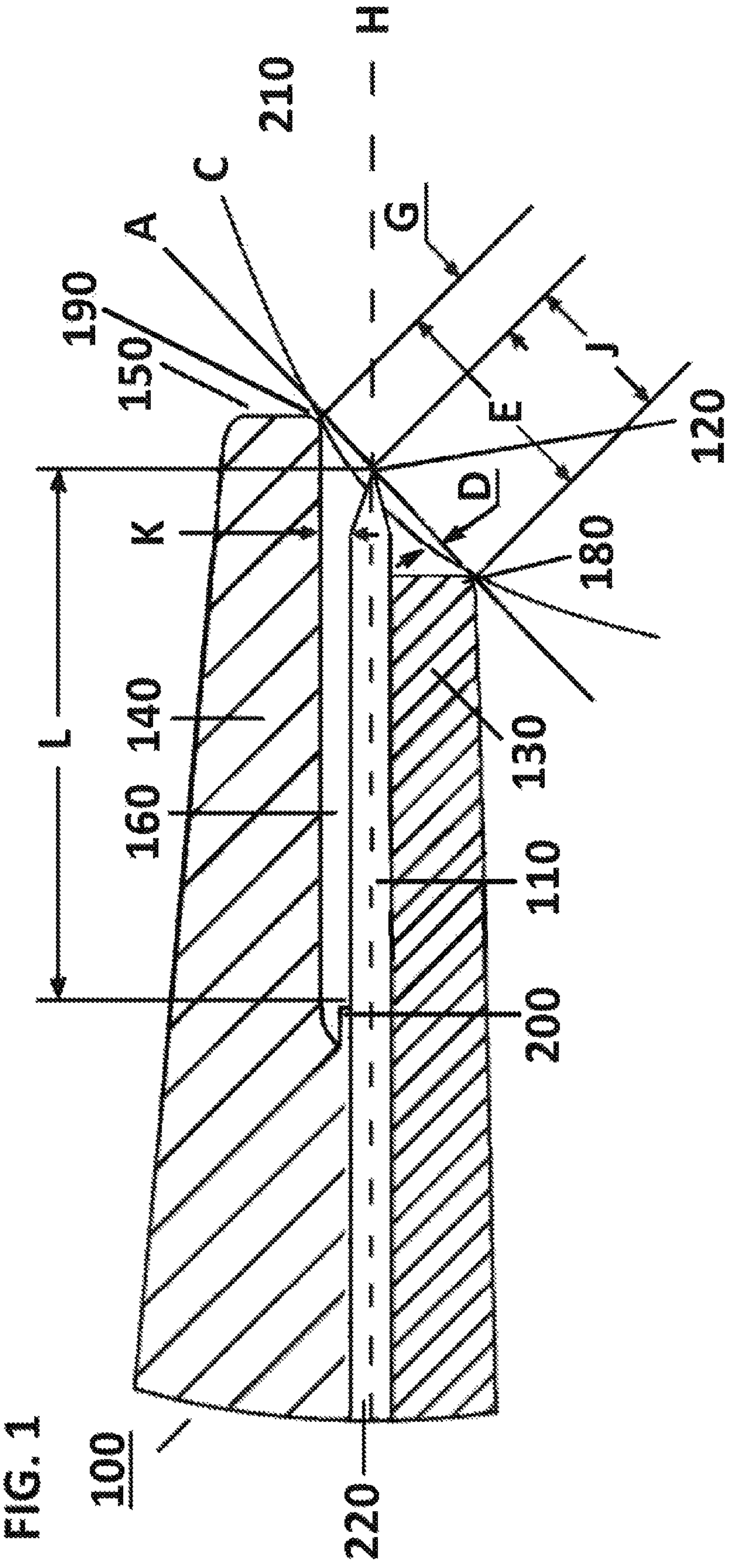
FIG. 1 is a schematic cross-sectional view of a razor blade shaving geometry wherein a cutting blade engages alongside skin surface in a first position according to a first embodiment of the present inventions.

FIG. 1 is a schematic cross-sectional view of a razor blade shaving geometry illustrating a skin surface contour A, an outer comb 140, an outer teeth tip 150, an outer teeth inside edge 190, an inner guard 130, an inner guard edge 180, a base 200, a deep void 160, a cutting blade 110 and a sharp edge 120 of cutting blade 110 wherein sharp edge 120 engages alongside skin surface contour A in a first position; and alongside inverted skin surface contour C in a second position while the opposite side view of this embodiment being identical according to a first embodiment of the present inventions. As illustrated in FIG. 1 a safety razor 100 with an outer comb 140 and cutting blade 110 and a shaving geometry coinciding with present inventions. A cutting blade 110; a sharp edge 120 at the end of a cutting blade 110; an inner guard 130; an outer comb 140; an outer teeth tip 150; a deep void 160; an inner guard edge 180; an inside edge 190 of outer teeth tips 150; a base 200; an elongated side 210; and a cutting blade end 220 whereby in one embodiment illustrated in FIG. 1 the members engaging in a first position or in other words making initial contact with skin surface contour A includes the inside edge 190 of the outer teeth tip 150, the sharp edge 120, and the inner guard edge 180 wherein a skin surface contour A is defined by the inside edge 190 of outer teeth tips 150 and the inner guard edge 180 of the inner guard 130. In the first embodiment the sharp edge 120 of the cutting blade 110 does not protrude the skin planar surface A. As will be seem in each of the first through the fourth embodiments, the sharp edge 120 of the cutting blade 110 does not protrude the skin planar surface A. A cutting blade 110 made of stainless steel extends along a path intermediate of a deep void 160 and inner guard 130. It should be known the preferred cutting blade 110 exposure is less than about 0.030 inches (about 0.0762 centimeter). A strong opposing force of at least 10 pounds (4.536 kilograms (10 pounds)) may be applied while protecting and minimizing cutting or nicking on a skin surface when the apparatus engages.

A sharp edge 120 opposite of cutting blade end 220 is dependent on shaving blade geometry in order to produce greater or lesser friction. One characteristic in creating a lesser friction between sharp edge 120 of cutting blade 110 and a skin surface contour A is presented in this invention wherein a sharp edge 120 of a cutting blade 110 is prohibited from protruding said skin surface contour A. In the efforts to promote less friction, the level of distance between the base 200 and the sharp edge 120 of the cutting blade 110 will be substantial. Flexibility of cutting blade 110 is dependent upon the distance exhibited between a base 200 and sharp edge 120 wherein the greater the margin of distance the more flexibility is exhibited which results in less friction between sharp edge 120 and skin surface when opposing force is applied. An extremely decreased level of friction by an extremely flexible cutting blade 110 wherein said sharp edge 120 of cutting blade 110 does not protrude flat plane of a skin surface contour A and allows for a shave where lubricant is not a recommended application. The less the level of distance between base 200 and sharp edge 120 the more rigid and less flexible the cutting blade 110. Thus, a more rigid cutting blade 110 would be the result of an increased level of friction between sharp edge 120 of a cutting blade 110 and a skin surface.

An inner guard 130 is a supporting member mounted adjacent of said cutting blade 110 where, within said shaving geometry, inner guard 130 embodies an inner guard edge 180 which with an inside edge 190 of outer teeth tips 150 together create skin surface contour A. Inner guard edge 180 may have teeth wherein teeth possess a web covering in order to hide shorn hairs as will later be further disused and illustrated in FIG. 17. Overall preferred distance from inner guard edge 180 to outer teeth inside edge 190 of outer teeth tips 150 is about 0.068 inches (about 0.1727 centimeter).

Figure 19:
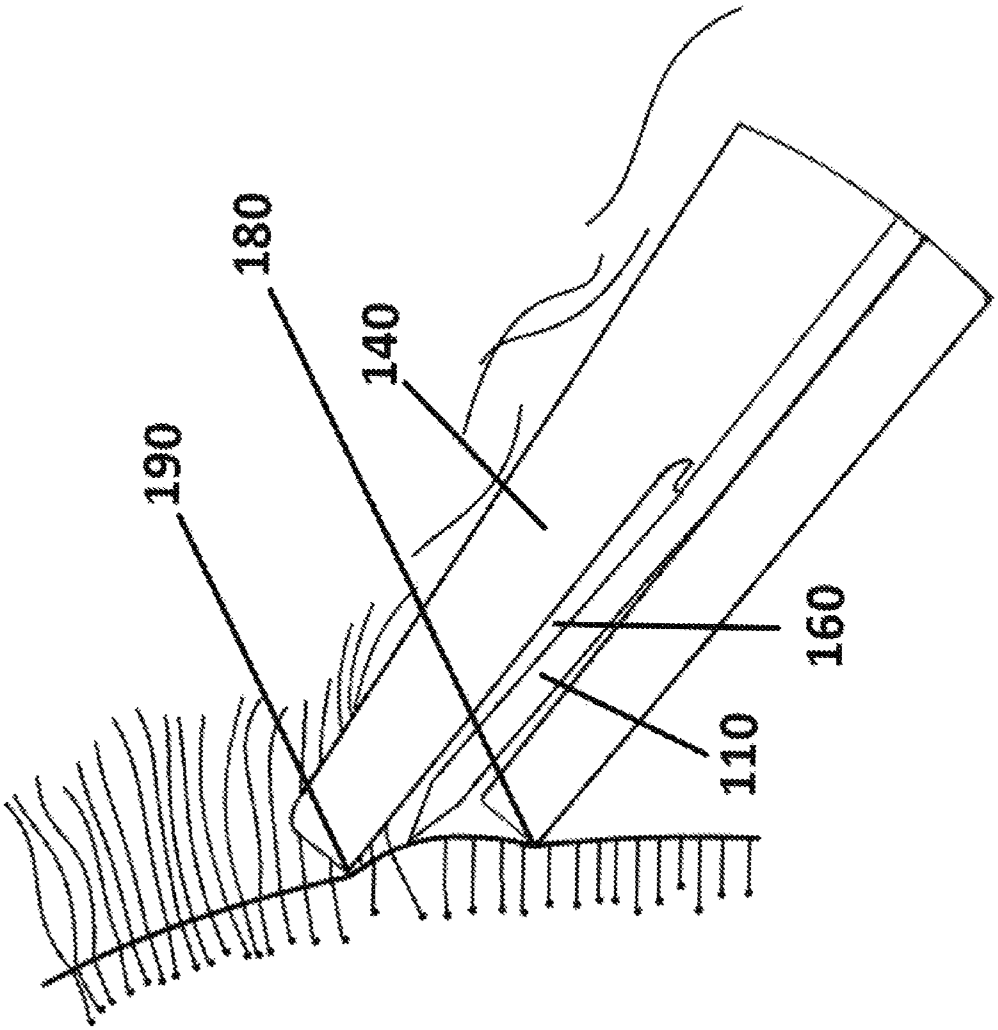
FIG. 19 is a close up view of the razor blade cutting hair along the back side of an individual according to first embodiment of the present inventions.

An outer comb 140 having elongated side 210 a row of outer teeth tips 150 and allowing shorn hair to exit the safety razor rearward of outer teeth inside edge 190 as illustrated in FIG. 19. Outer teeth tips 150, in a preferred embodiment as illustrated in FIG. 1-7 are no more than 0.032 inches (0.08128 centimeter) outside of sharp edge 120 of cutting blade 110. The outer comb 140 is preferably made from injected molded plastic or flexible plastic material used in many of the prior art shaving assemblies and typically well acceptable by customers seeking shaving products as they are durable and productive. The outer comb 140 may also be manufactured of stainless steel or chrome in order to cater to an audience seeking a higher quality product which is common in the wet shaving industry market. An inside portion of the outer comb 140 removed in order to create a deep void 160.

A deep void 160 is spaced intermediately of outer teeth tips 150 and cutting blade 110. Deep void 160 in a preferred embodiment having a preferred thickness "K" of 0.014 inches (0.03556 centimeter) or less in order to control over-exposure and over flexibility of said cutting blade 110. The thickness K as described is can be measured between inner side of comb and inner side of the cutting blade 110. The deep void 160 level of thickness limits the level of flexibility of the cutting blade 110 and plays an important role in the preferred level of friction displayed between the sharp edge 120 of a cutting blade 110 and a the skin surface contours in FIGS. 1-4. Although said deep void 160 may run thicker than 0.014 inches (0.03556 centimeter) a dangerous level of friction is presented wherein greater exposure of sharp edge 120 of cutting blade 110 is presented. Deep void 160 also maintains a length which is referenced as "L" in FIGS. 1-7. However, the length of L plays a vital role in FIG. 1-4 in that the L represents the distance from base 200 to sharp edge 120 of cutting blade 110. It is important to remember that in seeking to prevent a dangerous level of sharp edge 120 exposure the opening between the sharp edge 120 of the cutting blade 110 and an inside edge 190 of the outer teeth tips 150 of the outer comb 140 has a dimension less than or equal to a dimension of an opening between the sharp edge 120 of the cutting blade 110 and an inner guard edge 180 of the inner guard 130. Dimension of said deep void 160 is chosen to control the level of flexibility of a cutting blade 110 in order to shave hairs effectively while maintaining a level of friction that reduces the risk of cutting or bleeding. When beginning the shaving process an individual embracing the safety razor 100 makes initial contact to their skin surface on the skin surface contour A which is referred to as "first position". The distance from the inside edge 190 of the outer teeth tips 150 to the inner guard edge 180 define the skin surface contour A or the first position. In certain embodiments as illustrated by FIG. 1 and FIG. 6 the sharp edge 120 of cutting blade 110 is also engaged in first position along a skin surface contour A. When said sharp edge 120 of cutting blade 110 is engaging in a first position said sharp edge 120 will not protrude the skin surface contour A. As can be seen and will be further described cutting blade 110 in FIG. 3 engages in the second position.

The skin surface contour A is flat when not pressed by the safety razor 100. When the safety razor 100 is pressed against the skin surface contour A during shaving, the skin surface contours B or C result as illustrated in FIG. 1, depending on how hard it is pressed. The outer comb 140 and the inner guard 130 press against the skin surface creating two impressions and a convex skin surface contour B or C therebetween. This convex surface of the skin raises the skin closer to the sharp edge 120 for a closer cut of the hair. In some instances the convex skin surface may be considered protuberant.

The skin surface contours B or C have a convex skin surface contour between a pair of skin indents respectively created between both the outer comb 140 and the inner guard 130. When both the inside edge 190 of the outer comb 140 and the inner guard edge 180 of the inner guard 130 press into the skin, the recessed sharp edge 120 moves relatively closer towards the skin surface contour B or C of the skin when cutting the hair.

The outer comb 140 and the inner guard 130 simultaneously touch the skin surface during shaving and can also firmly press respective indents into the skin surface during shaving. Thus the convex contour between a pair of skin indents is respectively created between both the outer comb 140 and the inner guard 130 pressing into the skin surface. Because the present inventions are suitable for dry shaving, without a shaving cream or surface lubricant, the inner guard 130 can firmly press against the skin surface and there is no concern about shaving cream or skin lubricant removal by scraping from the skin surface before the skin surface and hair hit the sharp edge 120 of the cutting blade 110.

Figure 2:
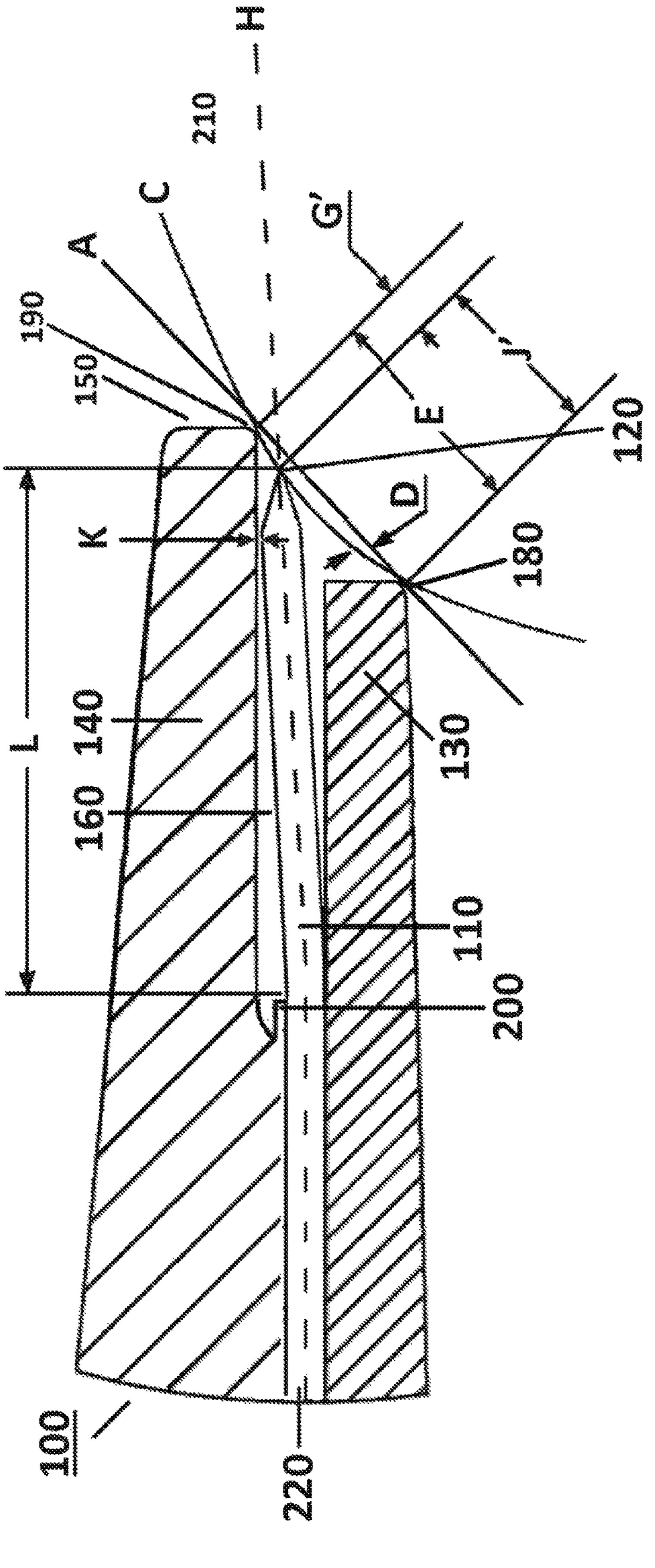
FIG. 2 is a schematic cross-sectional view of a razor blade shaving geometry wherein a cutting blade engages an opposing force of a convex skin surface contour in a second position according to the first embodiment of the present inventions.
Figure 3:
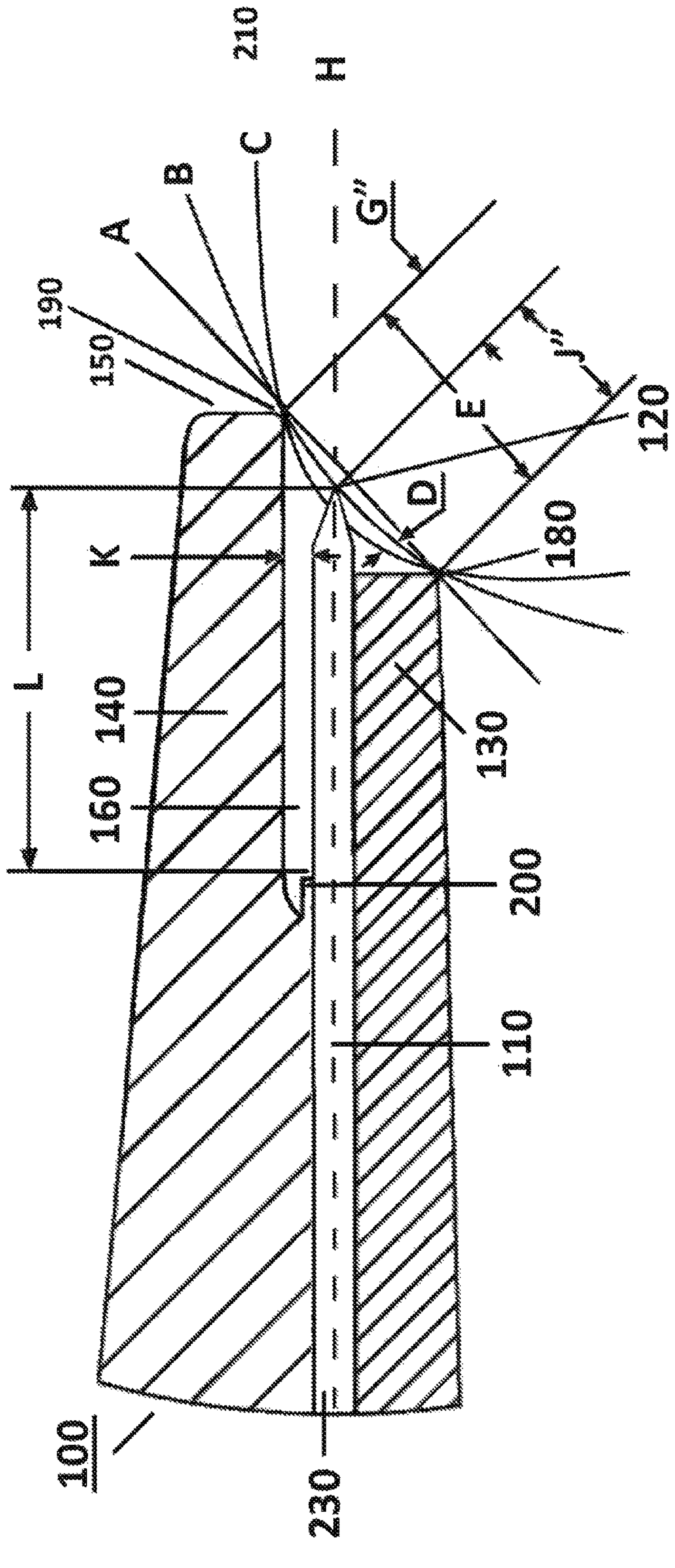
FIG. 3 is a schematic cross-sectional view of razor blade shaving geometry illustrating whereby said cutting blade is positioned inside of a skin surface contour A at inverted skin surface contour B according to a second embodiment of the present inventions.
Figure 4:
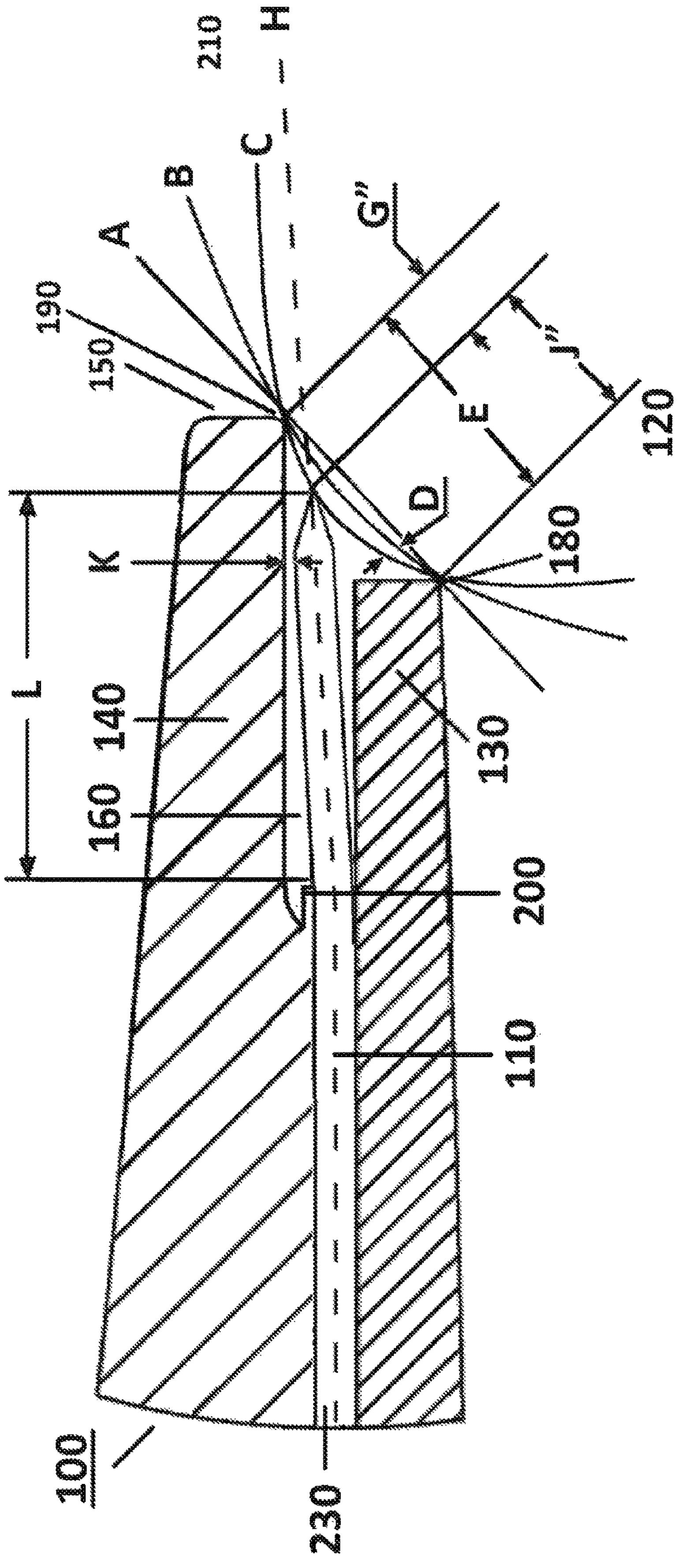
FIG. 4 is a schematic cross-sectional view of a razor blade shaving geometry whereby the base is positioned in a closer distance in comparison to FIG. 1 and FIG. 2 and said cutting blade engages a convex skin surface contour according to the second embodiment of the present inventions.
Figure 4:
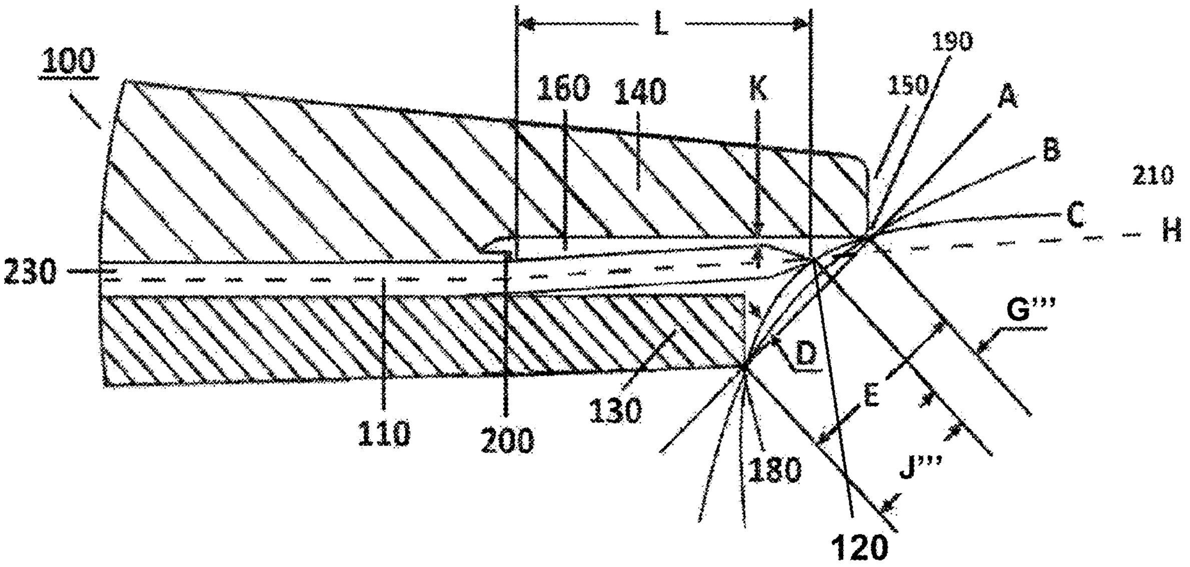

Letter designations in the drawings depict certain planes, gap distances and contours, defined throughout, and for convenience are summarily defined wherein:

"L" references the deep void 160 running lengthwise from the outer teeth tips 150 to the base 200 which allows ample space for the flexibility of said cutting blade 110 to perform "K" references the thickness of the said deep void 160 between the outer comb 140 and the cutting blade 110 which is a contributing factor in the level of flexibility the cutting blade 110 illustrates when shaving;

"A" references the skin surface contour A which is formed between the inside edge 190 of the outer teeth tips 150 and the inner guard edge 180. Skin surface contour A is also referenced as being the "first position" when safety razor 100 initially engages a skin surface contour A;

"B" references a convex skin surface contour A engaged in a convex surface contour in a second position as indicated in FIG. 3 wherein the sharp edge 120 of cutting blade 110 is engaged initially at a second position inside the original first position or skin surface contour A;

"C" references a convex skin surface contour A engaged in a convex contour whereby in FIG. 1 and FIG. 2 convex skin surface contour C is formed by cutting blade 110 flexed against an opposing skin surface force in a second position is inside the original first position and in FIG. 3 and FIG. 4 convex skin surface contour C is formed in a third position inside of the original first position A and the second position B when opposing force is applied during the shaving operation;

"D" references the margin difference between when sharp edge 120 of cutting blade 110 is flexed against opposing force versus its original position or "uninterrupted" position. In FIG. 1 and FIG. 2 reference D is the margin of difference between skin surface contours A versus C. In FIG. 3 we see reference D is the difference between convex skin surface contour B and skin surface contour C.

"E" referencing the distance of skin surface contour A or the distance between the inside edge 190 of outer teeth tips 150 and the inner guard edge 180. Reference J is always greater than or equal to G. Although a number alternative distances may exist to create an effective shaving assembly a preferred embodiment the margin of distance is about 0.068";

"J", "J'", "J''", and "J'''" reference the margin of distance between the sharp edge 120 of a cutting blade 110 and the inner guard edge 180. Although a number alternative distances may exist to create an effective shaving assembly a preferred embodiment the margin of distance is about 0.024";

"G", "G'", "G''", and "G'''" reference the margin of distance between the sharp edge 120 of a cutting blade 110 and the inside edge 190 of the outer teeth tips 150. Although a number alternative distances may exist to create an effective shaving assembly a preferred embodiment the margin of distance is about 0.018"; and "H" references to the midpoint section of a cutting blade 110.

The safety razor 100 removes hair from skin using the cutting blade 110 comprising a sharp edge 120 along an elongated side 210 of a planar surface. An outer comb 140 has a row of outer teeth 140 running along the planar surface on an outside of the cutting blade 110, each of the outer teeth of the outer comb 140 is substantially perpendicular to the sharp edge 120 and spaced with a deep void 160 between the row of the outer comb 140 and the planar surface of the cutting blade 110, wherein ends of the outer comb 140 comprise outer teeth tips 150. An inner guard 130 runs along the planar surface on an inside of the cutting blade 110. The sharp edge 120 of cutting blade 110 is recessed up to a skin surface contour A. The skin surface contour defined from the inside edges 190 of outer teeth tips 150 to the inner guard edge 180. When cutting blade 110 is flexing said cutting blade 110 longitudinally bends in a curved-like while sharp edge 120 of cutting blade 110 causing further recess D relative to the skin surface contour A. The sharp edge of the cutting blade can longitudinally bend to cause further recess relative to the skin surface contour. The sharp edge of the cutting blade can longitudinally bend to cause further recess relative to the skin surface contour. The cutting blade 110 is fixedly anchored on the cutting blade end 220 opposite the sharp edge 120.

The inner guard 130 may comprise an inner comb comprising a row of inner teeth running along the elongated side of an inside of the cutting blade 110, each of the inner teeth substantially perpendicular to the sharp edge 120.

A user for hair removal moves the safety razor 100 across skin such that the outer comb 140 extends over the cutting blade 110 to contact the hair before the hair comes in contact with the sharp edge 120. Prior to the shaving operation or flexing of the cutting blade 110 the inner guard 130 can have substantially no void between the cutting blade 110 and inner guard 130. When the safety razor 100 moves across the skin, the hair first passes through the outer comb 140 and then second the sharp edge 120 of the cutting blade 110 bends in a direction towards the outer comb 140 against a skin surface contour shortening the width of the gap G between the sharp edge 120 of the cutting blade 110 and the row of outer teeth of the outer comb 140 in FIG. 1-4 and the hair is cut by the sharp edge 120. The base 200 is positioned to create a level of distance between said base 200 and sharp edge 120 of cutting blade 110 in order to enable a controlled level of flexibility with said cutting blade 110. Outer comb 140 acts as a barrier to physically limit over bending of the sharp edge 120 of the cutting blade 110.

The safety razor 100 is moved across skin such that an outer comb 140 extends over the cutting blade 110 to contact hair before the hair comes in contact with a sharp edge 120. When moving the safety razor 100 across skin, the hair first passes through the outer teeth of the outer comb 140 and second then the sharp edge 120 of the cutting blade 110 bends in a direction to shorten the width of the gap G between the sharp edge 120 of the cutting blade 110 and the row of outer teeth of the outer comb 140 and the hair is cut by the sharp edge 120.

A deep void 160 exists between the planar surface of the cutting blade 110 and the outer comb 140 in the first and second and third and fourth embodiments of respective FIGS. 1-5. The deep void 160 extending from the outer teeth tips 150 to a base 200 of the outer comb 140. In order to create a desired "light friction" shave a preferred length of the deep void 160 reaching from outer teeth tips 150 to the base 200 is 0.180 inches (0.4572 centimeter). The closer a base 200 in distance to the sharp edge 120 of a cutting blade 110 the more rigid and less flexible the cutting blade 110 becomes and thus the level of friction increases between sharp edge 120 of a cutting blade 110 and a skin surface contour. Just the opposite, the further in distance a base 200 is to the sharp edge 120 of a cutting blade 110 the less rigid or more flexible the cutting blade 110 becomes and thus the level of friction decreases between a sharp edge 120 of a cutting blade 110 and a skin surface contour. It is important to note that aside from the position of said base 200, the degree of thickness of the deep void 160 which is represented as K plays a factor in determining the level of flexibility by which said cutting blade 110 is granted.

An opening G between the sharp edge 120 of cutting blade 110 and inside edges 190 of the outer teeth tips 150 of the outer comb 140 has a dimension G the same or less than a dimension J of an opening J between the sharp edge 120 of cutting blade 110 and an inner guard edge 180 of the inner guard 130. A dimension of the deep void 160 has a depth extending from the outer teeth tips 150 to a base 200 of the outer comb 140 substantially greater than a dimension G of the gap G. A dimension of the gap G is chosen in connection with the preferred distance of a base 200 from the sharp edge 120 of a cutting blade 110. It should be noted that the closer the base 200 is in distance to the sharp edge 120 of a cutting blade 110 the smaller the gap G becomes. The further away the base 200 is in distance to the sharp edge 120 of the cutting blade 110, the larger the gap G may become.

A problem with prior safety razors is that while they do offer a level of protection when contouring within the shaving process, it is widely known that in order to attain such a close shave that they still do require and create a cutting blade flexibility and exposure that is far too rigid to create a controlled atmosphere that would allow one to dry shave a hard-to-reach area such as one's back without application of shaving cream. More often in order to create a safety razor that navigates angles and bumps we see the safety razor 100 housing or "cartridge" being altered while the cutting blade 110 remains rigid. The strong friction is often illustrated in today's market between the sharp edge 120 of the cutting blade 110 and a skin surface which is why the application of shaving cream or shaving gel prior to shaving is recommended in order to minimize the cutting or nicking of the skin surface. The prior safety razors do not allow a controlled shaving geometry that minimizes cutting blade 110 exposure while offering a level of flexibility take place without the use of shaving cream or gel in order to greatly minimize cutting or bleeding. One common factor amongst the majority of safety razors is that the cutting blade, although engaging by guards that may assist in deflection when engaging a skin surface, often embody a cutting blade that is capable of protruding a skin surface contour A that is formed between an inner guard edge 180 and the inside edge 190 of the outer teeth tips 150. Another important missing characteristic of the prior art is that there does not exist an opening G between the sharp edge 120 of cutting blade 110 and an inside edge 190 that remains the same level of distance or less than an opening represented by J which exists between the sharp edge 120 of cutting blade 110 and an inner guard edge 180 of the inner guard 130. A final important notation is that a cutting blade 110 that is most commonly found within razors today do not embody a preferred level of distance between a sharp edge 120 and a base 200 that would allow for a proper amount of cutting blade 110 flexibility which creates an extremely light or soft level of friction between sharp edge 120 of a cutting blade 110 and a skin surface.

Furthermore, in embodiments of the present inventions there is a deep void 160 that is specified in FIG. 1 wherein said deep void 160 is embodied between the base 200 and outer teeth tips 150 and enables multiple contributing factors one of which would be the thickness of the deep void 160 represented by K which the level of thickness controls the level flexibility of cutting blade 110. This ultimately controls the level of friction allowed between sharp edge 120 of cutting blade 110 and a skin surface contour which in FIG. 1 is represented as A in the first position. These are important factors of the present inventions since creating a light traction is necessary when dry shaving and cutting at a lesser depth than a traditional over exposed and over rigid safety razor cutting blade 110. In summary, this prior art is generally designed to perform or cut hair at an aggressive level while creating a housing surrounding a cutting blade 110 or blades that create or allow a level of safety during the shaving operation. My invention, however, does not attempt to perform or cut hair at an aggressive level but instead performs or cuts at a less aggressive level. Furthermore, my invention takes advantage of the flexibility of a skin surface. The human skin is flexible and is able to bend at many contour angles. Being that in my invention a skin surface is granted ability to bend in a convex contour between a pair of skin indents respectively created between the comb and guard with an aggressively flexible cutting blade we notice a preferred level of friction throughout the shaving operation. Most prior art embodiments we see the guards or housing cartridges bending or flexing around the cutting blade wherein my invention I illustrate the cutting blade bending and flexing in relation to skin surface contour created by the fixed housing. The priority in my invention is that it cuts at a less aggressive level wherein an individual is not required to apply shaving cream or shaving lubricant to their back or back side prior to shaving in order to prevent several razor burn or cutting. It is very difficult for an individual to access their own back or back side with shaving cream without asking for assistance from another individual or without using a handle that may extend in length to access their back or back side. Thus, is proves beneficial to have a safety razor designed to allow an effective shave that does not rely on shaving cream or a shaving lubricant to be applied to dry skin prior to the shaving operation in order to protect oneself from cutting or bleeding. In addition, the cost associated with purchasing shaving cream is saved since shaving cream is not a requirement. Also, it is very scary for an individual to access their back or back side with a safety razor that does not cut at a level aggressive level of shaving friction. Not being able to accurately view your own back or back side while attempting to use a sharp safety razor is very dangerous and scary.

The less aggressive level of shaving operation in my invention offers a level of protection and light friction that does not require shaving cream or a shaving lubricant to be applied to dry skin prior to the shaving operation in order to protect a skin surface from cutting or bleeding from the cutting blade. It is widely known that cutting or bleeding is a common side effect when shaving one's face with a safety razor design for one's face. Also, an area such as one's back or back side offers a surface where the larger area of skin offers more flexibility of a skin surface area which proves beneficial to my invention. The majority allows a redundant amount of rigid cutting blade exposure when attempting to dry shave without the use of shaving cream which can lead to severe cutting or what is commonly referred to as "razor burn" to take place which is described as a skin condition featuring a red rash, bumps, or even infected blisters.

FIG. 2 is a schematic cross-sectional view of a razor blade shaving geometry wherein a cutting blade 110 engages an opposing force of a convex skin surface contour C in a second position according to the first embodiment of the present inventions. FIG. 2 illustrates a skin surface contour A or C, a comb, an outer teeth tip 150, outer teeth inside edge 190, an inner guard 130, an inner guard edge 180, a base 200 and a cutting blade 110 wherein the cutting blade 110 engages a convex skin surface in a second position; the opposite side view of this embodiment being identical according to a second embodiment of the present inventions. As illustrated in FIG. 2, while a first position is still active, a "second position" is created when an individual exercises a shaving stroke wherein an opposing force is applied allowing a determined degree of friction between sharp edge 120 of cutting blade 110 and skin surface whereby the degree of friction is determined by the sharp edge 120 of a cutting blade 110 being recessed up to a skin surface as well determined by the degree of distance a base 200 is positioned from the sharp edge 120 of a cutting blade 110. The further the distance a base 200 is positioned away from a sharp edge 120 of a cutting blade 110 the more flexibility is allowed by a cutting blade 110 which creates a lower level of friction and a softer shave. The closer the distance a base 200 is positioned from a sharp edge 120 of a cutting blade 110 the cutting blade 110 is more rigid and less flexible which creates a higher level of friction and a stronger shave. Although various measurements will create a light friction between the sharp edge 120 and a skin surface, the preferred length of the deep void 160 in creating a light friction is 0.180 inches (0.4572 centimeter) from the base 200 to the outer teeth tips 150. Furthermore, the thickness of the deep void 160 participates in controlling the level of friction between the sharp edge 120 of a cutting blade 110 and a skin surface as it limits the flexibility level of a cutting blade 110. Said sharp edge 120 of cutting blade 110 may engage in a first and second position but always along with at least one outer teeth inside edge 190 and at least one inner guard edge 180 on each opposite side of cutting blade 110. An outer teeth inside edge 190 running along the elongated side 210 of an outside of said cutting blade 110 and inner guard edge 180 running along the elongated side 210 of an inside of said cutting blade 110 As illustrated in FIG. 2 a safety razor 100 with comb and integrated blade in accordance with FIG. 1 wherein the cutting blade 110 is engaged in a second position with an opposing force wherein sharp edge 120 is flexed against a convex skin surface contour C. FIG. 2 illustrates a gentle friction between cutting blade 110 and skin surface contour which allows for an effective shave while cutting the hair a beneficial level versus the majority of straight edge razors assemblies on the market which aim to cut the hair as close as possible or even beneath the skin surface which is the reason shaving cream or shaving gel is often sold with straight razors. Skin surface contour A, in a preferred embodiment, is positioned between 20 to 50 degrees. Due to the fact that my invention cuts a hair at a less aggressive length the presence of shaving cream or gel prior to shaving is not necessary to minimize cutting or nicking of the skin surface. Furthermore, embodiments of the present inventions work better in areas of the body that have hair follicles less coarse. For example embodiments of the present inventions work better one back or arm hair which often possesses hair less coarse or thick in comparison to facial hair which is known to be thicker in nature.

FIG. 3 is a schematic cross-sectional view of razor blade shaving geometry illustrating whereby the base 200 is positioned closer in distance to the sharp edge 120 in comparison to the first embodiment in FIG. 1 and FIG. 2. When creating a less flexible cutting blade 110 in comparison to the first embodiment, it is necessary, in the spirit of maintaining a lighter friction between skin surface contour A and sharp edge 120, for said cutting blade 110 to be positioned inside of a skin surface contour A creating less cutting blade 110 blade exposure which in turn creates a lighter friction. As illustrated in FIG. 3 is a safety razor 100 with comb and integrated blade in accordance with FIG. 1 wherein the cutting blade 110 is positioned at convex skin surface contour B in a second position inside a skin surface contour A. The cutting blade 110 is fixedly anchored at a cutting blade end 220. This FIG. 3 demonstrates how when a cutting blade 110 maintains a base 200 closer in margin distance to the sharp edge 120 it is necessary to decrease the exposure of a cutting blade 110 is relation to the skin surface in order to maintain a less aggressive shaving friction.

FIG. 4 is a schematic cross-sectional view of a razor blade shaving geometry whereby the base 200 is positioned in a closer distance in comparison to FIG. 1 and FIG. 2 and said cutting blade 110 is engages in the second position an opposing force at a convex skin surface contour C according to the second embodiment of the present inventions. The inverted skin surface contour C is a sharper arc shaped bend than the inverted skin surface contour B or the flat plane of the skin surface contour A. As illustrated in FIG. 4 is a safety razor 100 in accordance with FIG. 3 wherein the cutting blade 110 is engaged in a third position with an opposing force and sharp edge 120 is flexed against a convex skin surface contour C. The cutting blade 110 is fixedly anchored at a cutting blade end 230. When said cutting blade 110 is engaged in a third position with an opposing force the void margin indicated by K is minimized between the cutting blade 110 and the outer comb 140. FIG. 4 clearly illustrates since the distance margin between the base 200 and the sharp edge 120 is increased when compared to FIG. 1 and FIG. 2 the exposure of the cutting blade 110 is decreased. This adjustment allows a light friction to be maintained in order to create an effective shave that ultimately does not require shaving cream or lubricant in order to prevent severe cutting or nicking of a skin surface.

Figure 5:
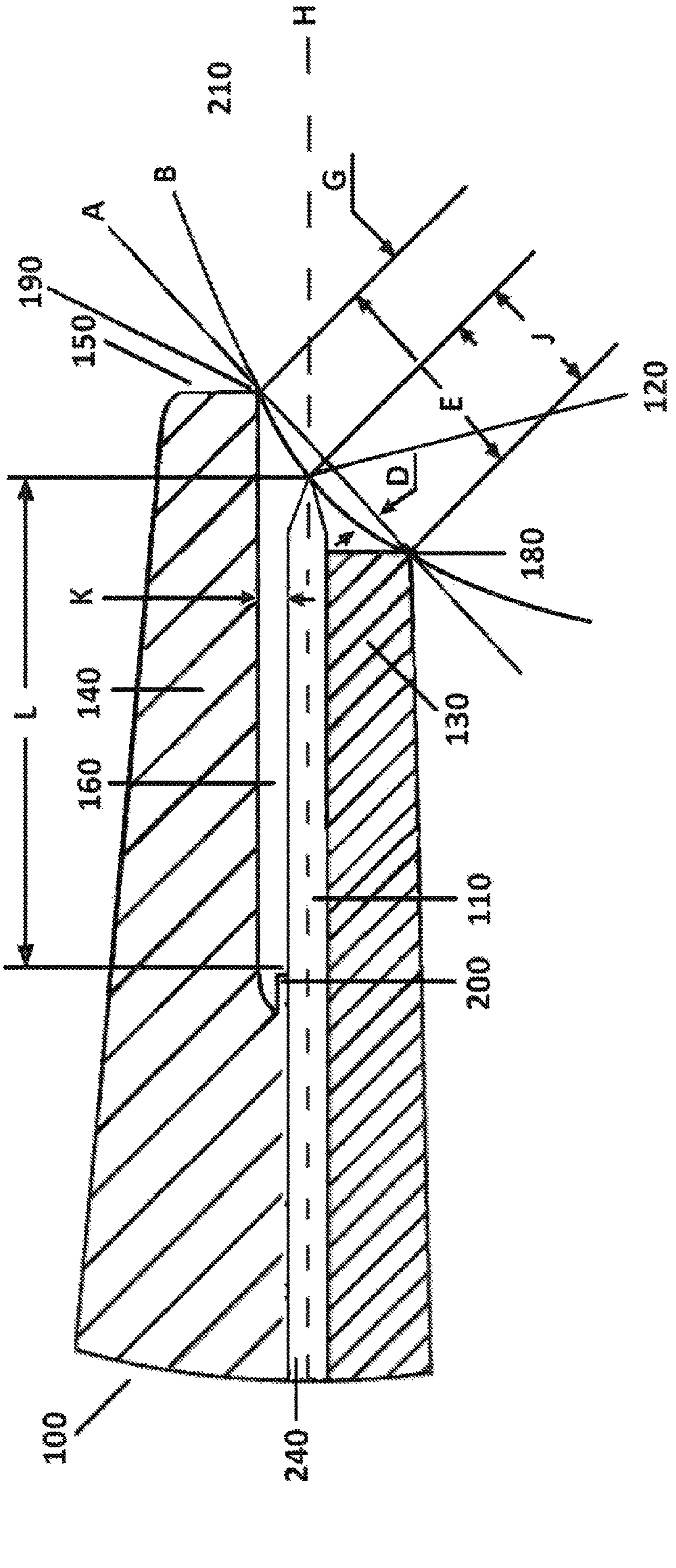
FIG. 5 is a schematic cross-sectional view of a razor blade shaving geometry whereby said cutting blade is fastened in a fixed position inside of the skin surface contour according to a third embodiment of the present inventions.
Figure 6:
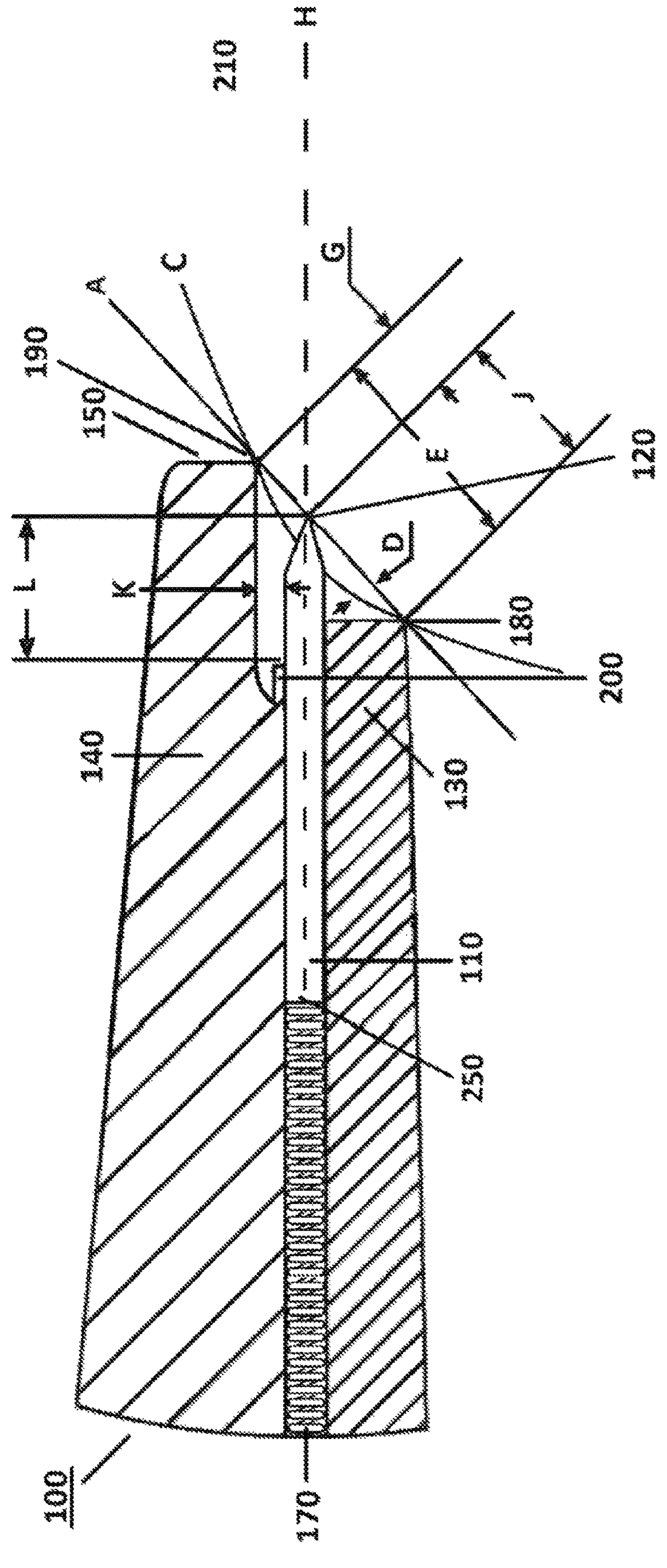
FIG. 6 is a schematic cross-sectional view of a razor blade shaving geometry whereby said sharp edge of a cutting blade is at the skin surface contour A in a first position and a spring is embodied in order to prepare for a cutting blade to engage skin surface contour in a second position according to a fourth embodiment of the present inventions.

FIG. 5 is a schematic cross-sectional view of a razor blade shaving geometry whereby the cutting blade 110 is fastened in a fixed position inside of the skin surface contour A according to a third embodiment of the present inventions. A fixedly anchored cutting blade 110 of a rigid material is substantially recessed inside the skin surface contour A of FIG. 5. As illustrated in FIG. 5 is a safety razor 100 wherein a cutting blade 110 is made from a non-flexible razor or perhaps ceramic. The cutting blade 110 is fixedly anchored between cutting blade end 240 and a base 200 wherein the sharp edge 120 remaining inside of a skin surface contour A at the same position in both the first position A and second position B for the purpose of allowing cutting accessibility while protecting the skin surface due to non-flexing attributes of cutting blade 110. Being that the cutting blade 110 in this example is made from a non-flexible razor such as ceramic the position of the base 200 to the sharp edge 120 of the cutting blade 110 is not relevant in this example.

FIG. 6 is a schematic cross-sectional view of a razor blade shaving geometry whereby said sharp edge 120 of a cutting blade 110 is at the skin surface contour A in a first position and a flexible spring 170 is embodied in order to prepare for the cutting blade 110 to engage an opposing force of a skin surface contour in a second position according to a fourth embodiment of the present inventions. As illustrated in FIG. 6 is a safety razor 100 wherein a cutting blade 110 is in an engaging first position alongside a skin surface contour A and not protruding the skin surface contour A. Illustrated in FIG. 6 is a flexible spring 170 which is implemented in order to cutting blade 110 flexibility in a different manner when compared to FIG. 2 and FIG. 4. The cutting blade 110 is fixedly anchored at a flexible spring 170. The flexible spring 170, of the fourth embodiment of FIG. 6, is operatively coupled to the cutting blade 110 on a cutting blade end 250 of the planar surface opposite the sharp edge 120, causes further recess relative to the skin surface contour A. Being that the cutting blade 110 in this example is allowed flexibility in a different manner when compared to FIG. 2 and FIG. 4 the position of the base 200 is not relevant in terms of determining a level of friction between sharp edge 120 of the cutting blade 110 and a skin surface.

Figure 7:
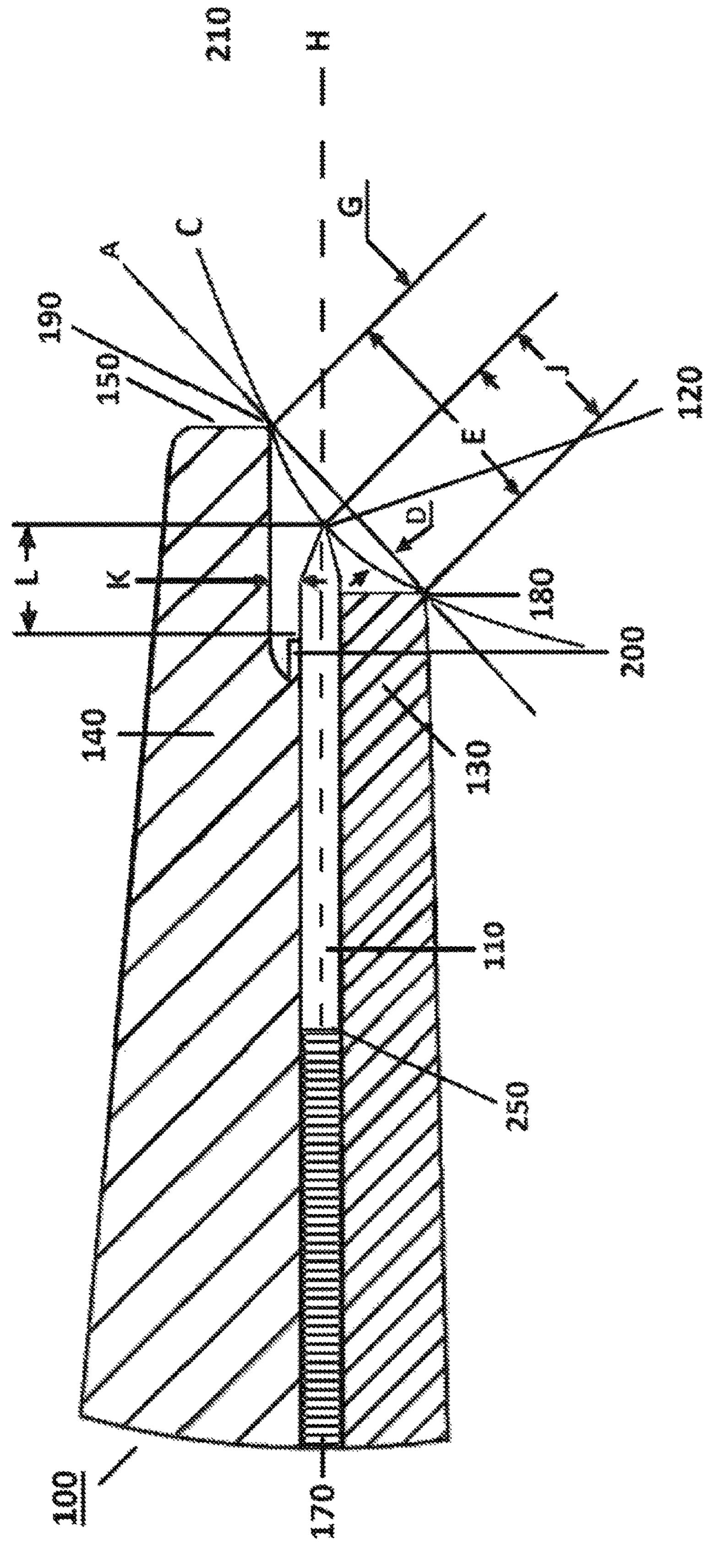
FIG. 7 is a schematic cross-sectional view of a razor blade shaving geometry whereby said cutting blade is engaged in a second position inside of the skin surface contour by a spring according to the fourth embodiment of the present inventions.

FIG. 7 is a schematic cross-sectional view of a razor blade shaving geometry whereby said cutting blade 110 is flexed and engaged in a second position C inside of the skin surface contour A by a spring according to the fourth embodiment of the present inventions. As illustrated in FIG. 7 and in accordance with FIG. 6 the cutting blade 110 is flexing due to a flexible spring 170 allowing the cutting blade 110 to retract horizontally and away from skin surface contour A. The flexible spring 170, of the fourth embodiment of FIG. 7, is operatively coupled to the cutting blade 110 on a cutting blade end 250 of the planar surface opposite the sharp edge 120, causes further recess relative to the skin surface contour A. The cutting blade 110 is fixedly anchored at a flexible spring 170. Due to the manner in which the cutting blade 110 is flexing in FIG. 7 the need for a deep void 160 is irrelevant as the cutting blade 110 is not flexing or bending towards the outer comb 140. It can be seen in FIG. 7 that the margin indicated by L is greatly reduced when engaging in a second position with an opposing force. Being that the cutting blade 110 in this example is allowed flexibility in a different manner when compared to FIG. 2 and FIG. 4 the position of the base 200 is not relevant in terms of determining a level of friction between sharp edge 120 of the cutting blade 110 and a skin surface contour. Furthermore, as illustrated in FIG. 1-6 a margin or gap represented by G in FIG. 7 is the equal to or less than the margin represented by J.

Figure 8:
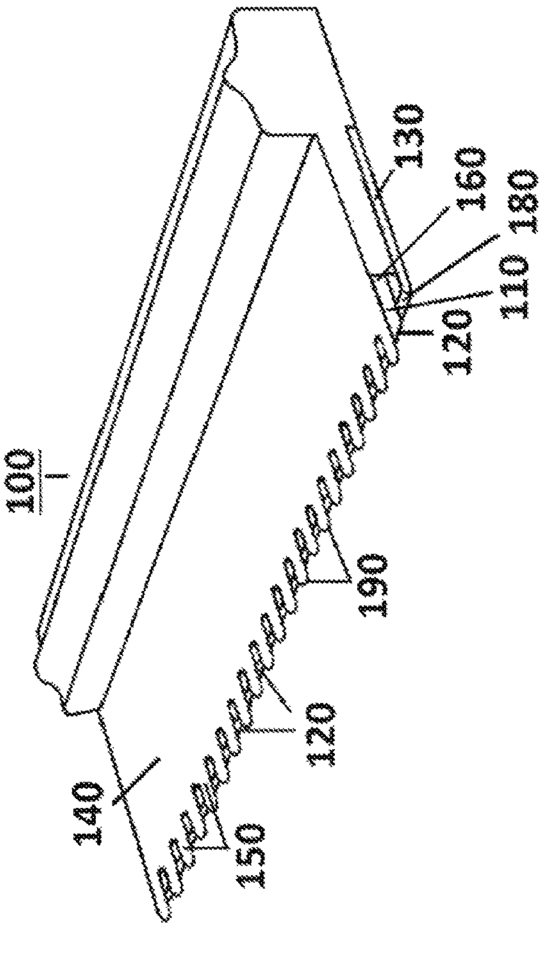
FIG. 8 is an angled elevated view of the razor blade whereby the comb portion is end up according to embodiments of the present inventions.

A FIG. 8 is an angled elevated view of the razor blade whereby the comb portion is end up. As illustrated in FIG. 8 the safety razor 100 is in an upright position.

Figure 9:
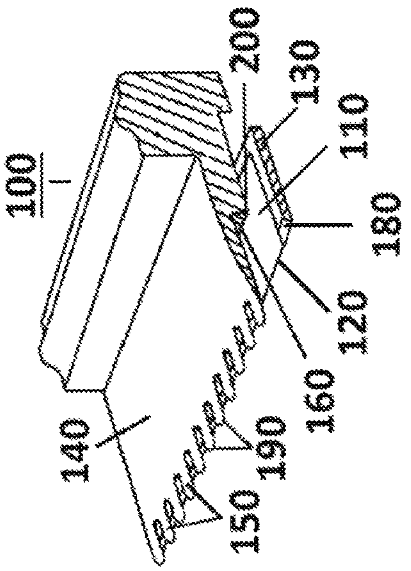
FIG. 9 is an elevated cut-away view of the apparatus as seen in FIG. 8 illustrating the comb, cutting blade and inner guard assembly according to embodiments of the present inventions.

FIG. 9 is an elevated cut-away view of the apparatus as seen in FIG. 8 illustrating the comb, cutting blade and inner guard assembly.

Figure 10:
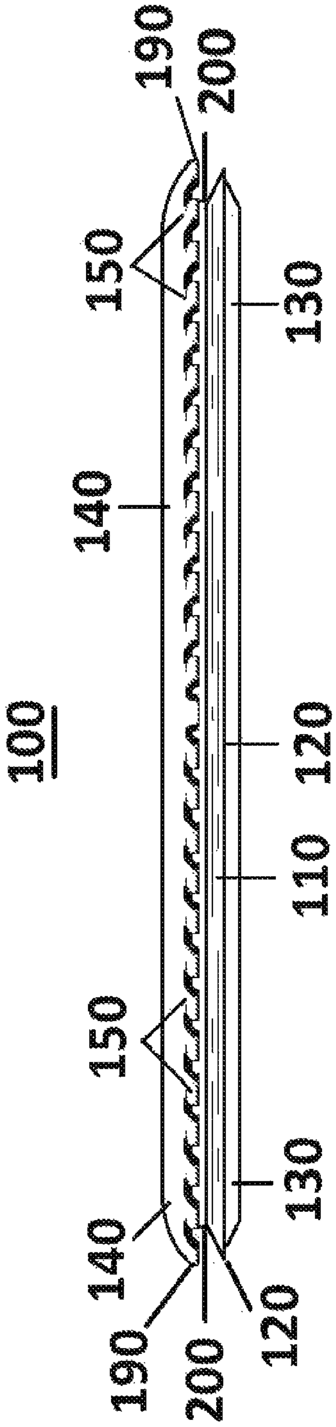
FIG. 10 is an eye-level view of the apparatus of the present inventions illustrating the comb, cutting blade and inner guard according to the first through fourth embodiments of the present inventions.

FIG. 10 is an eye-level view of the apparatus of the present inventions illustrating the comb, cutting blade and inner guard with like reference numerals according to any of the first through fourth embodiments of FIG. 1-7.

Figure 11:
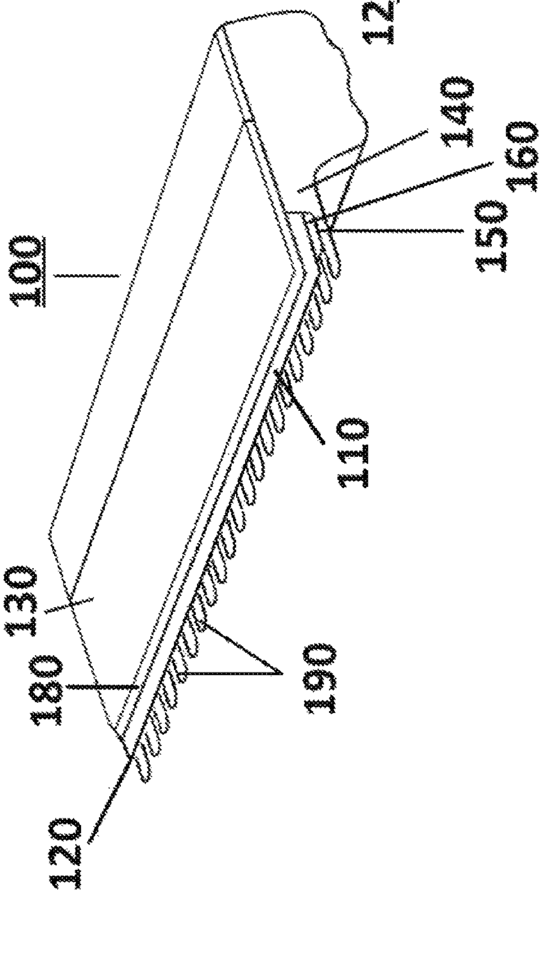
FIG. 11 is an elevated angled view of the present inventions whereby the inner guard is end up and apparatus is up-side down according to the first through fourth embodiments of the present inventions.

FIG. 11 is an elevated angled view of the present inventions whereby the inner guard 130 is end up and apparatus is up-side down with like reference numerals according to any of the first through fourth embodiments of FIGS. 1-7. As illustrated in FIG. 11 the safety razor 100 is in an upside-down position wherein the inner guard 130 is upright.

Figure 12:
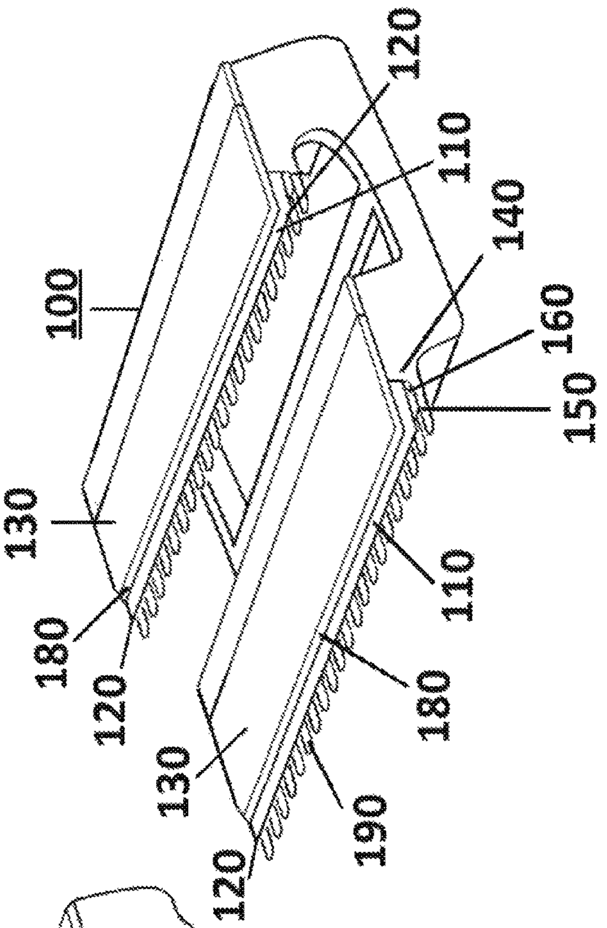
FIG. 12 is an elevated angled up-side down view of the present inventions that illustrates a plurality of razor blades assembled together as one apparatus according to the first through fourth embodiments of the present inventions.

FIG. 12 is an elevated angled up-side down view of the present inventions that illustrates a plurality of safety razors 100 assembled together as one apparatus with like reference numerals according to any of the first through seventh embodiments. As illustrated in FIG. 12 are redundant safety razors 100 creating a dual-blade structure.

Figure 13:
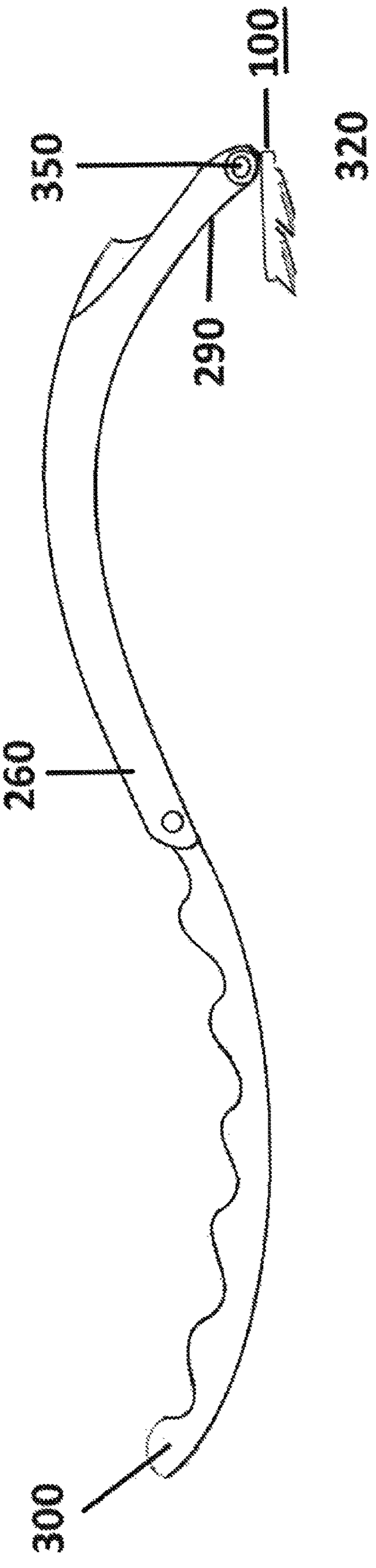
FIG. 13 is a side view the elongated handle by which the razor blade attaches on the upper end to in order to reach and shave areas of the body according to first through fourth embodiments of the present inventions.

FIG. 13 is a side view the elongated handle 260 by which the safety razor 100 attaches on the upper end 290 to in order to reach and shave areas of the body. As illustrated in FIG. 13 a safety razor 100 may attach to an elongated handle 260 which has an upper end 290 as well as a lower end 300 and a receiving end 320. Using the elongated handle 260 with attached safety razor 100 allows for access to desired shaving areas that may be hard-to-reach or prove difficult access.

Figure 14:
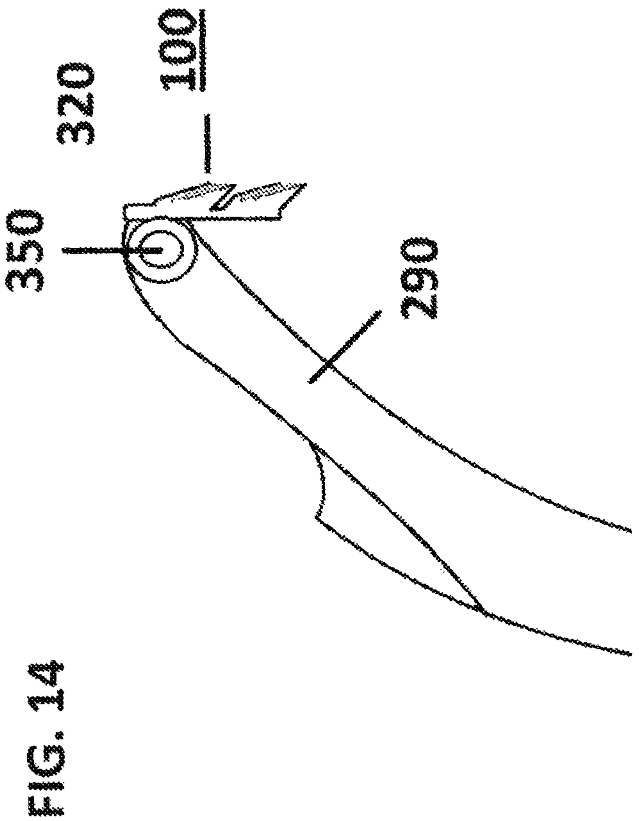
FIG. 14 is an side close up view of the end of the that handle whereby the razor blade attaches according to embodiments of the present inventions.

FIG. 14 is a side close up view of the upper end 290 of the handle whereby the safety razor 100 attaches. As seen from FIG. 14 upper end 290 or a portion thereof of receiving end 320 may be made from a material such as rubber or another flexible material that would allow the cutting blade 110 to pivot which would prove beneficial during the shaving process. A handle at the upper end 290 comprises a flexible coupling 350 coupled to the safety razor 100. Furthermore, a flexible coupling 350 proves beneficial when a user to have flexibility in their shaving stroke in order to navigate bumps or contour angles that can otherwise prove difficult.

Figure 15:
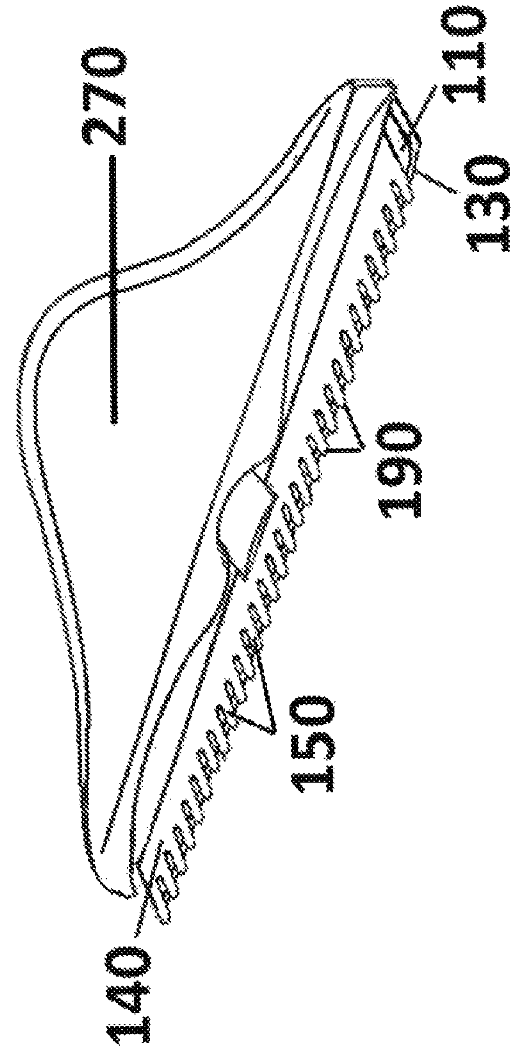
FIG. 15 is an elevated angled view illustrated a handle shaped to confirm to the shape of an individuals' hand or palm according to first through fourth embodiments of the present inventions.

FIG. 15 is an elevated angled view illustrated a palm-fitted handle 270 shaped to confirm to the shape of an individuals' hand or palm. As illustrated in FIG. 15 is a palm-fitted handle 270 used to accommodate desired shaving areas that would benefit from the safety razor 100 but would not necessarily require an elongated handle 260 in order to access the desired shaving area. One example of this embodiment would be for individuals who wish to shave hair on their arms or legs in order to better display their tattoos. Because a safety razor 100 that is wider would prove more beneficial to shaving quickly a palm-fitted handle 270 would be much more accommodating versus a traditional shaving handle found in most markets.

Figure 16:
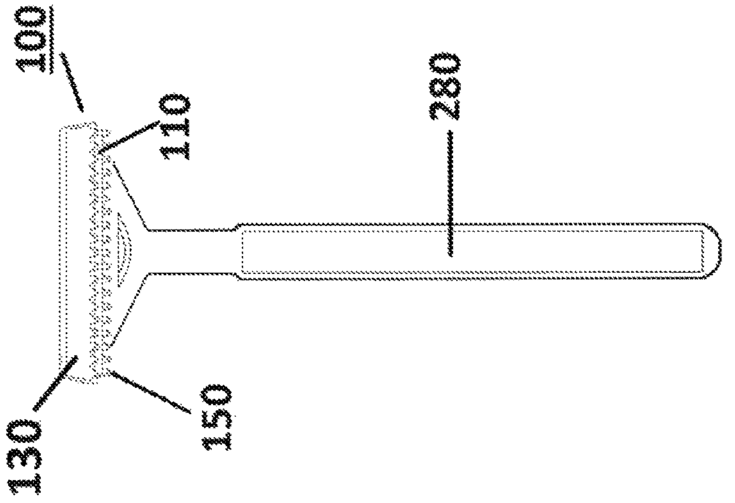
FIG. 16 is an elevated angled view of the present inventions whereby the safety razor is attached a handle according to first through fourth embodiments of the present inventions.

FIG. 16 is an elevated angled view of the present inventions whereby the safety razor 100 is attached to handle 280 most commonly used in with traditional shaving razor blades that are used to shave one's face. As illustrated in FIG. 16 is a safety razor 100 is attached to a traditional shaving handle 280 to allow access to areas whereby such handle 280 may prove useful such as one's neckline. The present invention illustrated in FIG. 1 creates such a soft friction between sharp edge 120 of cutting blade 110 and a skin surface which would not be the most desirable for accomplishing a clean close shave on one's face. FIG. 1 is most beneficial for areas of the body wherein hair may exist to be less dense in population as it strives to reduce the level at which hair is cut while still disallowing stubble. However, the closer the base 200 is positioned to the sharp edge 120 the more rigid the cutting blade 110 becomes and the easier the shaving operation becomes when attempting to shave areas consisting of more dense population of hair such as one's face.

Figure 17:
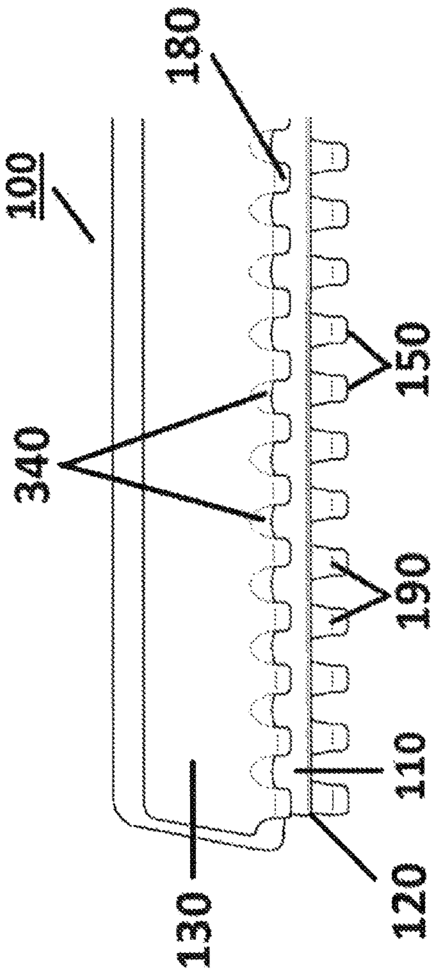
FIG. 17 is and front elevated view of the razor blade illustrating the web coverings existing between each tooth in order to conceal shorn hair from view according to the first through fourth embodiments of the present inventions.

FIG. 17 is and front elevated view of the razor blade illustrating the web covering 340 existing between each tooth in order to conceal shorn hair from view. The illustration of FIG. 17 can apply to any of the first through fourth embodiments of FIGS. 1-7. As previously mentioned and illustrated in FIG. 17 the inner guard 130 in a separate embodiment may embody a comb or teeth near the side wherein the inner guard edge 180 is positioned. That being said, the web covering 340 embodied in-between each tooth can be implemented between the teeth embodied within the elongated side H of the inner guard 130 as well as the elongated side of the outer comb 140. The web covering 340 acts much like an umbrella overhang covering between each tooth in order to conceal any shorn hairs from the public viewing. Being that the current invention embodies a deep void 160 there poses a risk of shorn hairs getting clogged over time. Though most shorn hairs will past through the safety razor 100 there is a small percentage that may still get stuck or clogged within the deep void 160. Too often users of safety razors dispose far too quickly disposable razors that are esthetically unappealing due to a build-up of shorn hairs. The web covering 340 acts to conceal any unappealing shorn hairs that cannot get brushed out or unclogged.

Figure 18:
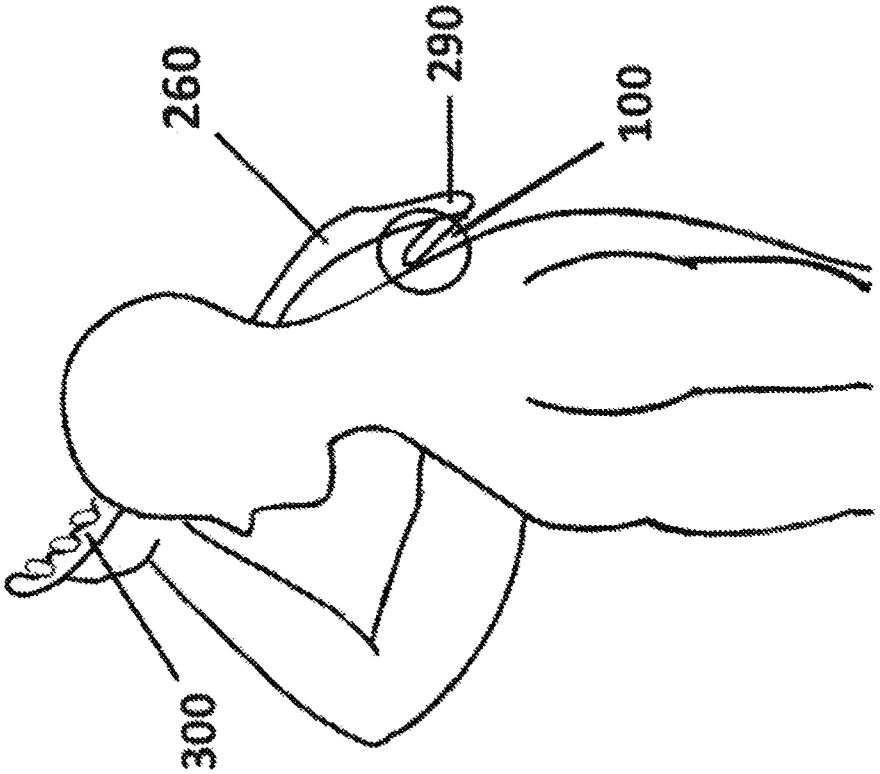
FIG. 18 is a view of an individual utilizing the safety razor by method of an elongated handle according to first embodiment of the present inventions.

FIG. 18 is a view of an individual utilizing the safety razor 100 by method of an elongated handle 260. As illustrated in FIG. 18 is an individual gripping the lower end 300 of the elongated handle 260 and utilizing the elongated handle 260 attached to a safety razor 100 and shaving the back side which often proves difficult in gaining appropriate access. Although the illustration of FIG. 18 illustrates the first embodiment of FIGS. 1-2, FIG. 18 can apply to any of the first through fourth embodiments of FIGS. 1-7.

FIG. 19 is a close up view of the safety razor 100 cutting hair along the back side of an individual. As illustrated in FIG. 19 is a close-up view of the safety razor 100 illustration of FIG. 18. Illustrated is the safety razor 100 shaving hair and cutting blade 110 flexing in a second position C according to the cutting action illustrated by FIG. 2 for the first embodiment. Furthermore, shorn hairs may pass through the outer teeth tips 150 and exit the safety razor 100 versus getting clogged or caught in the deep void 160. Though some hairs may get clogged or caught the web covering 340 covers visible exposure.

As previously indicated, FIG. 19 is a close-up view of the safety razor 100 as seen in FIG. 18 and illustrates the first embodiment illustrated in FIGS. 1-2. The skin surface contour has a convex skin surface contour between a pair of skin indents respectively created between both the outer comb 140 and the inner guard 130. When both the inside edge 190 of the outer comb 140 and the inner guard edge 180 of the inner guard 130 press into the skin, the recessed sharp edge 120 moves relatively closer towards the skin surface contour of the skin when cutting the hair.

The cutting blade 110 is at an angle nearly parallel to both the outer comb 140 and the inner guard 130 in embodiments. The cutting blade 110 of embodiments longitudinally bends in a direction of uncut hairs when the safety razor 100 is moved across the skin surface. The sharp edge of the cutting blade can longitudinally bend to cause further recess relative to the skin surface contour. The sharp edge of the cutting blade can longitudinally bend to cause further recess relative to the skin surface contour. This bend is in a direction less perpendicular to the skin surface. In embodiments of the present inventions, the cutting blade 110 in the safety razor 100 performs less rigidly against the skin surface and hair than in most prior razors. The deeper the void, the more the blade is cantilevered and the less rigid is its flexibility. Alternately, with a springier cutting blade 110 material or an inner spring, the blade has more flexibility. Such contributes to enhanced performance on dry conditions knowing that the closest save is not a highest priority on certain skin such as self-shaving the skin surface of ones back with a long handle 280 and no mirror.

A user of the safety razor 100 of embodiments can adjust how far the sharp edge 120 digs into the user's skin by varying the pressure of the safety razor 100 thereby adjusting how far the cutting blade 110 longitudinally bends. This may in some embodiments adjust the relative blade recess depth from the skin. These embodiments can be one mechanism for a user who feels adverse cutting feedback to adjust the blade recess by altering the pressure during the movement stroke. In other embodiments the cutting blade may be configured so altering speed or intensity of the movement stroke adjusts the blade recess.

Figure 20:
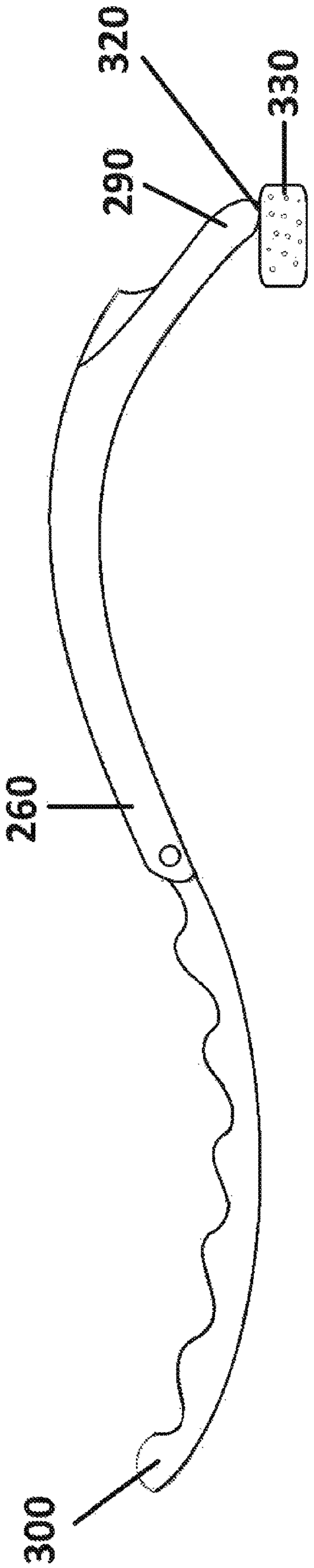
FIG. 20 illustrates a side view of a wet shave sponge with a handle according to embodiments of the present inventions.

FIG. 20 illustrates a side view of a safety razor 100 with an elongated handle 260 which embodies an upper end 290 and a lower end 300. As illustrated in FIG. 20 an elongated handle 260 can accept a shaving soap sponge 330 at a receiving end 320 near an upper end 290 opposite a lower end 300 and can easily be attached and removed in the same way the safety razor 100 can be easily attached and removed if an individual should decide to use the safety razor 100 in the shower which is commonly referred to as "wet shaving".

The term "flexible", as described previously in the first and second embodiment, is intended to describe the amount of bending or curved margin D the cutting blade 110 is granted in response to normal human opposing shaving forces. The "flexibility" of the cutting blade 110 in the first embodiment of FIGS. 1 and 2 is greater than the flexibility exhibited in the second embodiment or FIGS. 3 and 4. The term "flexible" takes on a different interpretation in the fourth embodiment wherein the flexible spring 170 is "flexed" allowing the cutting blade 110 to retract or flex horizontally and away from skin surface contour A.

A low friction between sharp edge 120 and a skin surface is illustrated in the first through the fourth embodiments illustrated in FIGS. 1-7 of the present inventions wherein a cutting blade 110 capable of less coarse hair found on an individual's back or arms at a depth allowing a smooth surface and all while minimizing cutting, razor burn as well as minimizing pulling or tugging hair while absent of an application of shaving cream or a shaving gel. Though a stronger friction may be allowed through the methods previously described, the preferred light or low friction is best practice when shaving one's back, buttock, arms or other areas that contain less dense areas of hair or areas that may be very sensitive to close shaving.

It is important to note in embodiments of the present inventions preferred cutting axis is a cutting axis between 20-50 degrees. An axis outside of 20-50 degrees, though may be accomplished, proves difficult when accessing petite skin surface areas whereby the risk of cutting or razor burn is greatly increased.

In further contrast to prior art the current invention does not require the razor blades to be exposed to water or shaving cream in order to offer a clean and close shave or to protect from cutting, nicking or skin irritation. This is a very important factor of the present inventions since application of shaving cream or lubricant can be extremely time consuming especially when applying to one's back side. Thus, not requiring the shaving cream lubricant is very time efficient. Furthermore, because the cutting blade 110 may be made from stainless steel the invention allows the safety razor 100 to last longer without any rusting since water and shaving cream, which will cause erosion or rust, is not necessary.

The preferred distance of separation between the inner guard edge 180 and the sharp edge 120 is a preferable margin of about 0.030 inches (about 0.0762 centimeter). The preferred distance of separation between the sharp edge 120 and the outer comb 140 inside edge 190 is about 0.032 inches (about 0.08128 centimeter). The preferred thickness of inner guard 130 is about 0.024 inches (about 0.06096 centimeter) or less. The preferred thickness of outer teeth tips 150 is about 0.026 inches (about 0.06604 centimeter) or less. The preferred cutting blade 110 exposure is about 0.030 inches (about 0.0762 centimeter) or less. Although the shaving geometry can be accomplished outside of these measurements these are preferred.

The present inventions relate to a safety razors themselves or safety razors with elongated handles of the type that allow a user to, with force applied, creates, in some embodiments forces along the handle with the skin and, in other embodiments, creates indentations into the skin and more particularly, in some further embodiments, may relate to a safety razor and elongated handle granting a user a source of communication known as "two-point discrimination" with regards to the location and angle of safety razor while simultaneously granting effective navigation over challenging muscular and skeletal terrain on the backside and body.

Figure 21:
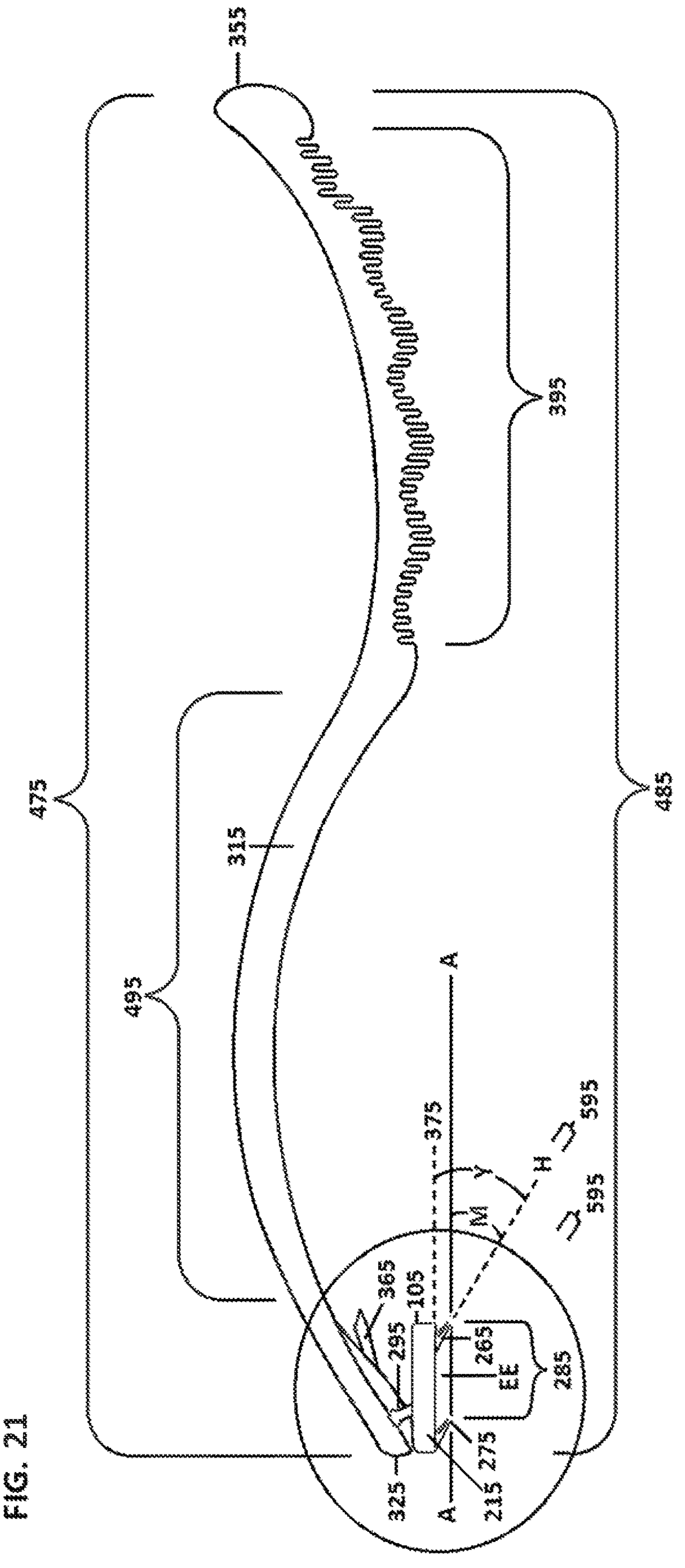
FIG. 21 illustrates a side view of a safety razor and an elongated handle for tactile feedback along a skin surface plane having a blade group and a support according to an embodiment of the present inventions.

FIG. 21 illustrates a side view of an elongated back shaver handle 315 and a safety razor 105 removably attaching to the elongated handle 315 according to embodiments of the present inventions. The elongated handle 315 is generally an s-shaped elongated member 315 having a surface along a length of the elongated handle 315 defining an inner side 485, an outer side 475, a blade end 325 and a grip end 355 and the blade end 325 opposite the grip end 355 and the said outer side 475 opposite the inner side 485 and having a finger surface grip 395 located on the inner side 485 of the elongated handle 315. The inner side 485, the outer side 475, the blade end 325, and the grip end 355 join one another to create an outside surface of the elongated member 315 that is substantially smooth and a cross-sectional shape of the elongated member 315 near the midway is substantially smooth having a shape that is substantially round or oval and a handle attachment 295 at the blade end 325 of the elongated member 315 opposite the grip end 355 and the handle attachment 295 located on the inner side 485 of the elongated handle member 315 and the blade end 325 comprises a handle clip 365 used to lock and release the safety razor 105 in the handle attachment 295.

The handle attachment 295 removably attaches the safety razor 105 for tactile feedback to a blade attachment of the elongated handle 315. The safety razor 105 has at least a blade group 265 protruding away from a substrate structure 215 of the safety razor 105 located on the inner side 485 of the elongated handle 315 facing against the torso backside of the user or in FIG. 21 facing against a flat skin surface plane referenced as plane A. It should be noted that when discussing the torso the breast tissue is not considered part of the torso. FIG. 21 illustrates the blade group 265 and a support 275 which, in FIG. 21, the support 275 takes the form of a secondary blade group. The blade group 265 and support 275 are protruding at an angle away from a front surface 375 of the safety razor 105. In order to illustrate the difference in angle between the front surface of the substrate structure 215 in relation to the top side 595 of the blade group 265 or support 275 the front surface, in FIG. 21, is with a dashed line. A substrate structure 215 adapts the tip or top side 595 of the blade group 265 or the top side 595 of the support 275 at an angle of about 75 degrees or less in relation to the front surface 375 of the substrate structure 215. A preferred angle between the top side 595 of the blade group 265 and the front surface 375 of the substrate structure 215 is about 20 degrees. Another way to measure this angle is by comparing the angle of a midpoint of a portion of a non-flexing sharp blade 115 which is referenced as midpoint H, to the front surface 375 of a substrate structure 215 of the safety razor 105. The midpoint H of a non-flexing portion of a sharp blade 115 is referenced as midpoint H which is illustrated in FIG. 21 with a dashed line. For the purpose of illustrating angle the front surface 375 of the substrate structure 215 is illustrated with a dashed line. The angle between the front surface 375 of the substrate structure 215 or the safety razor 105 in relation to the midpoint H is referenced as angle Y. Angle Y is 75 degrees or less. A preferred angle of angle Y is about 20 degrees. A similar angle that may be used is the angle between the midpoint H in relation to a flat skin plane A which is referenced as angle M. If the skin plane A is flat then angle M will be similar to angle Y.

The support 275 may take the form of a blade group or an alternative embodiment but having at least one blunt protrusion or bump sufficient for safely poking into the skin surface A. The support 275 may comprise more than one blunt protrusion wherein each blunt protrusion may be at staggered locations. In fact, in another alternate embodiment there may be three blunt protrusions 276 at staggered locations. As will be illustrated in the upcoming FIGS. 47 and 48 a support 275 may comprise a bump or blunt tip or blunt protrusion 276 as illustrated. The support 275 in further alternate embodiments, rather than another blade group or blunt protrusion 276, the support 275 may take the form of a lubrication strip, soap, or an electric trimmer, wherein each may have a blunt protrusion 276 for safely poking. There may also be other items that may be removably attached to the substrate structure 215 which would prove a benefit to a user for the sake of other methods of pre or post shaving efforts.

The blade group 265 and the support 275 spaced a distance sufficient to achieve discrimination such as two-point discrimination on the flat skin plane A of a user and a tactile discrimination distance 285 between the blade group 265 and support 275. A tactile discrimination distance 285 is any distance gap spaced inside of at least the blade group 265 and the support 275 and the tactile discrimination distance 285 may have a deep or shallow elevation which is referenced as elevation gap EE. The tactile discrimination distance 285 may be a tactile distance for two-point discrimination. The distance of the tactile discrimination distance 285 between the blade group 265 and the support 275 may vary on the area of the body that is going to be shaved. For instance, when shaving on the back area a preferred tactile discrimination distance for the human torso between the two points between the blade group 265 blunt tip and the support 275 blunt tip is about 35 millimeters or more. It should be noted that when discussing the torso the breast tissue is not considered part of the torso. The back side human skin surface is among the least sensitive portions of the human body and needs a longer tactile discrimination distance of about 39 millimeters. These 35 millimeter and 39 millimeter tactile discrimination distances are derived from the data cited in Myles and Binseel, 2007 referencing Weinstein, 1968. The tactile discrimination distance 285 allows balance and stability of the safety razor 105 for two-point discrimination when stroking against the skin surface A. Two-point discrimination, which will be further illustrated and discussed in FIG. 30 and FIGS. 32-33, describes the distance between the tip of the blade group 265 and the support 275 are about 35 millimeters on the human torso in order for the tactile two-point discrimination to be effective. It is for this reason that about 35 millimeters has been chosen as the preferred distance inside the blade group 265 tip and the support 275 tip. Tactile discrimination distance 285 also grants space for a tightened skin to convex to enter inside of the tactile discrimination distance 285 and inside of the elevation EE without rubbing against the front surface 375 of substrate structure 215 while tip of the blade group 265 and support 275 allowing a user to maintain an effective angle between the blade group 265 and support 275 and the skin surface A without difficulty. The tactile discrimination distance 285 also creates an effective amount of distance between the blade group 265 and the support 275 in order to allow two-point discrimination to occur which will be further illustrated and described in the upcoming FIG. 30 and FIGS. 32-33.

A body leverage surface 495 is located on the outer side 475 of the elongated member 315 near a midway between the blade end 325 and the grip 395 and the blade end 325 configured to press the body leverage surface 495 against a user's forearm when the grip 395 is respectively gripped by fingers and hand by a same arm of the user located on the inner side 485 of the elongated handle member 315 and a thumb of the hand facing away from the blade end 325 of the elongated member 315 while the long handle 315 is reaching the blade end 325 under an armpit of the same arm of the user to leverage the handle attachment 295 located on the inner side 485 of the elongated handle 315 against a torso backside of the user. This will be further illustrated in the upcoming FIGS. 27-37. It should be noted that when discussing the torso the breast tissue is not considered part of the torso.

The safety razor 105 for point discrimination is highly dependent on creating safe pokes or gouges into the skin surface A in order to create indentations that allow a skin convex to form inside of inner guard and outer comb belonging to the blade group 265 or the support 275 which may also take the form of a blade group as seen here in FIG. 21. In FIG. 21 the blade group 265 and support 275 are only making initial contact with the skin surface A and are simply touching the skin surface A and are not safely poking into the skin surface A to establish point discrimination. It can be seen in FIG. 21 the midpoint H of a non-flexed portion of the sharp blade 115 is in a straight line. It will be seen in the upcoming FIGS. 29-31, FIGS. 42-44 that when the blade group 265 is pressing into the skin surface A, a midpoint of a flexing sharp blade 115 will be directed at an alternative angle in relation to the front surface 375 of the substrate structure 215 when compared to the midpoint H. A safety razor 105 removably connecting to the elongated handle 315 is circled in FIG. 21 in order to illustrate the area that will have a close up view in the upcoming fifth illustration in FIG. 25.

Letter designations in the drawings depict certain planes, gap distances and contours, defined throughout, and for convenience are summarily defined wherein:

"A" references a flat skin plane surface;

"H" references the midpoint section of a non-flexing sharp blade 115;

"Y" references the angle between the front surface 375 of a substrate structure 215 or safety razor 105 in relation to the midpoint H is referenced as angle Y;

"M" references the angle between midpoint H in relation to a flat skin plane A which is referenced as angle M; and "EE" is an elevation gap inside a blade group 265 and a support 275.

Figure 22:
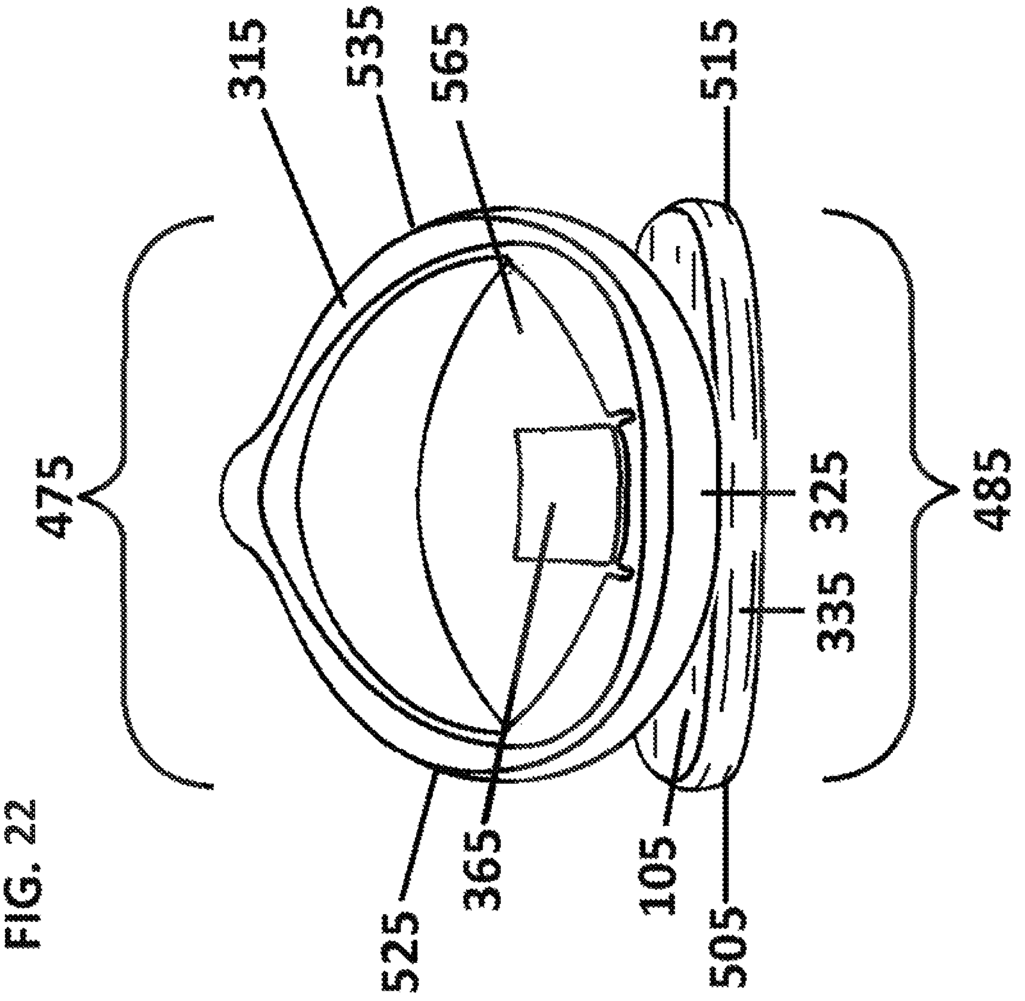
FIG. 22 illustrates a front view of a safety razor and an elongated handle according to embodiments of the present inventions.

FIG. 22 illustrates a front view of a back shaver handle 315 having a surface along a length of the elongated handle member 315 having a handle clip 365 and the elongated handle 315 defining a left handle side 525, a right handle side 535, an inner side 485, an outer side 475, and a blade end 325 wherein the left handle side 525 is opposite the right handle side 535 and the inner side 485 is opposite the outer side 475 and the blade end 325 between the left handle side 525 and right handle side 535. Although the safety razor 105 is illustrated in FIG. 22 as removably attaching to the elongated handle 315, the safety razor 105 is not included when referencing the left handle side 525 and the right handle side 535 of the elongated handle 315. The safety razor 105 having a left side of safety razor 505 and a safety razor right side 515 and a top side 335 wherein the left side of safety razor 505 is opposite the safety razor right side 515. The elongated handle 315 having an opening 565 allowing a user access the safety razor 105 in order to clean the safety razor 105 without having to remove the safety razor 105 from elongated handle 315 after performing shaving strokes. Often times shorn hair will get caught or stuck inside of safety razors. Safety razors such as the one presented within require a cleaning brush to stroke the outer comb or even inner guard in order to thoroughly and effectively clean most of the shorn hairs out of the safety razor 105. Thus, an opening in the elongated handle 315 near the blade end 325 would prove beneficial in allowing a user to save time and effort and keep the safety razor 105 for tactile feedback removably attaching to the elongated handle 315 when performing a cleaning.

Figure 23:
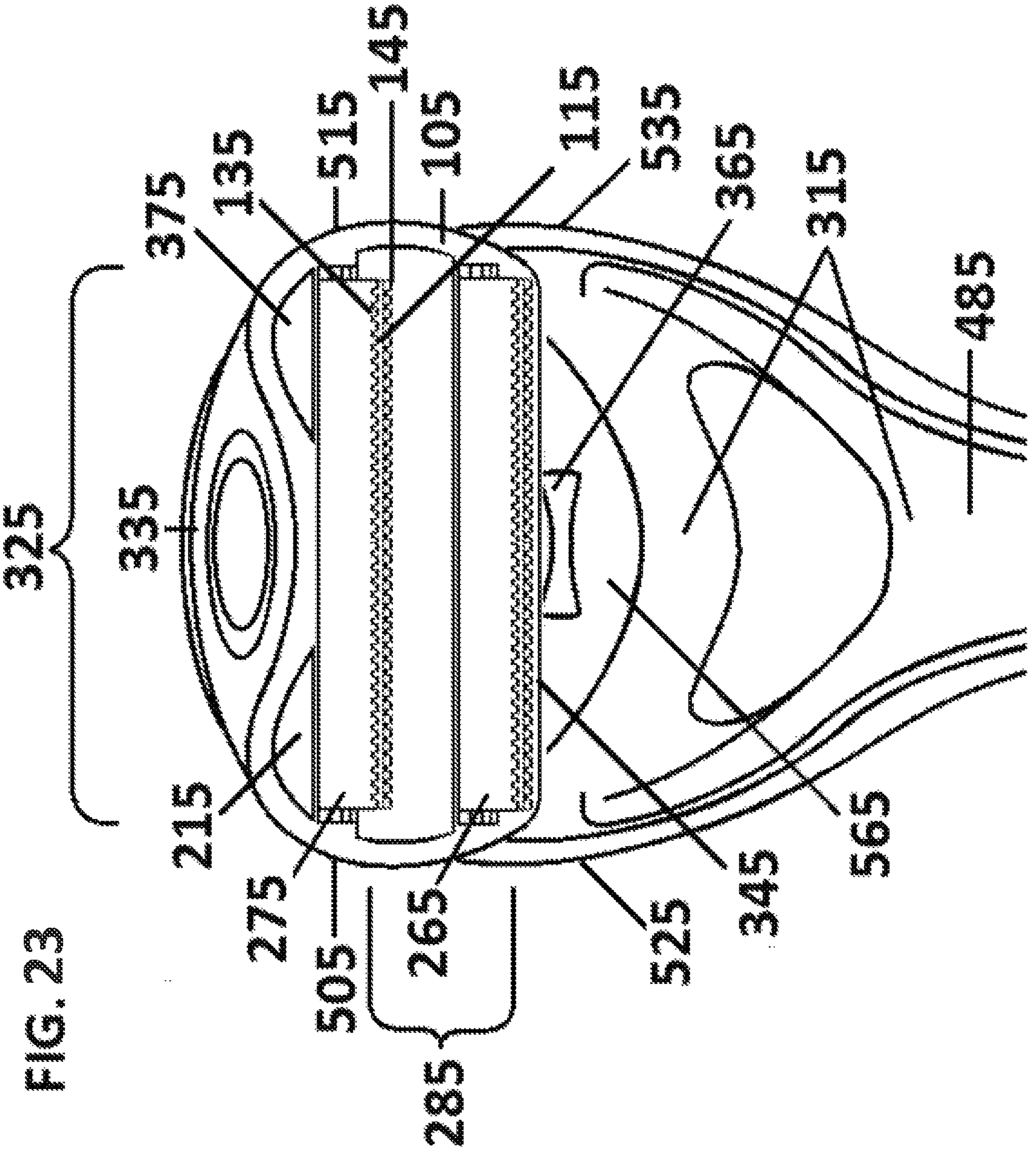
FIG. 23 illustrates a view on the inner side of an elongated handle and a safety razor according to embodiments of the present inventions.

FIG. 23 illustrates a front view of an inner side 485 of an elongated back shaver handle 315 near the blade end 325 wherein said handle 315 is removably attaching to a safety razor 105 for tactile feedback wherein the elongated handle 315 having a left handle side 525 and a right handle side 535 and a blade end 325 and wherein the left handle side 525 is opposite the right handle side 535. The elongated handle 315 having an opening 565 allowing a user access to clean the safety razor 105 after performing shaving strokes. The elongated handle 315 having a handle clip 365 which is inside the opening 565 allowing the user to press the handle clip 365 in order to allow the safety razor 105 to remove itself from the elongated handle 315.

The safety razor 105 for two point discrimination having a top side 335 a bottom side 345 and a safety razor left side 505 and a safety razor right side 515 wherein the top side 335 is opposite the bottom side 345 and the safety razor left side 505 is opposite the safety razor right side 515. A front surface 375 of a substrate structure 215 of the safety razor 105 is illustrated wherein the substrate structure 215 is removably attaching with a blade group 265 and a support 275 and the support 275, in FIG. 23, is taking the form of a secondary blade group. In FIG. 23 the blade group 265 and the support 275 both have an outer comb 145 and an inner guard 135 and a sharp blade 115 inside of the outer comb 145 and the inner guard 135. In another embodiment there may be multiple inner guards 135 and the sharp blade 115 inside of said multiple inner guards 135. It can be seen that a tactile discrimination distance 285, which was earlier explained as a gap for two point discrimination, is illustrated inside of a tip of both the blade group 265 and the support 275. Furthermore, even though in FIG. 23 the support 275 is closer to the top side 335 of the safety razor 105 it should be known that in an alternative embodiment the support 275 and the blade group 265 may switch positions wherein the blade group 265 is closer to the top side 335 of the safety razor 105 and inside the top side 335 and the support 275.

Figure 24:
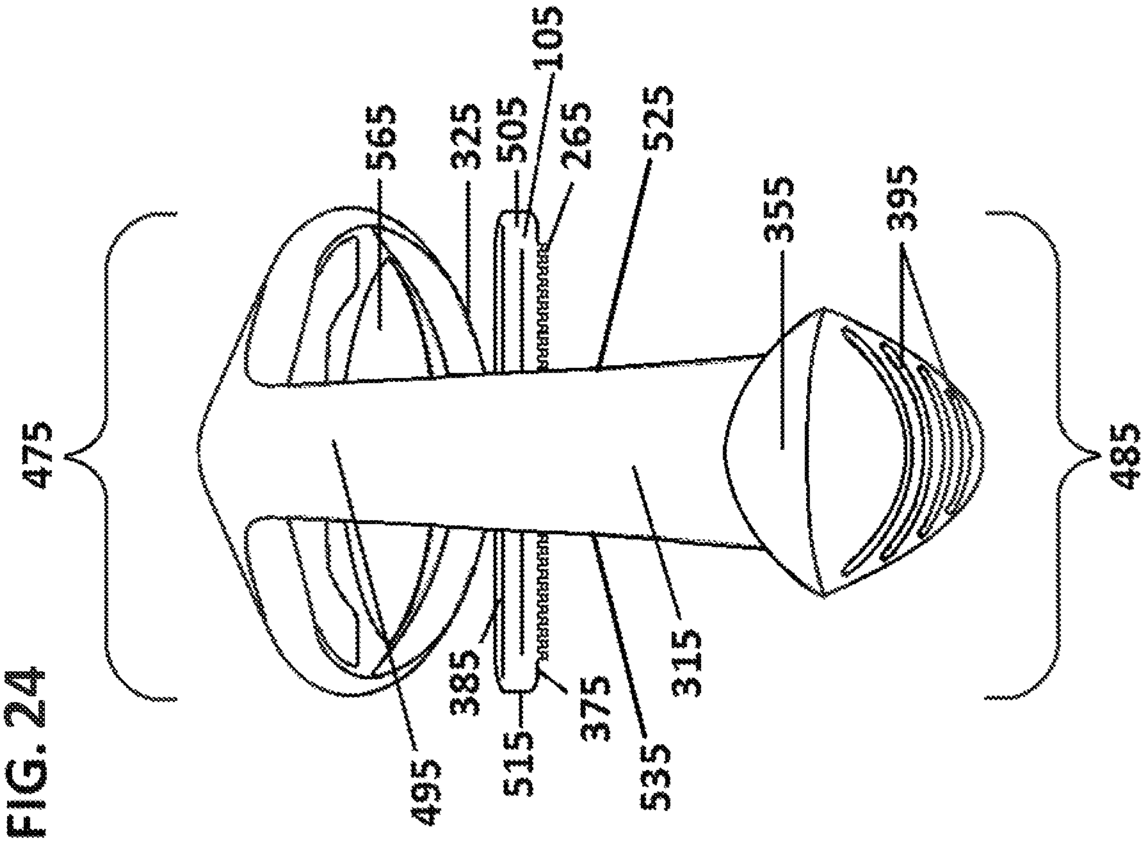
FIG. 24 illustrates a rear view of a safety razor and an elongated handle elongated handle according to embodiments of the present inventions.

FIG. 24 illustrates a rear view of a back shaver handle 315 having a surface along a length of the elongated member 315 defining a left handle side 525 and a right handle side 535 a blade end 325 and a grip end 355 and the left handle side 525 opposite the right handle side 535 and the grip end 355 opposite the blade end 325 and between the left handle side 525 and right handle side 535. A safety razor 105 is not included when referencing the left handle side 525 and the right handle side 535 of the elongated handle 315. The elongated member 315 having a surface along a length of the elongated handle 315 defining an inner side 485 and an outer side 475 wherein the inner side 485 is opposite the outer side 475 and a having a finger surface grip 395 located on the inner side 485 of the elongated handle 315 and wherein the inner side 485, the outer side 475, the blade end 325, and the grip end 355 join one another to create an outside surface of the elongated back shaver handle 315. The elongated back shaver handle 315 removably attaching to a safety razor 105 for tactile feedback and the safety razor 105 having a front surface 375, a rear surface 385, a safety razor left side 505, a safety razor right side 515 wherein the front surface 375 is opposite the rear surface 385 and the safety razor left side 505 is opposite the safety razor right side 515. A blade group 265 is extending from the front surface 375 of the safety razor 105. The elongated handle 315 having an opening 565 allowing a user access to clean the safety razor 105 after performing shaving strokes. Finally, a body leverage surface 495 is illustrated midway the grip 395 and the blade end 325 on the outer side 475 of the elongated handle 315.

Figure 25:
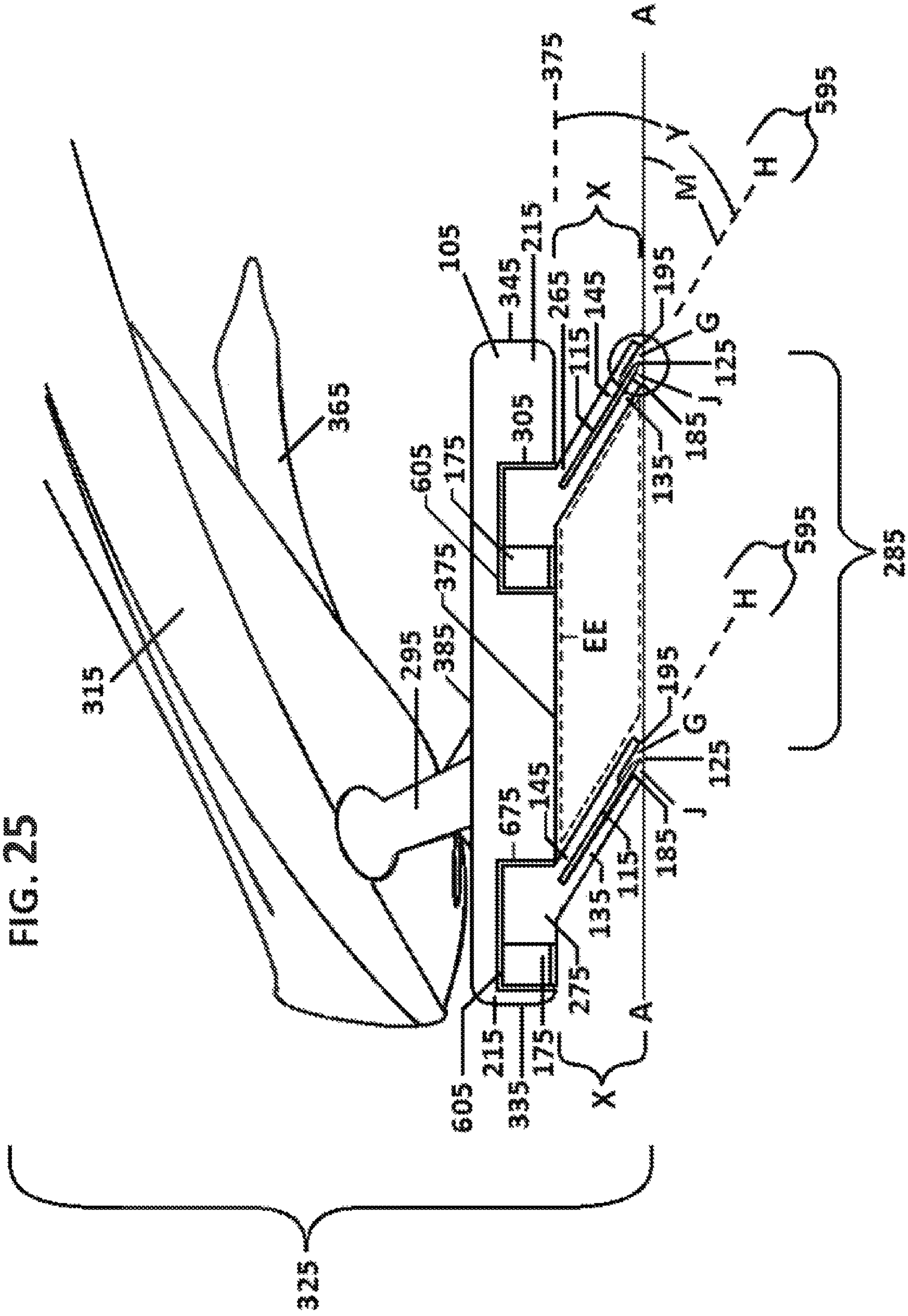
FIG. 25 illustrates a close up side view of a safety razor of the circled area of prior FIG. 1 according to embodiments of the present inventions.

FIG. 25 illustrates an up-close side view of a portion of the previously illustrated and circled elongated handle 315 removably attaching to the safety razor 105 for tactile feedback along the skin surface plane A in the prior FIG. 21. The safety razor 105 has a blade group 265 and a support 275 according to embodiments of the present inventions. The elongated handle 315 having a blade end 325. In FIG. 25 a substrate structure 215 adapted to hold both the blade group 265 and the support 275 the on a front surface 375 of the substrate structure 215 with the blade group 265 and the support 275 spaced a tactile discrimination distance sufficiently wide enough to achieve tactile feedback felt through a torso region of the skin of the user perceived between the blade group 265 and the support 275 and wherein the substrate structure 215 is adapted such that no elements within the tactile distance produce a tactile sensation on the skin surface A. It should be noted that when discussing the torso the breast tissue is not considered part of the torso. Two-point discrimination, which will be further illustrated and discussed in FIG. 30 and FIGS. 32-33, describes the distance between the tip of the blade group 265 and the support 275 are about 35 millimeters on the torso in order for the tactile two-point discrimination to be effective. It is for this reason that about 35 millimeters has been chosen as the preferred distance inside the blade group 265 tip and the support 275 tip. The substrate structure 215 is adapted to hold both the blade group 265 and the support 275 a distance measured from a leading edge of the blade group 265 to a trailing edge of the support 275 of a minimum of at least 1.59 millimeters.

The substrate structure 215 is further adapted to additionally provide a tactile discrimination distance between the blade group 265 and the support 275 spaced sufficiently wide enough to achieve point discrimination tactile feedback felt on the skin of the user between the blade group 265 and the support 275. The blade group 265 and the support 275 each extend from the front surface 375 of the substrate structure 215 at a height X or elevation EE sufficient to avoid loose skin of the user touching the front surface 375 of the substrate structure 215 within the tactile discrimination distance spaced between the blade group 265 and the support 275 and loss of point discrimination. In FIG. 25 a support 275 comprises another blade group comprising another sharp blade 115 and another guard 135 parallel to the another sharp blade 115. The substrate structure 215 is adapted with the blade group 265 and the support 275 are also spaced a tactile discrimination distance sufficiently wide enough to achieve point discrimination tactile feedback felt through on a backside torso region of the skin of the user perceived between the blade group 265 and the support 275. It should be noted that when discussing the torso the breast tissue is not considered part of the torso. Each of the different blade groups may have different angles in relation to the substrate structure 215. In another embodiment a plurality of blade groups 265 arranged in parallel rows on a front surface 375 of the substrate structure 215, each of the blade groups 265 spaced a distance there between, each of the blade groups 265. The blade group 265 and the support 275 are spaced a tactile leverage feedback distance sufficiently wide enough to provide leverage feedback felt through the elongated back shaver handle 315 for the user to maintain a consistent angle of the sharp blade 115 relative to the skin surface when an arm of the user reaches the elongated back shaver handle 315 to the user's backside during shaving movement over a shoulder blade peak or a spine depression.

The safety razor 105 in FIG. 25 is removably attached by a handle attachment 295 and a handle clip 365 configured to allow a user to press in order to grant the handle attachment 295 to remove itself from the elongated handle 315. The handle attachment 295 may remove itself by sliding out of the elongated handle 315. In another embodiment the handle attachment 295 may be embodied on the elongated handle 315 wherein the safety razor 105 accepts the handle attachment 295 of the elongated handle 315. The safety razor 105 having a rear surface 385, a front surface, a top side 335 and a bottom side 345 wherein the rear surface 385 is opposite the front surface 375 and the top side 335 is opposite the bottom side 345.

The support 275 in FIG. 25 takes the form a blade group and the blade group 265 and the support 275 both comprising a sharp blade 115 with a sharp edge 125 and an inner guard 135 parallel to the sharp blade 115 on a trailing side of the sharp blade 115 opposite an outer comb 145 wherein the outer comb 145 parallel to the sharp blade 115 on a leading side of the sharp blade 115 and a substrate structure 215 adapted to hold a blade group 265 and the support 275 on the front surface 375 opposite the rear surface 385 of the substrate structure 215 with the blade group 265 and support 275 spaced a distance sufficient to achieve point discrimination on the skin of a user between the blade group 265 and support 275. The inner guard 135 having an outer edge 185 and a trailing opening J wherein the trailing opening J is inside of the outer edge 185 and the sharp edge 125 of the sharp blade 115. The outer comb 145 having an inside edge 195 and a leading opening G wherein the leading opening G is inside of the inside edge 195 and the sharp edge 125 of the sharp blade 115. A suppleness distance is measured between the inside edge 195 of the outer comb 145 and the outer edge 185 of the inner guard 135 of the blade group 265. The suppleness distance is narrower than tactile discrimination distance 285 spaced between the blade group 265 and support 275, which said support 275 is a blade group in FIG. 25.

The substrate structure 215 adapted to hold the blade group 265 and a support 275 on the front surface 375 of the substrate structure 215 with the blade group 265 and the support 275 spaced a distance sufficient to achieve two-point discrimination on the skin A of a user between the blade group 265 and the support 275 and the support 275 and the blade group 265 extend from the front surface 375 of the substrate structure 215 of the safety razor 105 at a height X or elevation EE sufficient to avoid loose skin of the user touching and rubbing the front surface 375 of the substrate structure 215 which would interfere with a shaving stroke. This loose skin is more clearly illustrated in upcoming FIG. 30 as a skin convex CC inside blade group 265 and support 275. In FIG. 25 the front surface 375 of the substrate structure 215 comprising one or more grooves parallel from each other and adapted to removably hold at least one blade group 265 and support 275. The front surface 375 of the substrate structure 215 further comprises a second groove 675 adapted to removably hold the support 275 inserted therein and configured parallel to the first groove 305 spaced the tactile leverage distance sufficiently wide enough to provide the tactile leverage feedback felt through the elongated back shaver handle 315 for the user to maintain the consistent angle of the sharp blade 115 relative to the skin surface A when an arm of the user reaches the elongated back shaver handle 315 to a backside of the user during shaving movement over a shoulder blade peak or a spine depression on the backside.

In FIG. 25 there is a first groove 305 and a secondary groove 675. Both groove 305 and the secondary groove 675 will be more clearly illustrated in the upcoming FIGS. 47-48. The grooves allow a user an option to choose a preferred distance for two point discrimination between the blade group 265 and the support 275 which will be further illustrated in the upcoming FIGS. 45-46. The blade group 265 and the support 275 may attach to a groove by method of a clip 175 with a spring or a snap-lock by inserting the blade group 265 or support 275 into a groove from the front surface 375 of the substrate structure 215 until the clip 175 snaps into place. It is commonly known there are many alternative methods in which holding and securing the blade group 265 and the support 275 which would also suffice. In another embodiment the handle attachment 295 designed to removably attach and temporarily hold the safety razor 105 may be embodied on or near the top side 335 or bottom side 345 of a safety razor 105 In one embodiment the blade group 265 or support 275 may slide into a groove 305 or a secondary groove 675 from the left attachment side 545 or the right attachment side 555 of the safety razor 105 as will be illustrated in the upcoming FIG. 58. In FIG. 25 the first groove 305 and secondary groove 675 are illustrated. First groove 305 is removably holding the blade group 265 while secondary grove 675 is removably holding the support 275. Grooves allow a user an option to choose a distance between the blade group 265 and the support 275.

The substrate structure 215 adapts the tip or a top side 595 of the blade group 265 or support 275 at an angle of about 75 degrees or less in relation to the front surface 375 of the substrate structure 215. A preferred angle between the top side 595 of the blade group 265 in relation to the front surface 375 of the substrate structure 215 is 20 degrees.

The support 275 may take the form of a blade group or an alternative embodiment having a least one blunt protrusion 276 sufficient for safely poking into the skin surface A. The support 275 may comprise more than one blunt protrusion 276 wherein each blunt protrusion may be at staggered locations. As will be illustrated in the upcoming FIGS. 47-48 a support 275 may comprise a bunt tip or bump or blunt protrusion being a soap strip, a lubrication strip, or an electric trimmer each having a blunt protrusion.

A tactile discrimination distance 285 is a gap spaced inside of at least the blade group 265 and the support 275 and sufficiently spaced for two-point discrimination. The tactile discrimination distance 285 may have an elevation gap EE which may be a deep or shallow gap. The elevational gap EE is inside the blade group 265 and support 275 as well as inside of the tactile discrimination distance 285 and the front surface 375 of the safety razor 105. When shaving the back the substrate structure 215 holds the blade group 265 and the support 275 spaced the tactile discrimination distance greater than about 35 millimeters. However, other more sensitive areas of the body may require less distance. The tactile discrimination distance 285 allows balance and stability of the substrate structure 215 when stroking against the skin surface A. The tactile discrimination distance 285 also grants space for a tightened skin to convex to enter inside of the tactile discrimination distance 285 without rubbing against the front surface 375 of the substrate structure 215 while allowing a user to maintain an effective angle between the blade group 265 and the support 275 and the skin surface A without difficulty. The tactile discrimination distance 285 also creates an effective amount of distance between the blade group 265 and support 275 in order to allow point discrimination to occur. The elevation gap EE, which in FIG. 25 is illustration with dashed lines, allows a skin convex to enter when the safety razor 105 for point discrimination is pressing into the skin surface A.

The height from tips of each of the blade group 265 and the support 275 to the front surface 375 of the substrate structure 215 is referenced as height X and is 3.81 mm or more in order to avoid the loose skin of the user touching the front surface 375 of the substrate structure 215. In a preferred embodiment height X is about 3.81 mm and wherein the substrate structure 215 holds the blade group 265 and the support 275 spaced a tactile discrimination distance about 35 millimeters or greater. However, other more sensitive areas of the body may require less distance. Both the blade group 265 and the support 275 have the top side 595 and bottom side 605 which is opposite the top side 595. A midpoint of a non-flexing portion of a sharp blade 115 referenced as midpoint H may be between about 0-75 degrees in relation to the front surface 375 of the substrate structure 215. A preferred angle from the tip or the top side 595 of the blade group 265 in relation to the front surface 375 of the substrate structure 215 is about 20 degrees. In FIG. 25 the safety razor 105 for two-point discrimination is shown prior to gouging and indenting into the skin surface A while the opposite side view of this embodiment being identical according to a first embodiment of the present inventions. In FIG. 25 the support 275 comprises another blade group 265 comprising another sharp blade 115 having another leading side and another trailing side for shaving the hair and another outer comb 145 next to and parallel to the another leading side of the another sharp blade 115 and another inner guard 135 next to and parallel to the another trailing side of the another sharp blade 115.

The front surface 375 of the substrate structure 215 is represented by a dashed line in order to clearly illustrate angle Y. Y represents the angle between the front surface 375 in relation to the midpoint H of a portion of a non-flexing sharp blade 115. The angle between the midpoint H in relation to the flat skin plane A is angle M. Angle M may also be between about 0-75 degrees in order for a safety razor 105 for two-point discrimination to shave a stroke properly and effectively. A preferred angle of the tip or the top side 595 of the blade group 265 in relation to the front surface 375 of the substrate structure 215 is about 20 degrees. Finally, a circle is illustrated around the cutting area of a blade group 265. The circled area will be illustrated in a close-up schematic cross-sectional view in the upcoming FIG. 26.

The safety razor 105 for tactile feedback is highly dependent on creating safe pokes or gouges into the skin surface A in order to create indentations that allow a first skin convex to form inside of the inner guard 135 and outer comb 145 and a second skin convex inside the tactile discrimination distance 285. In FIG. 25 the outer edge 185 and the outer teeth inside edge 195 make initial contact with the skin surface A. At this point the inner guard 135 and outer comb 145 are simply touching the skin surface A and are not gouging into skin surface A. Finally, the support 275 and blade group 265 extend from the front surface 375 of the substrate structure 215 and creating a height X or EE which is the height inside of the tips of both the blade group 265 and the support 275 to the front surface 375 of the substrate structure 215. Height X is about 3.81 millimeters or more. Height X or EE is sufficient to avoid loose skin of the user touching and rubbing the front surface 375 of the substrate structure 215 which would interfere with a shaving stroke. In alternative embodiments the handle attachment 295 may located on the elongated handle 315 or the safety razor 105 or both the elongated handle 315 and safety razor 105. In FIG. 25 it can be seen that the safety razor 105 is removably attaching with the elongated handle 315 on the rear surface 385 of the safety razor 105. It alternative embodiments the safety razor may removably attach with the elongated handle 315 at the top side 335, the bottom side 345 or even the front surface 375 or a combination of them. Finally, the handle attachment 295 may have a spring allowing flexibility in the angle between the safety razor 105 and the elongated handle 315. There is a relationship between the tactile discrimination distance 285 and the distance of height X as presented herein. It is desired to prevent the front surface 375 of the substrate structure 215 from rubbing against the skin surface A during a shaving stroke. That being said, the greater the tactile discrimination distance 285 the greater the dimension of height X. Just the same, when the lesser the tactile discrimination distance 285 the lesser the dimension of height X.

Letter designations in the drawings depict certain planes, gap distances and contours, defined throughout, and for convenience are summarily defined wherein:

- "X" references a height from tips of a blade group 265 and a support 275 to a front surface 375 of a substrate structure 215;
- "J" references a trailing opening inside a sharp blade 115 and an outer edge 185 of inner guard 135;
- "G" references a leading opening inside a sharp edge 125 of a sharp blade 115 and an inside edge 195 of an outer comb 145; and
- "Y" represents an angle between front surface 375 in relation to a midpoint H portion of a non-flexing sharp blade 115.

Figure 26:
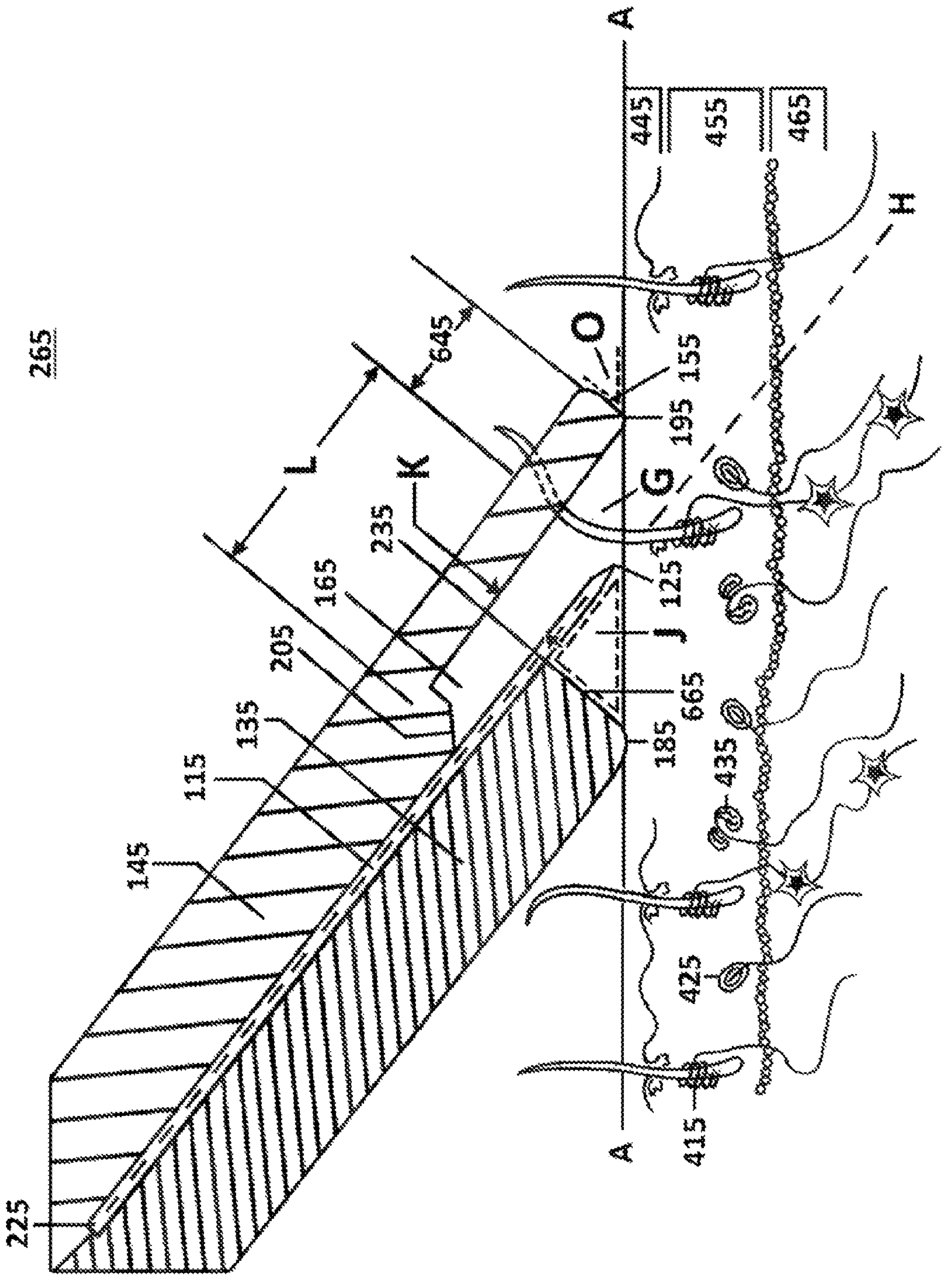
FIG. 26 illustrates a close up cross-sectional view of a blade group of the circled area of prior FIG. 5 according to embodiments of the present inventions.

FIG. 26 illustrates a close up cross-sectional view of a blade group 265 which was circled in the prior FIG. 25 according to embodiments of the present inventions. The blade group 265 comprising at least one sharp blade 115 comprising a sharp edge 125 facing towards a skin surface A comprising an outer comb 145 comprising an inside edge 195, a comb inside wall 645 inside of the sharp edge 125 and inside edge 195 and an inner guard 135 comprising an inner guard outer edge 185, an inner guard inside end 235 and an inner guard inside wall 665 inside the outer edge 185 and the inner guard inside end 235. The comb inside wall 645 is adjacent to the sharp blade 115 and is inside the inside edge 195 and the sharp edge 125 of the sharp blade 115. Inner guard inside end 235 is embodied where the inner guard 135 and the sharp blade 115 meet. An inside portion of the outer comb 145 removed in order to create a deep void 165. The sharp blade 115 is fixedly anchored on a sharp blade end 225 opposite the sharp edge 125 of sharp blade 115. A suppleness distance is measured between the inside edge 195 of the outer comb 145 and the outer edge 185 of the inner guard 135 of the blade group 265. Also the suppleness distance is narrower than tactile discrimination distance 285 spaced between the blade group 265 and support 275, which said support 275 is a blade group in FIG. 26. A base 205 is positioned to create a level of distance between the base 205 and the sharp edge 125 of the sharp blade 115 in order to enable a controlled level of flexibility with the sharp blade 115. The deep void 165 is spaced intermediately of the outer comb 145 and sharp blade 115. Deep void 165 thickness allowing a level of control over the flexibility of the sharp blade 115 as well as over-exposure of the sharp blade 115. The thickness of the deep void 165 is represented as K. Thickness K is 1.016 millimeters or less. In a preferred embodiment distance thickness K is about 0.381 millimeters. Thickness K of deep void 165 may run thicker but the danger of enabling the sharp blade 115 to become like a dagger in relation to the skin surface becomes increasingly probable. The level of distance of the deep void 165 between the base 205 and the sharp edge 125 of the sharp blade 115 is referenced as L. The distance L is about 4.572 millimeters or less. A preferred distance of distance L is about 2.032 or less. Distance L may be less or greater than the preferred distance. However, if the distance of distance L becomes much greater than 4.572 millimeters then the sharp blade 115 will start to bend too much and the sharp edge 125 of the sharp blade 115 will run the danger of not cutting effectively. It should be understood that comb inside wall 645 inside the sharp edge 125 and the inside edge creates a barrier for a skin surface convex to enter inside of inside edge 195 and outer edge 185 which will be illustrated in the upcoming FIG. 31. The outer comb 145 having an outer wall 155 which in another embodiment may also be rounded with an arc instead of a straight wall. The midpoint of a portion of a non-flexing sharp blade 115 is referred to as midpoint H which is illustrated with a straight or flat dashed line. In FIG. 26 the inner guard 135 and outer comb 145 are not indenting into the skin surface A and thus the sharp blade 115 is not pressing against the skin surface A and the sharp blade 115 is not flexing.

As seen in FIG. 26 when viewing a close up cross-sectional view of the blade group 265 a portion of the inner guard 135 inside of the outer edge 185 and the sharp edge 125 is removed in order to create a trailing opening J inside of outer edge 185 and sharp edge 125 of the sharp blade. In FIG. 26 the trailing opening J is illustrated as with dashed triangle inside of the outer edge 185 of the inner guard 135 and the sharp edge 125 of the sharp blade 115. In other alternate embodiments the dashed triangle may be a right triangle or an isosceles triangle or an isosceles right triangle. The trailing opening J cross sectional has three triangular corners or vertices which have three walls but it is not a perfect triangle being that the three walls or sides are not always flat. This is especially true of the sharp blade 115 and the skin surface A which both flex under pressure. The inner guard inside wall 665 of inner guard 135 creates a second wall or side. The inner guard inside wall 665 of the inner guard 135 does not need to be a straight wall but in another embodiment may be rounded with an arc. The skin surface A is the third and final wall or side which also deforms and will convex. The skin needs to deform inside the trailing opening J in order for the sharp blade 115 to access the base of a hair 415 which results in a shave that leaves a smooth skin surface after a shaving stroke. In FIG. 26 the first of the vertices is where the inner guard inside end 235 and the sharp blade 115 meet. The second of the vertices is where the sharp blade 115 and skin surface plane A intersect. The second vertex may also be where the sharp edge 125 of the sharp blade 115 and the skin surface plane A meet. The third of the vertices is where the skin surface A and the outer edge 185 of the inner guard 135 meet. The vertices work to together to form the planes that create trailing opening J or void in order for the trailing opening J to allow for a sufficient opening or void for tightening skin to enter and convex inside of the blade group 265 which is illustrated in the upcoming FIGS. 29-31. It should also be known that the inner guard inside wall 665 and the comb inside wall 645 controls the amount of skin convex allowed inside the blade group 265. As will be illustrated in the upcoming FIGS. 29-31 a skin convex is referenced as T and the inner guard 135 outer edge 185 and the outer comb 145 inside edge 195 simultaneously dig into the skin surface A in order to tighten the skin so that when the hair is presented to the sharp blade 115 the root or base of the hair 415 is being greatly exposed. In FIG. 26, a leading opening G is inside of inside edge 195 and the sharp edge 125 of the sharp blade 115. The leading opening G allowing a sufficient opening in order for a skin convex to safely press against the sharp edge 125 of the sharp blade 115 when pressing the blade group 265 against the skin surface A. It can be seen in FIG. 26 the outer wall 155 of the outer comb 145 and the skin plane A create a vertex of a leading side imaginary triangle referenced as vertex O. Vertex O is created in order to allow the outer comb 145 to better indent into the skin surface A allowing the blade group 265 to shave properly and for better tactile feedback.

It can be seen that the sensors that require pressure in order to trigger such as the Pacinian Corpuscle 425 and the Ruffini's Corpuscle 435 are not yet being triggered since there is only light touch between the blade group 265 and the skin surface A. Only the hairs 415 may detect the light touch. It can be seen in the illustration the tissue sub layers and the sensors within each layer which include the Epidermis 445, the Dermis 455 and the Hypodermis 465.

Letter designations in the drawings depict certain planes, gap distances and contours, defined throughout, and for convenience are summarily defined wherein:

"L" references a deep void 165 running lengthwise from inside edge 195 of outer teeth 145 to a base 205 which allows ample space for the preferred flexibility of a sharp blade 115 to the inside of a outer comb 145;

"K" references a thickness of a deep void 165 between an outer comb 145 and a sharp blade 115 which is a contributing factor in the amount of allowed inverted skin convex T as well as the level of flexibility a sharp blade 115 illustrates against inverted skin convex T when shaving; and "O" references a void inside an outer wall 155 of an outer comb 145 and a flat skin surface plane A.

Figure 27:
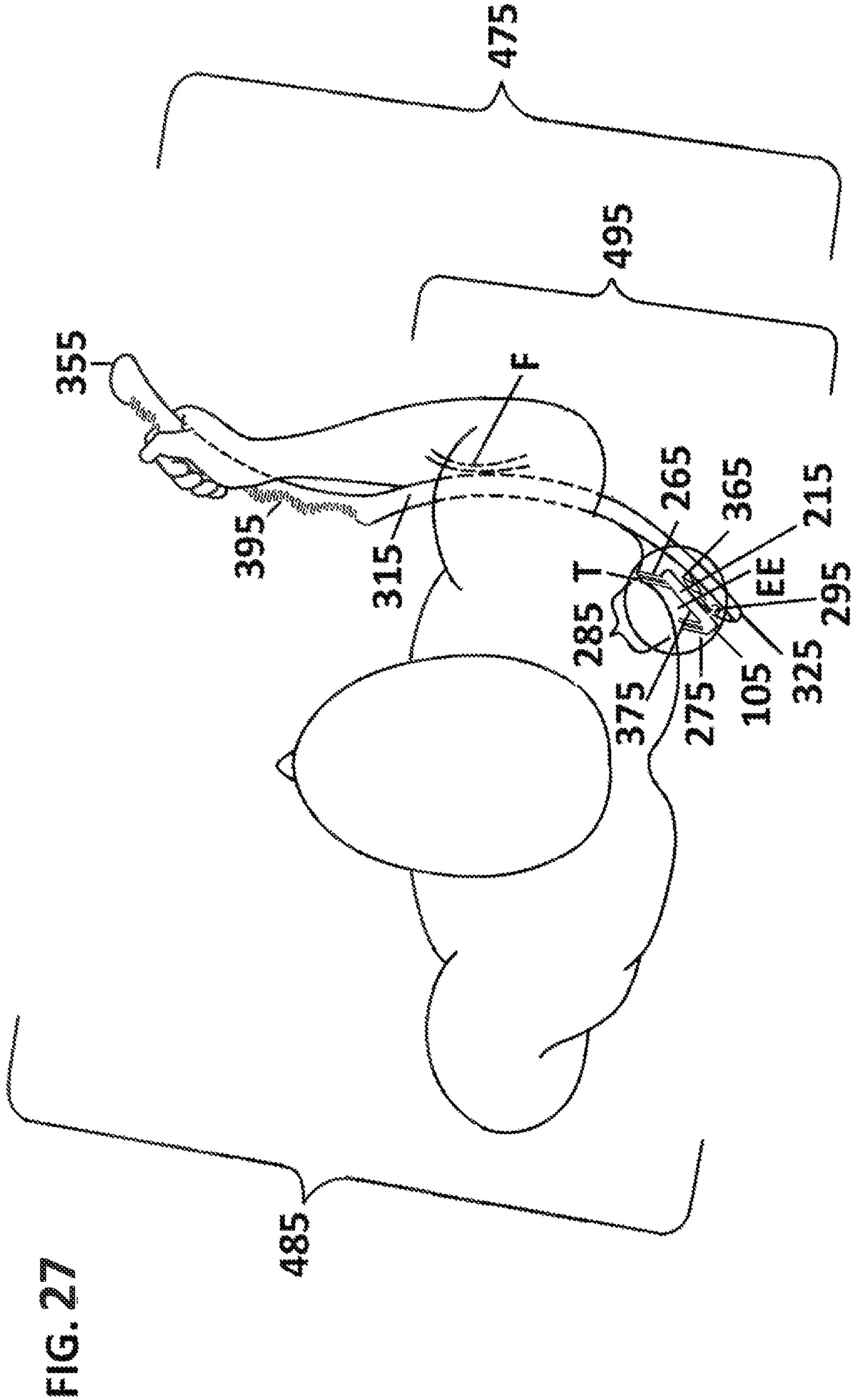
FIGS. 27-28 illustrate aerial views of a two-sided back shaver handle gripped by a user extended under the armpit towards the backside according to embodiments of the present inventions.
Figure 28:
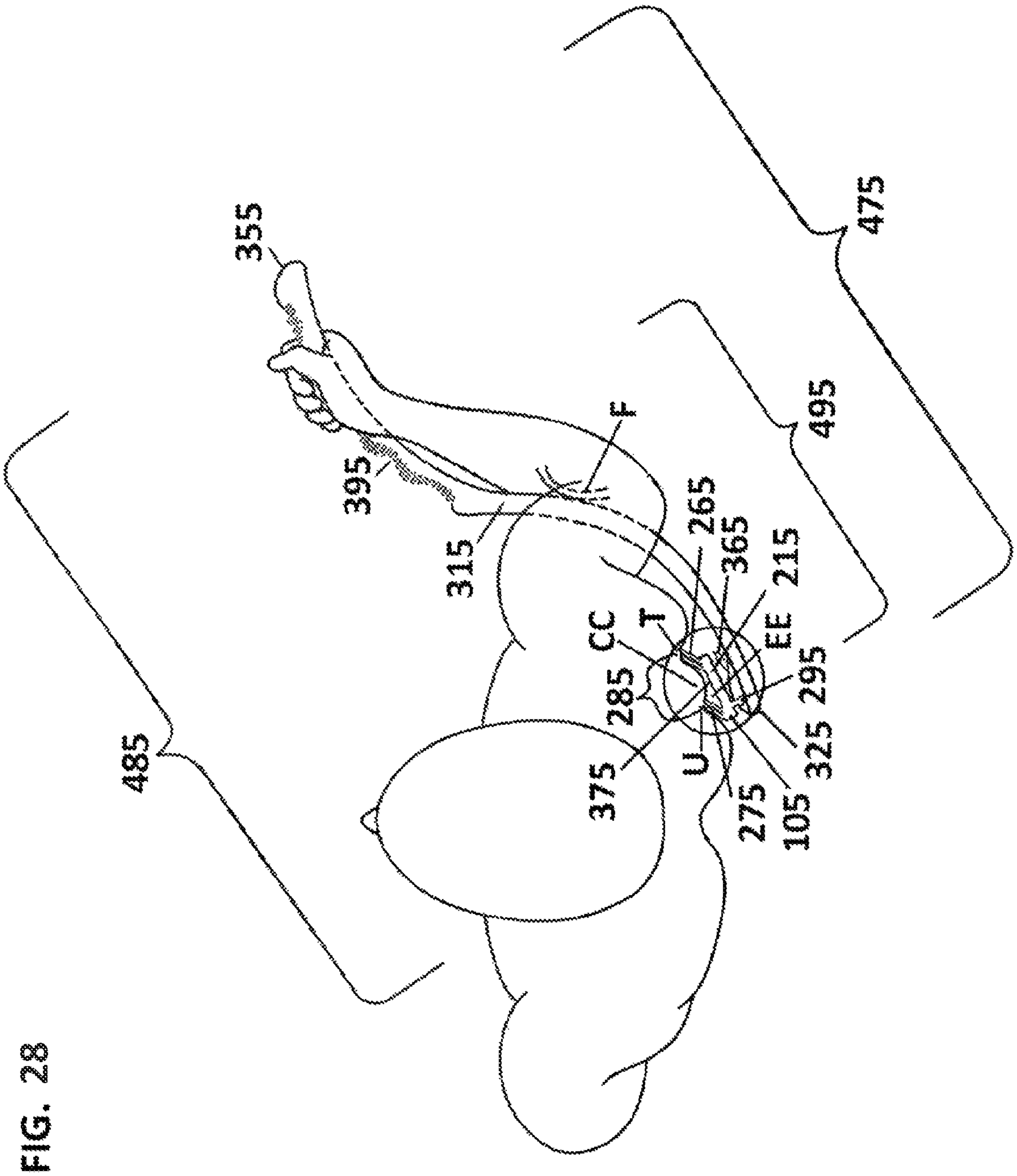

FIGS. 27-28 illustrate aerial views of a two-sided back shaver handle gripped by a user extended under the armpit towards the backside according to embodiments of the present inventions. The elongated handle 315 removably attaching to a safety razor 105 for tactile feedback and, in some embodiments, using leverage feedback, when gripped by a user extended under the armpit towards the backside according to embodiments of the present inventions. A handle attachment 295 on the safety razor 105 is coupled with the long handle 315 gripped by a user extended under the armpit towards the backside. The user feeling within the hand of the user on the grip 395 of the elongated handle 315 a leverage feedback from both the blade group 265 and the support 275 against the backside skin.

A substrate structure 215 is adapted to removably hold at least the blade group 265 and a support 275. In FIGS. 27-28 a substrate structure 215 operatively coupled to the blade end 325 of the elongated back shaver handle 315, wherein the substrate structure 215 is adapted to hold both the blade group 265 and the support 275 on a front surface 375 of the substrate structure 215 with the blade group 265 and the support 275 spaced a tactile leverage feedback distance sufficiently wide enough to provide leverage feedback felt through the elongated back shaver handle 315 for the user to maintain a consistent angle of the sharp blade relative to the skin surface when an arm of the user reaches the elongated back shaver handle 315 to a backside of the user during shaving movement over a shoulder blade peak or a spine depression on the backside. The blade group 265 and the support 275 each extend from the front surface 375 of the substrate structure 215 at least 0.381 centimeters to avoid loose skin of the user touching the front surface 375 of the substrate structure 215 within the distance spaced between the blade group 265 and the substrate structure 215. In FIGS. 27-28 the support 275 comprises another blade group comprising another sharp blade 115 and another guard 135 parallel to another sharp blade 115.

The front surface 375 of the substrate structure 215 further comprises a second groove 675 adapted to removably hold the support 275 inserted therein and configured parallel to the first groove 305 spaced the tactile leverage feedback distance sufficiently wide enough to provide the tactile leverage feedback felt through the elongated back shaver handle 315 for the user to maintain the consistent angle of the sharp blade 115 relative to the skin surface A when an arm of the user reaches the elongated back shaver handle 315 to a backside of the user during shaving movement over a shoulder blade peak or a spine depression on the backside. The substrate structure 215 is adapted with the blade group 265 and the support 275 are also spaced a tactile discrimination distance sufficiently wide enough to achieve tactile feedback tactile feedback felt through on a backside torso region of the skin of the user perceived between the blade group 265 and the support 275. The support 275 comprises at least one blunt protrusion. The blade group 265 and the support 275 are spaced a tactile leverage feedback distance sufficiently wide enough to provide leverage feedback felt through the elongated back shaver handle 315 for the user to maintain a consistent angle of the sharp blade 115 relative to the skin surface when an arm of the user reaches the elongated back shaver handle 315 to the user's backside during shaving movement over a shoulder blade peak or a spine depression.

The safety razor 105 in FIGS. 27-28 having a blade group 265 and a support 275 which in FIGS. 27-28 the support 275 takes the form of an additional blade group. In FIG. 25 the support 275 comprises another blade group 265 comprising another sharp blade 115 having another leading side and another trailing side for shaving the hair and another outer comb 145 next to and parallel to the another leading side of the another sharp blade 115 and another inner guard 135 next to and parallel to the another trailing side of the another sharp blade 115. In FIGS. 27-28 the safety razor 105 attaches to the elongated handle 315. The handle attachment 295 also attaches to the elongated handle 315. The safety razor 105 has the blade group 265 and the support 275 attached on an inner side 485 of the back shaver handle 315 facing against the torso backside of the user. It should be noted that when discussing the torso the breast tissue is not considered part of the torso. The elongated handle 315 has a surface along a length of the elongated handle 315 defining the inner side 485 and an outer side 475 and a blade end 325 and a grip end 355 wherein the outer side 475 opposite the said inner side 485 and the blade end 325 opposite the grip end 355 and the elongated handle 315 having a finger surface grip 395 located on the inner side 485 of the elongated handle 315. The handle attachment 295 is at the blade end 325 of the elongated handle 315. The blade end 325 is located at an end of the elongated handle 315 opposite the grip end 355. The handle attachment 295 is located on the inner side 485 of the elongated handle 315. The handle attachment 295 comprises a handle clip 365 used to lock and release the safety razor 105 for tactile feedback in the elongated handle 315. The handle attachment 295 attaches to the safety razor 105 with at least one blade group 265 and a support 275 protruding away from the safety razor 105 on the inner side 485 of the back shaver handle 315 facing against the torso backside of the user.

A body leverage surface 495 is located on the outer side 475 of the two-sided back shaver handle 315 near a midway between the grip 395 and the blade end 325 and the blade end 325 configured to press the body leverage surface 495 against a user's forearm when the grip 395 is respectively gripped by fingers and hand by a same arm of the user located on the inner side 485 of the back shaver handle 315 a thumb of the hand facing away from the blade end 325 of the s-shaped back shaver handle 315 and the elongated handle 315 is reaching the blade end 325 under an armpit of the same arm of the user to leverage the handle attachment 295 located on the inner side 485 of the elongated handle 315 against a torso backside of the user. It should be noted that when discussing the torso the breast tissue is not considered part of the torso. As seen in FIGS. 27-28 when the grip 395 is respectively gripped by fingers and hand by a same arm of the user the user is illustrated pressing the body leverage surface 495 located on the outer side 475 of the back shaver handle 315 near a midway between the grip 395 and the handle attachment 295 and configured to press the body leverage surface 495 against a user's forearm, in which the fulcrum is referenced as F, in order to leverage the handle attachment 295 located on the inner side 485 of the back shaver handle 315 against a torso backside of the user and leveraging the back shaver handle 315 using the body leverage surface 495 as a fulcrum F relative to the grip 395 to press the blade end 325 towards the torso backside of the user and stroking the blade end 325 against the torso backside of the user.

A portion of the safety razor 105 inside of the blade group 265 and support 275 is removed in order to create tactile discrimination distance 285. A tactile discrimination distance 285 is inside of two supports at about 35 millimeters. The tactile discrimination distance 285 having an elevational gap EE that may be shallow or deep and the distance of the tactile discrimination distance 285 between the blade group 265 and support 275 may vary. The tactile discrimination distance 285 serves multiple purposes. The first purpose of the tactile discrimination distance 285 is chosen to allow a user to find an effective cutting angle between the blade group 265 and skin surface with ease. Also the tactile discrimination distance 285 separates the blade group 265 and the support 275 allowing them to stabilize one another when stroking against the skin surface. The tactile discrimination distance 285 can also create an effective amount of distance between the blade group 265 and the support 275 in order to allow two-point discrimination which will be further discussed and illustrated in the upcoming FIG. 30 and FIGS. 32-33. The tactile discrimination distance 285 also grants space for a skin convex to enter inside of the blade group 265 and the support 275 which is illustrated as skin convex CC in FIG. 8. It can be seen in FIG. 8 that the tactile discrimination distance 285 is allowing skin convex CC to enter and preventing the skin convex CC from pressing against the front surface 375 of the safety razor 105 and interrupting the shaving process.

It can be seen in FIG. 27 a portion of the elongated handle 315 and the safety razor 105 is circled. The upcoming FIG. 29 will offer a close up illustration of the portion circled here in FIG. 27. Furthermore, it can be seen in FIG. 28 a portion of the elongated handle 315 and the safety razor 105 is circled. The upcoming FIG. 30 will offer a close up illustration of the portion circled here in FIG. 28. In FIGS. 27-28 the blade group 265 is pressing into the skin and is creating an indentation into the skin creating skin convex T inside the blade group 265.

It can be seen in FIGS. 27-28 the grip 395 is respectively gripped by fingers and hand by a same arm of the user the user is illustrated pressing the body leverage surface 495 against a user's forearm, in which the fulcrum is referenced as F, in order to leverage the handle attachment 295 located on the inner side 485 of the back shaver handle 315 against a torso backside of the user and leveraging the back shaver handle 315 using the body leverage surface 495 as the fulcrum F relative to the grip 395 to press the blade end 325 which is opposite the grip end 355, towards the torso backside of the user and stroking the blade end 325 against the torso backside of the user. It should be noted that when discussing the torso the breast tissue is not considered part of the torso. One difference when comparing FIG. 28 to FIG. 27 is that in FIG. 28 the support 275, which takes the form of a secondary blade group, is now pressing into the skin and with force is creating a skin convex referred to as U along with the blade group 265 which is creating skin convex T. Since the blade group 265 and support 275 are pressing into the skin a skin convex CC is illustrated inside the blade group 265 and support 275. In FIG. 28 both the blade group 265 and the support 275 are in position and through leverage feedback the user tactically feels leverage feedback through the handle and can feel that the safety razor 105 is at the correct angle according to one leverage feedback embodiment.

FIGS. 27-28 provide one embodiment for illustration of a tactile leverage feedback distance. When the tactile leverage feedback distance is sufficiently wide, leverage feedback felt by the user through the elongated back shaver handle for the user to maintain a consistent angle of the sharp blade relative to the skin surface when an arm of the user reaches the elongated back shaver handle to a backside of the user during shaving movement over a shoulder blade peak or a spine depression on the backside. As seen in FIG. 27 a user presses the blade group 265 into the user's own back. In order for the user to gain effective leverage feedback felt by the user through the elongated back shaver handle, the user must grasp and move the grip end 355 away from the front side of the user. As seen in FIG. 28, in comparison with FIG. 27, the user has moved the grip end 355 further away from the front side of the user and the user has pressed the support 275 into their back side. When the support 275 is pressed into the back side, the user feels this resistance in the handle 315. The resistance is felt in the palm of the user's hand griping the handle as well between the forearm of the user and the inner side 485 of the handle 315. These feelings of resistance permit leverage feedback to communicate to the user that the safety razor 105 is positioned at a correct cutting angle. It is important to have the safety razor 105 at the correct cutting angle since the blade group 265 and support 275 are positioned at a distance and an angle from the front surface 375 of the substrate structure 215.

To achieve the above-described leverage feedback felt through the elongated back shaver handle, the blade group and the support need to be spaced a tactile leverage feedback distance sufficiently wide. (Note as discussed elsewhere, the support can be a one or more blunt protrusions or bump shapes or the support can be one or more another blade groups.) This tactile leverage feedback distance is between the blade group and the support is the distance measured from the forward most leading edge and the reward most trailing edge of the blade group and the support. An example illustration of the tactile leverage feedback distance 286 between the leading edge 195 of a leading blade group 265 and the trailing edge 185 of an adjacent trailing blade group 275 as a support will be illustrated in the upcoming FIGS. 29 and 30. In one embodiment, the tactile leverage feedback distance measured as above described is at least about 1 inch or 25.4 mm separation. Thus the substrate structure in this one embodiment with the elongated handle would be adapted to hold one or more of blade groups and one or more of supports spaced the tactile leverage feedback distance of at least about 25.4 millimeters (or 1 inch equivalent) measured between outermost edges of a pair of outermost blade groups and supports of the substrate structure.

Note that the tactile discrimination distance sufficiently wide enough to achieve two-point discrimination is felt through by a user through the skin of the user, not through the handle to the hand of the user. Because the tactile discrimination distance is felt on the back skin, the tactile discrimination distance should be measured from different ends than the tactile leverage feedback distance. While the tactile leverage feedback distance is measured between the outermost edges of a plurality of blade groups or supports, the tactile discrimination distance is measured between the widest space between the inside edges of a pair of an adjacent blade group and support. This tactile discrimination distance is between an adjacent blade group and support is the distance measured from the trailing edge and the leading edge of the adjacent blade group and support. An example illustration of the tactile discrimination distance 285 between the trailing edge 185 of a leading blade group 265 and the leading edge 195 of an adjacent trailing blade group 275 as a support will be illustrated in the upcoming FIGS. 29 and 30.

The straight line length of the elongated handle 315, the height of the blade group 265 and support 275, and the tactile leverage feedback distance work in relationship with one another. The elongated handle 315 has a straight line length measured directly from the blade end 325 to the grip end 355 of about 330 mm to about 457.2 mm A preferred straight line length of the back shaver handle 315 is about 355.6 mm. This straight line length is measured across in a straight line from end to end, not following the curve of the elongated handle 315. In order to create a leveled back shaver handle 315 with safety razor 105 in an alternate embodiment when the straight line length of the handle 315 is greater than 355.6 mm then the tactile leverage feedback distance 285 becomes greater. In this instance when the straight line length of the handle 315 is greater than 355.6 mm and a user is gripping the handle near the grip end 355, the user will begin to lose leverage feedback which desires the tactile leverage feedback distance 285 to increase in order to maintain effective tactile feedback. Conversely, when the straight line length of the handle 315 is less than 355.6 mm then the tactile discrimination distance 285 may be less and still maintain tactile feedback for the user. Thus when a length of the elongated handle changes, the tactile discrimination distance 285 or tactile leverage feedback distance 286 needs to proportionately change.

To prevent skin from rubbing against or touching the front surface 375 of the substrate structure 215, the height EE of the blade group 265 and support 275 relative to the substrate needs to be considered. The blade group and the support each extend from the front surface of the substrate structure at a height sufficient to avoid loose skin of the user touching the front surface of the substrate structure within the distance spaced between the blade group and the substrate structure. The tactile discrimination distance 285 or tactile leverage feedback distance 286 also comes into play here. When the tactile discrimination distance 285 or tactile leverage feedback distance 286 changes, the height the blade group and the support each extend from the front surface of the substrate structure needs to proportionately change. When the tactile discrimination distance 285 or tactile leverage feedback distance 286 increases, the height also needs to increase. Conversely, when the tactile discrimination distance 285 or tactile leverage feedback distance 286 is less, the height EE may also be less. In one embodiment, for a flat substrate structure, the height X or elevation EE from tips of each of the blade group and the support to the front surface of the substrate structure is at least 0.381 centimeters.

Figure 32:
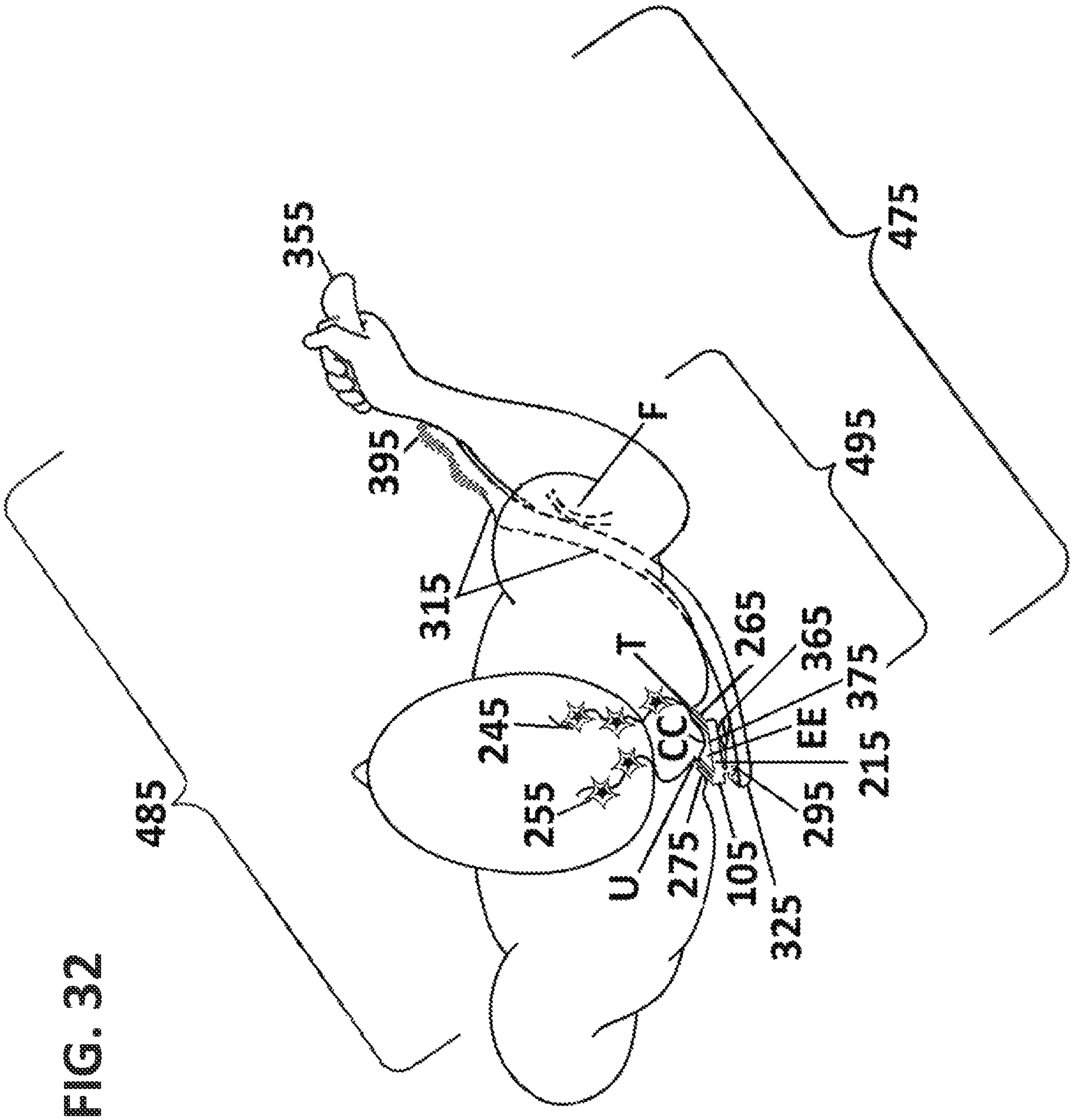
FIGS. 32-33 illustrate aerial views of handles gripped by a user extended under the armpit towards the backside with two safety blades indenting into the skin surface and triggering a sensory system according to embodiments of the present inventions.
Figure 33:
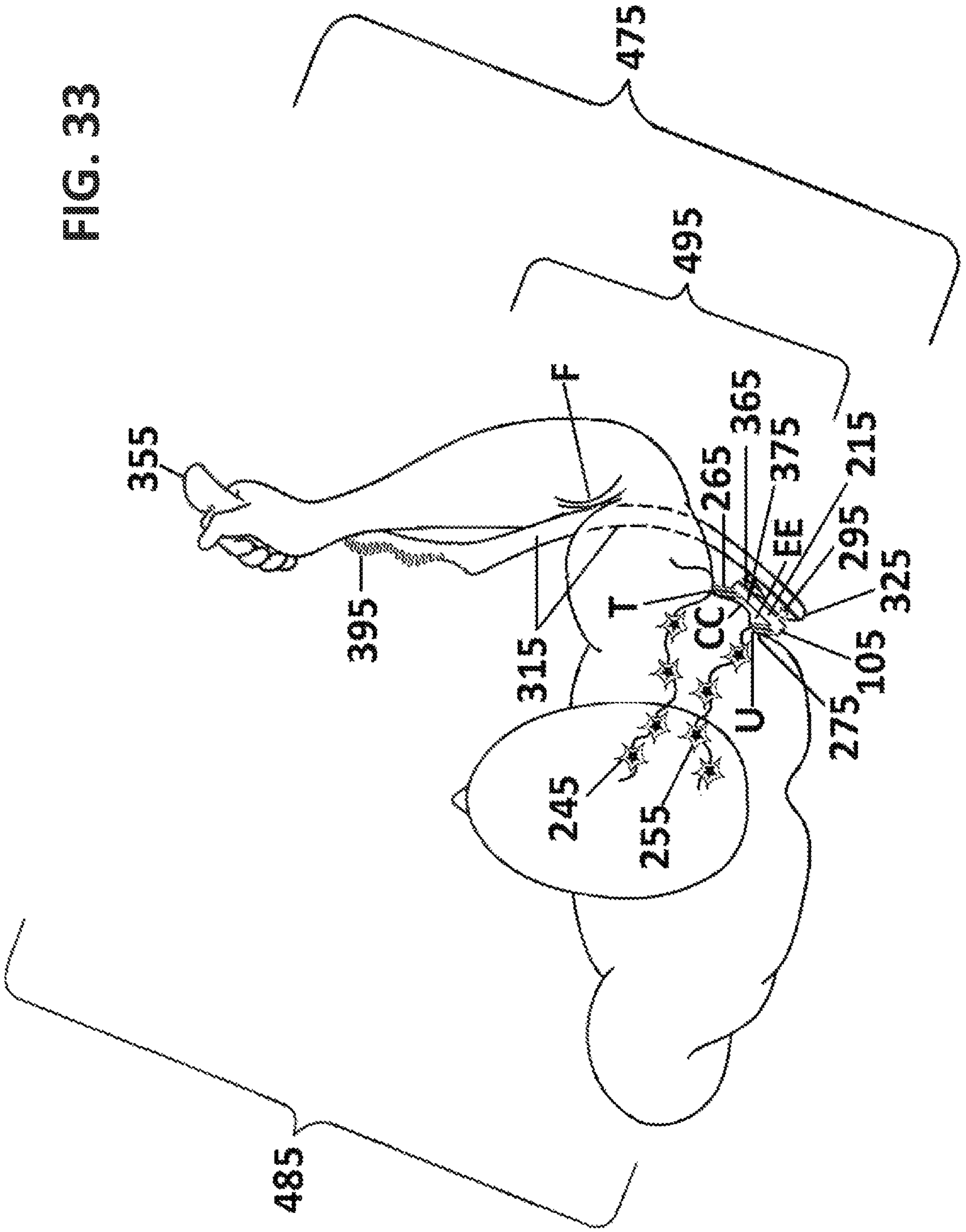

In other embodiments, as described in the upcoming FIGS. 32-33, the substrate structure 215 is adapted with the blade group 265 and the support 275 also spaced a tactile discrimination distance 285 sufficiently wide enough to achieve two-point discrimination tactile feedback felt through on a backside torso region of the skin of the user perceived between the blade group 265 and the support 275.

The two-point discrimination study offers an understanding on how the components found within the sensory system may be utilized to establish effective communication through the sensory system without having to actually view the location where the senses are being activated, or in my invention, when the blade group 265 and support 275 are safely poking or gouging the skin on the backside or body. The two-point discrimination illustrates the ability to discern that two or more nearby objects gouging or poking the skin are truly multiple distinct points set apart from each other and allowing a user to understand the location of each point. It is often tested with points creating sufficient indents into the skin, as illustrated in my invention, in order to assure the communication is effective.

In research and clinical studies, two-point discrimination is a technique for determining tactile agnosia. According to Sir Sidney Weintein, who tested Weber's observations published in year 1834, he agreed with the theory that there is a lack of uniformity of tactile sensitivity found throughout different parts of the body skin. In 1965 Sidney Weinstein decided to test the two-point discrimination theory to determine what areas of the body were more sensitive than others. In fact, he concluded the areas of the body such as the face, lips or fingers require less distance between the two points or indents in order to distinguish the two points. During the testing, he found the skin surface located on the back required much more distance between each point in order for the participant to differentiate the two points. However, the exact distance can be influenced based on whether or not the individual the individual has hair on their back. In hairy skin, Merkel nerve endings are clustered into specialized epithelial structures called "touch domes" or "hair disks". An individual with hair grown in on their backside have additive sensitivity to pressure or skin indentations with the presence of Merkel nerve endings. Merkel nerve endings are found in the basal layer of glabrous and hairy skin and in hair follicles as well. They provide information on pressure and deep touch which in my invention are provided by a blunt tip of the blade group 265 and a blunt tip of the support 275.

Seven non-patent literature publications have been located that explain tactile discrimination including that between two points at different distances and locations on human skin surfaces. These were:

Gemperle, F.; Hirsch, T.; Goode, A.; Pearce, J.; Siewiorek, D.; Smailigic, A. Wearable Vibro-Tactile Display. Carnegie Mellon Wearable Group, Carnegie Mellon University, 2003.

Sherrick, C. E.; Cholewiak, R. W.; Collins, A. A. The Localization of Low- and High-Frequency Vibrotactile Stimuli. Journal of the Acoustical Society of America 1990, 88 (1), 169-179.

Verrillo, R. T. Vibrotactile Thresholds for Hairy Skin. Journal of Experimental Psychology 1966, 72 (1), 47-50.

Zhu, B; Skin-Inspired Haptic Memory Arrays with an Electrically Reconfigurable Architecture; 2015.

Shih; Dubrowski; Carnahan; Evidence for Haptic Memory; 2009.

van Erp, J. B. F. Tactile displays for navigation and orientation: perception and behavior (pp. 26-27), Soesterberg, The Netherlands: TNO Human Factors, 2007.

Myles; Binseel; The Tactile Modality: A Review of Tactile Sensitivity and Human Tactile Interfaces; ARL-TR-4115 report; 2007.

An eighth publication by Weinstein was unable to be located, yet much of its contents were cited within this publication by Miles and Binseel. Also additional publications were not obtained, yet mentioned and cited within this publication by Myles and Binseel. The citations for Weinstein and the additional other publications in the References listed by Miles and Binseel were:

Weinstein, S. Intensive and Extensive Aspects of Tactile Sensitivity as a Function of Body Part, Sex, and Laterality. In D. R. Kenshalo (Ed.), The Skin Senses (pp. 195-222). Springfield, IL: Charles C. Thomas, 1968.

Weber, E. H. The Sense of Touch (De Tactu. H. E. Ross and Der Tastsinn, D. J. Murray, Trans.): New York: Academic Press, 1978 (original works published in 1834).

Sherrick, C. E.; Cholewiak, R. W. Cutaneous Sensitivity. In K. Boff, L. Kaufman, & J. L. Thomas (Eds.), Handbook of Perception and Human Performance, pp. 12-1-12-58. New York: Wiley, 1986.

Kandel, E. R.; Jessell, T. M. Touch. In E. R. Kandel, J. H. Schwartz, T. M. Jessell (Eds.), Principles of Neural Science, 3rd ed. (pp. 349-414). New York: Oxford University Press, 1991.

van Erp, J. B. F.; van den Dobbelsteen, J. J. On the Design of Tactile Displays; TNO-report TM-98-B012; Soesterberg, The Netherlands: TNO Human Factors Research Institute, 1998.

The below data reproduced in Table 1 is read from the 2007 publication by Kimberly Myles and Mary S. Binseel of the Army Research Laboratory entitled "The Tactile Modality: A Review of Tactile Sensitivity and Human Tactile Interfaces" which cited Weinstein. The graph associated in the upcoming FIG. 61 of the instant patent disclosure is also taken from this same publication. The below numbers are approximations read from the graph associated since the graph did not have hard numbers associated with each measurement. The tactile distance between pressure points for two-point discrimination is summarized in Table 1:

TABLE 1

| Body Part | Skin Tactile Distance in millimeters (mm) |
|---|---|
| toe | 10 |
| foot | 21 |
| leg | 47 |
| thigh | 44 |
| belly | 35 |
| back | 39 |
| breast | 32 |
| upper lip | 5 |
| cheek | 7 |
| nose | 8 |
| forehead | 15 |
| forearm | 38 |
| shoulder | 38 |
| upper arm | 46 |
| palm | 11 |
| finger | 1 |

Figure 61:
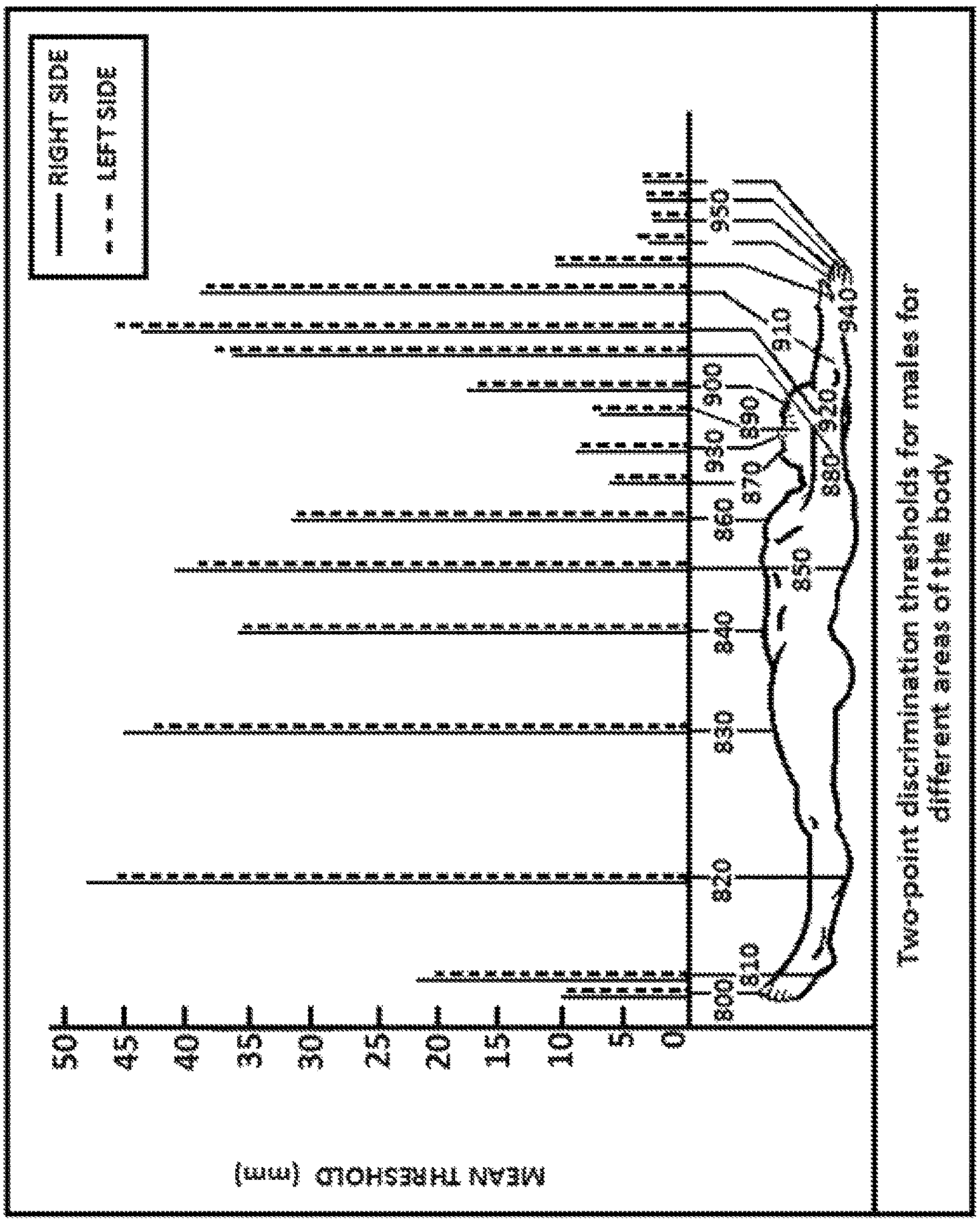
FIG. 61 illustrates the many level of distances to create two-point discrimination on the human male body locations in which these distances are performed in order for effective two-point discrimination communication.

A graphical representation of the data represented in Table 1 will be provided in FIG. 61.

Letter designations in the drawings depict certain planes, gap distances and contours, defined throughout, and for convenience are summarily defined wherein:

"F" references a fulcrum when the inside of a user's forearm presses against a body leverage surface 495 relative to a grip 395 of an elongated handle 315 and pressing the blade end 325 of an elongated handle 315 towards the torso backside of the user;

"T" references a skin convex inside a blade group 265;

"U" references a skin convex inside a support 275 taking form of a blade group; and "CC" references a skin convex inside a blade group 265 and a support 275.

Figure 29:
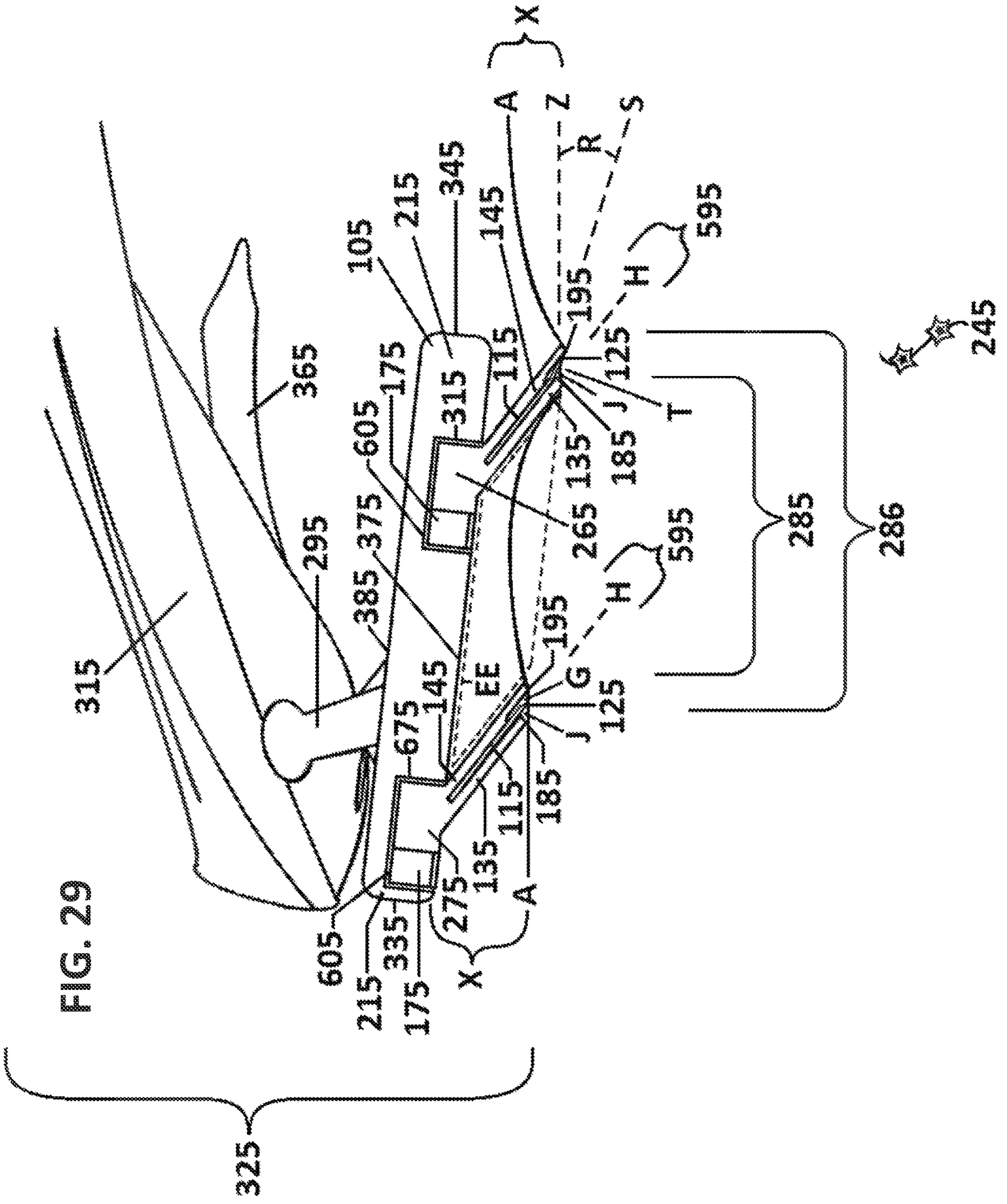
FIG. 29 illustrates a side view of a safety razor of the circled area of prior FIG. 7 according to embodiments of the present inventions.

FIG. 29 illustrates a close up side view of the elongated handle and the safety razor 105 for two-point discrimination previously circled in the prior illustration in FIG. 27 and the safety razor 105 removably attaching to the elongated handle 315. The elongated handle 315 having the handle clip 365 allowing a user to press in order to allow the safety razor 105 to removably attach or detach from the elongated handle 315. The safety razor 105 having the blade group 265 and support 275 according to embodiments of the present inventions. A substrate structure 215 adapted to hold both the blade group 265 and the support 275 the on a front surface 375 of the substrate structure 215 with the blade group 265 and the support 275 spaced a tactile discrimination distance 285 sufficiently wide enough to achieve two-point discrimination tactile feedback felt through a torso region of the skin of the user perceived between the blade group 265 and the support 275 and wherein the substrate structure 215 is adapted such that no elements within the tactile distance produce a tactile sensation on the skin surface A. The support 275 comprises another blade group comprising another sharp blade 115 and another guard 135 parallel to the another sharp blade 115. In FIG. 29 the support 275 takes the form a blade group and each blade group comprising a sharp blade 115 with a sharp edge 125 and an inner guard 135 parallel to the sharp blade 115 on a trailing side of the sharp blade 115 opposite an outer comb 145 having an inside edge 195 wherein the outer comb 145 parallel to the sharp blade 115 on a leading side of the sharp blade 115 and a substrate structure 215 adapted to hold the blade group 265 and the support 275 on a front surface 375 of the substrate structure 215 with the blade group 265 and support 275 spaced a distance sufficient to achieve two-point discrimination on the skin of a user between the blade group 265 and support 275. The front surface 375 of the substrate structure 215 opposite a rear surface 385. Inner guard 135 having an outer edge 185 and a trailing opening J inside of the outer edge 185 and the sharp edge 125 of the sharp blade 115. Though the blade group 265, in FIG. 29, is pressing into the skin surface A the support 275 is not pressing into the skin surface A and thus, the leading opening G inside of the inside edge 195 and the sharp edge 125 is still present. Depending on how flexible the sharp blade 115 is allowed the leading opening G is able to remain present or may no longer be present when the sharp blade 115 moves closer to the inside of the outer comb 145. Blade group 265 is safely poking the skin surface A and creating a skin convex inside of an outer edge 185 and an inside edge 195 which is referenced as skin convex T. Skin convex T will be even more clearly illustrated in the close up view in the upcoming illustration in FIG. 31.

The safety razor 105 for two point discrimination having the front surface 375, the rear surface 385, a top side 335, a bottom side 345 wherein the top side 335 is opposite the bottom side 345 and the top side 335 is close to the blade end 325 of the elongated handle 315. The substrate structure 215 adapted to hold the blade group 265 and the support 275 on the front surface 375 of the substrate structure 215 with the blade group 265 and the support 275 spaced a distance sufficient to achieve two-point discrimination on the skin of a user between the blade group 265 and support 275 and said support 275 and blade group 265 extend from the front surface 375 of the substrate structure 215 and having a height X which is the height inside of the tips of both the blade group 265 and the support 275 to the front surface 375 of the substrate structure 215. Height X is about 3.81 millimeters or more. Height X is sufficient to avoid loose skin of the user touching and rubbing the front surface 375 of the substrate structure 215 which would interfere with a shaving stroke. Both the blade group 265 and the support 275 having a bottom side 605 and a top side 595 wherein the bottom side 605 is opposite the top side 595. In a preferred embodiment height X is about 3.81 millimeters or more and wherein the substrate structure 215 holds the blade group 265 and the support 275 spaced a distance between about 35 millimeters. A midpoint H may be between about 0-75 degrees in relation to the front surface 375 of the substrate structure 215. A preferred angle of the tip of the blade group 265 or the top side 595 of a blade group 265 in relation to the front surface 375 of the substrate structure 215 is about 20 degrees. In FIG. 29 the safety razor 105 for two-point discrimination is shown prior to gouging and indenting into the skin surface A while the opposite side view of this embodiment being identical according to a first embodiment of the present inventions.

The front surface 375 of the substrate structure 215 comprising one or more grooves parallel from each other and adapted to removably hold the blade group 265 and support 275. In FIG. 29 a first groove 305 and secondary groove 675 are illustrated. First groove 305 is removably holding blade group 265 while the secondary grove 675 is removably holding the support 275. The first groove 305 and secondary groove 675 allow a user an option to choose a distance between the blade group 265 and the support 275. The safety razor 105 also having a rear surface 385 comprising a handle attachment 295 which is removably attaching to the elongated handle 315. It is preferred that the substrate structure 215 removably adapts at least one blade group 265 at an angle of about 0-75 degrees in relation to the front surface 375 of said substrate structure 215. The blade group 265 in my invention is capable of successfully stroking skin and shaving hair when the midpoint H of a non-flexing portion of the sharp blade 115 is at about 75 degrees or less in relation to the front surface 375 of said substrate structure 215.

The support 275 may take the form of a blade group or an alternative embodiment having a least one blunt protrusion sufficient for safely poking into the skin surface A. The support 275 may comprises more than one blunt protrusion wherein each blunt protrusion may be at staggered locations.

A tactile discrimination distance 285 is a gap spaced inside of the blade group 265 and the support 275 and is about 35 millimeters or larger for the torso. The back side human skin surface is among the least sensitive portions of the human body and needs a longer tactile discrimination distance 285 of about 39 millimeters. These 35 millimeter and 39 millimeter tactile discrimination distances are derived from the data cited in Myles and Binseel, 2007 referencing Weinstein, 1968. The tactile discrimination distance 285 may have an elevational gap EE which may be a deep or shallow gap inside of the tips of the blade group 265 and the support 275 and the front surface 375. The tactile discrimination distance 285 between a least the blade group 265 and the support 275 may vary. The tactile discrimination distance 285 allows balance and stability of the substrate structure 215 and safety razor 105 when stroking against the skin surface A. Tactile discrimination distance 285 also grants space for a tightened skin to convex and enter inside of the tactile discrimination distance 285 without rubbing against the front surface of substrate structure while allowing a user to maintain an effective angle between the blade group 265 and a skin surface without difficulty. In order for the safety razor 105 to hover over hills and valleys which may be found on the torso or back side of a user it is useful to have an elevational gap EE. In FIG. 29 the elevational gap EE is allowing room for the skin to move inside and begin to convex without touching or rubbing against the front surface of substrate structure. It will be illustrated in the upcoming FIG. 10 the skin convex taking full shape inside the elevational gap EE. The elevational gap EE allows the skin to tighten inside of the blade group 265 and support 275 creating a stabilized substrate structure 215. The tactile discrimination distance 285 also creates an effective amount of distance between the blade group 265 and the support 275 in order to allow two-point discrimination to occur which will be further described in the upcoming FIGS. 32-33. The tactile discrimination distance 285 is inside of the blade group 265 and support 275 and the elevational gap EE is illustrated with dashed lines inside the support 275 and blade group 265.

In FIG. 29 the safety razor 105 for two-point discrimination is illustrated attaching the blade group 265 and a support 275, which in FIG. 29 takes the shape of a blade group. In FIG. 29 the blade group 265 is poking and indenting into a skin surface A while the opposite side view of this embodiment being identical according to a first embodiment of the present inventions. This illustration in FIG. 29 shows the blade group 265 creating the first point of the two points in two-point discrimination represented by an initial sensory point signal 245. Initial sensory point signal 245 is a sensory in the human sensory system that is being triggered by the blunt tip of the blade group 265 poking the skin surface A and letting a user understand the location of the blade group 265. The blade group 265 in my invention functions properly and is highly dependent on safely poking into the skin surface A in order to create indentations that allow a skin convex to form inside of the inner guard 135 and outer comb 145. It can be seen in FIG. 29 the sharp blade 115 belonging to the blade group 265 is now flexing. The sharp blade 115 may flex very little or may be very flexible depending on the location of the base in relation to the sharp edge 125 of the sharp blade 115. The base was previously illustrated as base 205 in the prior FIG. 26. The angle of a top side 595 of the blade group 265 or the midpoint H in relation to the front surface 375 of a substrate structure 215 area is about between 0-75 degrees. A preferred angle of a tip or the top side 595 of the blade group 265 in relation to the front surface 375 of the substrate structure 215 is 20 degrees. The midpoint S references the flexing midpoint of the sharp blade 115 belonging to the blade group 265 or the support 275 when support 275 takes the form of a blade group. Midpoint H and midpoint S are both illustrated to show the difference between when a portion of the sharp blade 115 is flexing and what it is not flexing. A cutting surface inside of the inner guard 135 and the outer comb 145 is referenced as a convex surface Z. The angle between a midpoint S in relation to the angle of the convex surface Z is referenced as angle R. Convex surface Z is illustrated with a dashed line extending out from the skin convex T in order to illustrate the angle representation. Angle R is about 35 degrees or less. A suppleness distance is measured between the inside edge 195 of the outer comb 145 and the outer edge 185 of the inner guard 135 of the blade group 265. The suppleness distance is narrower than tactile discrimination distance 285 spaced between the blade group 265 and support 275, which said support 275 is a blade group in FIG. 29. There is a relationship between the tactile discrimination distance 285 and the distance of height X as presented herein. It is helpful to prevent the front surface 375 of the substrate structure 215 from rubbing against the skin surface A during a shaving stroke. That being said, the greater the tactile discrimination distance 285 the greater the dimension of height X. Just the same, when the lesser the tactile discrimination distance 285 the lesser the dimension of height X.

Letter designations in the drawings depict certain planes, gap distances and contours, defined throughout, and for convenience are summarily defined wherein:

"S" references a midpoint portion of a flexing sharp blade;

"Z" references a convex cutting surface; and

"R" references an angle between midpoint S and cutting surface Z.

Figure 30:
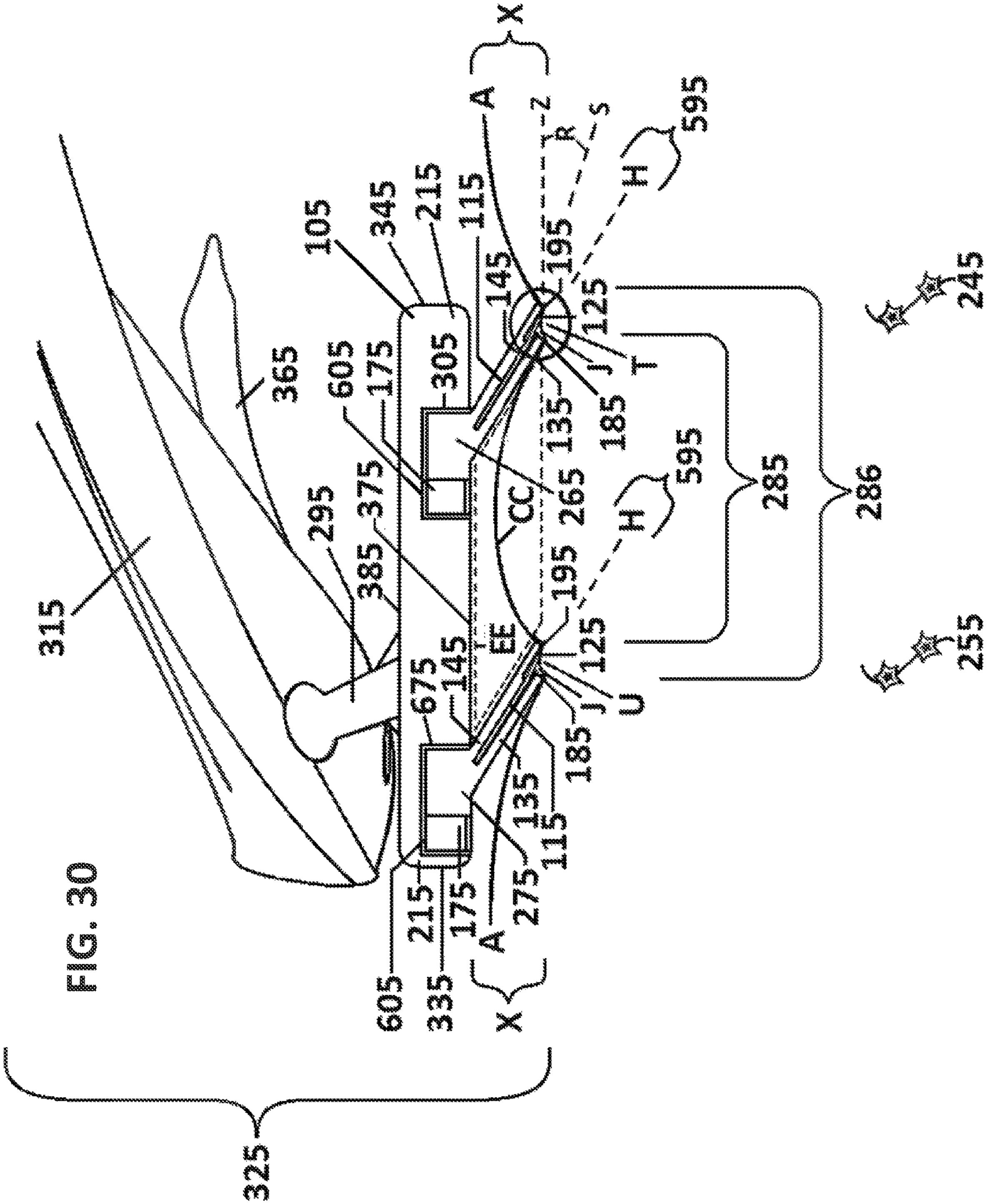
FIG. 30 illustrates a close up side view of a safety razor of the circled area of prior FIG. 8 according to embodiments of the present inventions.

FIG. 30 illustrates a close up side view of the elongated handle 315 and the safety razor 105 for two-point discrimination previously circled in the prior illustration in FIG. 28 and removably attaching to an elongated handle 315. The elongated handle 315 having a handle clip 365 allowing a user to press in order to allow the safety razor 105 to removably attach or detach from the elongated handle 315. The safety razor 105 having a blade group 265 and a support 275 according to embodiments of the present inventions. A substrate structure 215 adapted to hold both the blade group 265 and the support 275 the on a front surface 375 of the substrate structure 215 with the blade group 265 and the support 275 spaced a tactile discrimination distance 285 sufficiently wide enough to achieve two-point discrimination tactile feedback felt through a torso region of the skin of the user perceived between the blade group 265 and the support 275 and wherein the substrate structure 215 is adapted such that no elements within the tactile distance produce a tactile sensation on the skin surface A. Another reason why the skin convex CC should not touch or rub the front surface 375 of the substrate structure 215, as illustrated in the one embodiment of FIG. 30, is to avoid creating a tactile sensation on the skin and disrupting tactile discrimination, either or both two-point discrimination and tactile leverage feedback. It should be noted that when discussing the torso the breast tissue is not considered part of the torso. The support 275 in FIG. 30 takes the form a blade group and both support 275 and the blade group 265 comprising a sharp blade 115 with a sharp edge 125 and an inner guard 135 parallel to the sharp blade 115 on a trailing side of the sharp blade 115 opposite the outer comb 145 wherein the outer comb 145 parallel to the sharp blade 115 on a leading side of the sharp blade 115. A suppleness distance is measured between the inside edge 195 of the outer comb 145 and the outer edge 185 of the inner guard 135 of the blade group 265. The suppleness distance is narrower than tactile discrimination distance 285 spaced between the blade group 265 and support 275, which said support 275 is a blade group in FIG. 30.

A substrate structure 215 adapted to hold the blade group 265 and the support 275 on the front surface 375 of the substrate structure 215 opposite the rear surface 385 with the blade group 265 and support 275 spaced with a tactile discrimination distance 285 distance sufficient to achieve two-point discrimination on the skin of a user between the blade group 265 and support 275. Inner guard 135 having an outer edge 185 and a trailing opening J inside of the outer edge 185 and the sharp edge 125 of the sharp blade 115. Outer comb 145 having an inside edge 195. In FIG. 30 a support 275 comprises another blade group comprising another sharp blade 115 and another guard 135 parallel to the another sharp blade 115.

In FIG. 30 the blade group 265 and support 275 are both safely poking a skin surface A and the blade group 265 is creating a skin convex T inside of the outer edge 185 and the inside edge 195. The skin convex inside a blade group 265 is referenced as skin convex T while the skin convex inside the support 275, which in FIG. 30 takes the form of a blade group, is referenced as skin convex U. The safety razor 105 having a top side 335 and a bottom side 345 wherein the top side 335 is opposite the bottom side 345. The top side 335 of the safety razor 105 is on the blade end 325 of the elongated handle 315. The blade group 265 and the support 275 also having a top side 595 and a bottom side 605 wherein the top side 595 is opposite the bottom side 605.

The front surface 375 of the substrate structure 215 comprising one or more grooves parallel from each other and adapted to removably hold at least one or more blade group 265 and support 275. In FIG. 30 a first groove 305 and a secondary groove 675 are illustrated. The first groove 305 is removably holding blade group 265 while the secondary grove 675 is removably holding the support 275. It is preferred that a substrate structure 215 adapts the blade group 265 at an angle of about 75 degrees or less in relation to the front surface 375 of said substrate structure 215.

Grooves allow a user an option to choose a distance between the blade group 265 and support 275. The substrate structure 215 also having a rear surface 385 comprising a handle attachment 295 for removably attaching to the elongated handle 315. Handle attachment 295 may also take the form of an alternative method of attaching the safety razor

105 for tactile feedback. For example, instead of the handle attachment 295 being a protrusion that protrudes from the rear surface 385 in another embodiment a handle attachment 295 may be embodied as a female slot that interlocks with the long handle 315. Other alternative embodiments may exist as well in order to attach the safety razor 105 with the elongated handle 315.

The support 275, as seen here in FIG. 30 may take the form of a blade group or in an alternative embodiment having a least one blunt protrusion sufficient for safely poking into a skin surface. The support 275 may comprises more than one blunt protrusion but instead may have multiple blunt protrusions that are at staggered locations. A clip 175 attaching a blade group 265 and attaching a support 275 to a substrate structure 215.

A tactile leverage feedback distance 286 is between the blade group and the support is the distance measured from the forward most leading edge and the reward most trailing edge of the blade group and the support. An example illustration of the tactile leverage feedback distance 286 between the leading edge 195 of a leading blade group 265 and the trailing edge 185 of an adjacent trailing blade group 275 as a support will be illustrated in the upcoming FIGS. 29 and 30.

A tactile discrimination distance 285 is between an adjacent blade group and support is the distance measured from the trailing edge and the leading edge of the adjacent blade group and support. An example illustration of the tactile discrimination distance 285 between the trailing edge 185 of a leading blade group 265 and the leading edge 195 of an adjacent trailing blade group 275 as a support will be illustrated in the upcoming FIGS. 29 and 30. The tactile discrimination distance 285 is a gap spaced inside of two supports and is about 35 millimeters. The tactile discrimination distance 285 may be a two-point discrimination distance as in FIG. 30. The tactile discrimination distance 285 may have an elevational gap EE which may be a deep or shallow gap inside of the tips of the blade group 265 and the support 275 and the front surface 375. The tactile discrimination distance 285 between a least the blade group 265 and the support 275 may vary. The tactile discrimination distance 285 allows balance and stability of the substrate structure 215 and safety razor 105 when stroking against the skin surface A. Tactile discrimination distance 285 also grants space for a tightened skin to convex and enter inside of the tactile discrimination distance 285 without rubbing against the front surface 375 of substrate structure 215 while allowing a user to maintain an effective angle between the blade group 265 and a skin surface without difficulty. The tactile discrimination distance 285 also creates an effective amount of distance between the blade group 265 and the support 275 in order to allow tactile feedback to occur which will be further described in the upcoming FIGS. 32-33. The tactile discrimination distance 285 is inside of blade group 265 and support 275 and the elevational gap EE is illustrated with dashed lines inside the support 275 and blade group 265.

In order for the safety razor 105 to hover over hills and valleys which may be found on the torso or back side of a user it is useful to have a height or elevational gap EE. The blade group and the support each extend from the front surface of the substrate structure at a height sufficient to avoid loose skin of the user touching the front surface of the substrate structure within the distance spaced between the blade group and the substrate structure. An adequate height or elevational gap EE prevents skin from rubbing against or touching the front surface 375 of the substrate structure 215. In FIG. 30 the elevational gap EE allows room for the skin convex CC to completely enter inside the elevational gap EE. In FIG. 30 the skin convex CC is taking full shape inside the elevational gap EE and the skin convex CC is not touching the front surface 375 of the substrate structure 215. If the skin convex CC was rubbing against the front surface 375 of the substrate structure 215 then the skin convex CC would not tighten and would not allow the substrate structure 215 to stabilize itself. Furthermore, if the skin surface is rubbing against the front surface 375 of the substrate structure 215 the skin would interfere with the shaving stroke when shaving over hills or valleys.

The height from tips of each of the blade group 265 and the support 275 to the front surface 375 of a substrate structure 215 is referenced as height X and is about 3.81 millimeters or more to avoid the loose skin of the user touching the front surface 375 of the substrate structure 215.

In FIG. 30 the blade group 265 and the support 275 are both poking and indenting into the skin surface A while the opposite side view of this embodiment being identical according to a first embodiment of the present inventions. This illustration in FIG. 30 shows both of the two points being made to carry out two-point discrimination and the user may now understand the location of both the blade group 265 and the support 275. The blade group 265 in my invention functions properly and is highly dependent on safely poking into the skin surface A in order to create indentations that allow a skin convex to form inside of inner guard 135 and outer comb 145. It can be seen in FIG. 30 the sharp blade 115 belonging to the support 275 is now flexing along with the sharp blade 115 belonging to the blade group 265. The preferred angle of the top side 595 of the blade group 265 in relation to the front surface 375 of the substrate structure 215 area is about between 0-75 degrees. A preferred angle of a tip or the top side 595 of the blade group 265 in relation to the front surface 375 of the substrate structure 215 is 20 degrees. The midpoint S references the flexing midpoint of sharp blade 115 belonging to blade group 265 or a support 275 taking the form of a blade group. Midpoint H and midpoint S are both illustrated to show the difference between when the sharp blade 115 is not flexing and when it is flexing with midpoint S. A cutting surface inside of the inner guard 135 and the outer comb 145 belonging to the support 275 and the blade group 265 is referenced as a convex surface Z. The angle between a midpoint S and the convex surface Z is referenced as angle R. Convex surface Z is illustrated with a dashed line extending out from the skin convex T in order to illustrate the angle representation. Angle R is about 35 degrees or less. Midpoint H may be at about 0-75 degrees in relation to the front surface 375. It is easy for a user to accomplish a shave with such a wide range of angles when stroking the safety razor 105 to shave. Since shaving your backside or other areas of the body that are hard to see can be difficult to get a good shaving angle this is a very helpful feature.

In FIG. 30 the tactile discrimination distance 285 is inside of sensory point signal 245 and a secondary sensory point signal 255. Sensory point signal 245 represents the initial sensory point signal 245 and secondary sensory point signal 255 represents the secondary sensory point signal 255 being triggered through the sensory system and communicating to a user's brain the location of the sensory point signal 245 and the location of the secondary sensory point signal 255 with regards to the 2-point discrimination. It is illustrated with a stream of star shapes representing the triggered signal. Furthermore, it can be seen in FIG. 30 that the skin surface plane A is now forming inside of the tactile discrimination distance 285 and there is now a skin convex CC that has formed inside the tactile discrimination distance 285. The tactile discrimination distance 285 is the tactile distance or the distance. It can be seen that the blade group 265 extending from the front surface 375 of the substrate structure 215 at a height X sufficient to avoid the loose skin of skin convex CC from touching and rubbing the front surface 375 which would interfere with a shaving stroke. It should be noted that a portion of the blade group 265 is circled. The area circled will be illustrated as a close up view in the upcoming FIG. 31. There is a relationship between the tactile discrimination distance 285 and the distance of height X as presented herein. It is helpful to prevent the front surface 375 of the substrate structure 215 from rubbing against the skin surface A during a shaving stroke. That being said, the greater the tactile discrimination distance 285 the greater the dimension of height X. Just the same, when the lesser the tactile discrimination distance 285 the lesser the dimension of height X.

Letter designations in the drawings depict certain planes, gap distances and contours, defined throughout, and for convenience are summarily defined wherein:

"CC" references a convex skin surface contour A engaged in a convex contour inside a blade group 265 and a support 275.

Figure 31:
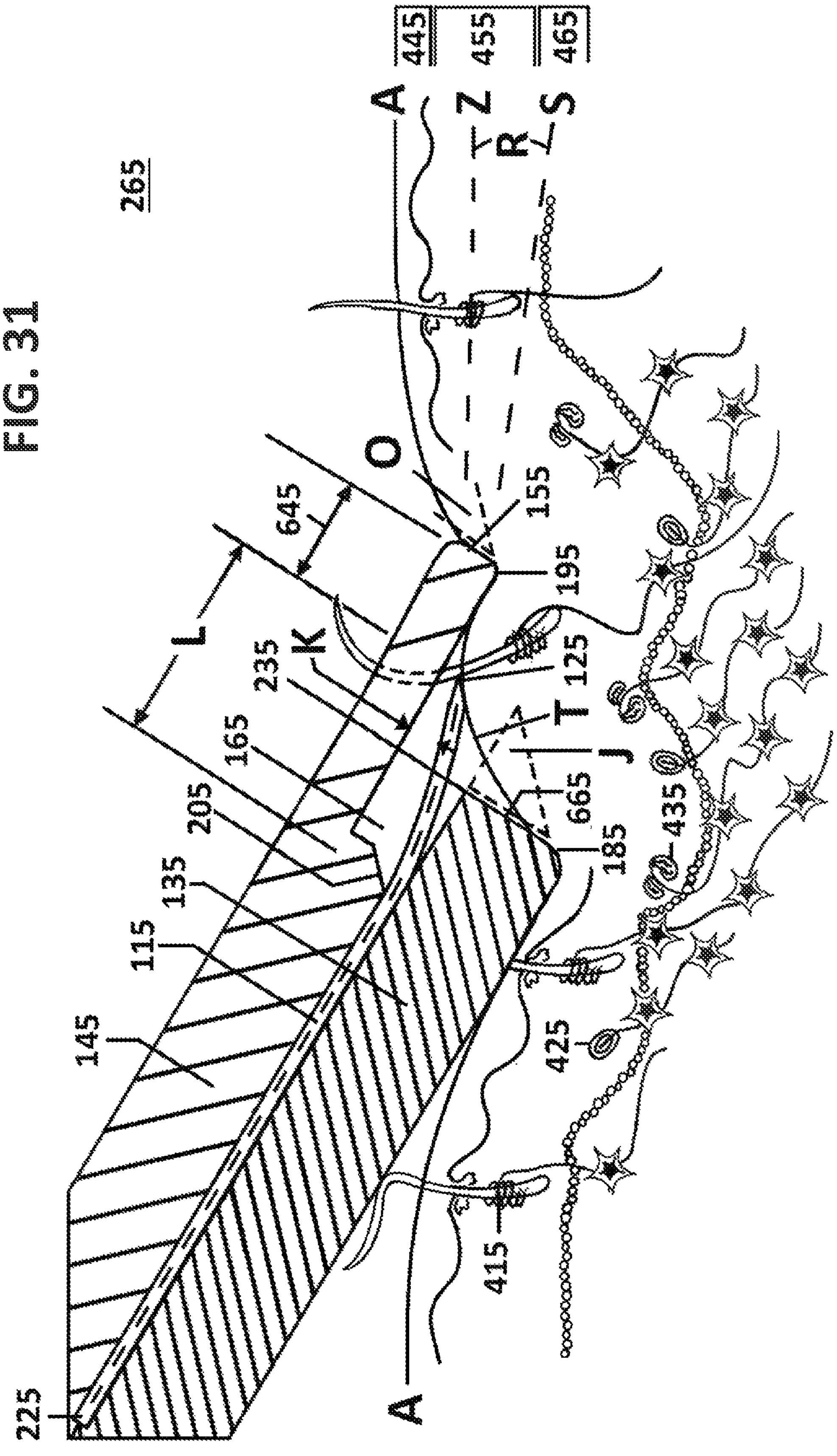
FIG. 31 illustrates a close up cross-sectional view of a blade group of the circled area of prior FIG. 10 according to embodiments of the present inventions.

FIG. 31 illustrates a close up cross-sectional view of a portion of a blade group 265 circled in the prior FIG. 30 according to embodiments of the present inventions. The blade group 265 comprising at least a sharp blade 115 comprising a sharp edge 125 facing towards a skin surface A and an outer comb 145 having an inside edge 195, an outer wall 155 of outer comb 145, an outer comb inside wall 645 and an inner guard 135 comprising an inner guard outer edge 185 and an inner guard inside end 235. Inner guard inside end 235 is embodied where the inner guard 135 and the sharp blade 115 meet. An inside portion of the outer comb 145 removed in order to create a deep void 165. The sharp blade 115 is fixedly anchored on a sharp blade end 225 opposite the sharp edge 125. A deep void 165 having a thickness which is represented as K allowing a level of control over the flexibility of the sharp blade 115 as well as over-exposure of the sharp blade 115 in relation to the skin surface A. Thickness K of deep void 165 is about 0.381 millimeters or less. In a preferred embodiment distance K is about 0.381 millimeters. Thickness K may run thicker but the danger of cutting becomes increasingly probable. It should be understood that the outer comb inside wall 645 is measured inside of the inside edge 195 and the sharp edge 125 of the sharp blade 115 and said outer comb inside wall 645 creates a barrier for the skin surface convex T. The deep void 165 is spaced intermediately of the outer comb 145 and the sharp blade 115. The level of distance of the deep void 165 between a base 205 and the sharp edge 125 of the sharp blade 115 is referenced as L. The distance of L is about 4.572 millimeters or less. A preferred distance of L is about 2.032 Although L may be less or greater than the preferred distance if the distance becomes much less than 2.032 then the sharp blade 115 may run the risk of becoming too rigid and less able to bend and the sharp blade 115 may become more of a dagger which can be dangerous. If the distance of L becomes much greater than 4.572 millimeters then the sharp blade 115 will start to bend too much and the sharp edge 125 of the sharp blade 115 may move too far inside the outer edge 185 and inside edge 195 and will run the danger of not cutting effectively. It can be seen in FIG. 31 the midpoint S references the midpoint of the flexing sharp blade 115. A skin convex T inside of the outer comb 145 and the inner guard 135 has a cutting referenced as a convex surface Z. The angle between the midpoint S and the convex surface Z is referenced as angle R. Convex surface Z is illustrated with a dashed line extending out from the skin convex T in order to illustrate the angle representation. Angle R is about 35 degrees or less.

In FIG. 31 the cross-section of the blade group 265 is illustrated pressing into skin according to embodiments of the present inventions. The blade group 265 is safely poking or indenting into the skin surface A in order for the blade group 265 to dry shave hairs properly as well as to create tactile feedback within the practice of two-point discrimination. The sharp edge 125 of the sharp blade 115 longitudinally bends relatively more parallel to a skin surface A when the inside edge 195 and the inner guard outer edge 185 safely poke into the skin surface A during shaving of hair. It can be seen from FIG. 31 that the hair 415, the Pacinian Corpuscle 425 and the Ruffini's Corpuscle 435 are now all actively being triggered due to the skin stretching and pressure from the inner guard 135 and the outer comb 145 into the skin surface A and forming the tightening skin convex T in order to exposure the base of a hair 415. Pacinian corpuscles 425, also known as the Lamellar corpuscles, are one of the four major types of mechanoreceptor. They are nerve endings in the skin found in the subcutaneous layer of skin and are responsible for sensitivity to vibration and pressure. They respond only to sudden disturbances and are especially sensitive to vibration. Feelings of deep pressure from a poke, for instance are generated from Pacinian corpuscles 425 which are located deeper in the dermis 455. In my invention the outer comb 145 and inner guard 135 serve to poke the skin surface A creating skin surface indentations and since the Pacinian corpuscles 425 are located deep in the dermis 455 it would be difficult for a safety razor that did not create a significant poke or indentation to stimulate the Pacinian corpuscles 425. By taking full advantage of communicating with the Pacinian corpuscles my invention is utilizing this communication in the same way this communication is used in two-point discrimination. Most safety razors found in most markets are designed to glide across the skin surface and are not designed to poke into the skin surface in order to trigger these nerves. The Ruffini Corpuscle 435, also known as the Ruffini's ending, is a slowly mechanoceptors found in the subcutaneous tissue layer and are another receptor responsible for mechanoreception. This spindle-shaped receptor is sensitive to skin stretch, responds to sustained pressure, and is located in the deep layers of the skin. As seen in FIG. 31 the skin indentations being created from the inner guard 135 and the outer comb 145 are stretching and poking the skin. Thus, communication through the sensory system to a user's brain is taking place in relation to the location of blade group 265.

It can be seen now in FIG. 31 a trailing opening J allows for a sufficient opening or void for creating a tightening skin convex T and the skin convex T entering between inner guard outer edge 185 and comb inside edge 195.

A trailing opening J is illustrated as a dashed imaginary triangle inside of the outer edge 185 of the inner guard 135 and the sharp edge 125 of the sharp blade 115. In other alternate embodiments the dashed triangle may be a right triangle or an isosceles triangle or an isosceles right triangle. In FIG. 31 an inner guard inside wall 665 is inside of the inner guard inside end 235 and the inner guard inside wall 665 is one of three sides or walls of the imaginary dashed triangle illustrating the trailing opening J in FIG. 31. The second side of the imaginary triangle for trailing opening J starts from the inner guard inside end 235 and runs along the sharp blade 115 up to the sharp edge 125 of the sharp blade 115. The third and final side starts from the sharp edge 125 of the sharp blade 115 and runs along the skin surface plane A when adjacent to the skin surface plane A area and up to the outer edge 185. These three sides work together to form the trailing opening J. The trailing opening J allows for a sufficient opening or space for tightening skin to enter and convex and exposure the base or root of a hair 415 in order to for the sharp blade 115 to cut a hair 415 at the base of the hair very effectively which is illustrated here in FIG. 31. The trailing hairs illustrated in FIG. 31 are not shorn because the blade group 265 is merely pressing into the skin surface A and not performing a shaving stroke. If the blade group 265 were moving forward making a shaving stroke the hairs will become shorn. As seen in FIG. 31 each of the outer teeth 145 are substantially perpendicular to the sharp edge 125 and it can be seen that the leading opening G, which was illustrated in the second illustration in the prior FIG. 26, is no longer illustrated since the sharp blade 115 has flexed enough to remove the opening G. However, in the case where the base 205 is closer to the sharp edge 125 of the sharp blade 115 the flexibility of the sharp blade 115 may be greatly limited and the opening G may still exist. It can be seen in FIG. 31 the outer wall 155 of the outer comb 145 and the skin plane A create a one imaginary triangle with a vertex referenced as vertex O. Vertex O angle is created in order to allow the outer comb 145 to better indent into the skin surface A allowing the blade group 265 to shave properly and for better two-point discrimination. In FIG. 31 it can be seen that the vertex O vertices is allowing the inside edge 195 of the outer comb 145 to safety indent into the skin in order to create a better skin convex T.

It can be seen in the illustration the tissue sub layers and the sensors within each layer which include the Epidermis 445, the Dermis 455 and the Hypodermis 465. For the sake of clarity the sensors located in the deep tissue sub layers are illustrated as being activated from the poke. The star shapes embodied on the strand of the sensor indicates the communication taking place. The illustrated sensors include the Ruffini's Corpuscle 435, which are found in the Dermis 455 layer and the Pacinian Corpuscle 425, which are found in the "subcutaneous" or hypodermis 465 layer. In FIG. 31 the star shapes represent sensors being triggered in the sensory system.

FIGS. 32-33 illustrate aerial views of a handles gripped by a user extended under the armpit towards the backside with two safety blades indenting into the skin surface and triggering a sensory system according to embodiments of the present inventions. In FIGS. 32-33 a user holds the elongated handle 315 removably attaching to a safety razor 105 wherein a grip 395 of the elongated handle 315 is respectively gripped by fingers and hand by a same arm of the user the user is illustrated pressing a body leverage surface 495 located on an outer side 475 of the elongated handle 315 near a midway between the grip 395 and a blade end 325, which is opposite a grip end 355, and configured to press the body leverage surface 495 against a user's forearm in order to leverage a handle attachment 295 located on an inner side 485 of the shaver handle 315 against a torso backside of the user and leveraging the shaver handle 315 using the body leverage surface 495 to create a fulcrum F relative to the grip 395 in order to press the blade end 325 towards the torso backside of the user and stroking the blade end 325 against the torso backside of the user. It should be noted that when discussing the torso the breast tissue is not considered part of the torso. A substrate structure 215 operatively coupled to the blade end 325 of the elongated back shaver handle 315, wherein the substrate structure 215 is adapted to hold both the blade group 265 and the support 275 on a front surface 375 of the substrate structure 215 with the blade group 265 and the support 275 spaced a tactile leverage feedback distance sufficiently wide enough to provide leverage feedback felt through the elongated back shaver handle 315 for the user to maintain a consistent angle of the sharp blade relative to the skin surface when an arm of the user reaches the elongated back shaver handle 315 to a backside of the user during shaving movement over a shoulder blade peak or a spine depression on the backside. The user feeling within the hand of the user on the grip 395 of the elongated handle 315 a leverage feedback from both the blade group 265 and the support 275 against the backside skin.

The elongated handle 315 may have a generally s-shape and having a surface along a length of the elongated member 315. The elongated handle 315 inner side 485 is opposite the outer side 475 and the elongated handle 315 also having a handle clip 365. A skin convex CC is illustrated inside of the blade group 265 and the support 275 and has moved inside of the elevational gap EE. Each of the different blade groups may have different angles in relation to the substrate structure 215. A suppleness distance is measured between the inside edge 195 of the outer comb 145 and the outer edge 185 of the inner guard 135 of the blade group 265. The suppleness distance is narrower than tactile discrimination distance 285 spaced between the blade group 265 and support 275, which said support 275 is a blade group in FIGS. 32-33.

FIGS. 32-33 further illustrates star shaped figures dispatching from a skin convex U created from a support 275 and a skin convex T created from a blade group 265. These stars represent the sensors of which are being communicated through the sensory system as a result of initial sensory point signal 245 and secondary sensory point 255 being created by the blade group 265 and the support 275 indenting into the skin surface and signaling the sensors. The user feeling within nerves of the user's skin a first tactile feedback at a first location where the blade group 265 presses against the user's skin and the user separately feeling within nerves of the user's skin a second tactile feedback at a second location where the support 275 presses against the user's skin. A user may adjust a relative pressure of the pressing to seek equal pressure on the skin of the blade group 265 and the support 275 based on the first tactile feedback and the second tactile feedback. In FIGS. 23-33 the skin convex T is created by the blade group 265, while the skin convex U is created by the support 275. The sensory signals are communicating through the sensory system to the user's brain allowing the user to understand that both the initial sensory point signal 245 created by the blade group 265 as well as the secondary sensory point signal 255 created by the support 275 while both blade group 265 and support 275 indenting into the skin and allowing the user to understand the location of blade group 265 and support 275. It can be seen that when comparing FIG. 32 to FIG. 33 the safety razor 105 has made a shaving stroke across the back side. During this stroke it can be seen that the sensors represented by the stars and referenced as initial sensory point signal 245 and secondary sensory point signal 255 have moved from one location to another and during this transition the user is gaining the understanding of the old and new location of the safety razor 105 because of two-point discrimination. Also, although in FIG. 33 the safety razor 105 has traveled across the skin surface in comparison to FIG. 32, the sensory memory allows a user to temporarily still feel previously made impressions or indentations for a short period of time allowing a user to understand where they have already just shaved or where they still may need to shave. This allows a user to refrain from shaving in areas on the back that have already been shorn cuts down on time and makes the process much more timely efficient. The elongated handle 315 has a straight distance measured directly from the blade end 325 to the grip end 355 that is measured not following the curve of the elongated handle 315 which is about 330 mm to about 457.2 mm A preferred straight distance of the back shaver handle 315 is about 355.6 mm.

The ability to discriminate stimuli on the skin also varies with where the skin is located on the body. Two-point discrimination is a measure that represents how far apart two pressure points must be before they are perceived as two distinct points on the skin (Gemperle et al., 2003). Weber's research focused on obtaining two-point discrimination thresholds for various areas of the body (Myles and Binseel, 2007 references Weber 1834/1978). Using a metal compass, touched various areas of the skin with the two points of the compass some distance apart and recorded judgments of the distance between the two points. (Myles and Binseel, 2007 references Weber, 1834/1978). From his work, promulgated five general propositions, of which the first two stated that (a) various parts of the touch organ are not equally sensitive to the spatial separation of two simultaneous points of contact, (b) if two objects touch us simultaneously, we perceive their spatial separation more distinctly if they are oriented along the transverse rather than the longitudinal axis of the body. (Myles and Binseel, 2007 references Weber, 1834/1978). This measurement will help the user to choose how dense his or her tactile array can be depending on what part of the body the tactile display is applied. (Myles and Binseel, 2007 references Weinstein, 1968) reported differences in two point discrimination thresholds for different areas of the body. Since each tip or tactor is responsible for presenting a unique signal, if the blunt tips or tractors are placed too close together the user will perceive it as one signal and will miss the sensory message being generated with the use of two signals. Weinstein's chart that better illustrates the thresholds of two-point discrimination in the upcoming FIG. 61.

From his work, (Myles and Binseel, 2007 references Weber, 1834/1978) promulgated five general propositions, of which the first two stated that (a) various parts of the touch organ are not equally sensitive to the spatial separation of two simultaneous points of contact, (b) if two objects touch us simultaneously, we perceive their spatial separation more distinctly if they are oriented along the transverse rather than the longitudinal axis of the body. In order of decreasing sensitivity for two-point discrimination, the tongue was found to be most sensitive, followed by the lips, fingers/palm, toes, and forehead. If tactors are placed too close together and each tactor is responsible for presenting a unique signal in the scheme of some complex, tactile pattern, the observer will perceive it as one signal and will miss the underlying message generated with the use of two signals. Two-point discrimination acuity is less than 1 millimeters for the fingers, 15 millimeters for the forehead, 35 millimeters for the forearm, 39 millimeters for the back, and 45 millimeters for the calf (Gemperle et al., 2003). Some areas of the body require are more sensitive that other areas of the body and thus, require less distance between a pair of distinct points.

In general, sensitivity decreases as one moves from distal to proximal extremities (Sherrick, Cholewiak, & Collins, 1990) and skin impedance of the stimuli is different for different areas of the body (Myles and Binseel, 2007 references Sherrick & Cholewiak, 1986). All skin on the body will probably follow some of the basic characteristics mentioned, but skin on different areas of the body will not be equally acute because of differences in skin "thickness, vascularity, density, electrical conductivity, and more derived properties, such as moduli of shear and elasticity" (Myles and Binseel, 2007 references Sherrick & Cholewiak, 1986, p. 12-3; Weber, 1834/1978).

Similar to the relationship found for the visual and auditory modalities, absolute threshold is inversely proportional to the amount of energy applied to the skin (Verrillo, 1966). Vibration is detected best on hairy, bony skin. (Gemperle et al., 2003). Since the four fibers overlap in their absolute sensitivities, a vibration stimulus will seldom stimulate one fiber in the skin but several fibers because the energy applied to the skin will move throughout nearby skin tissues (Myles and Binseel, 2007 references Sherrick & Cholewiak, 1986.) Within the vibrotactile literature, the fibers are grouped to describe two systems: the Pacinian system and the non-Pacinian system. The Pacinian system has a large receptive field excited by higher frequencies and the non-Pacinian system consists of a small receptive field thought to be excited by lower frequencies (Sherrick, Cholewiak, & Collins, 1990). (Sherrick et al., 1990) report perceptual sensations of the non-Pacinian system as a superficial skin flutter while sensations for the Pacinian system are described as deep and diffuse. For this reason, my safety razor 105 creates for a user effective communication in having multiple blunt tips that create multiple points of indentations at a distance apart from each other which create deep impression or indentations into a skin surface on a trunk or back side of a user.

Sensory memory is the process by which the human body retains the sensations of interaction with human body after the external stimuli ceased, thus helping humans describe the physical quantities in their environment and manipulate objects in daily activities. Skin, the largest organ in the human body, has a variety of sensory receptors and provides significant sensation information such as force, pain, shape, and texture. Skin perceives external stimuli and conveys the sensory information to the brain through afferent neurons to form haptic memory, allowing humans to remember the impressions of the stimuli applied on the skin (Zhu et al., 2015).

The term haptic memory can be defined as the ability to retain impressions of haptically acquired information after the original stimulus is absent (Shih, Dubrowski & Carnahan, 2009). After a series of tests were conducted it was concluded that haptic memory may last for up to 2 seconds. (Shih, Dubrowski & Carnahan, 2009). In embodiments of the present inventions the poking that my safety razor 105 creates against a user's torso stimulates the sensory memory of a user allows the information regarding the location of the safety razor 105 to be processed and retained if only for a short period of time. This allows a user to have a temporary understanding as to where the safety razor 105 has already been stroking and still where the safety razor 105 needs to still stroke.

As seen in FIGS. 32-33 after stroking the blade group 265 and a support 275 against the skin surface a user may now have a temporary understanding as to the location of where the blade group 265 and support 275 were traveling from and where the blade group 265 and support 275 are now presently location. This allows a user to, for a brief period of time, understand where both the blade group 265 and support 275 has just been and where the safety razor 105 is no longer present. This means that a user would be able to understand that they have been shaving in one area and may dictate where they need to stop and start based on a communication set forth with sensory memory.

According to (Myles and Binseel, 2007 references Kandel and Jessell, 1991), Meissner's corpuscles and Merkel's cells respond to touch, Pacinian corpuscles respond to vibration, and Ruffini's corpuscles respond to rapid indentation of the skin. Thus, a vibration stimulus delivered to non-Pacinian fibers but designed to evoke responses typical of Pacinian fibers (i.e., response to vibration) would produce lower threshold values than if the stimulus were directly delivered to Pacinian fibers. Likewise, stimuli for glabrous and hairy skin must be created to obtain the maximum sensitivity possible for each type of skin. Compatibility between the stimulus and the skin structure to be stimulated will yield sensitivity values closer to true threshold values. In the study conducted by Van Erp & Van den Dobbeltsteen (Myles and Binseel, 2007 references an Erp & van den Dobbelsteen, 1998) they concluded that the Pacinian corpuscle and Ruffini's ending both have large receptive fields and respond to high levels of pressure vibration and indenting into the skin. Van Erp & van den and Dobbelsteen concluded that while the range of the Pacinian Corpuscle was 40 to 800 Hz, the range of the Ruffini's ending was 15 to 400 Hz. (Myles and Binseel, 2007 references an van Erp & van den Dobbelsteen, 1998).

In embodiments there may be staggered supports 274 with blunt tips for indenting to cause tactile discrimination distance. A study was previously conducted and discussed by (van Erp, 2007) wherein 14 tactors were placed in a horizontal array on the back with a spacing of 4 millimeters, resulting in a center to center distance of 2 cm. The results show a uniform acuity across the torso of 3-4 cm, except for locations on the body midline (i.e., the spine and the navel) for horizontally oriented arrays (but not for the vertical arrays) where the resolution is much higher, about 1-2 cm. With a torso circumference between 80-100 cm and a horizontal acuity of 3-4 cm, a horizontal display resolution of 24 tactors should be obtainable. A similar calculation would result in a vertical display resolution of 8 tactors. In addition to skin location, parameters of the vibrotactile signal can also influence sensitivity to and the perception of tactile stimuli. For example, the tactile threshold for the trunk is 4 microns or lower but this threshold may very well increase or decrease, depending on the inter-stimulus interval, amplitude, frequency, or location on the trunk. (van Erp, 2007)

One of the earliest and most well-known form of sensory substitution devices was Paul Bach-y-Rita's TVSS that converted the image from a video camera into a tactile image and coupled it to the tactile receptors on the back of his blind subject. In summary, the receptors would create a tactile image on the back of the subject and the blind subject could determine the image. Recently, several new systems have been developed that interface the tactile image to tactile receptors on different areas of the body.

Figure 34:
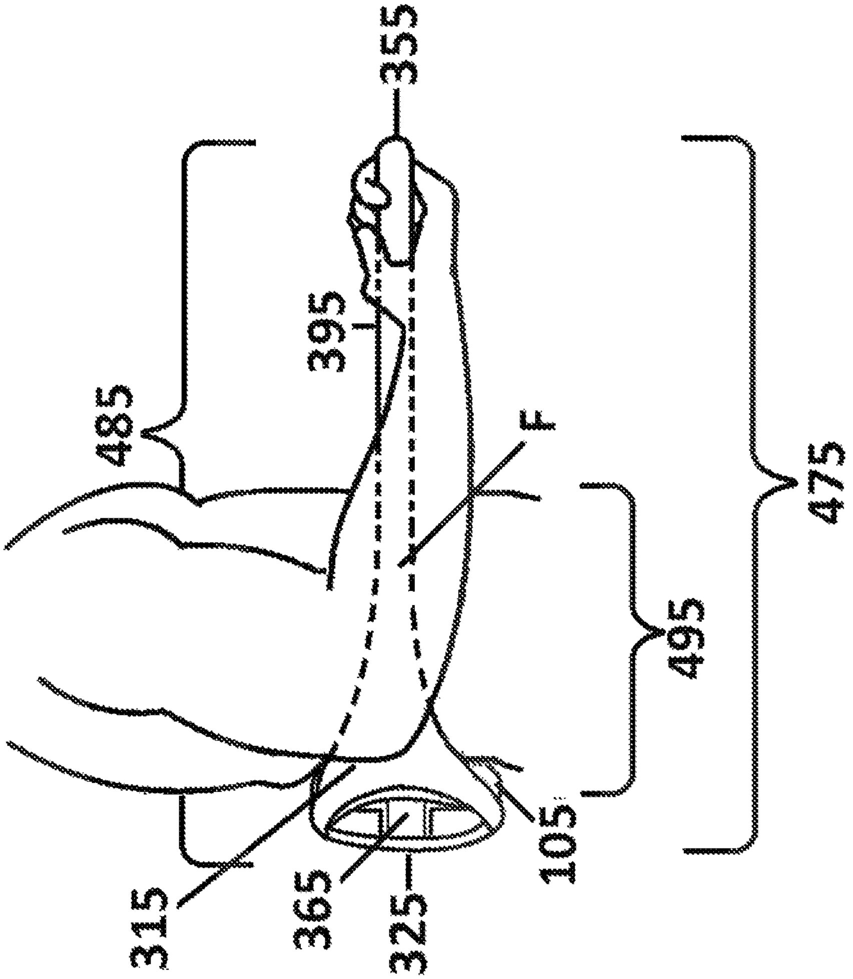
FIGS. 34-36 illustrate side views of handles gripped by a user extended under the armpit towards the backside according to embodiments of the present inventions.
Figure 35:
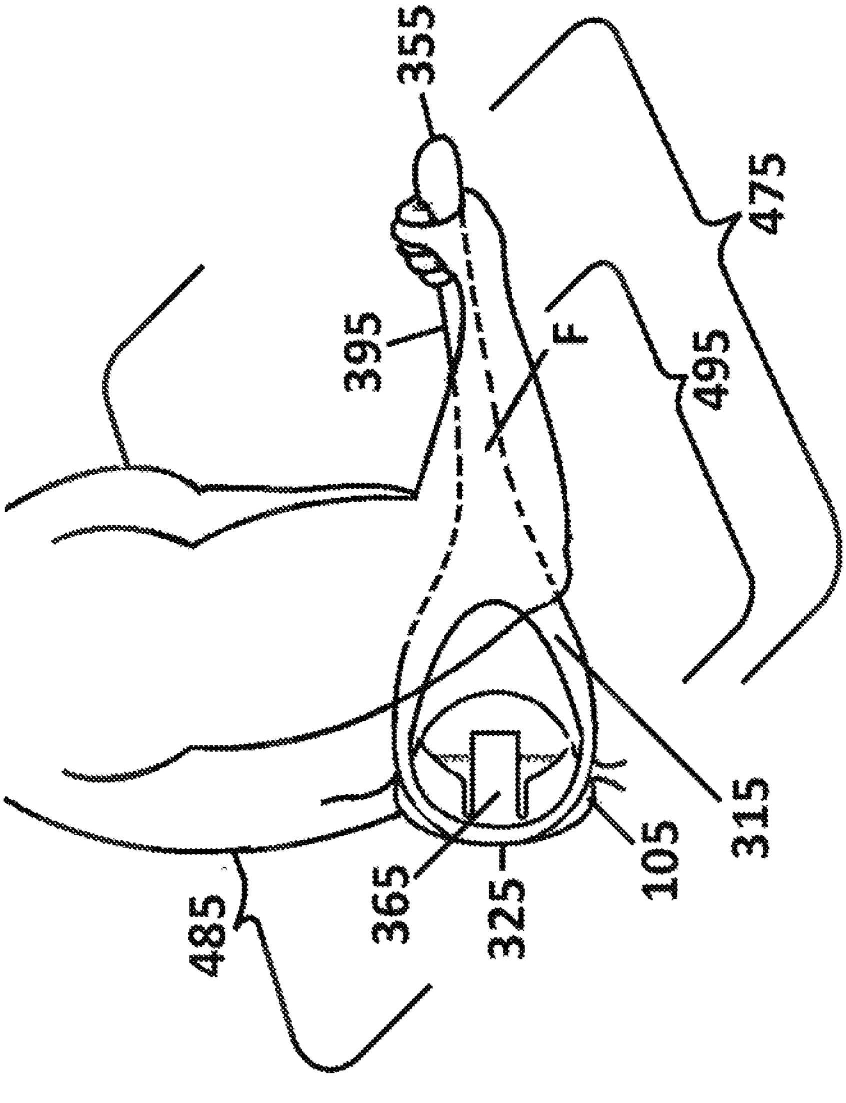
Figure 36:
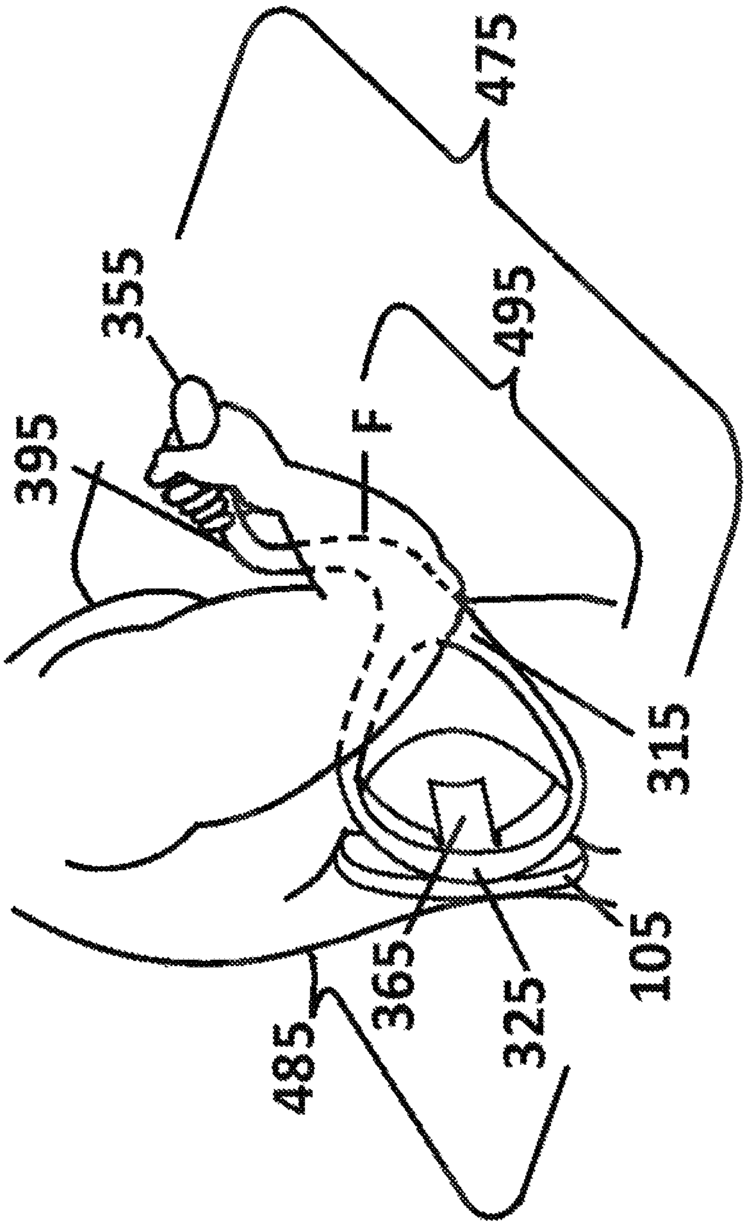

FIGS. 34-36 illustrate side views of a user utilizing an elongated handle 315 according to embodiments of the present inventions. The elongated handle 315 removably attaching to a safety razor 105 for two point discrimination and said handle 315 having a blade end 325 and a grip end 355 and the blade end 325 opposite the grip 395 and the outer side 475 opposite the inner side 485, and between the outer side 475 and the inner side 485. A handle clip 365 used to lock and release the safety razor 105.

A body leverage surface 495 is located on the outer side 475 of the elongated handle 315 near a midway between the grip 395 and the blade end 325 and the blade end 325 configured to press the body leverage surface 495 against a user's forearm creating a fulcrum F when the grip 395 is respectively gripped by fingers and hand by a same arm of the user located on the inner side 485 of the elongated handle 315 and a thumb of the hand facing away from the blade end 325 of the elongated handle 315 and the elongated handle 315 is reaching the blade end 325 under an armpit of the same arm of the user to leverage the safety razor 105 and handle attachment located on the inner side 485 of the elongated handle 315 against a torso backside of the user. It should be noted that when discussing the torso the breast tissue is not considered part of the torso.

Figure 37:
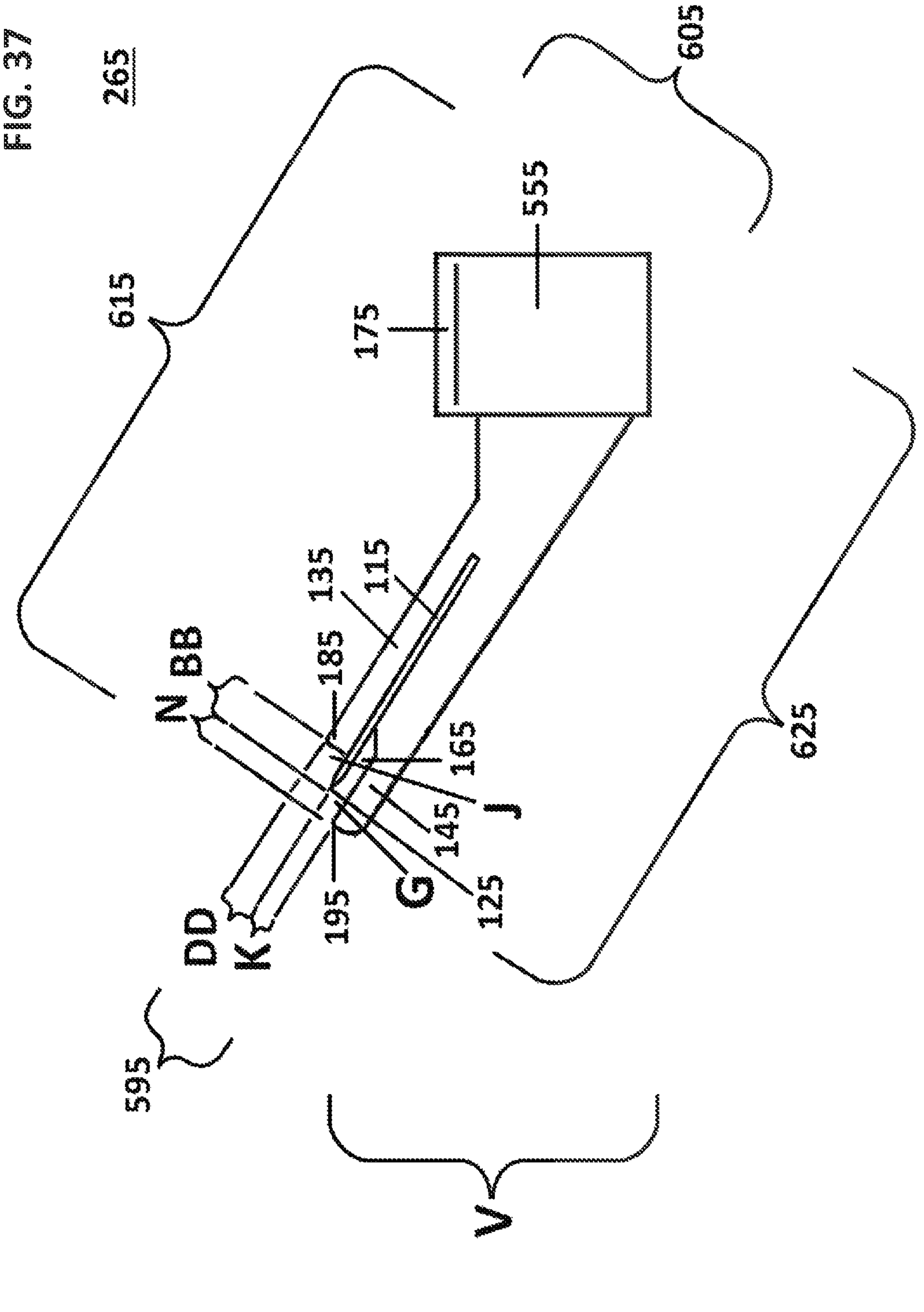
FIG. 37 illustrates a side view of a blade group for removably attaching to a substrate structure of a safety razor according to embodiments of the present inventions.

FIG. 37 illustrates a side view of a right attachment side 555 of a blade group 265 and blade group 265 comprising a sharp blade 115 with a sharp edge 125 and an inner guard 135 parallel to the sharp blade 115 on a trailing side of the sharp blade 115 opposite the outer comb 145 wherein an outer comb 145 parallel to the sharp blade 115 on a leading side of the sharp blade 115 and an outer comb 145 comprising an inside edge 195 and an inner guard 135 comprising an inner guard outer edge 185. A portion of the inner guard 135 inside of the outer edge 185 and the sharp edge 125 of the sharp blade 115 is removed in order to create a trailing opening J. Trailing opening J allows for a sufficient opening or void for tightening skin to enter and convex in order for the sharp blade 115 to gain access to a base of a hair. Each of the outer teeth 145 substantially perpendicular to the sharp edge 125 of the sharp blade 115 and spaced with a leading opening G between the inside edge 195 of the outer teeth 145 and the sharp edge 125 of the sharp blade 115. The right attachment side 555 having a clip 175 which is used to snap into a groove attachment of a substrate structure first or second groove. The clip 175 may be on the right attachment side 555 or a left attachment side which is opposite a right attachment side 555 of the blade group 265 or support as will be further illustrated in the upcoming FIG. 58. In an alternative embodiment the clip 175 may be inside the left attachment side and right attachment side 555 and near a bottom side 605 which is opposite a top side 595 or may also be near a blade group front surface 615 which is opposite a blade group rear surface 625 of the blade group 265 or support.

In FIG. 37 the blade group 265 has an inner rearward distance BB from the sharp edge 125 of the flexible sharp blade 115 to the to the inner guard edge of the inner guard 135 in relation to an outer rearward distance N from the inside edge 195 of the outer comb 145 to the sharp edge 125 of the sharp blade 115 has a ratio of about 1. In other words, in this embodiment, the inner rearward distance BB and the outer rearward distance N are substantially the same. The inner rearward distance BB from the sharp edge 125 of the sharp blade 115 to the inner guard edge of the inner guard 135 is about 0.508 mm to about 1.016 mm A preferred inner rearward distance BB from the sharp edge 125 of the sharp blade 115 to the inner guard 135 is about 0.762 mm. Also, the outer rearward distance N from the inside edge 195 of the outer comb 145 to the sharp edge 125 of the sharp blade 115 is about 0.508 mm to about 1.016 mm. A preferred outer rearward distance N from the inside edge 195 to the sharp edge 125 is about 0.762 mm.

A thickness of the inner guard 135 from the outer edge 185 of the inner guard 135 to the nearest portion of the sharp blade 115 is referenced as distance DD. Distance DD is about 0.381 mm to about 0.889 mm A preferred distance DD is about 0.61 mm.

A deep void 165 running from a base 205 to the sharp edge 125. A thickness of the deep void 165 is referenced as thickness K. Thickness K of the deep void 165 is about 0.7262 millimeters or less. In a preferred embodiment distance K is 0.0381 millimeters. The inner edge of the inner guard 135 and the inside edge 195 of the outer comb 145 in practice are blunt or curved edges because no corner is perfectly sharp or square. If the inner edge of the inner guard 135 and the inside edge 195 of the outer comb 145 were perfectly sharp or square, they would risk cutting into the skin or feel uncomfortable. That being said, there may be a slightly square edge sufficient to indent and grip the skin in order for the skin inside of the inside edge 195 and the inner guard 135 to stretch. These ends are the outermost horizontal dimension to the end or tip of the inner guard 135 or the outer comb 145. Therefore the inner rearward distance BB and outer rearward distance N are stated measured from respective ends of the inner guard 135 and the outer comb 145.

The deep void 165 between the row of the outer comb 145 and the planar surface of the sharp blade 115. The top side 595 is opposite the bottom side 605 and the right attachment side 555 of the blade group 265 close to the bottom side 605. The blade group front surface 615 is opposite the blade group rear surface 625 and the blade group front surface 615 is facing against a skin surface during a shaving stroke. A height from a blunt tip of the blade group 265 to the lowest portion of the blade group rear surface 625 of the blade group 265 is referenced as height V and is about 5.08 millimeters or more.

Letter designations in the drawings depict certain planes, gap distances and contours, defined throughout, and for convenience are summarily defined wherein:

- "BB" references a distance rearward from the sharp edge 125 of the sharp blade 115 to the outer edge 185 of the inner guard 135 is referenced as distance BB;
- "N" references a distance rearward from the inside edge 195 of the outer comb 145 to the sharp edge 125 of the sharp blade 115 is referenced as distance N;
- "DD" references a thickness of the inner guard 135 from the outer edge 185 of the inner guard 135 to the nearest portion of the sharp blade 115 is referenced as distance DD; and
- "V" references a height from a blunt tip of the blade group 265 to the lowest portion of the blade group rear surface 625 of the blade group 265 is referenced as height V.

Figure 38:
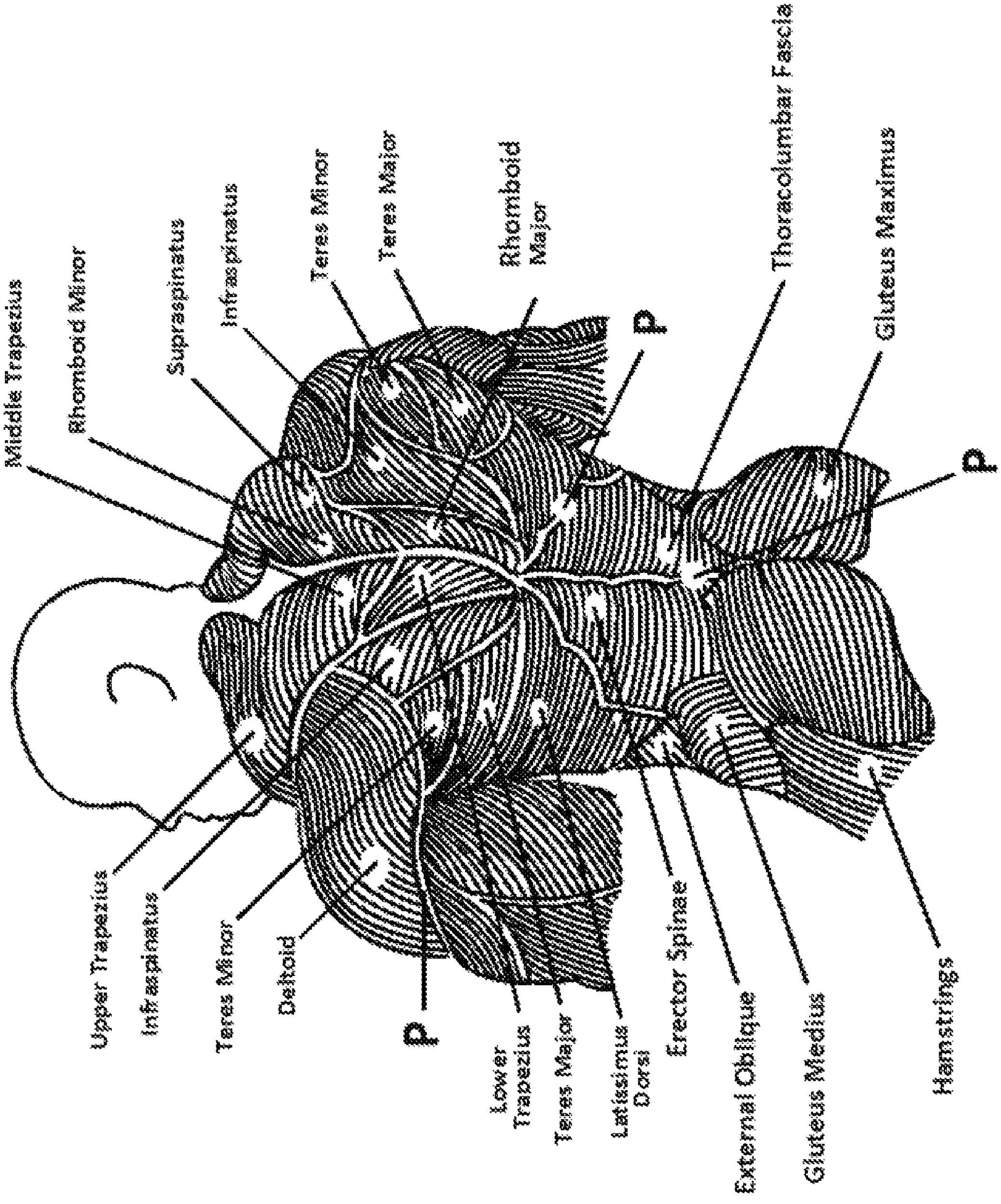
FIG. 38 illustrates a diagram of the different muscles that are found on the backside of the human body.

FIG. 38 illustrates a diagram of the different muscles that are found on the backside of the human body. It is important to take notice as to just how many different muscles that are found on the backside and the divides, which are illustrated as divide P are seen in FIG. 38 between the muscles. The more defined the muscles on one's backside means the more muscles divides P are present which means the more of a challenge the shaving terrain may pose for most traditional safety razors found in most markets. In the body building world an individual who has a high level of muscle definition is known as being "cut". When an individual has a high level of muscle definition it is common to see a defined divide or a "cut" which looks like a valley between each muscle group which can be seen in FIG. 38. In the upcoming FIGS. 39-44 it will be more clearly illustrated as to how a safety razor 105 for two-point discrimination performs a shaving stroke over challenging terrain with hills and valleys which can be found on the body and especially the back side of a user. It is because these areas are difficult to reach and shave properly that many individuals with muscles as such are forced to maintain their back hair with other non-preferable and painful means such as waxing and laser hair removal. It should be understood that the strength and flexibility of skin comes from two structures found in the dermal layer of skin which are collagen and elastin. Together, collagen and elastin make up about 70% of the dermal layer. Collagen is a fibrous protein that gives the skin form and strength. It holds together all the various structures of the skin and gives it plumpness and firmness. Elastin is a protein base interwoven with the collagen fibers to form elastic tissue. This gives the skin its flexibility and elasticity which my invention takes much advantage in using during the shaving process. Elastin helps the skin resume its shape after expanding or stretching. Muscle tissue is arrange in bundles of parallel fibers and is stretchy. Being that skin and muscle have these characteristics is very relevant in that while most traditional shavers are used to glide on the skin surface my invention is purposely designed to indent into the skin and when moving across the skin.

Letter designations in the drawings depict certain planes, gap distances and contours, defined throughout, and for convenience are summarily defined wherein:

- "P" illustrates a muscle divide inside of a pair of muscles found on the human back side.

Figure 39:
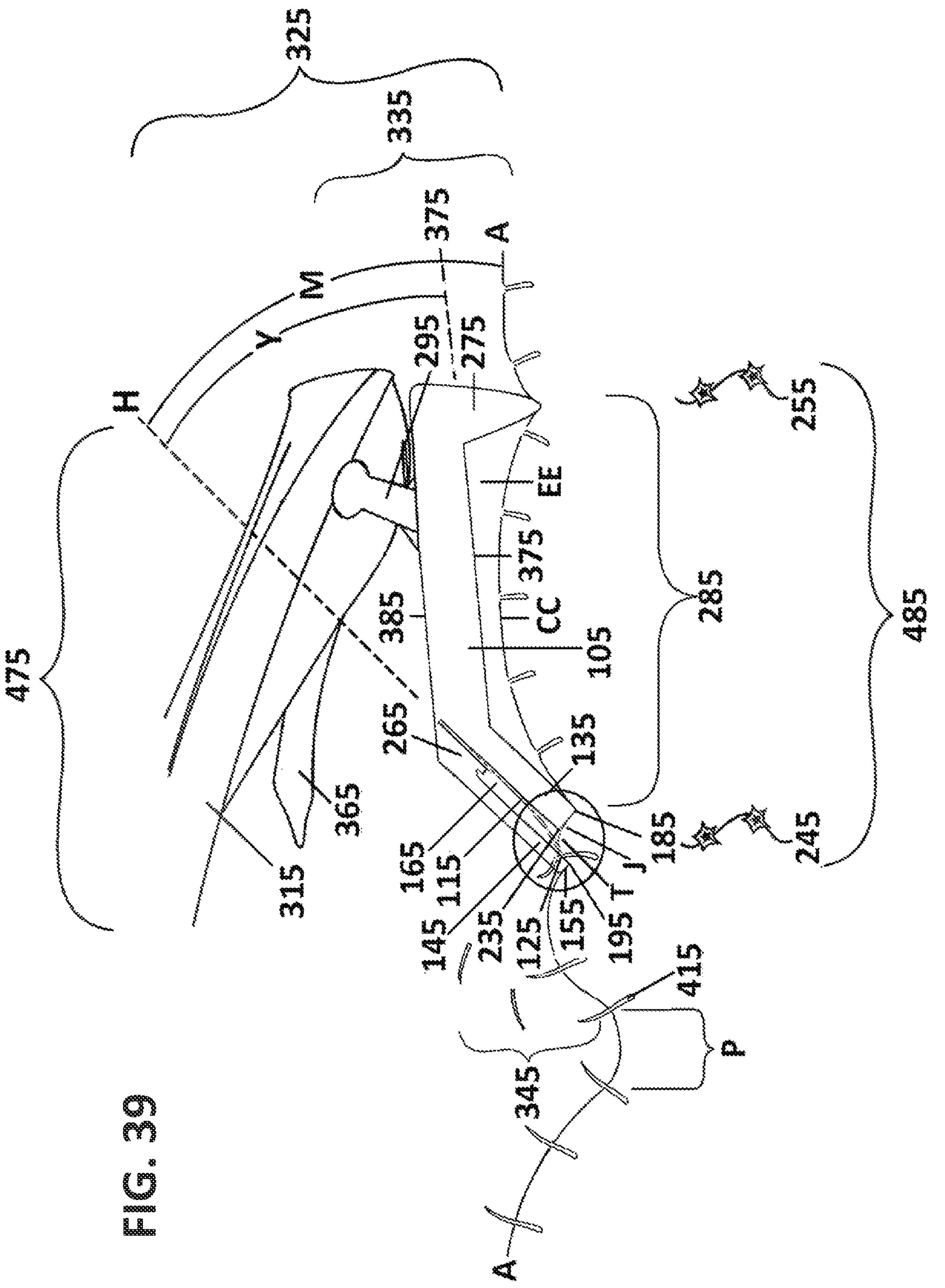
FIG. 39-41 illustrate a close up side views of a muscle divide as was illustrated in the previous FIG. 18 and showing a safety razor and elongated handle for two-point discrimination according to embodiments of the present inventions.
Figure 40:
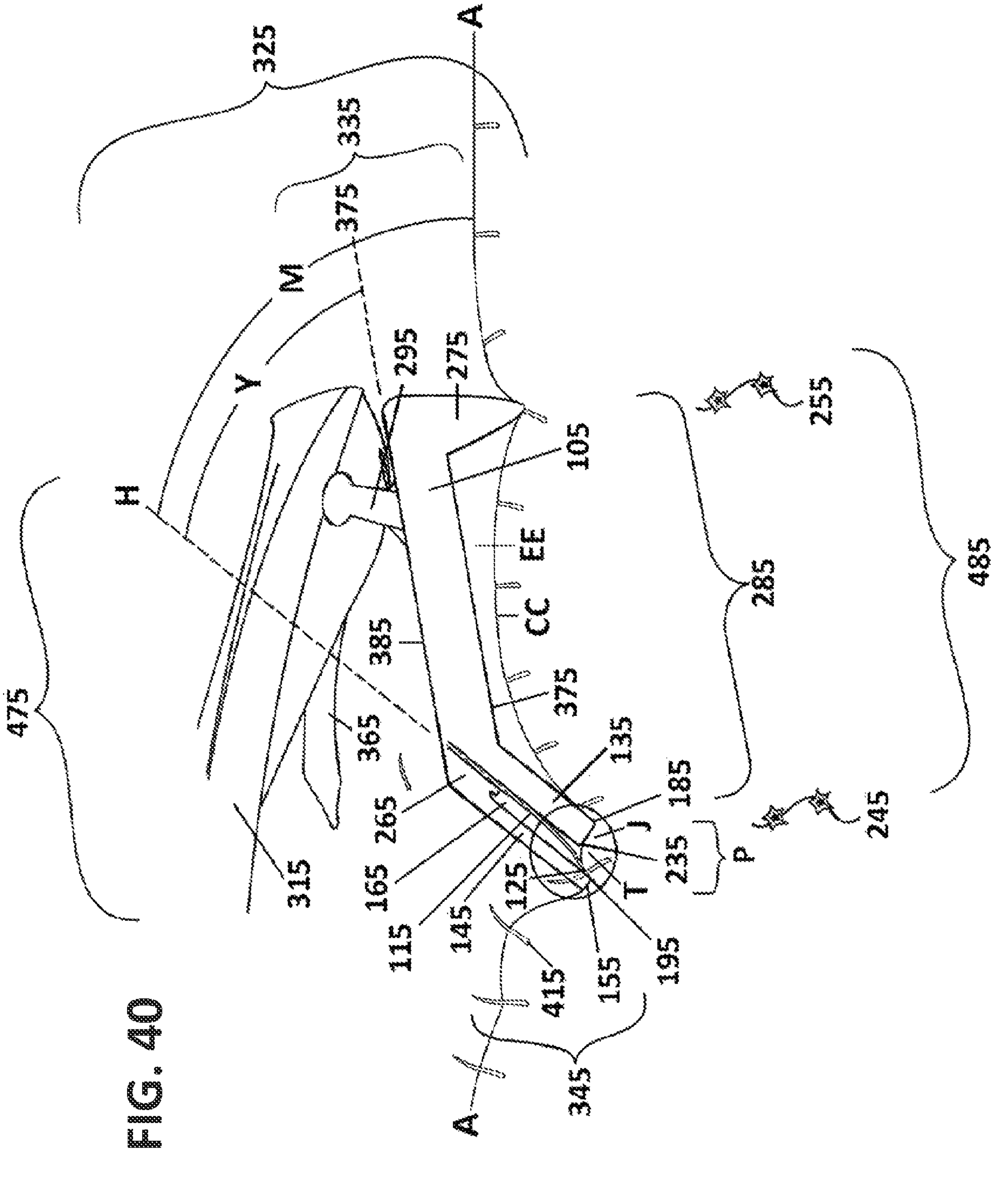
Figure 41:
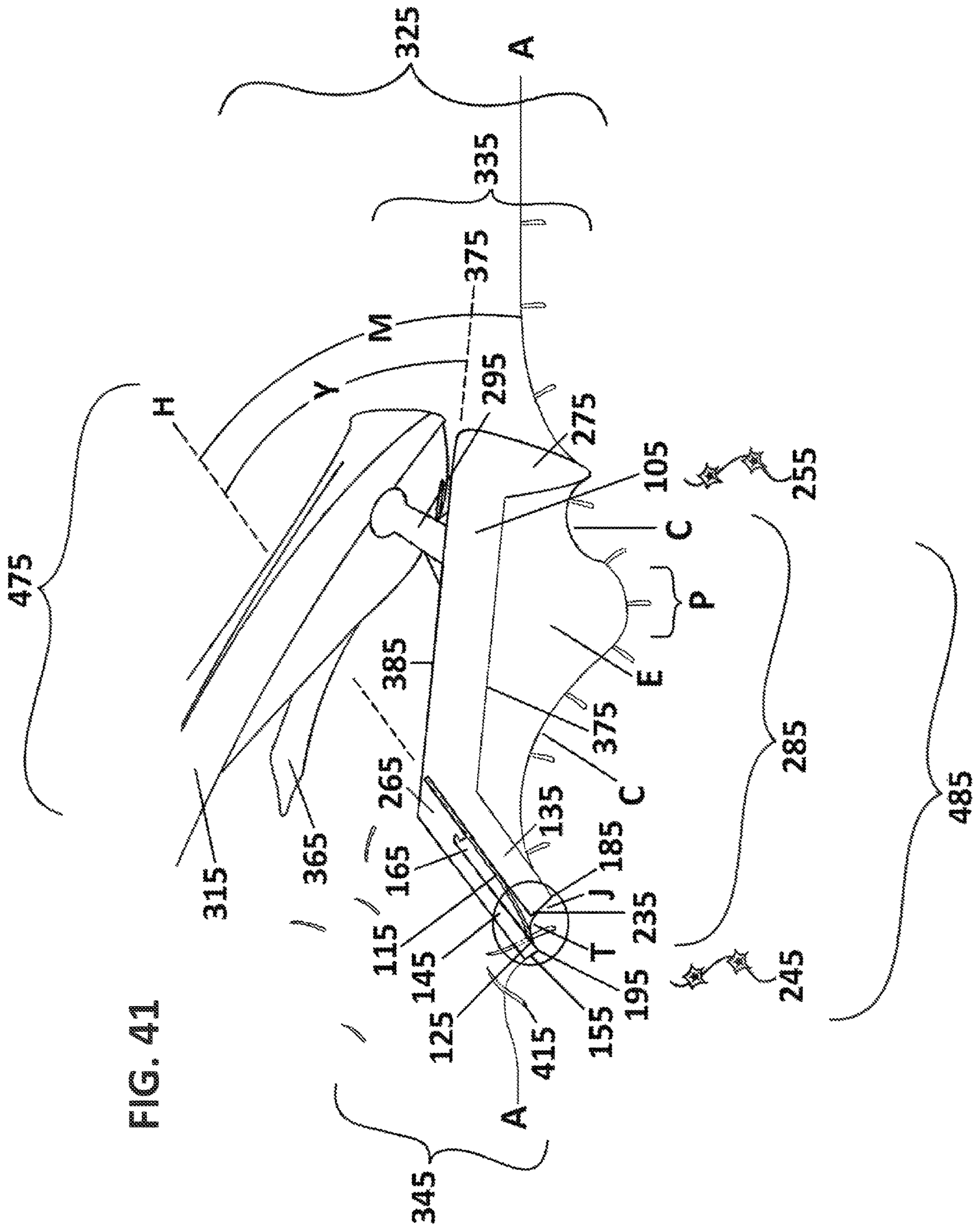

FIGS. 39-41 illustrate close up side views of a muscle divide P as was illustrated in the previous FIG. 38 and showing a safety razor 105 removably attaching to an elongated handle 315 according to embodiments of the present inventions. The safety razor 105 having a front surface 375, a rear surface 385, a top side 335, and a bottom side 345 wherein the front surface 375 is opposite the rear surface 385 and the top side 335 is opposite the bottom side 345 and a blade group 265 comprising a sharp blade 115 with a sharp edge 125 and an inner guard 135 parallel to the sharp blade 115 on a trailing side of the sharp blade 115 opposite an outer comb 145 wherein the outer comb 145 parallel to the sharp blade 115 on a leading side of the sharp blade 115 and the outer comb 145 comprising an inside edge 195 and an outer wall 155 of outer comb 145 and the inner guard 135 comprising an inner guard outer edge 185. It can be seen that the top side 335 is close to a blade end 325 of the elongated handle 315. A handle clip 365 is on the inner side 485 of the elongated handle 315. The elongated handle 315 having an inner side 485 and an outer side 475 wherein the inner side 485 is opposite the outer side 475. In another embodiment the handle clip 365 may also be on the outer side 475 of the elongated handle 315. A portion of the inner guard 135 inside of the outer edge 185 and sharp blade 115 is removed in order to create a trailing opening J which a skin convex T enters as seen in FIGS. 39-41. Trailing opening J allows for a sufficient opening or space for tightening skin to enter and allow convex T to form and in order for the sharp blade 115 to gain access to a base of a hair 415. Each of the outer teeth 145 substantially perpendicular to the sharp edge 125 of the sharp blade 115. A deep void 165 between the row of the outer comb 145 and the planar surface of the sharp blade 115. When the sharp blade 115 is flexed a void is inside the inner guard inside end 235 and the sharp blade 115. In FIGS. 39-41 the safety razor 105 is pressing into a skin surface A having a muscular skin surface hill and how when safely poking and gouging into the skin and moving forward to perform a shaving stroke it can also be seen that the while the inner guard 135 outer edge 185 and the outer comb 145 inside edge 195 are gouging the skin surface A they are creating a skin convex T while inside of the blade group 265 and a support 275 a skin convex contour CC is inside of a elevational gap EE and a tactile discrimination distance 285. The tactile discrimination distance 285 inside the blade group 265 and support 275 and the elevational gap EE creating sufficient space and allowing the blade group 265 and the support 275 to navigate the terrain without having the skin convex CC rubbing against the front surface 375 of the safety razor 105 which would cause a disruption in the shaving stroke process. A tactile discrimination distance 285 inside a blade group 265 and support 275 allowing said blade group 265 and support 275 to navigate the terrain without having a skin convex CC or a secondary skin convex CC from rubbing against the front surface 375 of a safety razor 105 which would cause a disruption in the shaving stroke process. A tactile discrimination distance 285 inside a blade group 265 and support 275 allowing said blade group 265 and support 275 to navigate the terrain without having skin convex CC rubbing against the front surface 375 of a safety razor 105 which would cause a disruption in the shaving stroke process. It is illustrated that as the safety razor 105 for two-point discrimination moves closer to the muscle divide P the hairs 415 are being shorn. Initial sensory point signal 245 and secondary sensory point signal 255 are illustrated and are communicating through a user's sensory system and letting the user know the location of each of the two points.

It is illustrated that as the safety razor 105 for two-point discrimination moves closer to the muscle divide P the hairs 415 are being shorn. Initial sensory point signal 245 representing the sensory communication taking place from the blade group 265 poking the skin while the secondary sensory point signal 255 representing the sensory communication taking place from the support 275 poking the skin. Both initial sensory point signal 245 and secondary sensory point signal 255 are communicating through a user's sensory system and letting the user know the location of each of the two points. It can be seen in FIGS. 39-41 that a midpoint of a non-flexing portion of the sharp blade 115 is referenced as midpoint H. The degree of angle between mid-point H in relation to the skin surface A is referenced as angle M. Angle M may range from about 0-75 degrees. Since angle M may be at 0-75 degrees to work properly it can be seen this is very beneficial in making it easier for a user to get an accurate shaving angle. It is preferred that M be at about a 20 degree angle. The angle between the front surface 375 the safety razor 105 in relation to the midpoint H is referenced as angle Y. Angle Y is 0-75 degrees or less. A preferred angle of angle Y is about 20 degrees. A handle attachment 295 is on the rear surface 385 of the safety razor 105.

Figure 42:
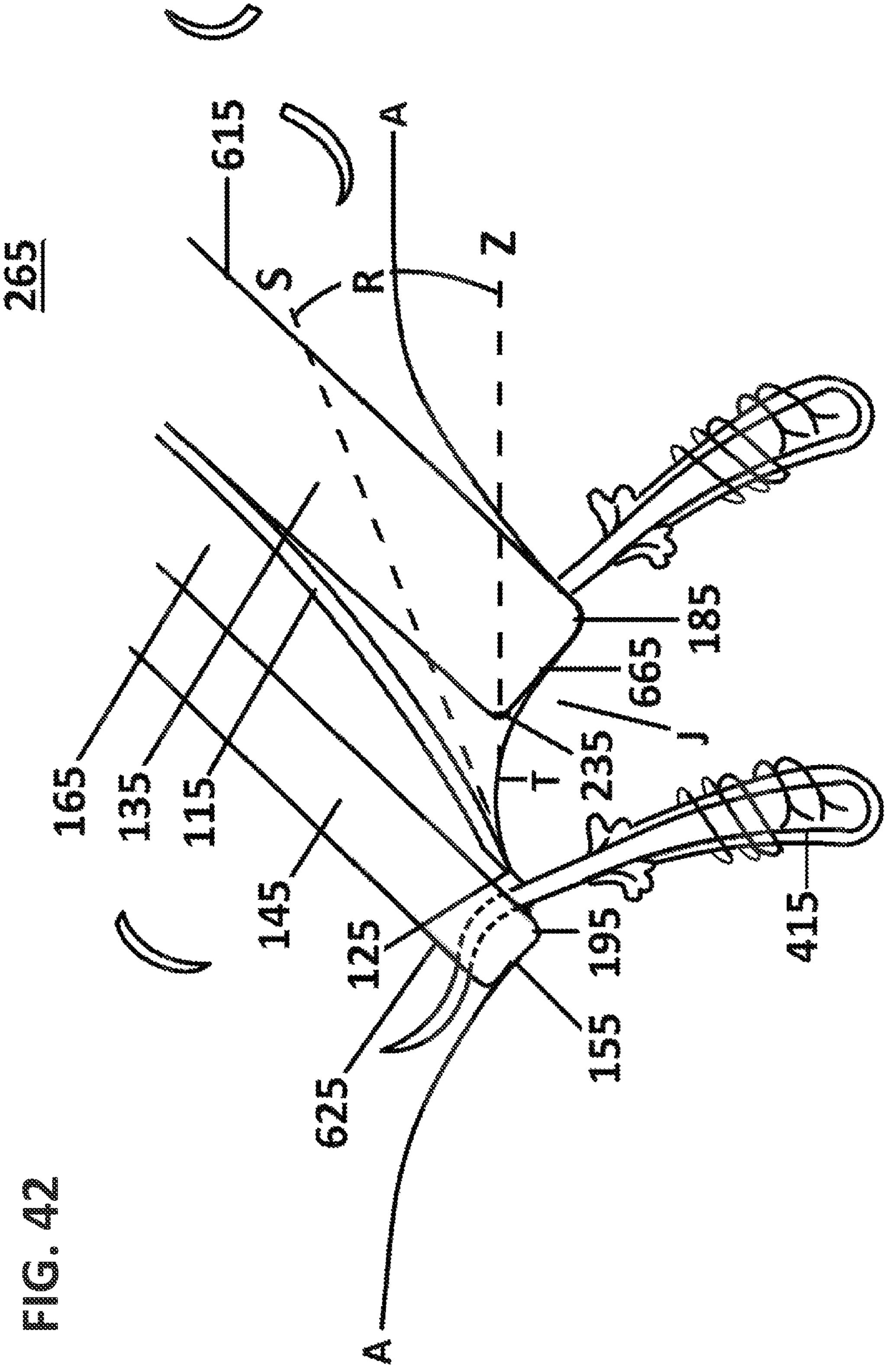
FIG. 42 illustrates a close up side view of a circled portion of a blade group in prior FIG. 39 according to embodiments of the present inventions.
Figure 43:
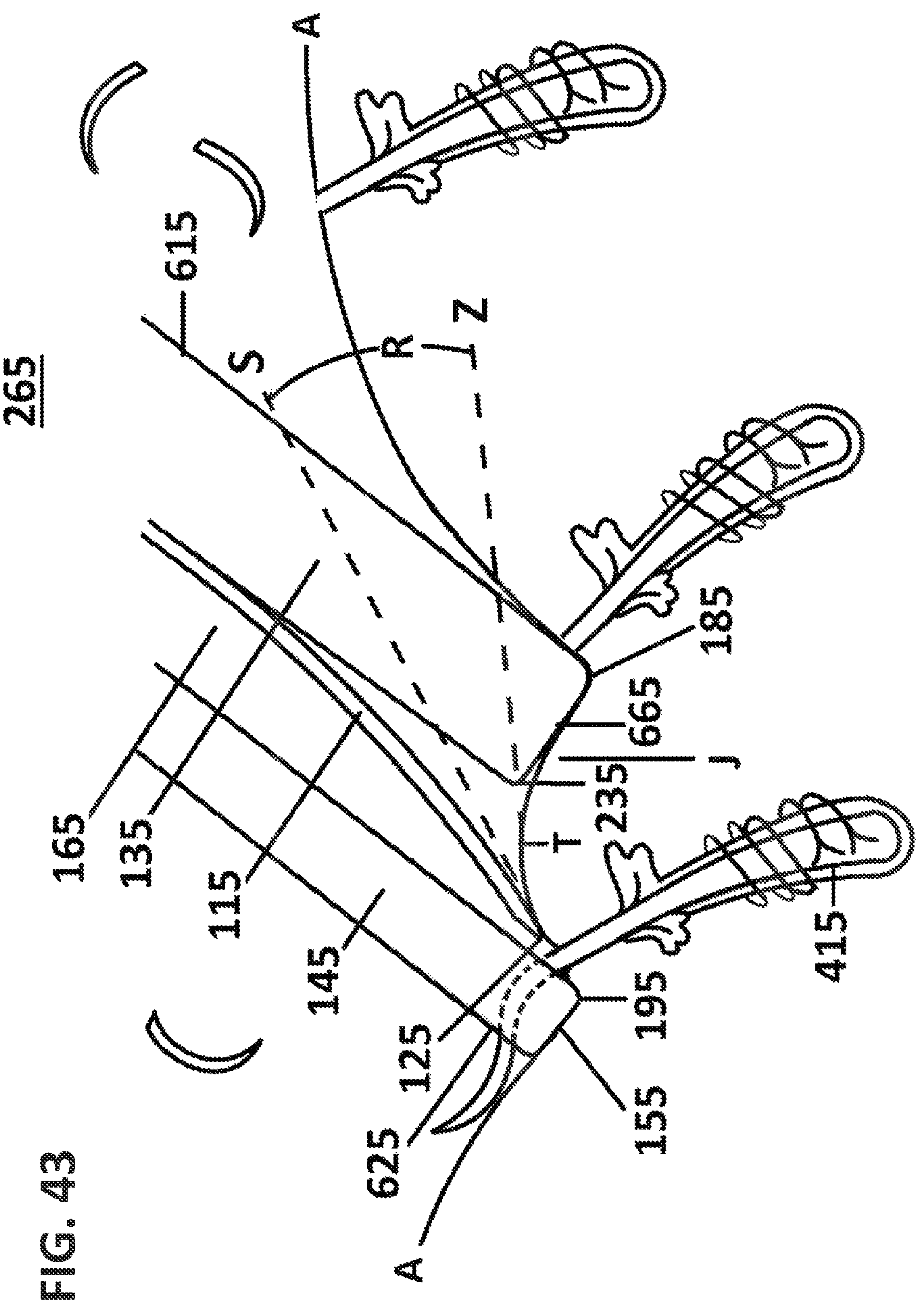
FIG. 43 illustrates a close up side view of a circled portion of a blade group in prior FIG. 40 according to embodiments of the present inventions.
Figure 44:
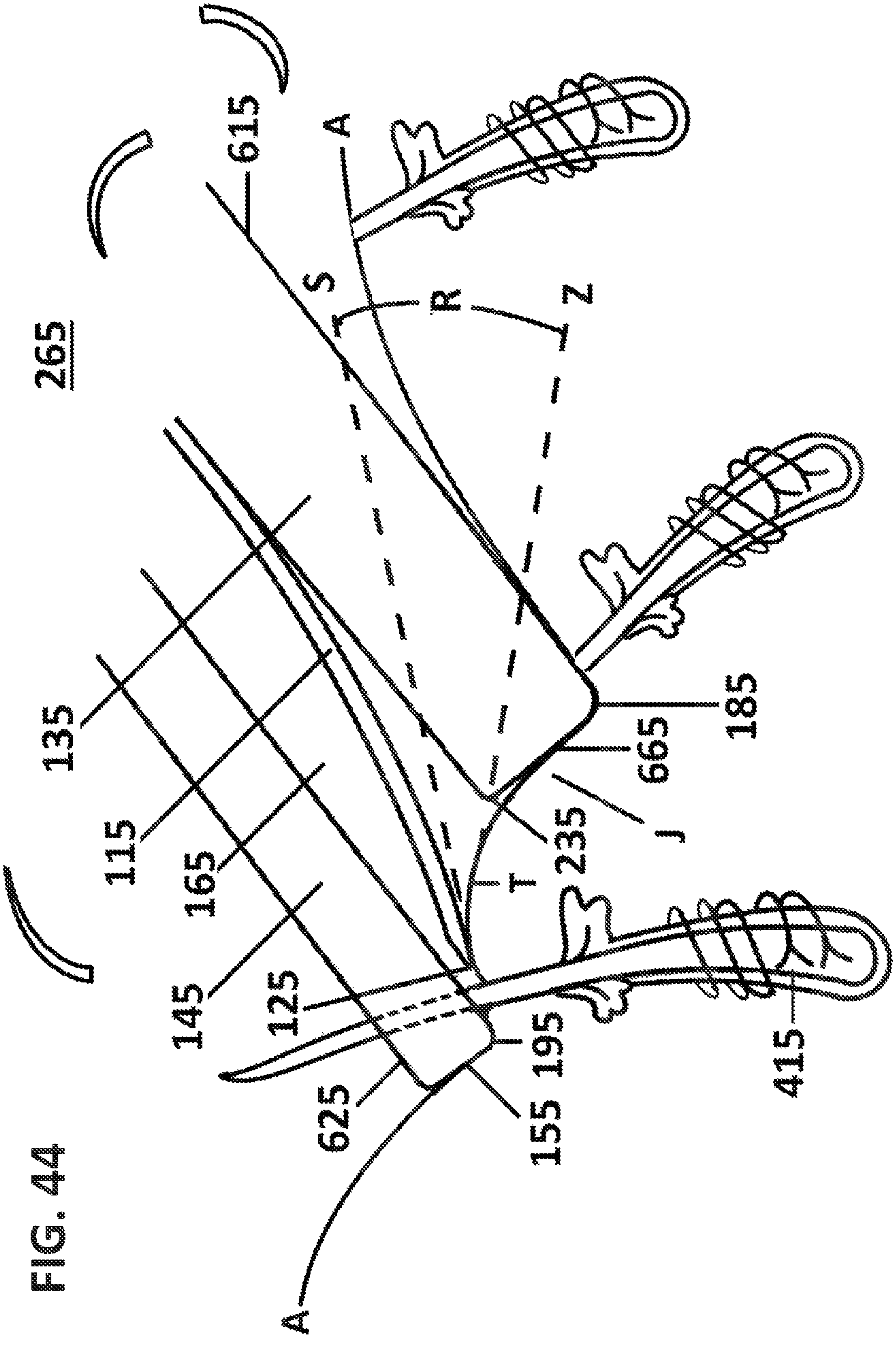
FIG. 44 illustrates a close up side view of a circled portion of a blade group in prior FIG. 40.

In FIGS. 39-41 a portion of the blade group 265 in each illustration is circled referencing a close view of this circled area which will be illustrated in a close up view in the upcoming FIGS. 42-44. In FIG. 39 angle M is at about 45 degrees. In FIG. 40 angle M is 50 degrees. In FIG. 41 angle M is 35 degrees which is illustrating how angle M is able to perform at such a wide range of angle. Furthermore, the circled portion of the blade group 265 in FIG. 39 is illustrated in a close up view illustration in the upcoming FIG. 42. The circled portion of the blade group 265 in FIG. 40 is illustrated in a close up view illustration in the upcoming FIG. 43. Finally, the circled portion of the blade group 265 in FIG. 41 is illustrated in a close up view illustration in the upcoming FIG. 44.

It can be seen in FIG. 41 that when the muscles divide P is inside of the tactile discrimination distance 285 that the skin convex CC may sometimes exist between the muscles divide P and the support 275 or blade group 265. The tactile discrimination distance 285 inside the blade group 265 and support 275 allowing said blade group 265 and support 275 to navigate the terrain without having a skin convex CC or a secondary skin convex CC from rubbing against the front surface 375 of the safety razor 105 which would cause a disruption in the shaving stroke process.

In FIGS. 42-44 a blade group 265 has a blade group front surface 615 opposite a blade group rear surface 625 along a skin plane A comprising a sharp blade 115 and an inner guard 135 parallel to the sharp blade 115 with a sharp edge 125 on a trailing side of the sharp blade 115 opposite an outer comb 145 wherein the outer comb 145 parallel to the sharp blade 115 on a leading side of the sharp blade 115 and the outer comb 145 comprising an inside edge 195 and an outer wall 155 of outer comb 145 and the inner guard 135 comprising an inner guard outer edge 185 and an inner guard inside wall 665 which is a wall inside the outer edge 185 and the inner guard inside end 235. A portion of the inner guard 135 inside of the outer edge 185 and the sharp edge 125 of the sharp blade 115 is removed in order to create a trailing opening J which a skin convex T entering opening J as seen in FIGS. 42-44. The inner guard 135 comprising the inner guard outer edge 185, an inner guard inside end 235 and an inner guard inside wall 665 inside the outer edge 185 and the inner guard inside end 235. The trailing opening J allows for a sufficient opening or space for the tightening skin convex T to enter and convex in order for the sharp blade 115 to gain access to a base of a hair 415. Each of the outer teeth 145 substantially perpendicular to the sharp edge 125 of the sharp blade 115. A deep void 165 between the row of the outer comb 145 and the planar surface of the sharp blade 115. When the sharp blade 115 is flexed a void is inside of the inner guard inside end 235 and the sharp blade 115 as see in FIG. 42-44.

FIGS. 42-44 illustrate close up side views of the circled portion of the blade group 265 previously illustrated and described in the prior FIGS. 39-44, each at different angles M. In FIGS. 42-44 a degree of angle between a midpoint of a flexing portion of the sharp blade 115 is referenced as flexing midpoint S and the angle of midpoint S and is illustrated with a dashed line. A cutting surface of skin convex T is referenced as surface Z and illustrated with a dashed lined to illustrate the surface angle of surface Z. The preferred angle of midpoint S in relation to the surface Z is referenced as angle R. Angle R is preferred to have an angle of about 35 degrees or less. In the previous FIGS. 39-41 we learned that angle M may range from about 20-75 degrees. It can be seen in FIGS. 42-44 that despite the wider ranges of angle M, angle R remains at an angle between 20-35 degrees. The embodiments of FIGS. 39-44, when at 20 degrees for both M and R, assume the non-flexing sharp blade 115 is not flexed. As the handle angle M increases, the sharp blade 115 flexes keeping its change of angle R smaller than the change of handle angle M. Meanwhile, in the embodiments of FIGS. 42-44 the support 275 helps keeps the handle angle M within its own range of 20-70 degrees. In summary, when the safety razor 105 is stroking over hills and valleys at various angles the quality of the preferred angle R is not altered nor disturbed. This allows a user more flexibility when shaving their back side, for example, and it is very difficult for a user to not shave effectively. In FIGS. 42-44 it can be seen there are shorn hairs being cut near the leading side of the blade group 265.

Figure 45:
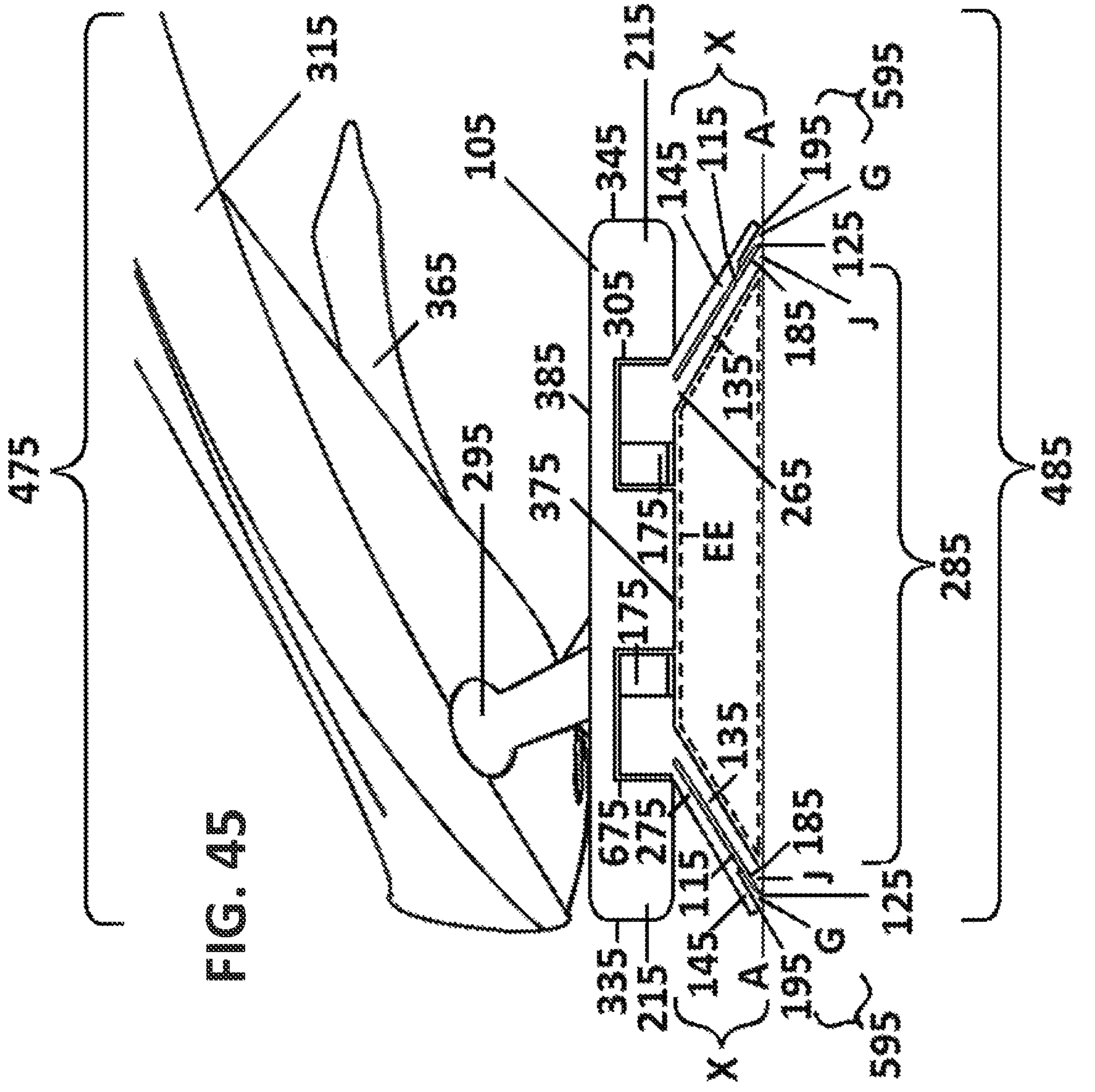
FIGS. 45-46 illustrate close up side views of a safety razor and elongated handle for tactile feedback according to embodiments of the present inventions.
Figure 46:
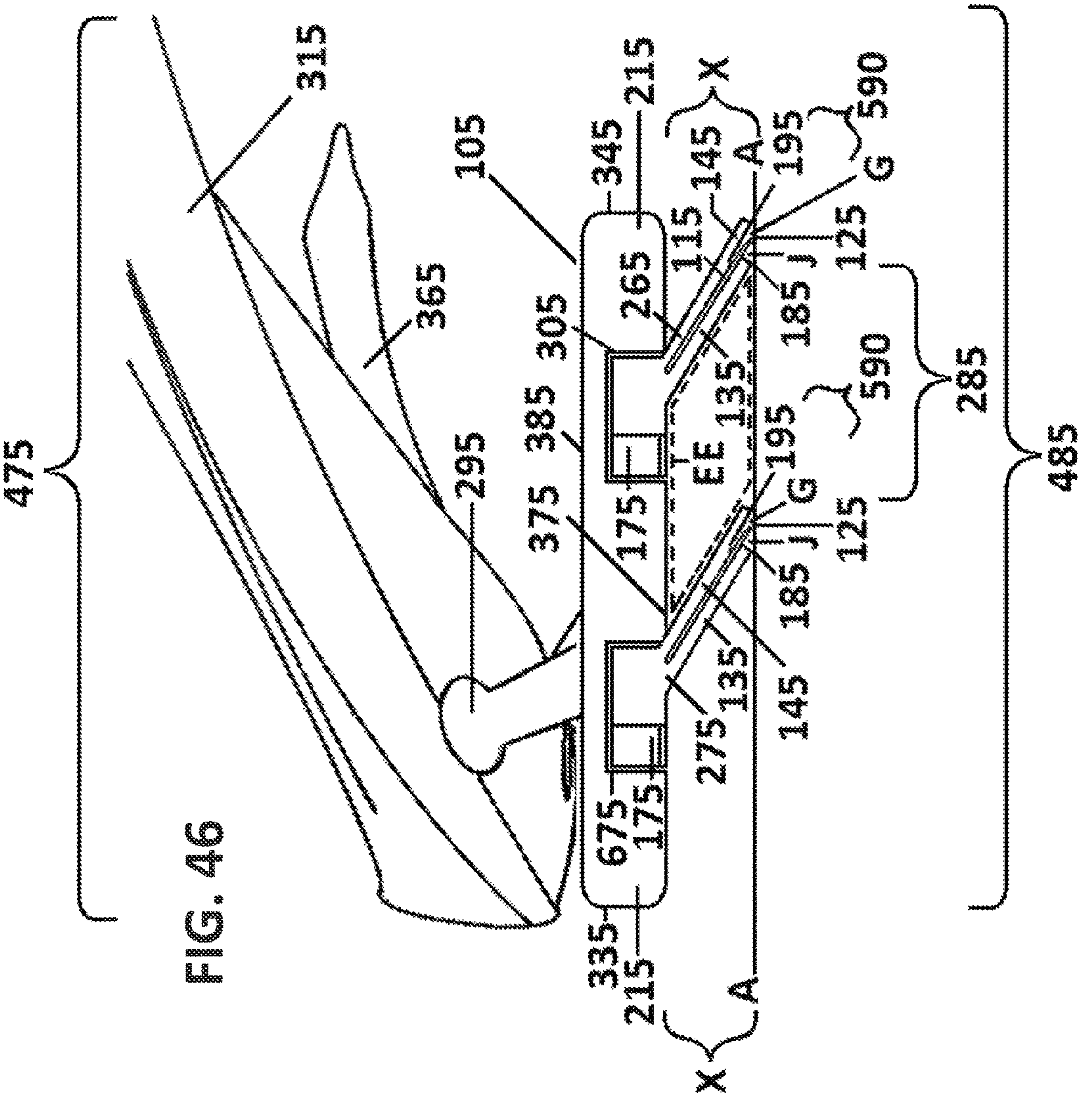

FIGS. 45-46 illustrate side views of a safety razor 105 for two-point discrimination removably attaching with an elongated handle 315 having a handle clip 365 and along a skin plane A with a blade group 265 and a support 275 and the elongated handle 315 having an inner side 485 and an outer side 475. The inner guard 135 can be shaped as a plate running next to and continuously alongside on a trailing side of the sharp blade 115. The outer comb 145 can be shaped as a plate running next to and continuously alongside on a leading side of the sharp blade 115. In FIG. 45-46 the support 275 takes the form a blade group and both support 275 and blade group 265 comprising a sharp blade 115 with a sharp edge 125 and an inner guard 135 parallel to the sharp blade 115 opposite an outer comb 145 wherein the outer comb 145 parallel to the sharp blade 115 on a leading side of the sharp blade 115 and a substrate structure 215 adapted to hold the blade group 265 and the support 275 on a front surface 375 of the substrate structure 215 opposite a rear surface 385 and the blade group 265 and support 275 spaced with a tactile discrimination distance 285 allowing a distance sufficient to achieve two-point discrimination on the skin of a user between the blade group 265 and support 275. The safety razor 105 for two point discrimination having a top side 335 and a bottom side 345 wherein the top side 335 is opposite the bottom side 345. Inner guard 135 having an outer edge 185 and a trailing opening J inside of the outer edge 185 and the sharp edge 125 of the sharp blade 115. Outer comb 145 having an inside edge 195 and a leading opening G inside of the inside edge 195 and the sharp edge 125 of the sharp blade 115. The trailing opening J is referred to a trailing opening since when the safety razor 105 is performing a shaving stroke the trailing opening J is always trailing the leading opening G. However, in FIG. 45 it can be seen that a top side 595 of the blade group 265 and the top side 595 of the support 275 are directed in opposite directions of one another. The top side 595 of the support 275 is directed towards the top side 335 while the top side 595 of the blade group 265 is directed towards the bottom side 345 of the safety razor 105. This means that when a user is holding the elongated handle 315 and pulling the safety razor 105 across their backside the blade group 265 is shaving while the support 275 is not shaving. Just the opposite, the when user is holding the elongated handle 315 and is pushing the safety razor 105 across their backside the support is shaving while the blade group 265 is not shaving. This particular method is beneficial as the user may save much time between shaving strokes.

In FIGS. 45-46 the substrate structure 215 adapted to hold the blade group 265 and the support 275 on the front surface 375 of the substrate structure 215 with the blade group 265 and the support 275 spaced a distance sufficient to achieve two-point discrimination on the skin of a user between the blade group 265 and the support 275. The support 275 and blade group 265 extend from the front surface 375 of the substrate structure 215 at a height X sufficient to avoid loose skin of the user touching and rubbing the front surface 375 of the substrate structure 215 which would interfere with a shaving stroke. The height from tips of each of the blade group 265 and the support 275 to the front surface 375 of the substrate structure 215 is referenced as height X and is about 3.81 millimeters or more to avoid the loose skin of the user touching the front surface 375 of the substrate structure 215 and wherein the substrate structure 215 holds the blade group 265 and the support 275 spaced a distance about 35 millimeters or more. The front surface 375 of the substrate structure 215 comprising one or more grooves parallel from each other and adapted to removably hold at least one blade group 265 and support 275. Groove 305 and secondary groove 675 allow a user an option to choose a distance between the blade group 265 and support 275. The rear surface 385 of the substrate structure 215 comprising a handle attachment 295. It is preferred that the substrate structure 215 adapts the blade group 265 at an angle of about 0-75 degrees in relation to the front surface 375 of substrate structure 215. The support 275 may take the form of a blade group or an alternative embodiment having a least one blunt protrusion sufficient for safely poking into the skin surface A.

Tactile discrimination distance 285 is a gap spaced inside of at least one blade group 265 and support 275. The tactile discrimination distance 285 may have an elevation gap EE which may be deep or shallow and the distance of the tactile discrimination distance 285 between a pair of supports may vary. The tactile discrimination distance 285 allows balance and stability of the substrate structure 215 when stroking against the skin surface A. Tactile discrimination distance 285 also grants space for a tightened skin to convex and enter inside of the tactile discrimination distance 285 without rubbing against the front side of substrate structure 215 while allowing a user to maintain an effective angle between the blade group 265 the skin surface A without difficulty. The tactile discrimination distance 285 also creates an effective amount of distance between the blade group 265 and the support 275 in order to allow two-point discrimination to occur. The tactile discrimination distance 285 is inside of the blade group 265 and support 275 and the elevational gap EE is illustrated with dashed lines. Elevational gap EE allows a skin convex to enter when the safety razor 105 is pressing into the skin surface A.

In the embodiment here in FIG. 45 the top side 595 of a blade group 265 is directed towards the bottom side 345 of the substrate structure 215 while the top side 595 of the support 275 is directed towards the top side 335 of the substrate structure 215 or safety razor 105. These arrangements may be altered in order to create alternate two point discrimination distances for shaving alternate areas of the body which will be further illustrated in the upcoming FIGS. 46-47.

In FIG. 45 the blade group 265 and support represented as another blade group 275 each having a clip 175 for removably attaching to the substrate structure 215. The safety razor has a substrate structure 215 according to the embodiment illustrated in FIG. 45 capable of selectively adapting different blade groups 265 and 275, each of the different blade groups 265 and 275 having different angles in relation to the substrate structure 215. The angles of the different blade groups 265 can be opposite angles relative to the substrate structure 215, as illustrated. The angles can also be different form one another for at least two blade groups 265 and 275 when three or more blade groups. The opposite angle can be accommodated by a user merely inserting or sliding in one of the blade groups in an opposite direction from the other. Having a first and second blade group as illustrated in FIG. 45 allows for the safety razor 105 to shave hair when a user is both pulling and pushing the safety razor across the skin.

As seen in FIG. 46 the support 275, which is taking form of a secondary blade group, has been turned a 185 degrees wherein the top side 595 of the support 275 is now facing the bottom side 345 of the safety razor 105. In FIG. 46 it can be easily seen the tactile discrimination distance 285 distance is much less in comparison to the prior FIG. 45 between the blade group 265 and support 275 for two-point discrimination. A user may now use the two point discrimination on an area that requires less of a tactile discrimination distance 285 distance in comparison to FIG. 45. Alternate embodiments or arrangements of the blade group 265 and support 275 may exist to create alternate tactile discrimination distance 285 distances. Allowing a user the option to create alternate tactile discrimination distance 285 distances allows a user to apply two-point discrimination on alternate areas of the body since different areas on the body require different distances between two points.

Figure 47:
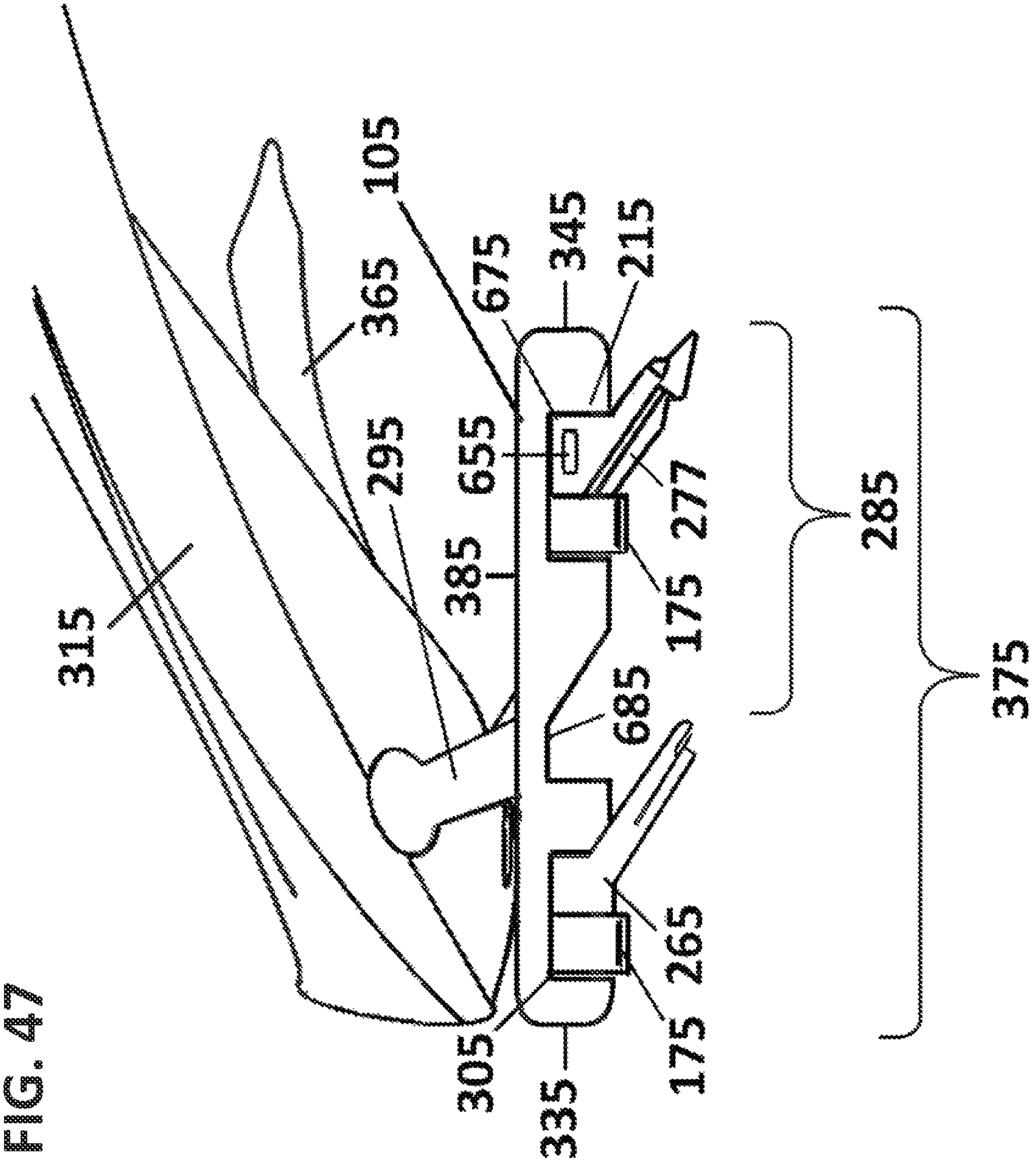
FIG. 47 illustrates a close up side view of a safety razor and elongated handle for tactile feedback having an electric trimmer for a support according to embodiments of the present inventions.
Figure 48:
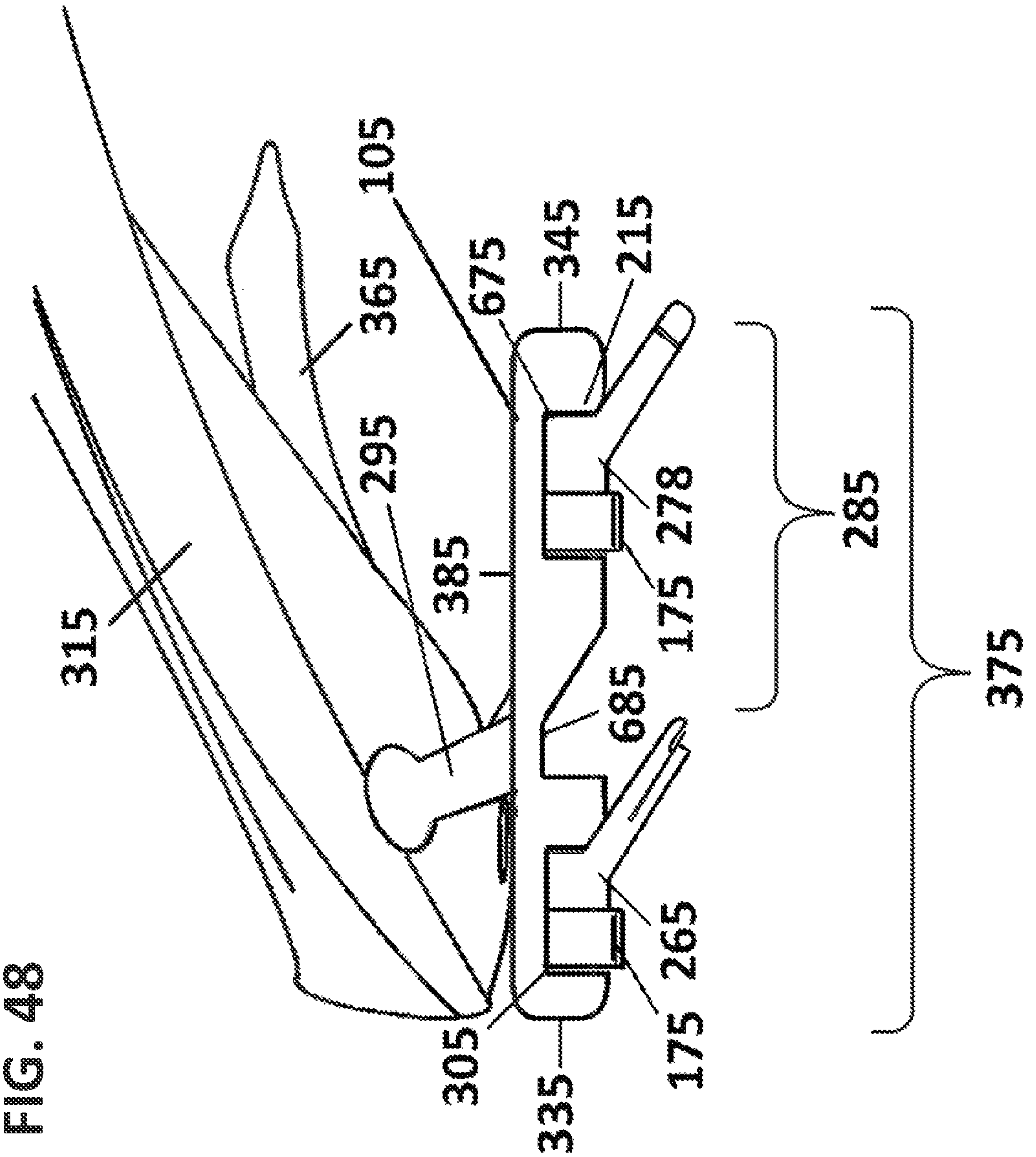
FIG. 48 illustrate a close up side view of a safety razor and elongated handle for tactile feedback having a lubrication strip for a support according to embodiments of the present inventions.

FIGS. 47-48 illustrate side views of an elongated handle 315 having a handle clip 365 and said handle 315 is removably attaching to a safety razor 105 for two-point discrimination according to an embodiment having a substrate structure 215 with a front surface 375, a rear surface 385, a top side 335, a bottom side 345, wherein the front surface 375 is opposite the rear surface 385 and the top side 335 is opposite the bottom side 345 and the rear surface 385 having a handle attachment 295 and a first groove 305, and a secondary groove 675 and a third groove 685 inside of said first groove 305 and said secondary groove 675 wherein a third groove 685 allows the option to choose multiple tactile discrimination distance 285 distances between at least one blade group 265 and support 275 when carrying out two-point discrimination. In FIG. 47 a support 275 taking form of an electrical trimmer 277. In cases where a user is extremely hairy it would prove beneficial to have the support 275 be an electrical trimmer 277 ran by a battery 655 or an electrical power cord that would allow a user to trim back hair and body hair to a lesser level prior to applying the blade group 265. In the same way it is common for a man to trim his beard prior to shaving with razor designed to shave one's face it would also prove beneficial for those who wish to trim their back or body hair prior to applying the blade group 265. The blade group 265 and support 275 having a clip 175 for attaching to the substrate structure 215. A tactile discrimination distance 285 is also illustrated inside the tip of the blade group 265 and the support 275. Although a user may replace the blade group 265 a support 275 in FIG. 47 takes the form of an electric trimmer 277. It is more beneficial to have both the support 275 taking form of an electrical trimmer 277 may lead when stroking the safety razor 105 against a skin surface in order to first trim the hair down with the blade group 265 trailing the support 275 embodied as electric trimmer 277 in order to then closely shave the trimmed hair that was trimmed by the support 275 taking the form of an electric trimmer 277.

In FIG. 48 a support 275 takes the form of an interchangeable lubricating strip 278 according to an embodiment. In cases where a user wishes to wet shave or shave with the presence of water with a shaving lubrication it would be beneficial for a user to removably hold the support 275 taking form of an interchangeable lubricating strip. An interchangeable lubricating strip 278 is commonly used with safety razors designed for a user's face, however, it is not common to have an interchangeable lubricating strip 278 functioning as the support 275 as seen in FIG. 48. Most safety razors found in most markets have a lubricating strip 278 attached with a safety razor and both safety razor and lubricating strip 278 are disposable. The interchangeable lubricating strip 278 may also contain a solid or liquid soap substance for lubrication. In my invention a user may choose to not dispose of the substrate structure 215 but rather dispose of the support 275 taking the form of an interchangeable lubricating strip 278.

Figure 49:
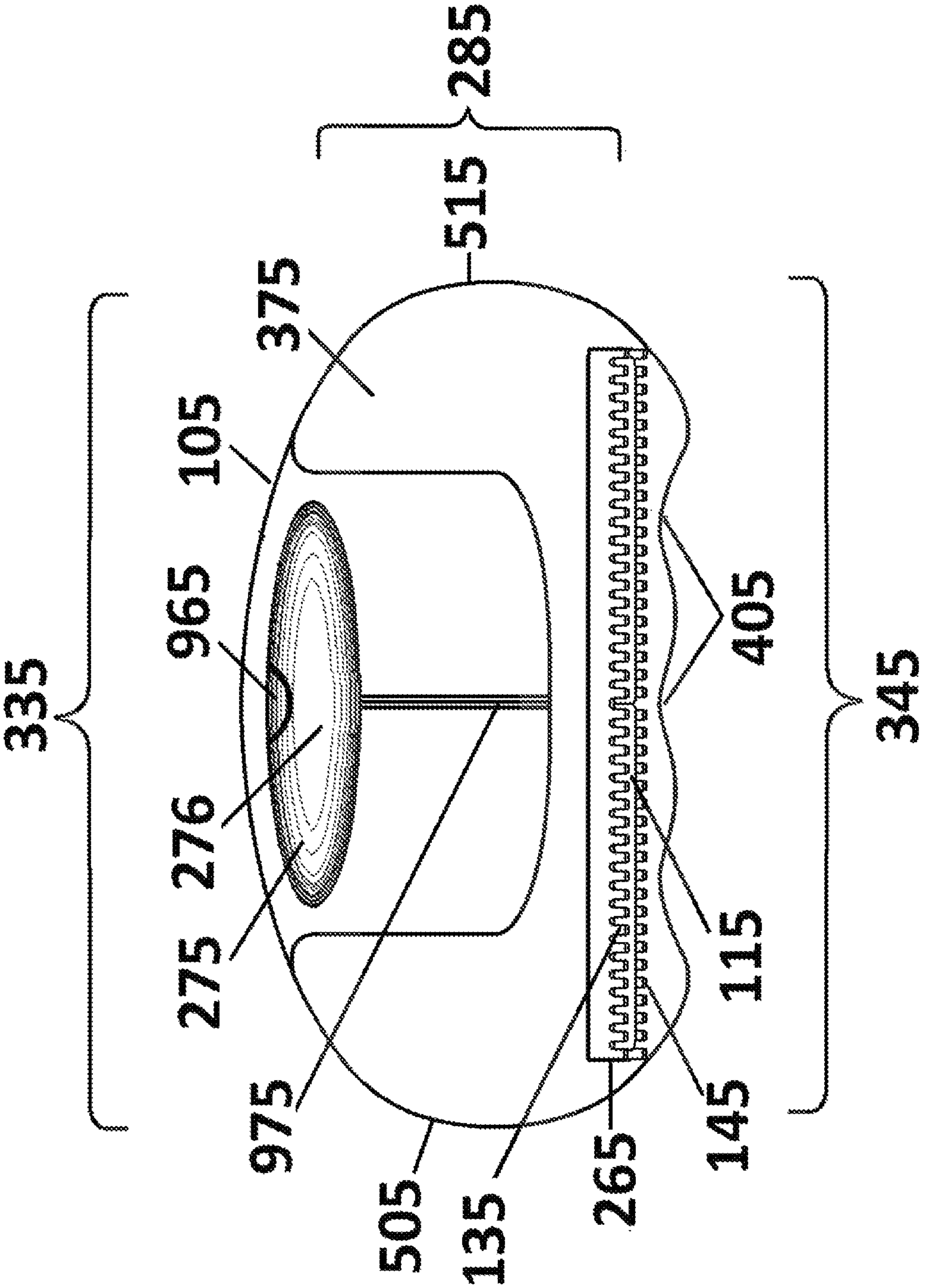
FIGS. 49-50 illustrate front views of a safety razor with a channel inside of a blade group and a support according to embodiments of the present inventions.
Figure 50:
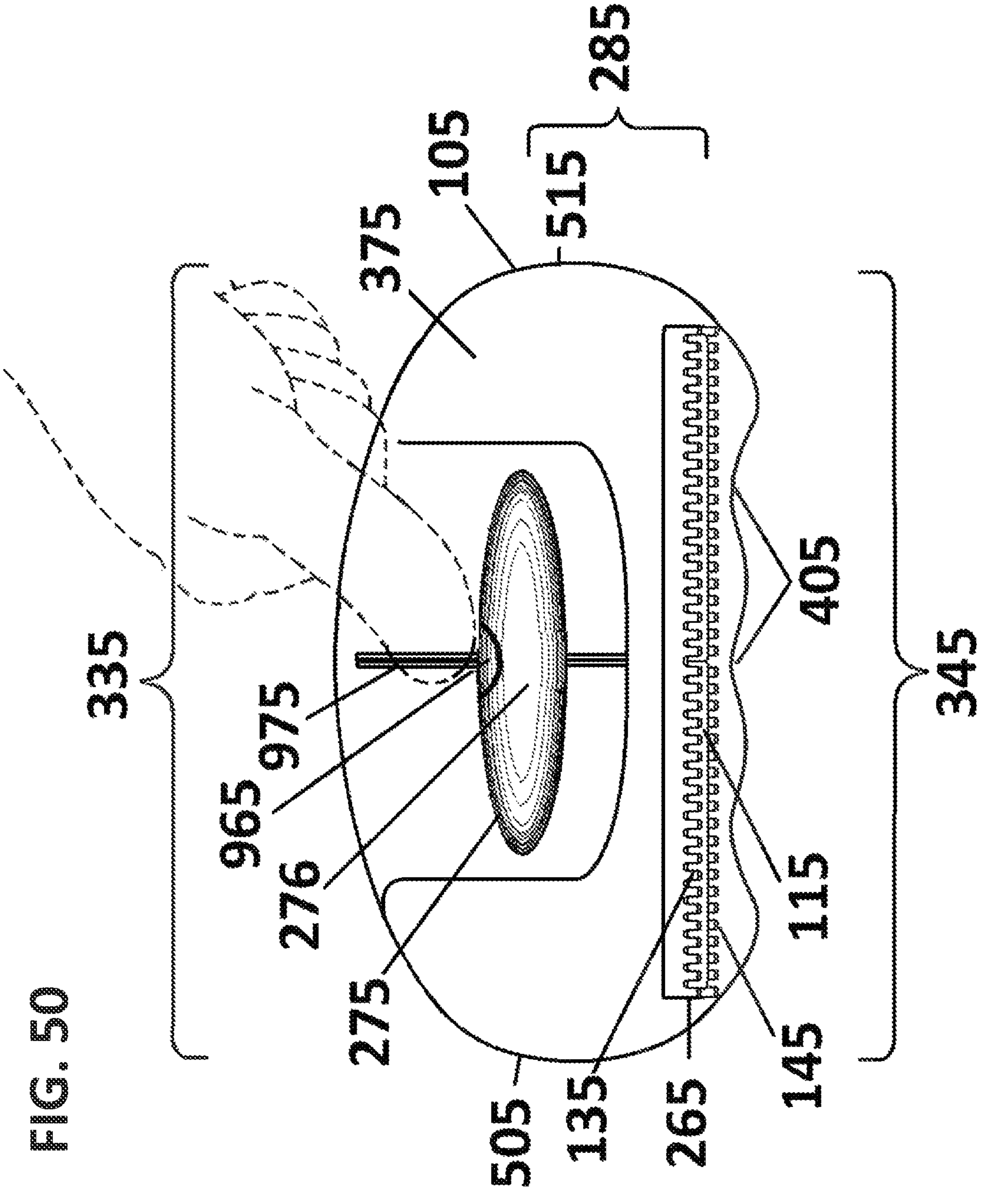

FIGS. 49-50 illustrate front views of a safety razor 105 for two-point discrimination having a top side 335, a bottom side 345, a safety razor left side 505, a safety razor right side 515, wherein the top side 335 is opposite the bottom side 345 and the safety razor left side 505 is opposite the safety razor right side 515. The safety razor 105 having a front surface 375 with a blade group 265 and a support 275 wherein the blade group 265 and support 275 are separated with a tactile discrimination distance 285 at a distance sufficient for two-point discrimination. A channel 975 is inside the blade group 265 and the support 275 allowing alternate distances between the blade group 265 and the support 275. In FIGS. 49-50 the support 275 having a lock and release 965. However, in an alternate embodiment the blade group 265 may move through the channel 975 as well. The blade group 265 having an inner guard 135, an outer comb 145 and a sharp blade 115. In FIGS. 49-50 the support may comprise at least one blunt protrusion 276 for safely poking into the skin surface A. Furthermore, the tip of the blade group 265 may also have a blunt protrusion. The support 275 may comprises more than one blunt protrusion 276 wherein each blunt protrusion 276 may be at staggered locations. In fact, there may be three blunt protrusions 276 at staggered locations.

Finger depressions 405 are illustrated in FIGS. 49-50 along the bottom side 345 of the safety razor 105. The safety razor 105 may be removably detached from the elongated handle in order for a user to grasp the safety razor 105 and shave with said safety razor 105 against easy-to-reach areas such as the chest or shoulder area. The finger depressions 405 allow a user to more easily grasp the safety razor 105. The finger depressions 405 may, in an alternate embodiment, be on the top side 335, the safety razor left side 505 or the safety razor right side 515. In FIG. 50 a user's hand is illustrated with dashed lines in order to illustrate how a user may press the support 275 or the lock and release 965 of the support 275 and may move the support 275 through the channel 975 and closer to the blade group 265. Furthermore, it can be seen that the tactile discrimination distance 285 in FIG. 50 has become a lesser distance in comparison to FIG. 49. In FIGS. 49-50 the channel 975 stretches vertically from the top side 335 to the bottom side 345 of the safety razor 105 substrate structure 215. It can seen that in FIGS. 49-50 an alternate embodiment is presented wherein the inner guard 135 may be embodied as a comb inside of the outer comb 145. An inner guard 135 with a comb may allow a user to have multiple edges on the inner guard 135 tip which may help indenting into the skin during shaving. Furthermore, when the inner guard 135 has a comb, the inner guard 135 may better exfoliate and removing dead skin during the shaving process since the inner guard 135 with a comb has multiple points on the inner guard 135 tip for dragging against the dead skin surface.

Having a channel 975 that is parallel with the front surface allows the height X of both the blade group 265 and the support 275 to remain somewhat equal. In another embodiment the channel 975 may be at an angle in relation to the front surface of the safety razor 105. This allows the height X of the blade group 265 to become different that the height X of the support 275 which will be further illustrated in the upcoming FIGS. 51-52.

Figure 51:
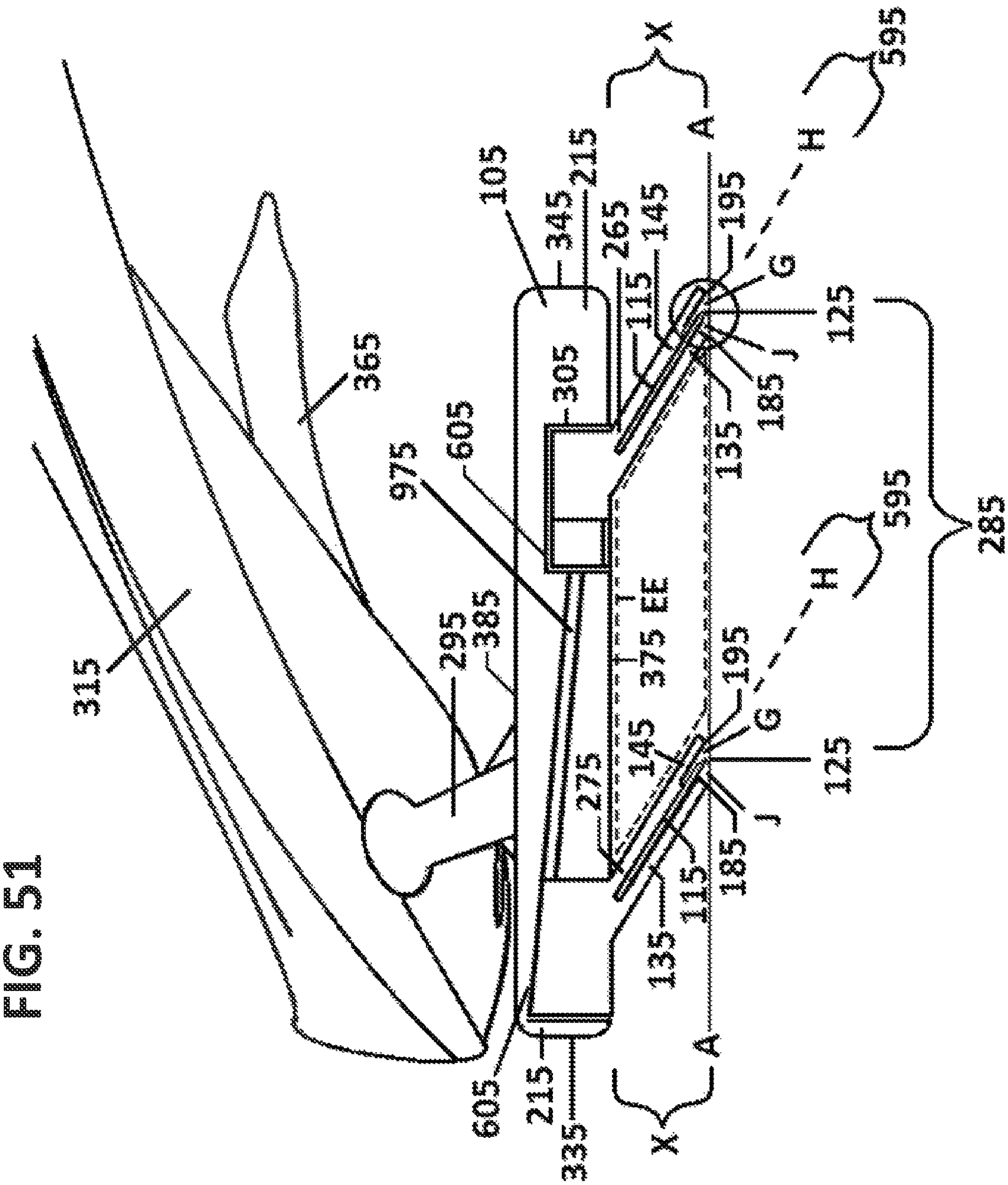
FIGS. 51-52 illustrate close up side views of a safety razor and elongated handle for tactile feedback according to embodiments of the present inventions.

FIGS. 31-32 illustrate close up side views of a safety razor and elongated handle according to embodiments of the present inventions. The elongated handle 315 has a handle clip 365 removably attaching to a safety razor 105 for two-point discrimination along a skin surface plane A and the safety razor 105 having a blade group 265 and a support 275 according to an embodiment of the present inventions. The safety razor 105 having a top side 335, a bottom side 345, a front surface 375, and a rear surface 385, wherein the top side 335 is opposite the bottom side 345 and the front surface 375 is opposite the rear surface 385. The rear surface 385 having a handle attachment 295 for removably attaching to a blade attachment of the elongated handle 315. The safety razor 105 having a substrate structure 215 for removably attaching the blade group 265 and the support 275 wherein the blade group 265 and support 275 are separated with a tactile discrimination distance 285 at a distance sufficient for two-point discrimination. The tactile discrimination distance 285 having an elevational gap EE inside the tactile discrimination distance 285 which may be deep or shallow. A height X measured from the front surface 375 to the tips of the blade group 265 or support 275. A channel 975 is inside the top side 335 and the bottom side 345 of the safety razor 105 and inside the front surface 375 and the rear surface 385 and said channel 975 allowing alternate distances for two-point discrimination between the blade group 265 and the support 275. In FIG. 51 the channel 975 is at an alternate angle in relation to the front surface 375 of the substrate structure 215 or safety razor 105. This allows multiple alternate angles between the midpoint H of the blade group 265 and support 275 in relation to the skin plane A. For example, in FIG. 51 the midpoint H in relation to the skin surface A is 30 degrees while in FIG. 52 the midpoint H in relation to the skin surface A is 40 degrees. Not only has the angle of the midpoint H in relation to the skin surface A changed, when comparing FIG. 51 to FIG. 52, but also in FIG. 52 the tactile discrimination distance 285 has become lesser in distance when comparing to FIG. 51. Furthermore, it can be seen that the height X between the front surface 375 and the tip of the support 275 is greater than the height X between the front surface 375 and the tip of the blade group 265. In another alternate embodiment the channel 975 may not be at an angle in relation to the front surface 375 of the safety razor 105 but may be parallel with the front surface 375. This allows the support 275 and blade group 265 to be allowed multiple distances from each other without altering the angle between the midpoint H and the skin surface A.

Figure 52:
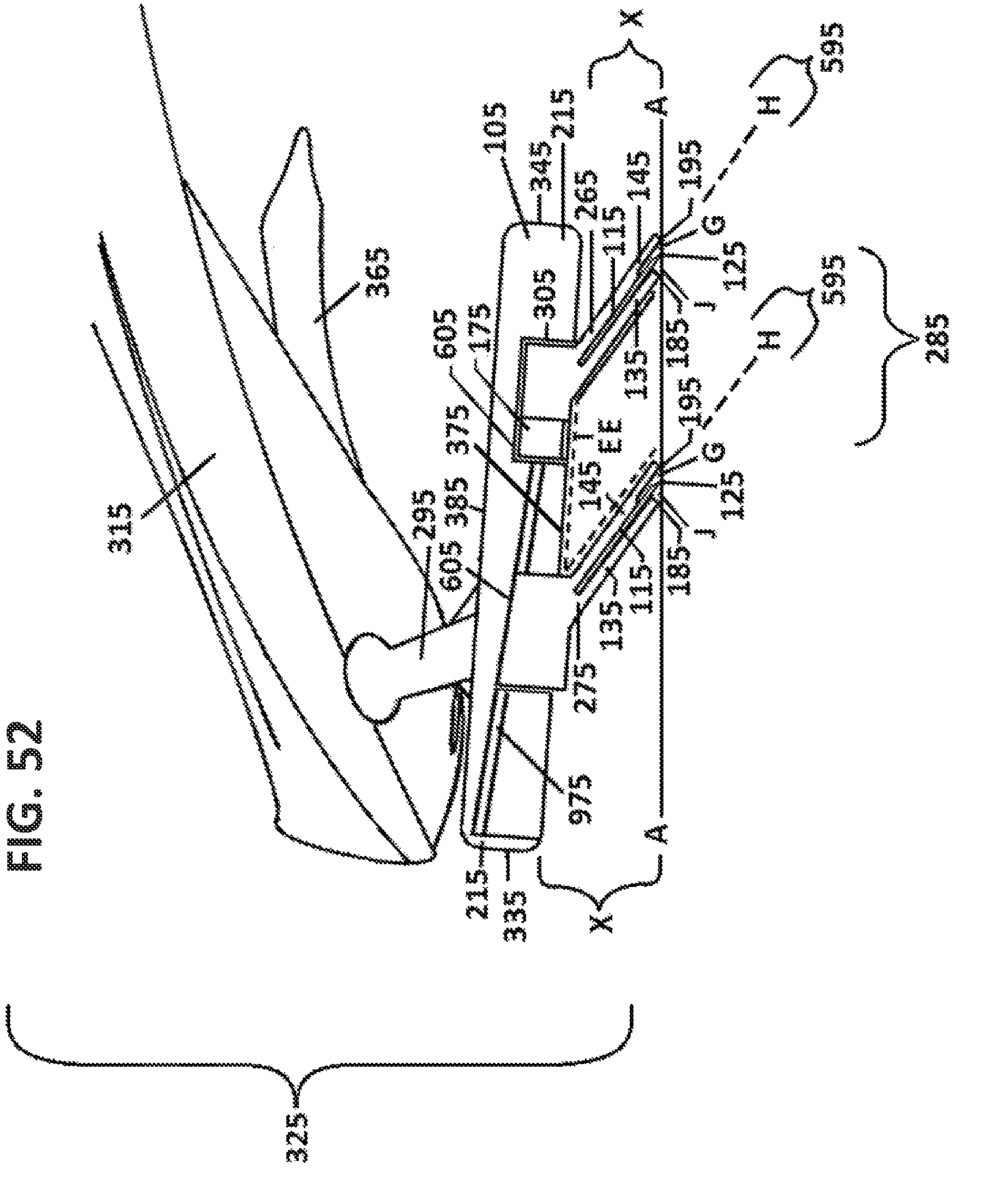

In FIGS. 51-52 the blade group 265 and support 275 embodied as a blade group comprising at least one sharp blade 115 comprising a sharp edge 125 facing towards a skin surface A comprising an outer comb 145 comprising an inside edge 195, an inner guard 135 comprising an inner guard outer edge 185. Both the blade group 265 and the support 275 having bottom side 605 and a top side 595 where a midpoint H is embodied. A trailing opening J wherein the trailing opening J is inside of the outer edge 185 and the sharp edge 125 of the sharp blade 115. A leading opening G wherein the leading opening G is inside of the inside edge 195 and the sharp edge 125 of the sharp blade 115. A portion of the inner guard 135 inside of the outer edge 185 and sharp edge 125 is removed in order to create a trailing opening J inside of outer edge 185 and a sharp edge 125 of a sharp blade.

Figure 53:
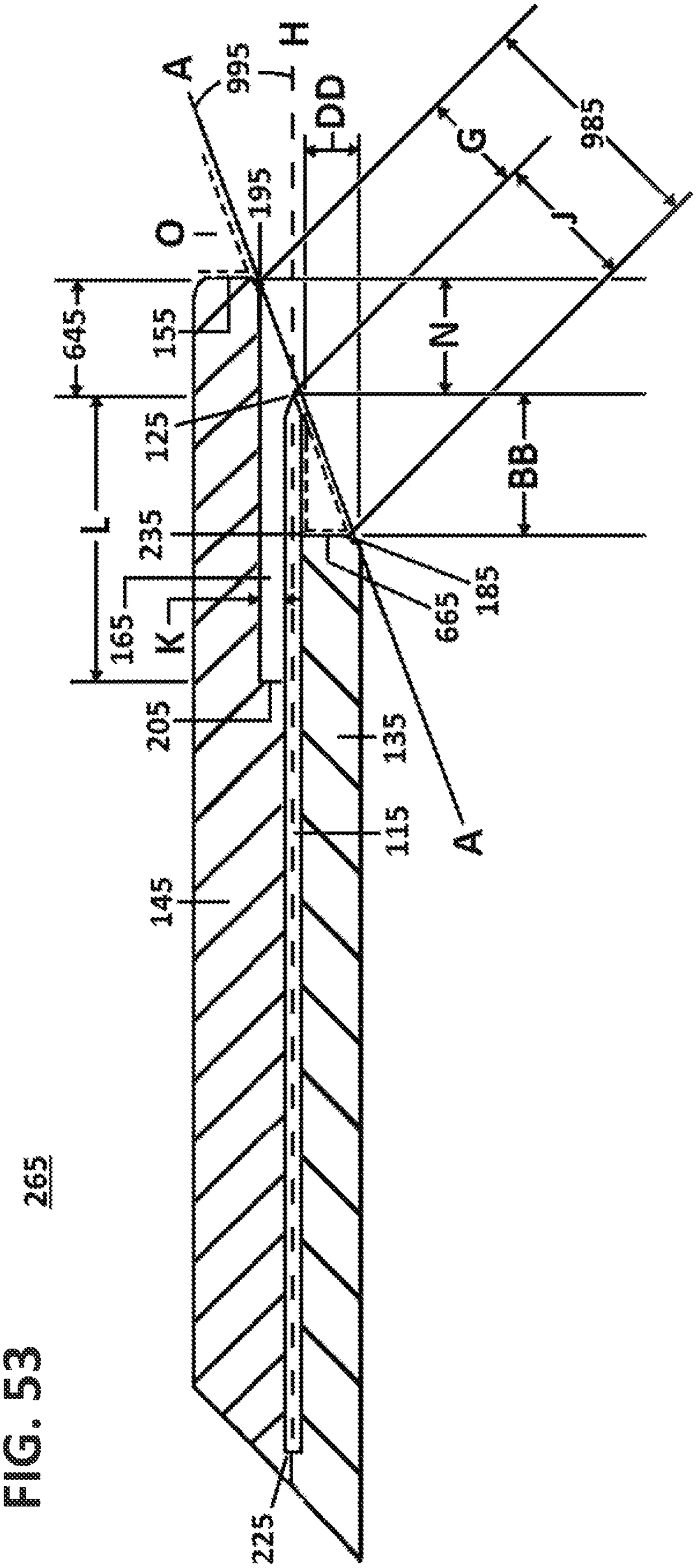
FIGS. 53-55 illustrate close up cross-sectional views of a blade group for tactile feedback according to embodiments of the present inventions.
Figure 54:
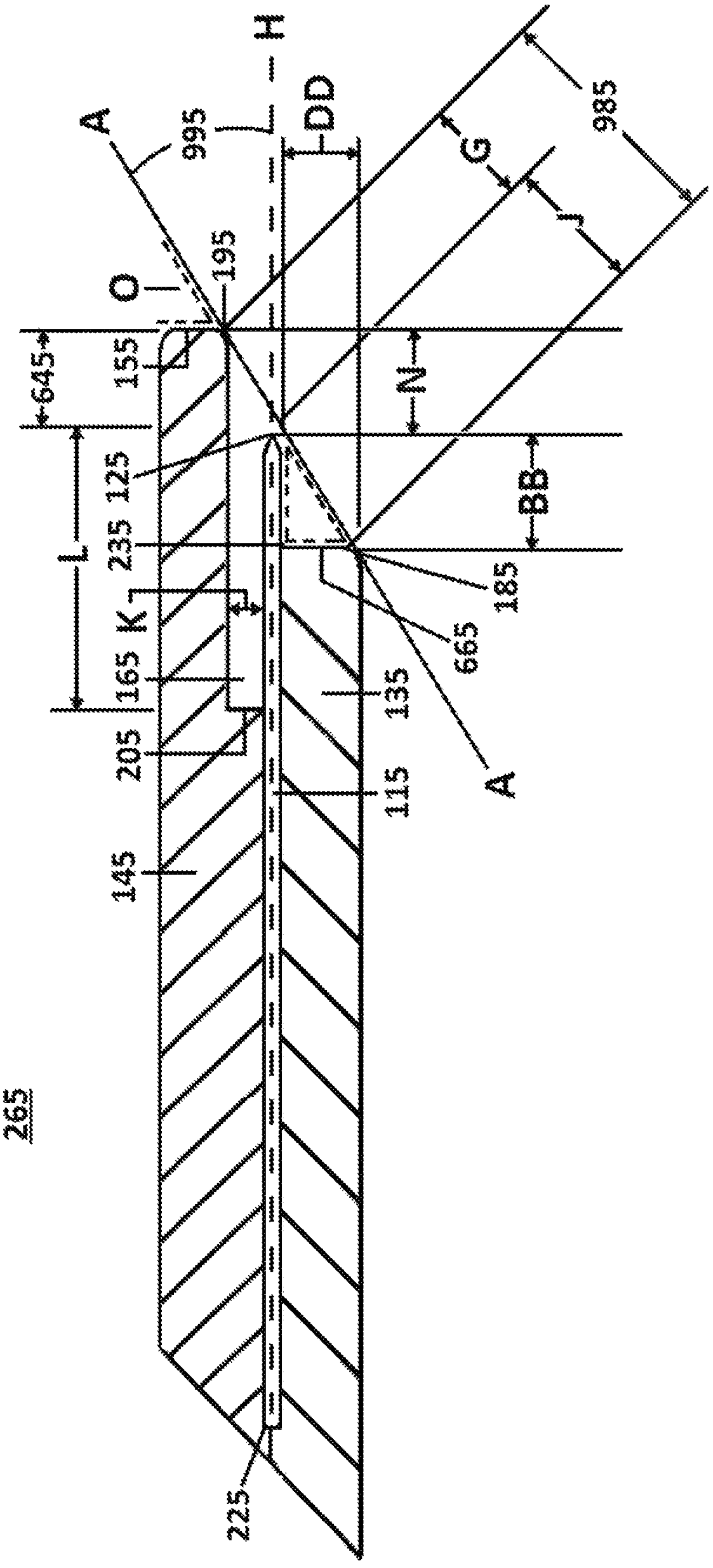
Figure 55:
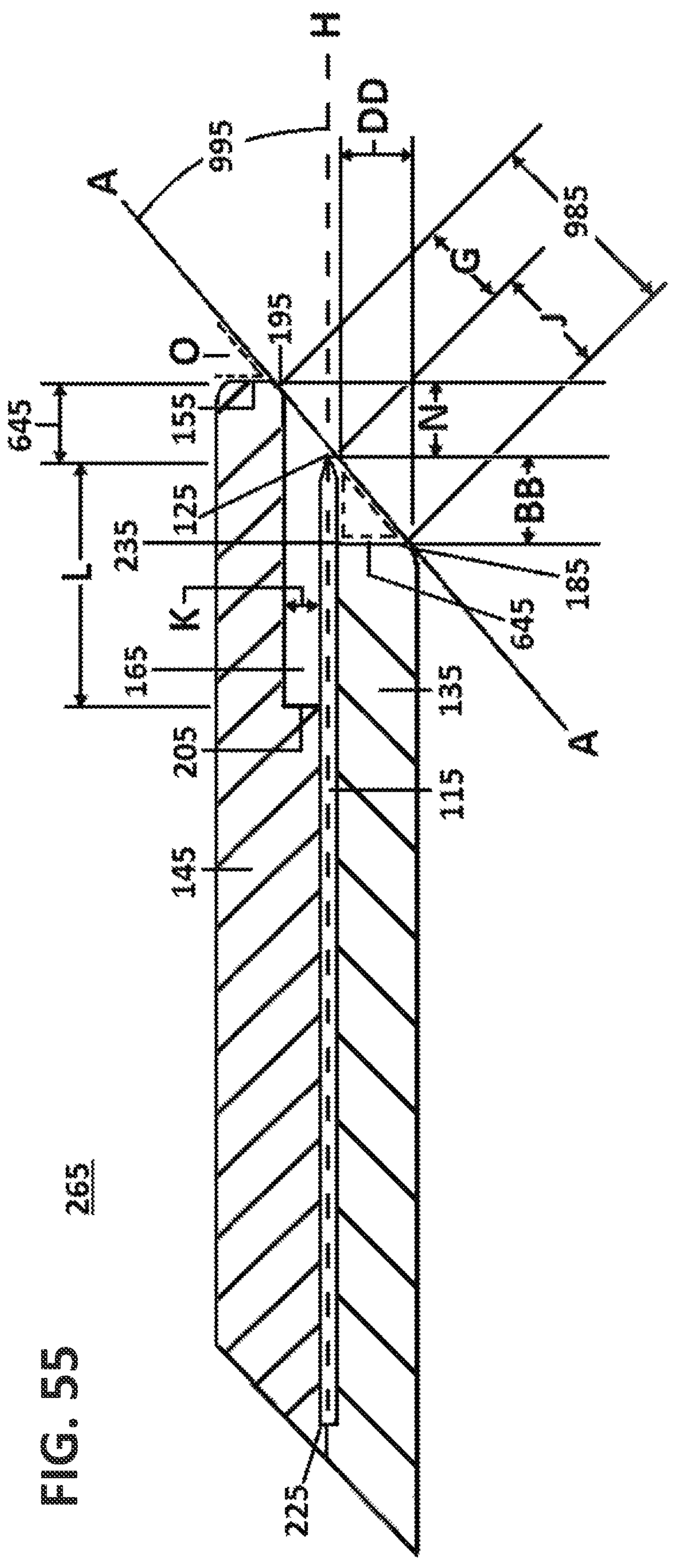

FIGS. 53-55 illustrate a close up cross-sectional view of a blade group 265 according to embodiments of the present inventions. A blade group 265 comprising at least one sharp blade 115 comprising a sharp edge 125 facing towards a skin surface A comprising an outer comb 145 comprising an inside edge 195, an outer comb outer wall 155, and an outer comb inside wall 645 on the inside of the outer comb 145 and inside of the sharp edge 125 and inside edge 195 and an inner guard 135 comprising an inner guard outer edge 185, an inner guard inside end 235 and an inner guard inside wall 665 of the inner guard 135 inside an outer edge 185 and an inner guard inside end 235. The comb inside wall 645 is adjacent to the sharp blade 115 and inside the inside edge 195 and sharp edge 125 of the sharp blade 115 in order to be a barrier for a skin convex during a shaving stroke. Inner guard inside end 235 is embodied where the inner guard 135 and the sharp blade 115 meet. An inside portion of the outer comb 145 removed in order to create a deep void 165. The sharp blade 115 is fixedly anchored on a sharp blade end 225 opposite the sharp edge 125 of the sharp blade 115. A base 205 is positioned to create a level of distance between said base 205 and the sharp edge 125 of the sharp blade 115 in order to enable a controlled level of flexibility with the sharp blade 115. The deep void 165 is spaced intermediately of the outer comb 145 and sharp blade 115. Deep void 165 thickness allowing a level of control over the flexibility of the sharp blade 115 as well as over-exposure of the sharp blade 115. Deep void 165 having a thickness which is represented as K. Thickness K of deep void 165 is about 0.7262 millimeters or less. In a preferred embodiment distance K is 0.381 millimeters. Thickness K of deep void 165 may run thicker but the danger of enabling the sharp blade 115 to become like a dagger in relation to the skin surface becomes increasingly probable. The level of distance of the deep void 165 between the base 205 and the sharp edge 125 of the sharp blade 115 is referenced as L. The distance L is about 4.57 millimeters or less. A preferred distance of distance L is about 2.03 millimeters. Distance L may be less or greater than the preferred distance.

An inner rearward distance B from the sharp edge 125 of the sharp blade 115 to the inner guard edge of the inner guard 135 in relation to an outer rearward distance N from the inside edge 195 of the outer comb 145 to the sharp edge 125 of the sharp blade 115 has a ratio of about 1. In other words, in this embodiment, the inner rearward distance B and the outer rearward distance N are substantially the same. The inner rearward distance B from the sharp edge 125 of the sharp blade 115 to the inner guard edge of the inner guard 135 is about 0.508 mm to about 1.016 mm A preferred inner rearward distance B from the sharp edge 125 of the sharp blade 115 to the inner guard 135 is about 0.762 mm. Also, the outer rearward distance N from the inside edge 195 of the outer comb 145 to the sharp edge 125 of the sharp blade 115 is about 0.508 mm to about 1.016 mm A preferred outer rearward distance N from the inside edge 195 to the sharp edge 125 is about 0.762 mm. In this discussion of an additional embodiment the diagonal distance 985, diagonal distance J, and diagonal distance G are also affected and have alternate dimensions as well. Diagonal distance 985 may be about 1.54 mm to about 2.54 mm A preferred diagonal distance 985 is about 2.3622 mm. Diagonal distance J may be about 0.762 mm to 1.6 mm A preferred distance J is about 1.4986 mm Diagonal distance G may be about 0.254 mm to about 0.889 mm. A preferred diagonal distance G is about 0.8636 mm. Furthermore, the inner guard 135 has an inside end 235 and an outer edge 185 wherein the distance between the inner guard 135 inside end 235 and the outer edge 185 is considered the inner guard 135 inside wall 665. The inside wall 665 distance is referenced as distance DD. Distance DD is about 0.381 mm to about 0.889 mm A preferred distance DD is about 0.61 mm. The distance DD is the same or greater than a thickness “K” of a deep void 165. Note that diagonal distance J is substantially equal or greater than distance G. Note that the skin convex enters and stretches inside of the outer edge 185 and inside edge 195 it is preferable to have a greater diagonal distance J in comparison to diagonal distance G. Having a greater diagonal distance J allows the stretching skin convex to press against the sharp blade 115 and bending the sharp blade 115 towards the inside of the outer comb 145. If diagonal distance J was less than diagonal distance G the skin convex will have a harder time pressing the sharp blade 115 towards the inside of the outer comb 145 and the sharp blade 115 becomes more likely to poke into the skin as a dagger instead of at an cutting angle between the sharp edge 125 of the sharp blade 115 and the skin surface.

The inner edge of the inner guard 135 and the inside edge 195 of the outer comb 145 in practice are blunt or curved edges because no corner is perfectly sharp or square. If the inner edge of the inner guard 135 and the inside edge 195 of the outer comb 145 were perfectly sharp or square, they would risk cutting into the skin or feel uncomfortable. That being said, there may be at a slightly square edge sufficient to indent and grip the skin in order for the skin inside of the inside edge 195 and the inner guard 135 to stretch. These ends are the outermost horizontal dimension to the end or tip of the inner guard 135 or the outer comb 145. Therefore the inner rearward distance B and outer rearward distance N are stated measured from respective ends of the inner guard 135 and the outer comb 145.

It should be understood that outer comb inside wall 645 creates a barrier for a skin surface convex to enter inside of the inside edge 195 and outer edge 185. The outer comb 145 having an outer wall 155 which in another embodiment may also be rounded with an arc instead of a straight wall. The midpoint of a portion of the non-flexing sharp blade 115 is referred to as midpoint H which is illustrated with a straight or flat dashed line. In FIGS. 53-55 the inner guard 135 and outer comb 145 are not indenting into the skin surface A and thus the sharp blade 115 is not pressing against the skin surface A and the sharp blade 115 is not flexing.

As seen in FIGS. 53-55 a portion of the inner guard 135 inside of the outer edge 185 and sharp edge 125 is removed in order to create a trailing opening J inside of outer edge 185 and a sharp edge 125 of a sharp blade. In FIGS. 53-55 the trailing opening J is illustrated as a dashed triangle inside of the outer edge 185 of the inner guard 135 and the sharp edge 125 of the sharp blade 115. The trailing opening J cross sectional has three triangular corners or vertices which have three walls but it is not a perfect triangle being that the three walls or sides of the vertices are not always flat. This is especially true of the sharp blade 115 and the skin surface A which both flex under pressure. The sharp blade 115, which forms one of the walls or sides, will flex and bend which is key in situations where a less rigid blade is necessary to create a softer shaver against a skin surface A. The inner guard inside wall 665 of inner guard 135 which starts from the outer edge 185 and ends at the inner guard inside end 235 of the inner guard 135 creates a second wall or side. The inner guard inside wall 665 of inner guard 135 does not need to be a straight wall but in another embodiment may be rounded with an arc. The skin surface A is the third and final wall or side which also deforms and will convex. The skin surface A starts from the sharp edge 125 and ends at the outer edge 185. The trailing opening J allows the skin to deform and tighten itself in order for the sharp blade 115 to access the base of a hair which results in a shave that leaves a smooth skin surface after a shaving stroke. In FIGS. 53-55 the first of the vertices is where the inner guard inside end 235 and the sharp blade 115 meet. The second of the vertices is where the sharp blade 115 and the skin surface plane A intersect. The second vertices may also be where the sharp edge 125 of the sharp blade 115 and the skin surface plane A meet. The third of the vertices is where the skin surface A and the outer edge 185 of the inner guard 135 meet. The vertices work to together to form the planes that create trailing opening J or void allowing for a sufficient opening or void for tightening skin to enter and convex. It should also be known that the inner guard inside wall 665 controls the amount of skin convex allowed inside as does the outer comb inside wall 645. In FIGS. 53-55 the trailing opening J allows for a sufficient void or space for tightening skin to enter and convex in order for the sharp blade 115 to gain access to a base of a hair. A leading opening G is inside of the inside edge 195 and the sharp edge 125 of the sharp blade 115. Leading opening G allows a sufficient opening in order for a skin convex to safely press against the sharp edge 125 of the sharp blade 115 when pressing the blade group 265 against the skin surface A. In FIGS. 53-55 the blade group 265 is not yet pressing into the skin surface A and thus the sharp blade 115 is illustrated in a stationary position.

The first dimension of opening G across the gap thickness K measured diagonally between the sharp edge 125 of the sharp blade 115 and the inside edge 195 of the outer comb 145 is less than or equal to a second dimension of the opening J inside the inner guard 135 measured diagonally between the sharp edge 125 of the sharp blade 115 and the outer edge 185 of the inner guard 135. The leading opening G is inside the inside edge 195 of the outer comb 145 and the sharp edge 125 of the sharp blade 115. The distance of G is the diagonal distance between the inside edge 195 of the outer teeth 145 and the outer edge 185 of inner guard 135 and is about 1.524 millimeters or less. A preferred distance of G or the diagonal distance between the inside edge 195 of the outer teeth 145 and the outer edge 185 of the inner guard 135 is about 0.889 millimeters.

The trailing opening J inside the outer edge 185 of the inner guard 135 and the sharp edge 125 of the sharp blade 115. The distance of J is the diagonal distance between the outer edge 185 of inner guard 135 and the sharp edge 125 of the sharp blade 115 and is about 1.905 millimeters. A preferred distance of J or a diagonal distance between the outer edge 185 of the inner guard 135 and the sharp edge 125 of the sharp blade 115 is about 1.4224 millimeters.

A diagonal distance inside the inside edge 195 of the outer comb 145 and the outer edge 185 of the inner guard 135 is referenced as distance 985. Distance 985 is 2.286 or less. A preferred distance of 985 or the diagonal distance between the inside edge 195 of the outer teeth 145 and the outer edge 185 of inner guard 135 is about 1.7272 millimeters.

Note that in FIGS. 53-55 the angle of the outer edge 185 and the inside edge 195 in relation to the midpoint H is referred to angle 995. Angle 995 may be 40 degrees or less. A preferred angle of angle 995 is about 20 degrees. FIGS. 53-55 illustrates a range of alternate angle that angle 995 may take form. For instance, in FIG. 53 angle 995 is 20 degrees, in FIG. 54 angle 995 is 30 degrees while in FIG. 55 angle 995 is 40 degrees.

An angle between the skin plane A and the outer wall 155 of outer comb 145 is referenced as vertex O. Vertex O is an angle created in order to allow the outer comb 145 to better indent into the skin surface A allowing the blade group 265 to shave properly.

Figure 56:
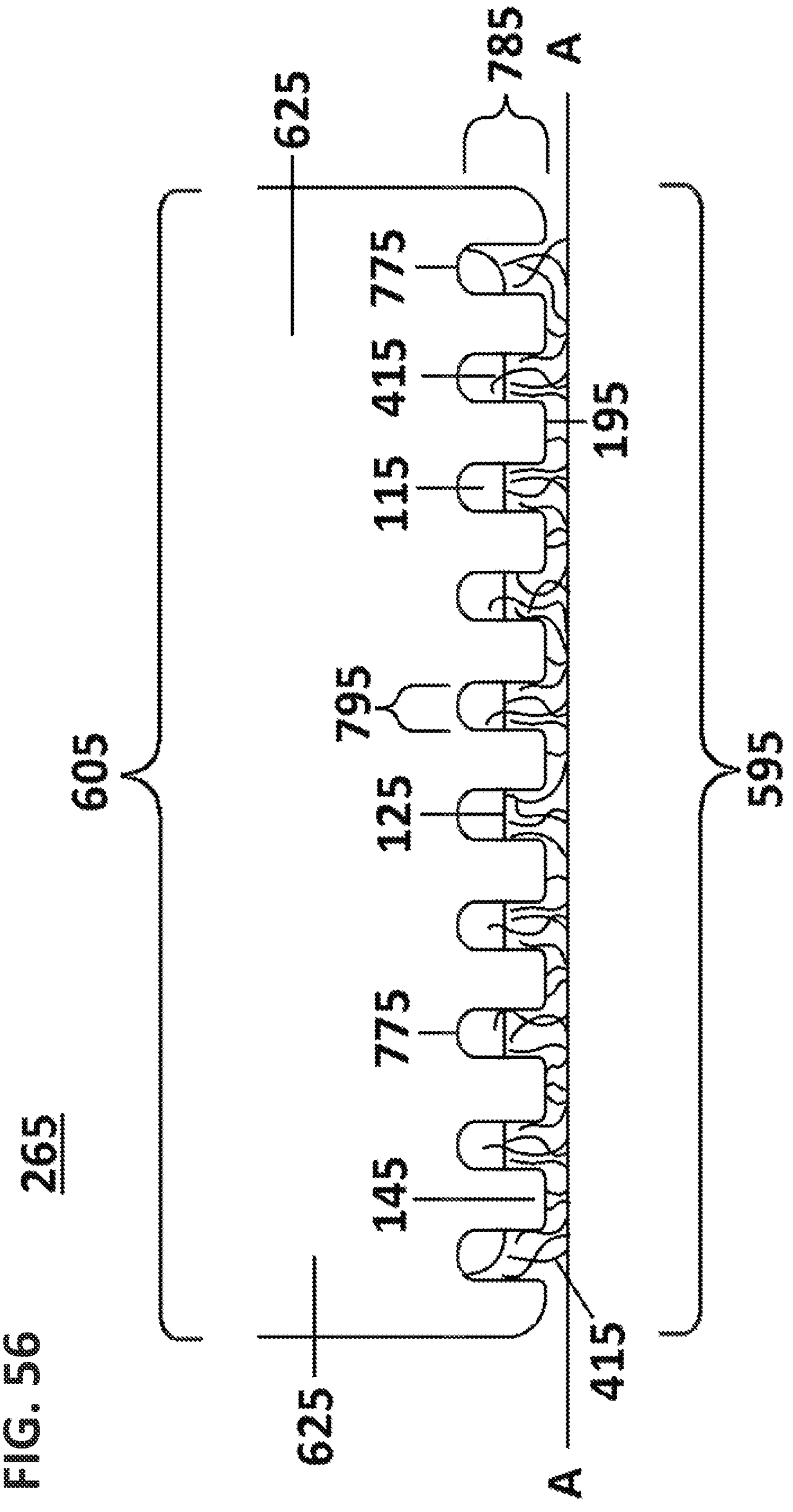
FIGS. 56-57 illustrate close up views of a blade group rear surface of a blade group for tactile feedback according to embodiments of the present inventions.
Figure 57:
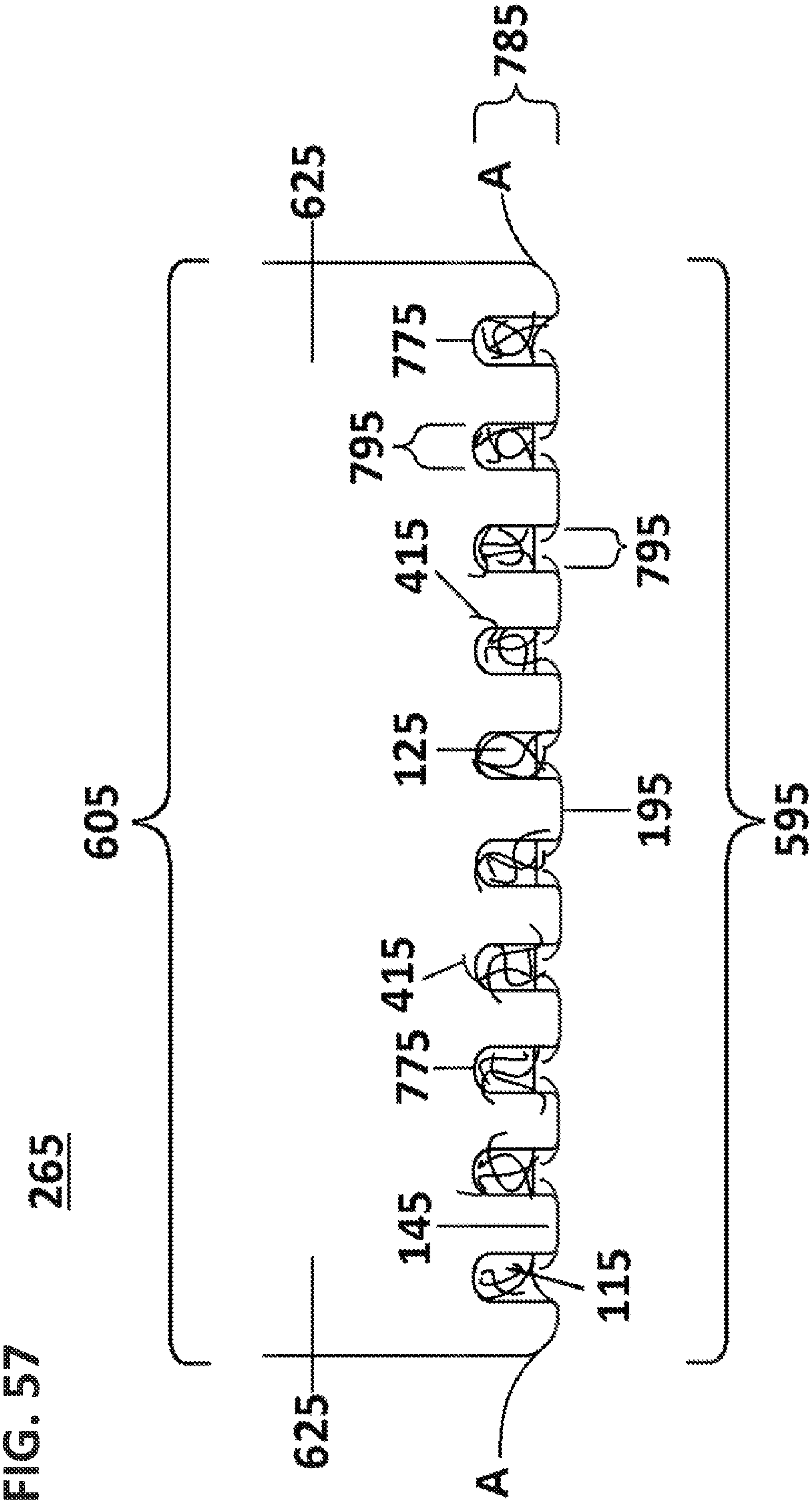

FIGS. 56-57 illustrates close up views of a blade group rear surface 625 of a blade group 265 having a top side 595, a bottom side, 605 wherein the top side 595 is facing a skin plane A opposite the bottom side 605. The blade group 265 having an outer comb 145 with an inside edge 195 and a sharp blade 115 with a sharp edge 125 and the sharp blade 115 is opposite the blade group rear surface 625. As can be seen in FIGS. 56-57 the outer comb 145 having a tooth end 775, a tooth length 785 and a tooth width 795 wherein the tooth length 785 illustrates the length of the outer teeth 145 or outer comb 145 stretching from the tooth end 775 to the inside edge 195 of the outer comb 145. The tooth width 795 illustrates the width of the opening gap inside of at least two teeth 145. In FIG. 56 it can be seen that hair 415 is illustrated inside of the tooth end 775 and the sharp edge 125 of the inside edge 195. Although in FIG. 56 the blade group 265 is not pressing into the skin plane A it can be seen that the hair 415 may move inside of the tooth end 775 and the inside edge 195 when approaching the skin surface A which often times may cause hair 415 to clog and get stuck inside of the blade group 265 after being shorn as in FIG. 57. In order for a user to easily clean the blade group 265 with a cleaning brush it is preferred that the tooth end 775 be inside of the sharp edge 125 of the sharp blade 115 as illustrated in FIGS. 56-57. As it can be seen in FIG. 57 after the user has performed a shaving stroke the hairs 415 have collected inside of the tooth end 775 and inside edge 195. However, since the tooth length 785 stretching from the inside edge 195 to the tooth end 775 inside the sharp edge 125 the user is able to access all of the shorn hairs collected inside the sharp blade 115 and outer comb 145.

Figure 58:
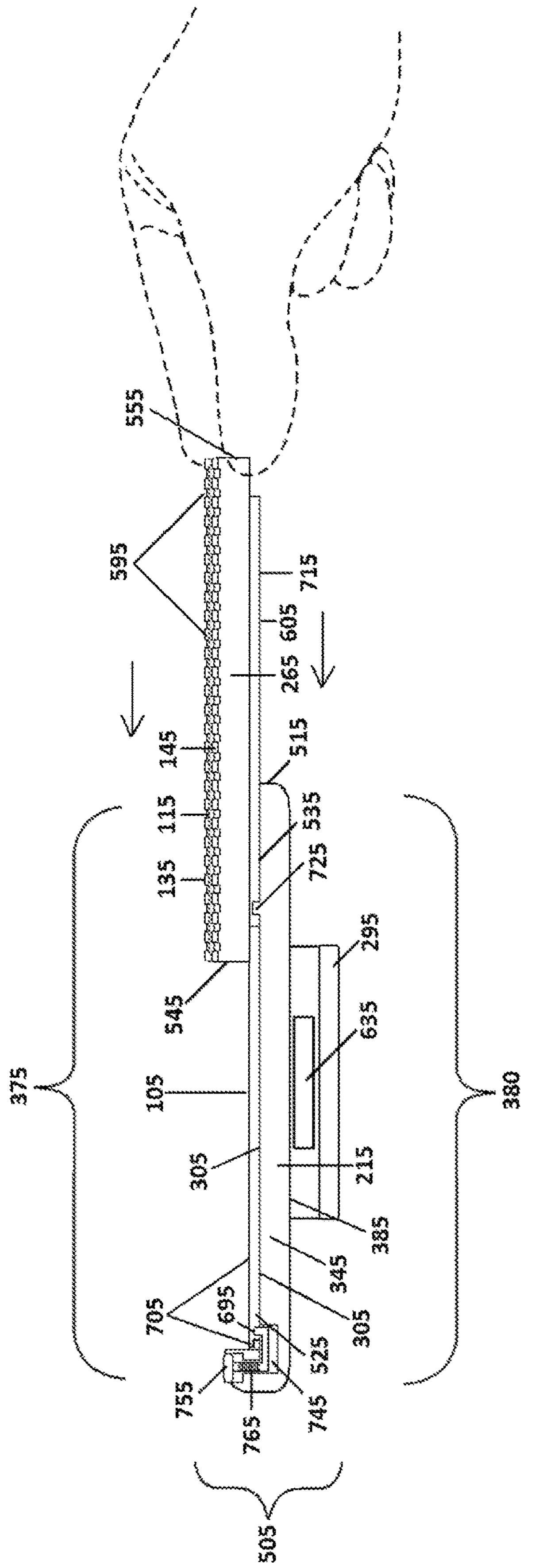
FIGS. 58-59 illustrate an eye-level view of a safety razor for tactile feedback according to embodiments of the present inventions.
Figure 59:
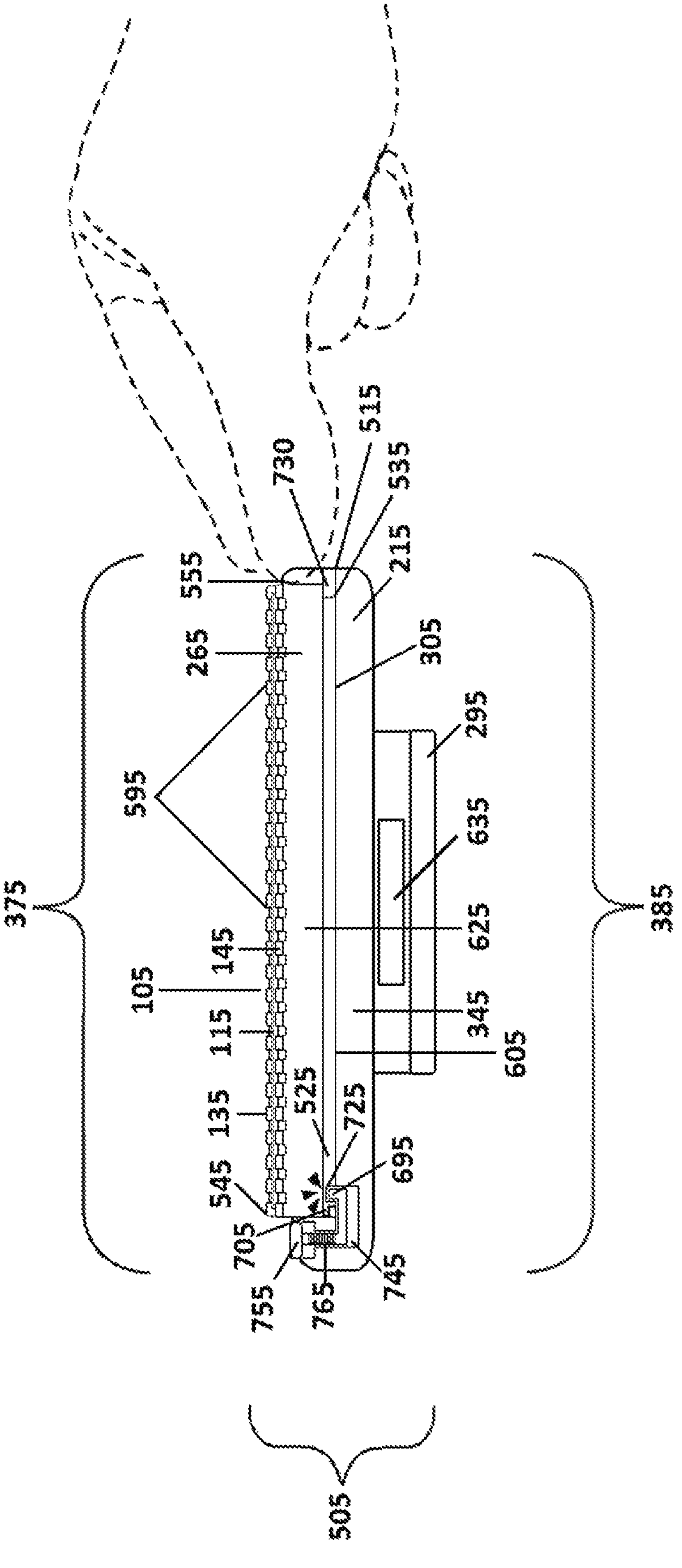

FIGS. 58-59 illustrate an eye-level view of the bottom side 345 of a safety razor 105 for two-point discrimination according to an embodiment where a blade group 265 has a sharp blade 115 and an inner guard 135 parallel to the sharp blade 115 on a trailing side of the sharp blade 115 opposite the outer comb 145 wherein an outer comb 145 parallel to the sharp blade 115 on a leading side of the sharp blade 115 and a substrate structure 215 having a groove 305 and adapted to hold the blade group 265 and a support on the front surface 375 of the substrate structure 215 opposite a rear surface 385. In FIGS. 58-39 the blade group 265 having a left attachment side 545 and a right attachment side 555 wherein the left attachment side 545 is opposite the right attachment side 555 and a user's hand, which is illustrated with a dashed line, is removably holding the right attachment side 555 and sliding said blade group 265 along a substrate structure 215 and towards a safety razor left side 505 of the blade group 265 and is sliding the blade group 265 into the groove 305. In the illustration in FIGS. 58-39 the groove 305 of substrate structure 215 having a track 705 while a blade group 265 having a track attachment slot 715 close to the bottom side 605 of the blade group 265 which may have an opening in order for the track 705 to insert into the track attachment slot 715 while a bottom side 605 opposite a top side 595 of the blade group 265 is entering the groove 305 from the safety razor right side 515 opposite a safety razor left side 505. Track attachment slot 715 may have a track attachment secondary slot 725 as illustrated in FIGS. 58-59. The blade group 265 top side 595 is opposite the bottom side 605 and the top side 595 is a portion of the blade group 265 touching a skin surface of a user during a shaving stroke during two-point discrimination. The length of the blade group 265 or a support 275 referenced as support length 575 is the length of the blade group 265 or support 275 inside of the left attachment side 545 and the right attachment side 555. The length of the support length 575 is about 36.322 millimeters or greater. A preferred support length 575 is about 72.644 millimeters.

A substrate structure 215 having an anchor 695 and a lock and release lever 755 with a spring 765 that when said lock and release lever 755 is pushed in a container 745 by a user the anchor 695 may move towards the rear surface 385 of the safety razor 105 and when a user releases the lock and lock and release lever 755 the spring 765 will move the anchor 695 may move towards the front surface 375 of a safety razor 105. In another embodiment the anchor 695 may move towards the safety razor left side 505 or the safety razor right side 515. As seen in FIG. 59 this functionality allows the anchor 695 to move inside the track attachment secondary slot 725 when the anchor 695 moves into the track attachment secondary slot 725 the blade group 265 or support are removably interlocking with substrate structure 215 forming the safety razor 105 for two-point discrimination. As seen in FIG. 59 the anchor 695 is removably interlocking with the track attachment secondary slot 725 which small arrows are illustrating the spring 765 has allowed the anchor 695 to snap into the track attachment secondary slot 725. It should be stated that in another alternate embodiment, the left attachment side 545 and right attachment side 555 of a safety razor 105 may simultaneously removably attach into place with the safety razor left side 505 and the safety razor right side 515 when entering from the front surface 375 of the safety razor 105. In yet another embodiment the lock and release lever 755, spring 765 and anchor 695 may interlock with a blade group 265 and support 275 which are one piece and not separate. In another embodiment a lock and release lever 755, spring 765 and anchor 695 may be embodied on the safety razor right side 515 opposite a safety razor left side 505 or on the front surface 375 or rear surface 385 of the safety razor 105. In yet another embodiment, the handle attachment 295 on the rear surface 385 of a substrate structure 215 having a handle clip insert 635 for when attaching a safety razor 105 to an elongated handle for shaving. In FIG. 59 is an illustration wherein a user has completely attached the blade group 265 to the substrate structure 215. As seen in FIG. 59 a secondary anchor 735 may be embodied near the right attachment side 555 of the substrate structure 215 interlocking the blade group 265 or in another embodiment a support 275 into place. In another embodiment the secondary anchor 735 may be on the left attachment side 545. Also, in alternate embodiments the other parts found in FIGS. 58-59 be may located on opposite side of ends of the substrate structure 215 and will still perform effectively.

Figure 60:
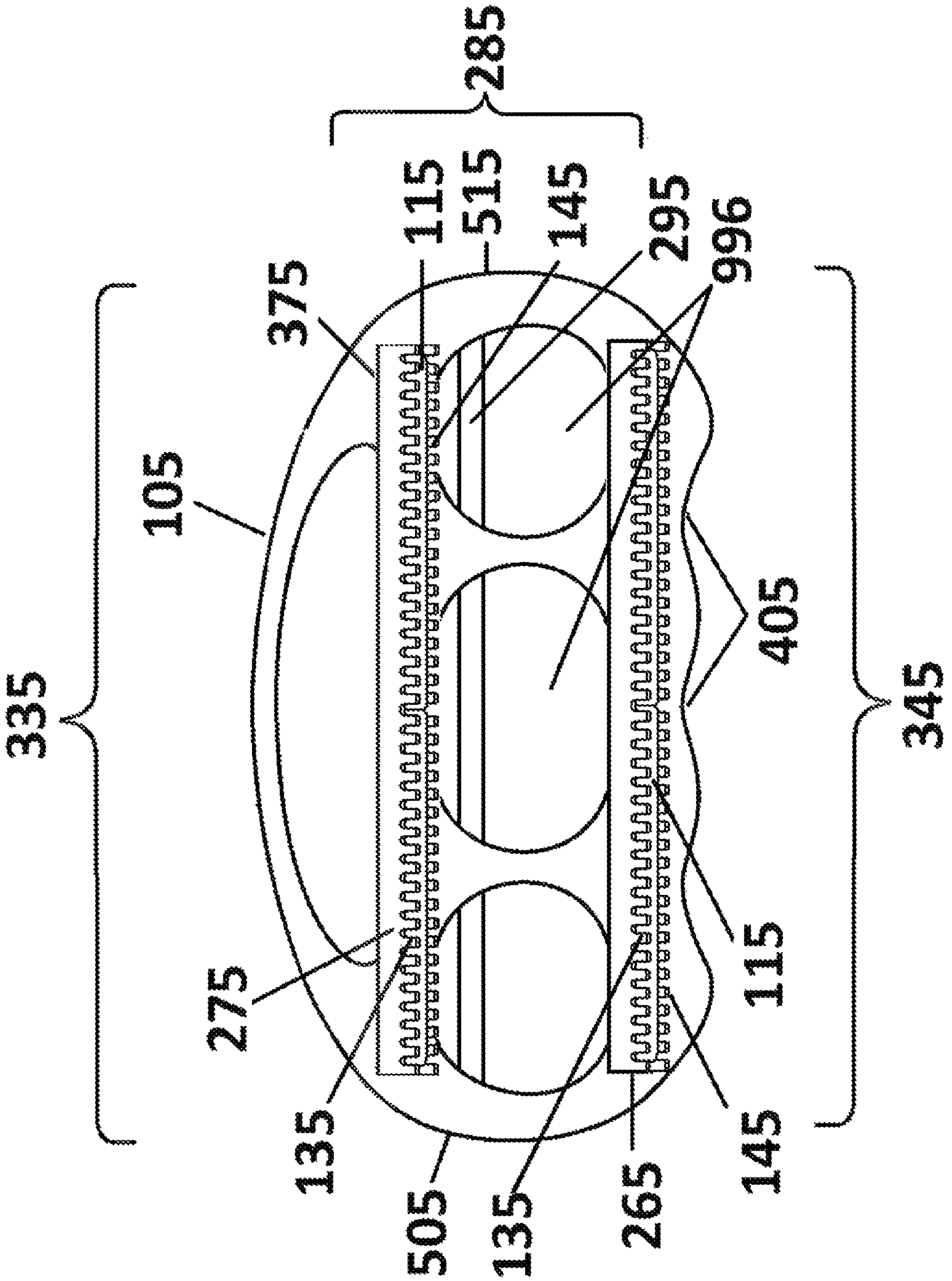
FIG. 60 illustrates a front view of an alternate embodiment of a safety razor with a skeletal structure according to embodiments of the present inventions.

FIG. 60 illustrates a front view of an alternate embodiment of a safety razor 105 with a skeletal structure. The safety razor 105 has a top side 335, a bottom side 345, a safety razor left side 505, a safety razor right side 515, wherein the top side 335 is opposite the bottom side 345 and the safety razor left side 505 is opposite the safety razor right side 515. The safety razor 105 having a front surface 375 with a blade group 265 and a support 275 wherein the blade group 265 and support 275 are separated with a tactile discrimination distance 285 at a distance sufficient for two-point discrimination. In FIG. 60 the support 275 is embodied as a blade group and both blade group 265 and support 275 having a sharp blade 115 inside an inner guard 135 and outer comb 145. In FIG. 60 the safety razor 105 is has a skeletal structure which multiple safety razor skeletal openings 996. Having a skeletal structure offers a light weight safety razor 105 which may be more efficient for shaving as well as saves cost in manufacturing due to the absent amount of material that is saved. The safety razor 105 having a handle attachment 295 that can be seen through at least one safety razor skeletal opening 996 on the rear surface of the safety razor 105 opposite the front surface 375. Furthermore, illustrated are finger depressions 405 near the bottom side 345 of the safety razor 105.

In FIG. 61 illustrates a chart depicting the many level of distances to create two-point discrimination on the human male body locations in which these distances are performed in order for effective two-point discrimination communication. FIG. 61 is a graphical representation of the data represented in Table 1 discussed above with respect to FIGS. 27 and 28. The different parts of the body illustrated in FIG. 61 are the a hallux 805, a sole 815, a calf 825, a thigh 835, a belly 845, a back 855, a breast 865, a upper lip 875, a shoulder 885, a nose 935, a forehead 905, a forearm 915, a upper arm 925, a cheek 895, a palm 945 and fingers 955.

Figure 62:
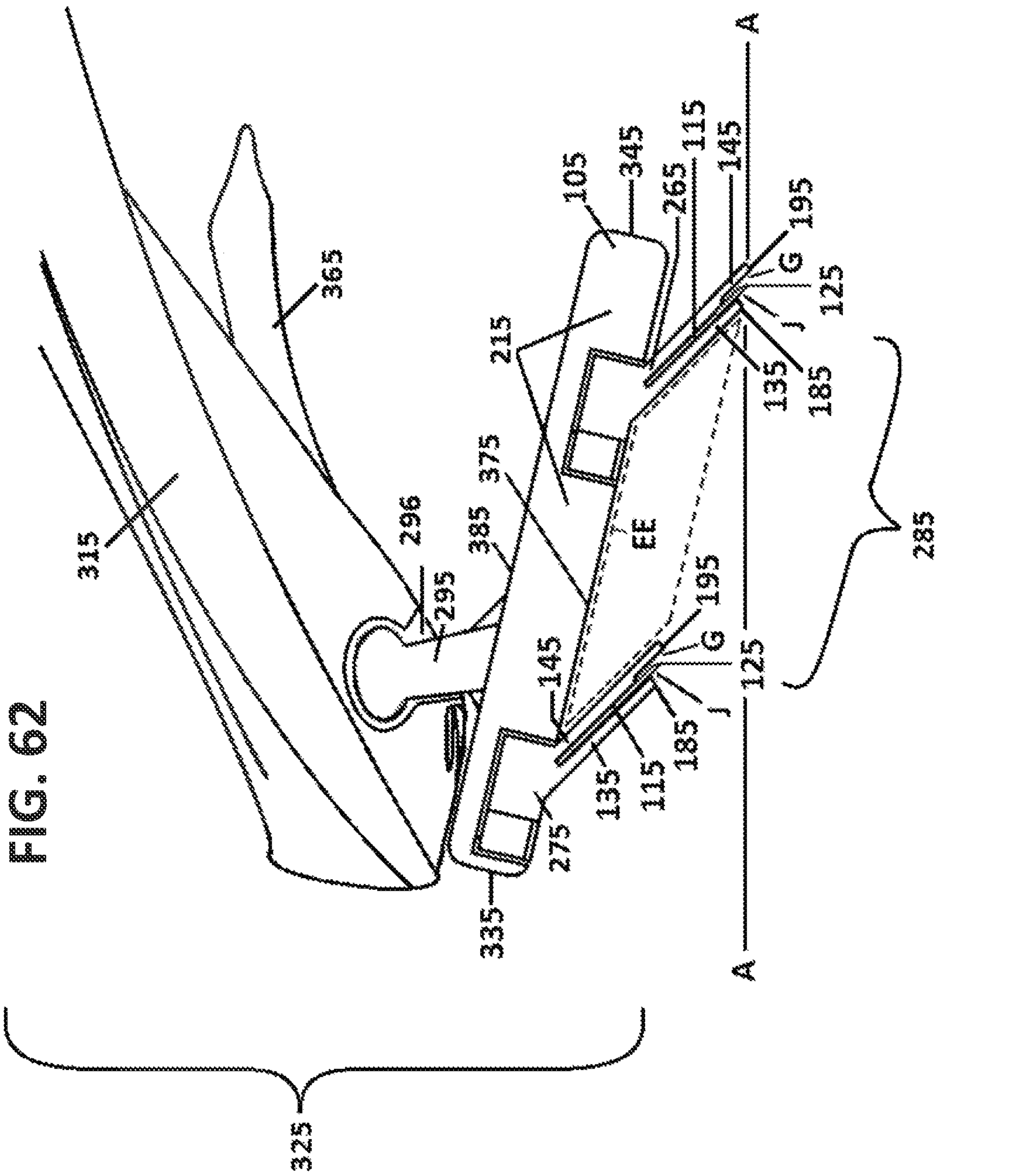
FIGS. 62-63 illustrate close up side views of an elongated back shaver handle and a safety razor removably attaching to the elongated handle with a pivot mechanism according to embodiments of the present inventions
Figure 63:
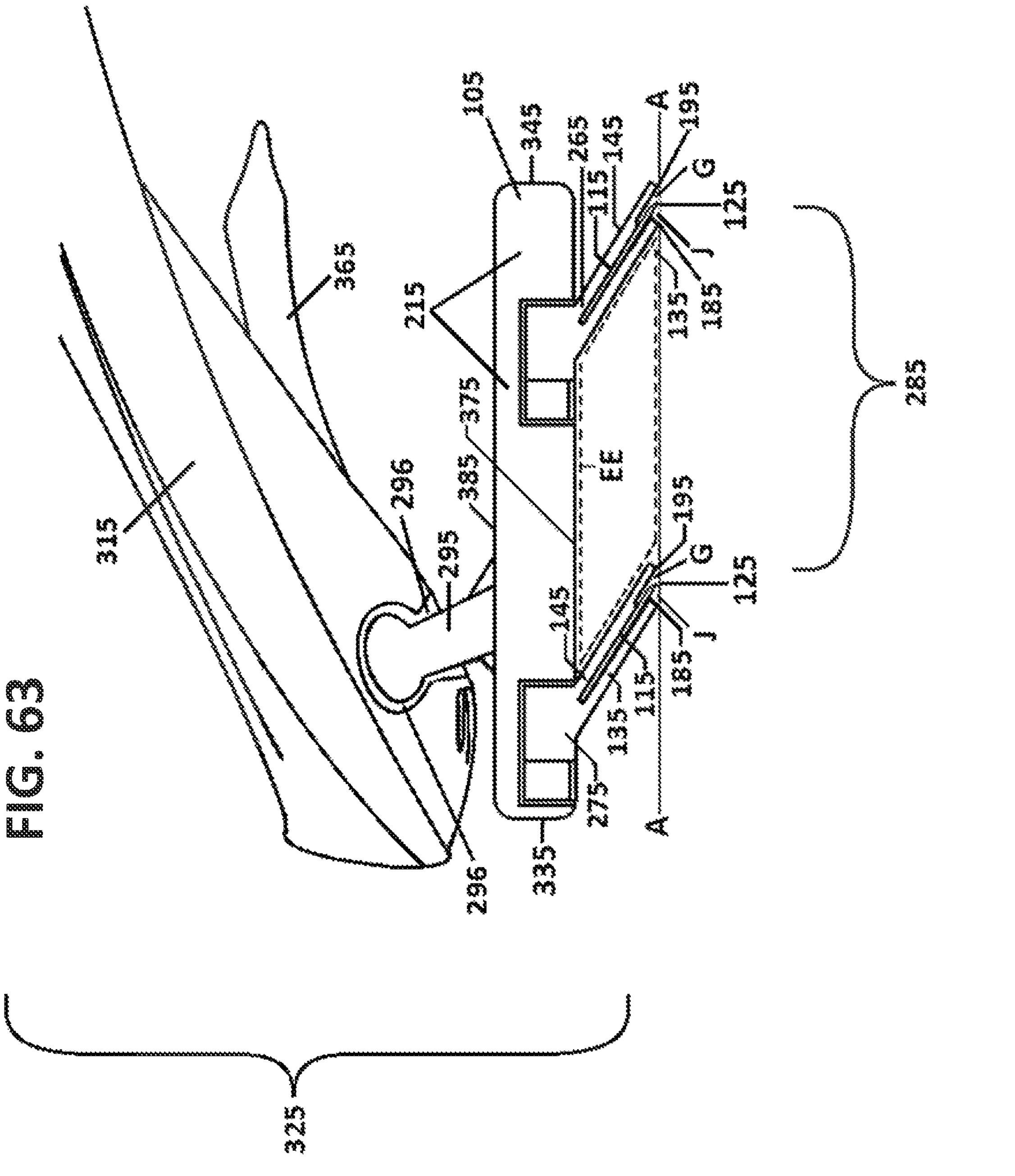

FIGS. 62-63 illustrate close up side views of an elongated back shaver handle 315 and a safety razor 105 removably attaching to the elongated back shaver handle 315 with a pivot mechanism 296 according to embodiments of the present inventions. The elongated handle 315 is generally an s-shaped elongated member 315 having a surface along a length of the elongated handle 315 defining a blade end 325. The safety razor 105 having a front surface 375 and a rear surface 385 wherein the front surface 375 is opposite the rear surface 385 and in FIGS. 42-43 the rear surface 385 if facing the elongated back shaver handle 325. A handle attachment 295 is on the rear surface 385 of the substrate structure 215 and removably attaching the safety razor 105 with the handle 315. A pivot mechanism 296 is located near the blade end 325 and allowing the safety razor 105 to move and pivot at alternate angles when pressed against a skin surface A. In an alternate embodiment the pivot mechanism 296 can also be embodied closer or further from the rear surface 385 of the substrate. Also, in another alternate embodiment the pivot mechanism 296 may also be located entirely on the safety razor 105 or the handle 315 or may be located on both in order to have the pivot work properly in allowing the safety razor 105 to pivot at alternate angles when pressed against the skin. The handle 315 having a handle clip 365 to lock and release the safety razor 105 for tactile feedback in the handle attachment 295. The safety razor having a top side 335 and a bottom side 345 wherein the top side 335 is opposite the bottom side 345.

The safety razor 105 has a blade group 265 and the support 275 spaced a distance sufficient to achieve tactile feedback on the flat skin plane A of a user and a tactile discrimination distance 285 between the blade group 265 and support 275. A tactile discrimination distance 285 is any distance gap spaced inside of at least the blade group 265 and the support 275 and the tactile discrimination distance 285 may have a deep or shallow elevation which is referenced as elevation gap EE. The tactile discrimination distance 285 may be a tactile distance for two-point discrimination. In FIGS. 42-43 the support 275 takes the form a blade group and each blade group comprising a sharp blade 115 with a sharp edge 125 and an inner guard 135 parallel to the sharp blade 115 with an outer edge 185 on a trailing side of the sharp blade 115 opposite an outer comb 145 having an inside edge 195 wherein the outer comb 145 parallel to the sharp blade 115 on a leading side of the sharp blade 115 and a substrate structure 215 adapted to hold the blade group 265 and the support 275 on a front surface 375 of the substrate structure 215 with the blade group 265 and support 275 spaced a distance sufficient to achieve two-point discrimination on the skin of a user between the blade group 265 and support 275. A trailing opening J is inside the sharp blade 115 and the inner guard 135 while the leading opening G is inside the inside edge 195 and the sharp edge 125.

Although the invention is described herein with reference to specific embodiments, various modifications and changes can be made without departing from the scope of the present inventions as set forth in the claims below. Accordingly, the specification and figures are to be regarded in an illustrative rather than a restrictive sense, and all such modifications are intended to be included within the scope of the present inventions. They can have different configurations than the examples illustrated in the drawings. Any benefits, advantages, or solutions to problems that are described herein with regard to specific embodiments are not intended to be construed as a critical, required, or essential feature or element of any or all the claims.

Any letter designations such as (a) or (b) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A safety razor for hair removal from skin, comprising:

a first cutting blade having an inner planar surface and an outer planar surface and comprising a sharp edge;

a first outer comb comprising a row of outer teeth extending alongside the outer planar surface of the first cutting blade, wherein the first outer comb comprises a leading opening spaced between an inside edge of the row of the outer teeth and the sharp edge of the first cutting blade;

a first inner guard comprising an inner guard edge extending alongside the inner planar surface of the first cutting blade, wherein a trailing opening is formed between the sharp edge of the first cutting blade spaced from the inner guard edge of the first inner guard; and a shaver handle coupled with the first cutting blade, the first outer comb, and the first inner guard and having a longitudinal axis always substantially perpendicular to the sharp edge of the first cutting blade, wherein the first outer comb is between the shaver handle and the first cutting blade; and wherein the first cutting blade is held in a position between the first outer comb and the first inner guard.

2. A safety razor according to claim 1, wherein the leading opening is less than or equal to the trailing opening.

3. A safety razor according to claim 2, wherein the leading opening is less than or equal to the trailing opening when the first cutting blade is at rest.

4. A safety razor according to claim 1, wherein an exposure distance between the inside edge of the row of outer teeth and the inner guard edge of the first inner guard is about 0.1727 centimeters (about 0.068 inches).

5. A safety razor according to claim 1, wherein the leading opening is about 0.08128 centimeters (about 0.032 inches).

6. A safety razor according to claim 1, wherein an inner distance BB measured along a longitudinal axis H of the first cutting blade to the inner guard edge of the first inner guard in relation to an outer distance N measured along the longitudinal axis H of the first cutting blade from edges of the outer teeth of the first outer comb to the sharp edge of the first cutting blade has a ratio of about 1.0.

7. A safety razor according to claim 6, a flat plane defined by edges of the outer teeth of the first outer comb and the inner guard edge of the first inner guard, wherein a guard to guard distance along the flat plane from the inner guard edge of the first inner guard to the edges of the outer teeth of the first outer comb is between about 1.5 mm and about 2.54 mm.

8. A safety razor according to claim 1, a flat plane defined by edges of the outer teeth of the first outer comb and the inner guard edge of the first inner guard, wherein an inner distance along the flat plane from the inner guard edge of the first inner guard to a sharp edge of the first cutting blade in relation to an outer distance along the flat plane from edges of the outer teeth of the first outer comb to the sharp edge of the first cutting blade has a ratio of about 1.74.

9. A safety razor according to claim 1, wherein the shaver handle is coupled directly to at least the first outer comb.

10. A safety razor according to claim 1, wherein the first inner guard comprises an inner comb to at least partially form the inner guard edge of the first inner guard comprising a row of inner teeth running along the inner planar surface of the first cutting blade.

11. A safety razor according to claim 1, further comprising a second cutting blade having an inner planar surface and outer planar surface and comprising a sharp edge;

a second outer comb comprising a row of outer teeth extending alongside the outer planar surface of the second cutting blade, wherein the row of outer teeth of the second outer comb comprises outer teeth edges;

a second inner guard comprising an inner guard edge extending alongside the inner planar surface of the second cutting blade; and wherein the shaver handle is further coupled to the second cutting blade, the second outer comb, and the second inner guard and the shaver handle having the longitudinal axis always substantially perpendicular to the sharp edge of the second cutting blade, wherein the second outer comb is between the shaver handle and the second cutting blade; and wherein the second cutting blade is held in a position between the second outer comb and the second inner guard.

12. A safety razor according to claim 11, wherein the sharp edge of the first cutting blade projects from the first inner guard up to a flat plane defined by edges of the outer teeth of the first outer comb and the inner guard edge of the first inner guard; and wherein the sharp edge of the second cutting blade projects from the second inner guard up to a flat plane defined by edges of the outer teeth of the second outer comb and the inner guard edge of the second inner guard.

13. A safety razor according to claim 1, wherein the sharp edge of the first cutting blade projects from the first inner guard up to a flat plane defined by edges of the outer teeth of the first outer comb and the inner guard edge of the first inner guard.

14. A safety razor according to claim 1, wherein the shaver handle is an elongated handle.

15. A safety razor according to claim 1, wherein the first cutting blade is a flexible cutting blade.

16. A method of using the safety razor of claim 15 for shaving hair on skin of a user, comprising the steps of:

(a) obtaining the safety razor;

(b) a hand of the user grasping the shaver handle on a grip of the shaver handle of the safety razor obtained in said step (a);

(c) the user reaching the shaver handle over a shoulder of the user with the first cutting blade facing towards a backside skin of the user;

(d) the user applying pressure against the backside skin of the user with the safety razor obtained in said step (a);

(e) the user making a movement stroke on the backside skin of the user with the safety razor obtained in said step (a); and (f) the user adjusting the first cutting blade of the safety razor by altering the pressure of said step (d) during the movement stroke of said step (e).

17. A method of using the safety razor according to claim 16, wherein said step (f) of the user adjusting the first cutting blade further comprises a substep of (f)(1) adjusting how far the first cutting blade bends towards the first outer comb by varying the pressure of the safety razor.

18. A method of using the safety razor according to claim 16, wherein, in the safety razor obtained in said step (a), the outer planar surface of the first cutting blade is parallel with and adjacent to a portion of the first outer comb; and the inner planar surface of the first cutting blade is parallel with and adjacent to a portion of the first inner guard.

* * * * *